(12) United States Patent
Biggerstaff

(10) Patent No.: US 8,060,857 B2
(45) Date of Patent: Nov. 15, 2011

(54) AUTOMATED PARTITIONING OF A COMPUTATION FOR PARALLEL OR OTHER HIGH CAPABILITY ARCHITECTURE

(75) Inventor: Ted James Biggerstaff, Austin, TX (US)

(73) Assignee: Ted J. Biggerstaff, Austin, TX (US)

( * ) Notice: Subject to any disclaimer, the term of this patent is extended or adjusted under 35 U.S.C. 154(b) by 331 days.

(21) Appl. No.: 12/363,738

(22) Filed: Jan. 31, 2009

(65) Prior Publication Data

US 2010/0199257 A1    Aug. 5, 2010

(51) Int. Cl.
*G06F 9/44* (2006.01)
*G06F 9/45* (2006.01)

(52) U.S. Cl. ............... 717/106; 717/114; 717/136
(58) Field of Classification Search .................. None
See application file for complete search history.

(56) References Cited

U.S. PATENT DOCUMENTS

| | | |
|---|---|---|
| 4,710,872 A | 12/1987 | Scarborough |
| 5,237,691 A | 8/1993 | Robinson et al. |
| 5,499,371 A | 3/1996 | Heminger et al. |
| 5,535,393 A | 7/1996 | Reeve et al. |
| 5,790,863 A | 8/1998 | Simonyi |
| 5,815,713 A | 9/1998 | Sanders |
| 5,822,593 A | 10/1998 | Lamping et al. |
| 5,896,537 A | 4/1999 | Landi et al. |
| 5,911,072 A | 6/1999 | Simonyi |
| 6,088,511 A | 7/2000 | Hardwick |
| 6,212,672 B1 | 4/2001 | Keller et al. |
| 6,314,555 B1 | 11/2001 | Ndumu et al. |
| 6,314,562 B1 | 11/2001 | Biggerstaff |
| 6,370,681 B1 | 4/2002 | Dellarocas et al. |
| 6,408,431 B1 * | 6/2002 | Heughebaert et al. ........ 717/106 |
| 6,460,176 B1 | 10/2002 | Suehiro et al. |
| 6,502,234 B1 | 12/2002 | Gauthier et al. |
| 6,574,791 B1 | 6/2003 | Gauthier et al. |
| 6,708,331 B1 | 3/2004 | Schwartz |
| 6,745,384 B1 * | 6/2004 | Biggerstaff .................. 717/156 |
| 6,889,373 B2 | 5/2005 | Fukase et al. |
| 6,966,054 B2 | 11/2005 | Simonyi |
| 7,017,146 B2 | 3/2006 | Dellarocas |
| 7,140,000 B2 | 11/2006 | Yucel |
| 7,146,347 B1 | 12/2006 | Vazquez et al. |
| 7,152,228 B2 | 12/2006 | Goodwin et al. |
| 7,181,734 B2 | 2/2007 | Swamy et al. |
| 7,219,328 B2 | 5/2007 | Schloegel et al. |

(Continued)

OTHER PUBLICATIONS

References list included in external document submitted as a file named References.pdf.

(Continued)

*Primary Examiner* — James D Rutten

(57) ABSTRACT

A method and a system for transformation-based program generation using two separate specifications as input: An implementation neutral specification of the desired computation and a specification of the execution platform. The generated implementation incorporates execution platform opportunities such as parallelism. Operationally, the invention has two broad stages. First, it designs the abstract implementation in the problem domain in terms of an Intermediate Language (IL) that is unfettered by programming language restrictions and requirements. Concurrently, the design is evolved by specializing the IL to encapsulate a plurality of desired design features in the implementation such as partitioning for multicore and/or instruction level parallelism. Concurrently, constraints that stand in for implied implementation structures are added to the design and coordinated with other constraints. Second, the IL is refined into implementation code. With this invention, porting an implementation neutral computation to an arbitrary architecture can be automated.

51 Claims, 105 Drawing Sheets

U.S. PATENT DOCUMENTS

| | | | |
|---|---|---|---|
| 7,313,773 B1 | 12/2007 | Braun et al. | |
| 7,334,216 B2 | 2/2008 | Molina-Moreno | |
| 7,743,362 B2* | 6/2010 | Peck et al. | 717/109 |
| 7,900,189 B2* | 3/2011 | O'Brien | 717/106 |
| 2005/0144226 A1* | 6/2005 | Purewal | 709/203 |

OTHER PUBLICATIONS

Saman Amarasinghe: The Looming Software Crisis due to the Multicore Menace, presentation, Computer Science and Artificial Intelligence Laboratory, MIT, also at http://groups.csail.mit.edu/commit/papers/06/MulticoreMenace.pdf (2006) 1-55.
APL (programming language), Wikipedia, the free encyclopedia, (Apr. 4, 2011) 1-19.
Loop Optimization, Wikipedia, (May 23, 2011), pp. 1.
John Backus: Can Programming be Liberated from the von Neumann Style? A Functional Style and Its Algebra of Programs, Communications of the ACM, Aug. 1978, vol. 21, No. 8, 613-641.
Roman Barták: Constraint Programming: In Pursuit of the Holy Grail, in Proceedings of the Week of Doctoral Students (WDS99), Part IV, MatFyzPress, Prague (Jun. 1999) 555-564.
Don Batory and Sean O'Malley: The Design and Implementation of Hierarchical Software Systems with Reusable Components, ACM Transactions on Software Engineering, vol. 1, No. 4, (Oct. 1992) 355-398.
Don Batory, Vivek Singhal, Marty Sirkin, and Jeff Thomas: Scalable Software Libraries. Symposium on the Foundations of Software Engineering. Los Angeles, California (1993) 191-199.
Ted J. Biggerstaff: A Perspective of Generative Reuse, Annals of Software Engineering, Baltzer Science Publishers, AE Bussum, The Netherlands (1998b) pp. 44.
Ted J. Biggerstaff: Pattern Matching for Program Generation: A User Manual. Microsoft Research Technical Report MSR-TR-98-55 (1998d) pp. 47.
Ted J. Biggerstaff: Fixing Some Transformation Problems. Automated Software Engineering Conference, Cocoa Beach, Florida (1999) pp. 10.
Ted J. Biggerstaff: A New Architecture of Transformation-Based Generators, IEEE Transactions on Software Engineering, vol. 30, No. 12 (Dec. 2004) 1036-1054.
Guy E.Blelloch, Jonathan C.Hardwick, Siddhartha Chatterjee, Jay Sipelstein, and Marco Zagha: Implementation of a Portable Nested Data-Parallel Language, in Proceedings of PPOPP '93 Proceedings of the fourth ACM SIGPLAN symposium on Principles and practice of parallel programming, (1993) 102-111.
Guy Blelloch: Programming Parallel Algorithms, Communications of the ACM, 39 (3) (Mar. 1996) 85-97.
Guy E.Blelloch, and Bruce M. Maggs: Parallel Algorithms, in Algorithms and theory of computation handbook, Chapman & Hall/CRC, (Jan. 2010) pp. 44.
Lucas Bordeaux, Youssef Hamadi, and Lintao Zhang: Propositional Satisfiability and Constraint Programming: A comparative survey, ACM Computing Surveys, vol. 38, No. 4, (Dec. 2006) pp. 54.
A.Borning: The Programming Language Aspects of ThingLab, A Constraint-Oriented Simulation Laboratory, in ACM Transactions on Programming Languages and Systems, 3(4), (1981) 353-387.
Bradford L. Chamberlain: Choi, Sung-Eun, Deitz, Steven J. and Snyder, Lawrence: The High-Level Parallel Language ZPL Improves Productivity and Performance, Proceedings of the IEEE International Workshop on Productivity and Performance in High-End Computing, (2004) 1-10.
Don Clark: Racing to Gain Edge on Multicore Chips, Wall Street Journal, Mar. 17, 2008 pp. 1.
Daniel E.Cooke, J. Nelson Rushton, Brad Nemanich, Robert G.Watson, and Per Andersen: Normalize, Transpose, and Distribute: An Automatic Approach to Handling Nonscalars, ACM Transactions on Programming Languages and Systems, vol. 30, No. 2, (2008), pp. 49.
Tzilla Elrad, Robert E. Filman and Atef Bader: Aspect-Oriented Programming, Communications of the ACM, vol. 44, No. 10 (2001) 29-32.
Jung Kim Foo and David Garlan: Analyzing Architectural Styles, Journal of Systems and Software (2010) 1-54.
Fortran—Wikipedia, the free encyclopedia, (Apr. 4, 2011) pp. 21.
Franz Franchetti, Yevgen Voronenko and Markus Puschel: FFT Program Generation for Shared Memory:SMP and Multicore, SC2006, (Nov. 2006) pp. 12.
L.J. Guibas and D. K. Wyatt: Compilation and Delayed Evaluation in APL, Fifth Annual ACM Symposium Principles of Programming Languages, (1978) 1-8.
Halfhill, Tom R.: Parallel Processing with CUDA, Microprocessor Report, (Jan. 2008) pp. 8.
M. W.Hall, S. P.Amarasinghe, B. R.Murphy, S. W.Liao, and M. S.Lam: Interprocedural Parallelization Analysis in SUIF ACM Transactions on Programming Languages and Systems, vol. 27, No. 4, (Jul. 2005) 662-731.
Gwan-Hwan Hwang, Jenq Kuen Lee, and Dz-Ching Ju: An Array Operation Synthesis Scheme to Optimize Fortran 90 Programs, Conference Title: Fifth ACM SIGPLAN Symposium on Principles and Practice of Parallel Programming (PPoPP), Jul. 1995; Published in SIGPLAN Notices, 30(8):112-22 (Aug. 1995) 112-122.
Neil D.Jones: An Introduction to Partial Evaluation, ACM Computing Surveys, vol. 28, No. 3 (1996) 480-503.
W. M. Johnson, J. R. P. Hanna, and R. J.Millar: Advances in Dataflow Programming Languages, ACM Computing Surveys, vol. 36, No. 1 (Mar. 2004) 1-34.
Elaine Kant: Synthesis of Mathematical Modeling Software, IEEE Software, (May 1993) 30-41.
M. D Katz and D.Volper: Constraint Propagation in Software Libraries of Transformation Systems, International Journal of Software Engineering and Knowledge Engineering, 2, 3 (1992) 355-374.
Gregor Kiczales and Mira Mezini: Aspect-Oriented Programming and Modular Reasoning, International Conference Software Engineering, (May 2005) 49-58.
Christian Schulte and Peter J.Stuckey: Efficient Constraint Propagation Engines, ACM Transactions on Programming Languages and Systems, vol. 31, No. 1, (2009) pp. 43.
James Larus and Christos Kozyrakis: Transactional Memory, Communications of the ACM, (Jul. 2008), pp. 80-88.
John Markoff: Race is on to Advance Software for Chips, New York Times, (Apr. 30, 2008) pp. 2.
Kiminori Matsuzaki, Hideya Iwasaki, Kento Emoto, and Zhenjiang Hu: A Library of Constructive Skeletons for Sequential Style of Parallel Programming, INFOSCALE '06. Proceedings of the First International Conference on Scalable Information Systems, (May 29-Jun. 1 2006), pp. 14.
Marjan Mernik, Jan Heering and Anthony M.Sloane; When and How to Develop Domain-Specific Languages, ACM Computing Surveys, vol. 37 No. 4, Dec. 2005, 316-344.
Metal-Object-Protocol, http://en.wikipedia.org/wiki/Metaobject, (Apr. 7, 2011) pp. 3.
Rick Merritt: Chip industry confronts 'software gap' between multicore, programming, EE Times, (Apr. 3, 2008) pp. 3.
Rick Merritt: CS Gets With Parallel Program, EE Times, (Mar. 21, 2008) pp. 5.
Robert Mullins: Academia Tackles Parallel Programming Problem, Systems Management News (Apr. 18, 2008), pp. 3.
James M. Neighbors: The Draco Approach to Constructing Software From Reusable Components. IEEE Transactions on Software Engineering, SE-10 (5), (Sep. 1984) pp. 564-573.
ZPL, http://www.cs.washington.edu/research/zpl/overview/overview.html (Apr. 8, 2011) 1-2.
OpenMP, http://en.wikipedia.org/wiki/OpenMP, (Apr. 6, 2011) 1-13.
D. L.Parnas: On the Criteria to Be Used in Decomposing Systems into Modules, Communications of the ACM, (Dec. 1972) 1053-1058.
David Patterson: The Multicore Challenge, Posted in Research Horizons, The Computing Community Consortium Blog, (Aug. 26, 2008) pp. 2.
David Patterson: The Trouble with Multicore, IEEE Spectrum, (Jul. 2010) pp. 6.
Daniel Perovich, Maria Cecilia Bastarrica, and Cristian Rojas: Model-Driven Approach to Software Architecture Design, SHARK ICSE Workshop, (May 2009) pp. 8.

J. Alan Robinson: A Machine-Oriented Logic Based on the Resolution Principle. Journal of the ACM (JACM), vol. 12, Issue 1, (1965) 23-41.

Tim Sheard: Accomplishments and Research Challenges in Meta-Programming, SAIG 2001 Workshop, Florence, Italy (Sep. 2001), pp. 44.

Charles Simonyi: Intentional Programming, http://en.wikipedia.org/wiki/Intentional_programming (Apr. 10, 2011) pp. 5.

D. B. Skillicornand D.Talia: Models and Languages for Parallel Computation, ACM Computing Surveys, vol. 30, No. 2, (Jun. 1998), pp. 123-169.

Steve Conway: Multicore Processing: Breaking Through the Programming Wall, Scientific Computing, (Aug. 2010) pp.

Kai Tan, Duane Szafron, Jonathan Schaeffer, John Anvik and Steve MacDonald: Using Generative Design Patterns to Generate Parallel Code for a Distributed Memory Environment, Proceedings of the ninth ACM SIGPLAN symposium on Principles and practice of parallel programming (Jun. 2003) 203-215.

Unified Parallel C, http://en.wikipedia.org/wiki/Unified_Parallel_C (Apr. 7, 2011) pp. 1.

* cited by examiner

Partitioning Condition: $(((== ?i\ ?ilow)\ \lor (== ?j\ ?jlow)\ \lor (== ?i\ ?ihigh)\ (== ?j\ ?jhigh))$,
where $?i$ and $?j$ are matrix index variables and $(?ilow \leq ?i \leq ?ihigh)$ and $(?jlow \leq ?j \leq ?jhigh)$.

1c-01

1c-02

| Partition Object | Partitioning Condition | Specialized Domain Object | Specialized Intermediate Language Method-Transforms |
|---|---|---|---|
| Part1 | $(== ?i\ ?ilow)$ | S-0-edge1 | Partestx(S-0-Edge1 ...), Row (S-0-Edge1 ...), Col (S-0-Edge1 ...), W (S-0-Edge1 ...), ... |
| Part2 | $(\neg (== ?i\ ?ilow)) \land (== ?j\ ?jlow))$ | S-0-edge2 | Partestx(S-0-Edge2 ...), Row (S-0-Edge2 ...), Col (S-0-Edge2 ...), W (S-0-Edge2 ...), ... |
| Part3 | $(\neg (== ?i\ ?ilow) \land \neg (== ?j\ ?jlow) \land (== ?i\ ?ihigh))$ | S-0-edge3 | Partestx(S-0-Edge3 ...), Row (S-0-Edge3 ...), Col (S-0-Edge3 ...), W (S-0-Edge3 ...), ... |
| Part4 | $(\neg (== ?i\ ?ilow) \land \neg (== ?j\ ?jlow) \land \neg (== ?i\ ?ihigh) \land (== ?j\ ?jhigh))$ | S-0-edge4 | Partestx(S-0-Edge4 ...), Row (S-0-Edge4 ...), Col (S-0-Edge4 ...), W (S-0-Edge4 ...), ... |
| Part5 | $(\neg (== ?i\ ?ilow) \land \neg (== ?j\ ?jlow) \land \neg (== ?i\ ?ihigh) \land \neg (== ?j\ ?jhigh))$ | S-0-default | Partestx(S-0-default ...), Row (S-0-default ...), Col (S-0-default ...), W (S-0- default ...), ... |

Fig. 1c

Loop2D APC

| ... Inherited Fields ... |
| --- |
| Name: Loop2D1 |
| Type: Loop2D |
| Idex: idx3 |
| Irange : (0 , (m-1)) |
| Jdex: idx4 |
| Jrange : (0 , (n-1)) |

Fig. 6 totalsteps = (1,000,000) ——————→ 60-01 step = $\left(\dfrac{1}{\textbf{totalsteps}}\right)$ ——————→ 60-02

$f(x) = \dfrac{4}{(1+x^2)}$ ——————→ 60-03

$\Pi = \displaystyle\int_0^1 f(x)\,dx$ ——————→ 60-04 where (0<=i<=(totalsteps − 1)), delta(x) = step, and $x_i$ = (i+0.5) * step. ——————→ 60-05

Fig. 60

AUTOMATED PARTITIONING OF A COMPUTATION FOR PARALLEL OR OTHER HIGH CAPABILITY ARCHITECTURE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable.

INCORPORATION-BY-REFERENCE OF MATERIAL SUBMITTED ON COMPACT DISC

Not Applicable

BACKGROUND

1. Field of Invention

This invention relates to programming of computers with various kinds of facilities for parallel or other high capability execution of computer programs, specifically to the automated generation of programs from execution platform neutral specifications, to the automated partitioning of those programs into pieces that can be executed in parallel or can otherwise exploit a high capability feature of a high capability execution platform architecture, and to the automated choice of the specific partition form that best exploits the parallelism or other high capability feature in a chosen class of parallel or other high capability execution platform architectures.

2. Description of Prior Art

Key Machinery: Much of the prior art is most easily understood by contrasting it with the key machinery and methods underlying this invention. Thus, the following paragraph provides a summary of the key machinery and methods of this invention to serve as a context for the subsequent descriptions of the prior art.

A hallmark of the methods and machinery of this invention, and one that breaks with the tradition of most of today's mechanisms for parallelization of software, is that this invention performs most of its key operations in the problem domain and the programming process or design domain but not (initially) in the general program language (GPL) domain. What this means is that this invention initially represents its end product largely in terms of problem data and operators (e.g., images and convolutions, where a convolution is is defined as a very general image or signal processing operation that computes output images or signals from input images or signals where each pixel or signal element in the output image or signal is computed from the pixels or signal elements in the neighborhood surrounding the particular input pixel or signal element) rather than program language data and operators (e.g., concretely defined matrices, collections and arithmetic operations). Further, it formulates its output (i.e., the target program) first, in terms of broad-brush design abstractions (e.g., parallel partitions of a computation) that are easy to create, organize and re-structure and do not yet contain the low level programming (i.e., GPL) details. Adding the GPL details later reduces one large, global and intractable programming problem to a set of locally separated, smaller and therefore simpler programming problems, each within the context of a separate design abstraction. In other words, operating in the problem, programming process, and design domain first, and adding the programming details later means "design first, code later."

Background of the Prior Art: A well known drawback of new architectures for parallel machines is that in order to exploit their parallelism, costly reprogramming is usually required. Parallel (also called partitioned) designs of some computational algorithms that have been developed for specific machine architectures must be converted by human programmers into new parallel forms when new parallel architectures are introduced. It is often too costly, complex, and time consuming for companies and organizations to perform such conversions. In many cases, this requirement has been the death knell of the parallel machine or at least of the parallel elements of a machine. Prior approaches to programming parallel machines are varied and all have significant problems and shortcomings.

Generalist or Universal approaches: Some past approaches to this and related problems have largely sought to find an improved General Programming Language (GPL) or other general, universal representations that lend themselves to all programming problems. These representations include Functional Programming (FP, See Backus, John: Can Programming be Liberated from the von Neumann Style? A Functional Style and Its Algebra of Programs, Communications of the ACM, August, 1978, Vol. 21, No. 8, (August, 1978); APL (See, James A., Pakin, Sandra, Plivka, Raymond P.: APL2 at a Glance (1988)); data flow programming; applicative programming; lambda calculus based representations (e.g., ML and Haskell), which often include higher order abstractions (e.g., higher order functions); and other programming languages, e.g., NESL, (See Blelloch, Guy: Programming Parallel Algorithms, Communications of the ACM, 39 (3) (March, 1996)) and SequenceL (Cooke, D. E., Rushton, J. N., Nemanich, B., Watson, R. G., and Andersen, P.: Normalize, Transpose, and Distribute: An Automatic Approach to Handling Nonscalars, ACM Transactions on Programming Languages and Systems, Vol. 30, No. 2, (2008), pp. 50). These approaches emphasize making the representation easy to understand and attempt to make it independent of the nature of underlying machine. For example, Backus's paper emphasizes the algebraic nature of FP and the fact that FP is not imperative in the von Neumann sense. However, these representations fall short in that they provide few or no mechanisms for exploiting the array of computational speed ups that are offered by the many new computational environments and machines. Typically, the constructs that implement those speed ups are extensions that fall outside of the representational notation itself. Sometimes, they are hidden or isolated in base layers or libraries upon which application software is built. In order to exploit them, one must make some non-trivial modifications to the target application software specification, thereby undoing some of the representational gains made by the choice of the implementation neutral specification language. For example, to exploit a multi-core architecture, the application programmer must write code that partitions a computation into subcomponents that are executed by separate threads, or must write other forms of code that are tied to the underlying execution platform or abstraction thereof.

Some of the languages in this category (e.g., NESL and SequenceL) do provide some opportunity for automating parallelism by virtue of the fact that certain constructs of the general programming language may suggest parallelism (e.g., applying parallel function calls to data collections) or alternatively, may provide a generalized translation/reorganization procedure or protocol to produce parallel forms (e.g., the "Normalize, Transpose and Distribute" protocol in SequenceL). Nevertheless, such opportunities for parallelism arise strictly out of the data structures in the programming language and provide no method of discovering or taking advantage of domain and application specific opportunities for parallelism (e.g., problem or specific partitioning). Thus, opportunities to exploit domain specific knowledge to improve or extend the parallelization of the program are lost. As a consequence, these languages fall into the class of GPLs and the translation process is working in the GPL domain not the problem domain. Furthermore, since any parallelization procedure/protocol for these languages is not operating in the "programming" domain (i.e., the domain whose focus is the process of designing and constructing a program), it does not have facilities for first formulating the broad-brush target program architecture from (not-yet-concrete) design abstractions (e.g., partitions or thread partitions) unencumbered by low-level GPL details. That is, it does not have the ability to be design driven and inject desired design features into the solution like this invention does. And as a consequence, it lacks the follow-on ability to add in the low level coding details as a separate step that reduces a big global coding problem to a set of smaller and largely independent or weakly dependent coding problems. In short, because these languages are operating in the GPL domain, they are not suited to the principle of "design first, code later."

Even so, many of the languages and approaches in this category provide useful representational contributions to the specification problem. Features and elements of some of these representations (e.g., functional expressions) will be exploited by this invention.

Abstraction Layers: In an attempt to hide the details of the machine and thereby allow the program specification to be free (to a degree) of the architecture of the machine, it is common to introduce a standardized interface layer with which the application software can communicate. The problem is that this approach does not really solve the partitioning and reprogramming problem. One has the choice of two basic approaches. One can choose some specific architectural metaphor for the layer (e.g., message passing among distributed computers or threads on a shared memory system or a vector machine model) and accept the fact of reprogramming that layer whenever the system must be moved to a new machine architecture. Alternatively, if one seeks to avoid reprogramming, one could, in theory, move the partitioning problem into the layer code. However, this is equivalent to giving up because the partitioning problem is just as hard (and most likely harder) within the abstraction layer than it is within the application proper. In all likelihood, the abstraction layer will compromise full exploitation of theoretical performance increases possible through exploiting the machine parallelism. Further, if the layer has an architecturally specific structure, only a subset of problems can really benefit from its specific architectural abstractions. In the end, abstraction layers are really just another (albeit somewhat generalized) class of parallel machine.

Enhanced GPLs: Other approaches have extended GPL-based representations (e.g., FORTRAN (See Chapman, Stephen J.: Fortran 90/95, McGraw-Hill, (1998)) or C (See Kernighan, Brian W. and Ritchie, Dennis M.: C Programming Language (2nd Edition), Prentice Hall (1988) and Harbison, Samuel P. and Steele, Guy L., Jr.: C: A Reference Manual (5th Edition), Prentice Hall (2002))) with constructs that directly exploit the facilities of the underlying execution environment (e.g., High Performance FORTRAN—HPF—and Unified Parallel C—UPC). And to the degree that they depend on extensions to the programming language, Transactional Memory (TM) systems also fall into this class. See Larus, James and Kozyrakis, Christos: Transactional Memory, Communications of the ACM, (July, 2008), pp. 80-88 and Larus, James and Rajwar, Ravi: Transactional Memory, Morgan and Claypool, (2007). While I have chosen to classify Transactional Memory in the Enhanced GPL category, one could make the argument that TM could equally as well be classified in the Abstraction Layers category because TM often depends upon software layers (e.g., conflict handlers, instrumentation and state management routines, transaction roll back facilities, etc.) and further, TM may depend upon hardware features (e.g., extra cache flags and functionality). In either case, the programmer must build some programming structures in the application code that are needed by the TM functionality and therefore, the programming language (or runtime libraries) requires enhancements.

However, enhanced GPL approaches are a step backward in that, in addition to having all of the problems of GPLs (e.g., being difficult to manipulate by automation), they have the additional problem of being tightly bound to the special features of their execution environment. That is, they force commitment to detailed program structures too early (e.g., what data must be processed by what loops or iterations, how many different loops are required, what are the detail ranges of loops, how are loops broken up to exploit parallelism) and this precludes or complicates reorganizing the program to represent a different partitioning needed by a different parallel machine architecture. Additionally, parallel languages often implicitly commit to a specific parallel machine architecture because of their specialized operators and structures. For example, consider the special operators or functions in a parallel language that fork threads. Use of such an operator implicitly commits to a multiprocessor architecture with shared memory. On the other hand, the use of a message passing expression in the code implicitly commits to a message passing architecture. These differing architectures are likely to engender different computation partitionings with differing control frameworks (e.g., message passing may require data locking code to coordinate the actions of the separate machines on shared data while threads on multiple CPUs with shared memory may or may not). At the very least, differing machine architectures will require different data organizations, different management functions for that data, and different coordination actions (e.g., locks and releases for data shared by multiple CPUs with separate memories).

To shift between niches often requires identifying the "too-architecture-specific" code, abstracting away the specificity (i.e., recovering the domain or problem specific knowledge by an inference process), reorganizing the program structure to the new niche, and regenerating the detailed programming language for that new niche. That is to say, reprogramming is still required with parallel programming languages.

In short, such approaches exacerbate the manipulation problem especially in the context of moving from one computational environment to another that is architecturally quite different. These representations are headed in the wrong direction if one is seeking a broadly general solution. Such languages are in the same class as assembly languages. They are useful for programming a single class of machine but antithetical to the objective of developing abstract program specifications that transcend the properties of any particular machine architecture.

Manipulation Protocols and Code Optimization: Another approach is to choose some useful GPL for representation and to extend that representation with a protocol for manipulating the GPL representation. These approaches are usually aimed at allowing specification of a target program in a form that is easy for the human programmer to express and understand even though that form may not execute efficiently. The manipulation protocols are used to manipulate the GPL specification into a highly efficient executable form. Ideally, one would like the ability to have the executable form take advantage of architectural features such as vector instructions and multi-core CPUs. In the previous research, that ideal has not been fully accomplished.

Examples of GPL-oriented approaches using manipulation protocols include Meta-Object Protocols (MOP), Aspect Oriented Programming (AOP), OpenMP, Anticipatory Optimization Generation' (AOG) and others. MOP creates higher order objects (i.e., Meta-Objects) that can examine the state of the object system used for the definition of some target program and potentially, alter the behavior of those objects and thereby alter the behavior of the target program. In one example, MOPs have been created that allow one to change the behavior (e.g., inheritance) of the Common Lisp Object System (CLOS).

For more information on AOP, see Tzilla Elrad, Robert E. Filman, Atef Bader, (Eds.), "Special Issue on Aspect-Oriented Programming," Communications of the ACM, vol. 44, no. 10, pp. 28-97, 2001. For more information on OpenMP, see Chapman, Barbara, Jost, Gabriele, and van der Pas, Ruud: Using OpenMP: Portable Shared Memory Parallel Programming, Massachusetts Institute of Technology (2008). For more information on Anticipatory Optimization Generation, see U.S. Pat. No. 6,314,562, Nov. 6, 2001, "Method and System for Anticipatory Optimization of Computer Programs," Inventor: Ted J. Biggerstaff, Assignee: Microsoft Corporation; U.S. Pat. No. 6,745,384, Jun. 1, 2004, "Anticipatory Optimization with Composite Folding," Inventor: Ted J. Biggerstaff, Assignee: Microsoft Corporation; and Biggerstaff, Ted J.: "A New Architecture for Transformation-Based Generators," *IEEE Transactions of Software Engineering, pp.* 1036-1054, Vol. 30, No. 12, December, 2004.

OpenMP (OpenMP 2007) allows pragma-based directives to be embedded in C/C++ or FORTRAN to guide the compiler to add parallelism to the program. The approach is limited by the fact that both representations—the GPL language and the OpenMP directives—are dealing with low level concrete details. The broad design of the program is cast in concrete leaving smallish locales available for improvement. A deeper problem may be that the programmer is given two hard, detailed tasks: 1) write the computation in a GPL and then, based on a limited understanding of what the compiler can and will do, 2) describe to it how to parallelize these locales (e.g., partition a computation into threads). This seems like we are asking the programmer to perform two very hard programming jobs in two quite different domains (i.e., programming and code optimization). Further, the programmer is likely to be somewhat in the dark on the exact nature of the generated code, which makes adding the successful directives even harder. Like enhanced or specialized GPLs, this seems like a step backwards. Additionally, it is not particularly useful for parallelization opportunities that do not lend themselves to thread-based parallelism. Whenever a new parallel architecture appears, the old directives are pretty much useless. So, once again, the programmer is faced with reprogramming for the new architecture.

AOP seeks to separately specify aspects of the target program and then as a separate process, weave those separate aspects into a design that is more computationally optimal (but a design that is by necessity less modular). For example, one might specify the essence of a computation separately from a cache-based optimization for that program. AOP research often uses MOP machinery to achieve the program modifications (i.e., the re-weavings).

In AOG, piece-parts that are assembled into the target program are decorated with tags. These tags specify event-driven transformations that are triggered by transformation phases or AOG events. These various tag driven transformations (possibly, on different piece-parts) cooperatively rewrite portions of the target program to achieve some specific (often non-local) optimization. Different machine architectures (specified separately) engender different sets of tag annotations for the target program piece-parts, allowing the program to be selectively rewritten for different machine architectures, e.g., a vector machine, or a multi-core machine or both. AOG differs from OpenMP in that the AOG transformations are event triggered allowing coordination among the atomic transformations; the transformations are attached beforehand to the building block components (i.e., piece-parts) not to the full and integrated program; the transformations for the building block components vary based on domain specific properties (e.g., a multi-core target architecture would add a different set of transformation tags to the building blocks than a non-multi-core architecture); and the transformations can be further coordinated and ordered by restricting them to one particular generation phase. These various mechanisms allow each differing tagging strategy to implement an overall program reorganization strategy that is tuned to optimization opportunities presented by the target execution platform.

However, while the AOG approach can be an improvement over fully automatic compiler parallelization because it can realize partitionings that avoid the high overhead problem of lots of little partitions, it too has flaws that result from the optimization processes having to operate on a programming language representation of the code (i.e., a too detailed representation). This approach requires a number of carefully organized and sequenced program reorganization (i.e., optimization) steps in order to achieve the ideal partitioning of the computation for a particular parallel architecture. The details of the steps, their coordination and their order are highly dependent upon the structure of the computation. For example, two if-then-else based cases derived from two related abstract operations (e.g., two convolutions on the same image) may benefit from being merged (i.e., included in the same computational partition). However, because they are each generated within a separate loop, they may require preparatory steps such as the distribution of the loop over the then and else cases in order to get the two if tests positioned so that there is an opportunity to merge them. Occasions arise where intervening code is generated that prevents the automatic distribution of the two loops thereby preventing the merging of the "if tests", which in turn prevents the ideal partitioning. The deeper problem is waiting until code is generated with all of its detailed variations. While the code level representational approach makes expressing partition details easier because they are expressible in well known programming language terms (e.g., array index expressions), it makes recognizing the code more difficult and is fraught with unforeseen opportunities for failure. Such generators and indeed all approaches that reorganize program code after the fact (e.g., parallelizing compilers) are a lot like trying to fundamentally change the design of a house after the house is built. The better solution is to design the desired structure in the first place and then build the house. For parallelization, the better solution is to commit to the partitioning pattern first and let that guide the generation of the detailed code. However, until this invention, it was not known how to automate this process. Because of these shortcomings, the AOG approach has been abandoned in favor of the approach described in this invention.

Code level optimization in the context of compilers has been an active area of research because there is an existing base of understanding, tools, and practice. (See Bacon et al 1994) Unfortunately, the amount of parallelization achievable with code optimization appears to be limited to rather simple cases in which the code has certain desirable properties and determining the existence of those properties is feasible. Unfortunately, only a portion of the opportunities for optimization can be detected because many opportunities are beyond the ability of the analysis process.

For a good example of the difficulties of automatic parallelization, see Hall, M. W., Amarasinghe, S. P., Murphy, B. R., Liao, S. W., and Lam, M. S.: "Interprocedural Parallelization Analysis in SUIF," *ACM Transactions on Programming Languages and Systems*, Vol. 27, No. 4, July, 2005. This paper describes a number of highly complex analyses on code, based on techniques like interprocedural data flow analyses, convex region analyses, scalar data flow analyses, context identification, and others to determine pieces of the computation that can be parallelized. In many cases, it is doing a large amount of analysis to infer facts that the human programmer already knows or can easily infer from problem domain specific knowledge. In some cases, the analysis is too computationally difficult to identify all possibilities for parallelization and opportunities are missed. Sometimes opportunities for big gains are missed. In most cases, the parallelization is rather low level (small chunks) such that the computational overhead of setup reduces the profits of parallelization. This is the price that is paid for operating in the program language domain (FORTRAN and C) rather than the problem domain and for committing to specific machine architectures too early in the programming process, which is unavoidable in the programming language domain.

The code optimization process often finds many little, separate opportunities rather than a larger, combined opportunity, which increases the computational overhead costs and thereby reduces the speed ups of parallelization. Finally, the optimization process is generally unable to take advantage of domain specific knowledge that can easily identify the large opportunities for parallelization and it is this latter point that places the hard limits on the degree to which compiler optimization can exploit opportunities for parallelization.

Beyond compiler optimization, manipulation protocols have made some progress. However, there has always been one major but largely unrecognized stumbling block—the representation of the target program. Because the target program is usually specified in a GPL form, the concrete level details of the GPL make the rewriting process excessively complex and introduce many ways for that rewriting process to fail. In general, transformations of the target program representation often require knowing complex program properties that are difficult or infeasible to derive from the GPL code (much like with compiler optimization). For example, even simple transformations may depend on data flow, liveliness of variables, scoping knowledge, variable dominance, and other even more specialized properties (e.g., convex hull of program regions) that may require inferences that are not always computationally feasible. (See Hall, et al 2005). While AOG makes some progress with these difficulties by using the domain knowledge encoded in the tags to guide the overall process, the many detailed, GPL-induced constraints within the target program can make the addition of new variations to the process difficult.

Fundamentally, the author believes that the key problem with all of these approaches is that the manipulation is done in the code or GPL domain (as opposed to the problem domain) and many of the complex properties that are so difficult to determine arise from the imperative nature and the low level detail of the GPL language itself. A domain oriented language eliminates many of the GPL's imperative complexities, abstracts away the low level of detail and therefore, many of the difficult "program property" inferences (e.g., convex hull of program regions) just disappear. In addition, domain knowledge often provides programming guidance, e.g., knowledge of problem specific partitioning conditions guides loop partitioning to exploit multi-core CPUs. In other words, a GPL program representation is not sufficiently domain oriented and the GPL technologies for abstraction (e.g., Object Oriented representations) are insufficient to make the difficult property inferences disappear. In short, a GPL representation is too imperative and not declarative enough. It throws away useful domain knowledge. It is too much oriented to programming machines and too little oriented to describing domain or problem solutions.

"Constraint Programming Research" is not focused on "Programming": Some research areas that seem like they should be candidates for the partitioning problem aren't, at least, not for the general partitioning problem. Constraint programming research, is one of those. It is a sound-alike topic but it is NOT focused on using constraints to guide the construction and parallelization of general computer programs in the sense considered in this invention. It is focused on and characterized by computational models that use constraints (dynamically) to guide the execution of a program searching a very large search space of potential solutions to a problem (e.g., find DNA sub-segments that may be part of a single longer segment based on common sub-segments). The idea is that the constraints can (possibly) reduce an unfeasibly large search space to a feasible size by determining that large portions of that space do not contain or are unlikely to contain the solution based on some macro-properties of that large subspace. It is mostly focused on constraint satisfaction problems that are best characterized as a "mathematically oriented process akin to solving equations" where the "equations" are the constraints. The problems are mostly combinatorial in nature and the approaches are mostly methods of searching some large solution space for an answer meeting the set of constraints. The constraints are often propagated over the data description as a mechanism of guiding the execution of the search. Typical example problems are:

Simulations of real-world systems,
Finding DNA sequences given a large number of overlapping sub-sequences,
Determining protein structures,
Graphic layout solutions (e.g., projecting a complex network onto a two dimensional surface in a way that makes it easy to understand),
Configuring or designing networks such that they meet some set of constraints,
Scheduling problems (i.e., scheduling events given a set of restrictions), and
Planning problems (akin to the scheduling problem).

For more information on constraint programming research, see

Barták, R.: "Constraint Programming: In Pursuit of the Holy Grail," in Proceedings of the Week of Doctoral Students (WDS99), Part IV, MatFyzPress, Prague (June 1999) 555-564;

Borning, A.: "The Programming Language Aspects of ThingLab, A Constraint-Oriented Simulation Laboratory,"

in ACM Transactions on Programming Languages and Systems, 3(4) (1981) 252-387;

Apt, Krzysztof: Principles of Constraint Programming, Cambridge University Press, Cambridge, UK (2003); and Schulte, Christian and Stuckey, Peter J.: Efficient Constraint Propagation Engines, ACM Transactions on Programming Languages and Systems, Vol. 31, No. 1, (2009).

Pick a Problem that Matches the Machine: An empirical approach to parallelization is to pick a narrow problem that suits the technology rather than trying to invent the technology to solve the general partitioning problem. That is, pick a problem that is easily programmed on certain parallel machines. For example, some problems, like weather simulation, allow a full program to be replicated on many machines and run in parallel. This is sometimes called program level parallelization. This approach limits the amount of reprogramming required. Unfortunately, most problems that can benefit from parallel execution are not in this class and therefore, not amenable to this approach. This still leaves the general partition problem unsolved for most programs.

Pick a High Value Problem: Another empirical approach is to pick a problem that is so important or so profitable that the large cost and time for human programming can be justified (e.g., cryptography and games). Much like the previous approach, most programs are not in this class.

Forget About Exploiting Parallelism: Another option is to abandon the parallel aspects of the machine (e.g., abandon the MMX or SSE instructions on the Intel chips and the multicores) and just use the machine as a straightforward non-parallel computer. Declare failure and move on. This means, of course, programs may run more slowly than possible, needed or desired. All the potential benefits of parallelization and computational speed up are lost. In terms of the market and business pressures, this just is not an option!

By way of more concrete definition for the example MMX and SSE instruction sets referenced above, the MMX and SSE instruction sets extend Intel instruction sets to allow various kinds of vector computations among other kinds of instructions. That is to say, they include single instructions that operate on vectors of data. For example, a "sum of products operation" instruction could be implemented to take as input two vectors of integers [10, 11, 14] and [2, 0, −2] and compute the value of (10*2+11*0+14*(−2)) in a single operation, producing −8 as its result.

Domain Specific Models and Languages: Domain specific models and languages (DSMs and DSLs) are abstract models and languages that are highly specific to the problem domain and (ideally) highly independent of the eventual execution architecture. Domain specific generators incrementally manipulate and evolve the domain language(s) into some low level imperative language (e.g., C, C++ or Java) by exploiting the domain knowledge to guide the implementation choices. In some sense, this is what the human programmer is doing when he or she writes a program.

One of the earliest examples of using DSLs in program generation is the Draco system (Neighbors) which was later used to develop a commercial product called CAPE (Computer Aided Protocol Engineering). CAPE provides a Finite State Machine Based domain language for specifying a communication protocol (e.g., Ethernet or ISDN). CAPE automatically generates ROM-able code implementing that protocol.

Another early example of this technology is graphical models and languages for the User Interface (UI). In this approach, tools are provided that allow the user to draw the interface in geometric terms (e.g., draw a window as a rectangle), drag and drop operating objects (e.g., title bars, menus, scroll bars, and other graphical and perhaps animation objects) onto those interface elements and add property information by filling in forms or checking boxes. These have become so useful and popular that they are widely included in development products (e.g., Microsoft's Visual Studio™). Of course, this metaphor of drawing to specify a computation is limited to those problems whose domains have a large geometric component. Unfortunately, beyond UI problems, the majority of problems that can profit significantly from parallelism do not have this property.

The invention described in this paper is strongly DSL oriented and exploits key strengths of DSLs to address the problem of generating code for various flavors of machine parallelism, specifically:

DSLs' inherently high level of abstraction,
DSL's lack of GPL imperative-oriented complexities, and
The heuristic programming guidance provided by domain specific knowledge.

Operationally, the invention obeys two key principles:
Don't do the manipulation in the GPL (i.e., code) domain!
Use a priori domain knowledge to guide generation!

Preliminary Conclusion on Prior Art: The failure of the large amount of prior art work over the last thirty years or so is strong evidence that the problem is unsolved in any broad, practical sense and certainly, that a practical solution is not obvious. Additionally, the large amount of research over that period is strong evidence of the importance of the problem.

More Evidence of a Lingering Problem

In addition to the broad general classes of prior art discussed above, there are other more specialized areas of computing research that promised to solve or, at least, to contribute to the problem of automating the parallelization of computations. Unfortunately, those research promises too (as they apply to the parallelization of computations) are largely unfulfilled.

Current Automatic Program Generation Models Inadequate: The literature on "automatic program generation" (in the sense we use the term today) goes back to the late 60's and early 70's. Before that, in the late 50's and early 60's, "Automatic Programming" was used to mean what we now call "high level language compilers". From the 60's onward though, many models have been suggested for automatic programming ranging from theoretically based models that can only solve toy problems (e.g., generation of a program for factorial) through current systems that are based on paradigms of local substitution (e.g., frame systems, XML based tools, Model Driven Engineering (MDE) based tools, Genvoca abstractions and other similar software engineering systems). For a typical concrete example of local substitution-based system, see Batory, D., Singhal, V., Sirkin, M., and Thomas, J.: "Scalable Software Libraries." *Proc. Symp. Foundations of Software Engineering*, 1993.

The paradigm of local substitution refers to operations that rewrite localized "islands" within a program without any dependence on program information (or constraints) from outside of those localized islands. This paradigm is analogous to Context Free Grammars, whose definitions do not depend on any contextual information outside of their locale of application. That is, a Non-Terminal grammar token in a Context Free Grammar has a finite definition that uniquely defines the structure of a small island of input and is independent of the input outside that island (i.e., independent of its context of application). Thus, a Context Free parser only has to look at a finite island of the input data to determine its syntactic structure. In contrast, the specific form of an island within a computer programs is sensitive to widely dispersed contextual elements of the overall program in which it occurs. In that sense, program generation is more like analyzing or generating languages with Context Sensitive Grammars whereas analyzing or generating programs with local substitution is more like analyzing or generating languages with Context Free Grammars. Therefore, the paradigm of local substitution is inadequate to the task of generating real world programs, and especially real world programs that need to exploit various kinds of parallelism based on their architectural context.

A common shortcoming of all of these systems is that they do not solve the problem of constraints that affect separated areas of the target program (i.e., cross-program constraint satisfaction). For example, partitioning requires coordination of a set of cases that span a fair expanse of the emerging target program. Any code generator must coordinate these cases and their implied iterative structures with the intended computation. Systems based on the paradigm of local substitution cannot accomplish this task of cross-program constraint satisfaction. The currently popular systems have more modest goals than earlier systems and content themselves with aiding the programmer in the assembly of pieces of code. However, they leave the task of cross-program constraint satisfaction to the human programmer. In that sense, they have significant utility but only modest benefit. And importantly, automatic partitioning and generation from a machine architecture free, implementation neutral specification of a computation is not within the grasp of these paradigms. They are really designed to deal with and generate narrowly focused implementation oriented artifacts. As with earlier approaches, the fundamental problem with these approaches is that they are dealing with representations within the GPL domain (lightly abstracted) and therefore, they suffer many of the same problems discussed earlier.

The Author Did Not Solve It Initially: There is additional evidence of newness and non-obviousness. Even the author's own work (AOG) that preceded this invention was unable produce parallel code without having to embed domain knowledge about the machine architecture in the domain specific definitions. Further, it had no notion of a partitioning abstraction that could be manipulated into a form that would guide the generation of the partitioned code, and certainly, no notion of the partitioning process whereby the target partition is derived via the mechanism of associative programming constraints (APCs) that are Represented by active objects with data slots and behaviors (i.e., executable methods), Associated with code building blocks, Propagated among various points in the code, Modified during their propagation to incorporate information from the code as well as the independent specification of the machine architecture, and eventually Evolved into forms that directly guide the generation of properly partitioned code.

For a more complete description of Associative Programming Constraints, see the Objects and Advantages section of this document.

What domain specific partitioning accomplishes directly is what the author's earlier work (AOG) attempted to accomplish by attaching optimization routine calls to the code pieces and embedding a scheme to coordinate the order in which the optimization routines were called. The optimization routines could not be called until after the programming language code was finally generated because they operated upon a GPL representation of the program. Thus, they operated in the programming language domain rather than the more abstract application or problem domain. This complicated the job immensely. The human programmer who attached those calls to the optimization routines had to know the architecture of the target machine and the expected abstract pattern of the generated code to make this optimization method work. He had to carefully assure proper sequencing of the various calls to optimization routines and had to trust to fate that the cascade of optimizations would all work consistently. Sometimes they did not. By contrast, working in the application/problem domain as this invention does, the partitioning process can directly and easily test, in domain oriented terms, to see if the partitioning will be possible and if it is not possible, rewrite the domain oriented expression (e.g., divide into sequences of separate statements) to allow partitioning to optimize the domain specific parallelization. In addition, the author's earlier work required a different set of optimization calls on the program parts for each combination of machine architecture and method of partitioning desired. It also required new optimization routines to be programmed as new pairs of machine architecture and partitioning goals are introduced. This invention has significantly simplified the partitioning process and extended the range of partitioning results that can be produced.

An Early Pioneer of Domain Specific Generation Did Not Solve It: Even Jim Neighbors, who introduced the idea of domain specific generation almost thirty years ago, has not addressed the partition problem and specifically, not addressed it in the manner described by this invention, that is, Using associative domain specific, programming constraints (APCs) to identify the abstracted piece parts for partitioning, and more specifically, to identify the partitioning tests (using domain specific knowledge) and the operations associated with the branches of those tests, Using incremental specialization of design objects to encapsulate various implementation features as a way to sketch out the macroscopic design of the target implementation, where those implementation features include GPL-specific needs, particular patterns of data decomposition for parallel execution, required patterns of synchronizing parallel partitions, and programming action plans to reorganize the target computation for instruction level parallelism and/or multi-core level parallelism, and Manipulating those abstractions into partitions based on the expression being computed, the associated constraints that guide the programming process, and the abstractions defining the machine architecture.

He has made many contributions to domain specific generation but has not addressed or solved this problem in the general way that this invention does. If the domain specific computation partitioning techniques described herein were obvious, he would certainly have cracked the problem by now.

For a more comprehensive description of Neighbors' work, see

Neighbors, James M.: "Software Construction Using Components," PhD Dissertation, Univ. of California at Irvine, 1980;

Neighbors, James M.: "The Draco Approach to Constructing Software From Reusable Components," IEEE Transactions on Software Engineering, vol. SE-10, no. 5, pp 564-573, September, 1984; and Neighbors, James M.: "Draco: A Method for Engineering Reusable Software Systems," Software Reusability, Biggerstaff, T., and Perlis, A. eds.: Addison-Wesley/ACM Press, pp. 295-319, 1989

Software Engineering and Development: The literature that focuses on the programming process (rather than the program) is generally oriented to the human programmer using informal or partially formal models to construct the program via a non-automated construction process. The term "programming process" should not be confused with the similar term "Process Programming", which is loosely described as research on writing "programs" or scripts whose execution coordinates and manages sets of people and automated programs to accomplish some business operation goal. For example, a process program might be a business process like running a factory or supporting a department that processes loan applications through many steps, both automated and human.

By contrast to Process Programming, the programming process topics range far a field from this invention and are mostly related to this approach in spirit only. Most of the focus is on activities related to but occurring before or after the actual construction of code, e.g., activities like software design, testing, maintenance, documentation, etc. These include specification techniques, formal (e.g., Z and VDM) and informal (SADT charts). The emphasis is often on how to structure a program to improve program understanding, correctness, etc. (See Parnas, D. L.: On the Criteria To Be Used in Decomposing Systems into Modules, Communications of the ACM, (December, 1972) 1053-1058.) Some of the early work in this area evolved into what is known today as Object Oriented Programming. Much of this work is focused on the structure of the implementation and thus, is dealing with the implementation/GPL domain rather than the problem domain. Further, the heavy use of informal information in these steps precludes them from being directly or fully cast into automated form.

Some of the technologies in this group have a more formal orientation. These may involve techniques for deriving the code from designs and often involve some kind of human-based step by step refinement of designs into code with strong emphasis on producing mathematically correct code and being able to formally verify that the code is correct. (Dijkstra 1976) Sometimes these refinement processes are based on a theoretical formalism (e.g., predicate logic) that focuses on rules for manipulating the program in problem domain independent terms rather than guiding the programming process in domain specific terms. The domain specificity is largely absent from these approaches. In that sense, these approaches suffer from the GPL mindset in that the formal specifications are at a very detailed and concrete level, a very GPL level. In fact, the predicate logic specification and the code are basically different representations of the same information and can be mechanically converted from one form to the other. These approaches are largely operating in the GPL domain (i.e., dealing with "implementation" structures) rather than the more abstract problem domain (i.e., dealing with implementation "goals" whose organizational structure and detail level is likely to be quite different from the abstract design representation). In short, these approaches are dealing with "how" implementations are structured and defined rather than "what" is being computed.

Early Domain-Specific Programming and Generation: The techniques of domain-specific generation are characterized as a series of steps that refine a high level DSL (e.g., a problem specific DSL) to a lower level DSL (i.e., a DSL nearer to the GPL domain) until a conventional programming language is finally produced. Conventionally, between each DSL to DSL step is an intervening step that performs some optimization, often removing or simplifying redundant code inserted by the generation step. In both cases, the refinement and optimization steps are usually expressed as a set of program rewrite transformations. However, explicit associative programming constraints (i.e., APCs) expressed in domain-specific terms that guide the program construction and optimization rewrites is an idea that is absent from the literature. Jim Neighbors work comes as close to this invention as any but his rewrite rules do not employ explicit APC-like constraints that are associated with individual program pieces (although he does associate supplementary translation state data with the program pieces). His rewrites are largely based on a model of refining the abstractions of high level DSLs into abstractions of lower level DSLs by applying a series of transformations without an overriding, coordinating or programming purpose (e.g., the programming goal of computing looping structures to minimize matrix rewriting and creating partitions that will guide the partitioning of those loops to best exploit parallel hardware). In this invention, each translation phase has a narrowly defined programming purpose and the associated constraints are used to guide the transformation process and coordinate the individual transformation steps so that they all cooperate to achieve this overriding goal.

But apart from Neighbors work, this author's work, and a few others, there is a relative small footprint for domain specific generation of the variety that so clearly eschews GPL representations as the basis for DSLs. The general domain-specific generation topic is growing and there is lots of interest in it, but the footprint of concrete results without the GPL slant is still small. The footprint for explicit "programming" constraints (in contrast to "program constraints") is similarly slim to non-existent. (I anticipate that this statement might engender debate from theorists who describe "constraint programming". However, if one looks closely at that body of work, one will notice that their "constraints" are describing the program (i.e., the desired computation) rather than the process of manipulation and programming that gets one to that desired computation. This is a key distinction.) And as for the specific notion of "Associative Programming Constraints," it is non-existent. APCs are a new structure introduced by this invention.

Domain Specific-Based Partitioning Is Hard: The majority of research on parallelization of computations is distracted by the ready availability and maturity of GPL representations. There are easily available platforms and tools and it is relatively easy to get started using GPL representations. On the other hand, conceiving of how one might approach parallelization in a non-GPL but strictly domain specific context is quite difficult. Parallelization requires, for example, knowledge of Matrices and indexing (What are the dimensions of matrices?), Arithmetic relationships among variable dimensions (Is the dimension K of image A greater, equal or less than the dimension L of image B?)

Programming housekeeping decisions that will affect the form of the implementation (If the generator decides to compute the results of a loop out of line, how does it record this decision without trying to build the GPL structures immediately and still generate code that will operate and integrate correctly?), Special case computations that don't lend themselves to vector instructions (What sections of the matrices must be tested for special cases and then computed separately?), Default case computations that do lend themselves to vector instructions (What sections of the matrices have regular patterns of computations that would allow streaming data?), Big sections of the matrices that could profitably be split up and computed in parallel (What sections of the matrices represent a heavy computational load if done sequentially?), How can one compute the boundaries between these various sections?

What kind of partitioning would work well on the machine targeted to run this computation, and so forth?

Some (but not all) of these questions are answered easily given the concrete terms of GPL structures even though turning those easy answers into a highly parallel program is hard and the results are limited. (See M. W. Hall et al, 2005). Consider the following quote from the recent paper Mernik, Marjan, Heering, Jan and Sloane, Anthony M.: "When and How to Develop Domain-Specific Languages," ACM Computing Surveys, Vol. 37 No. 4, December, 2005, pp. 316-344:

"Domain-specific analysis, verification, optimization, parallelization, and transformation of application programs written in a GPL are usually not feasible because the source code patterns involved are too complex . . . . With continuing developments in chip-level multiprocessing (CMP), domain-specific-parallelization will become steadily more important."

In contrast to using GPL representations, one has to think really hard as to what domain specific abstractions might be used as stand-ins for these concrete programming language oriented structures, that is, domain specific abstractions that can be evolved into the concrete programming language structures. It's a quandary. Does one choose to work on the problem in a familiar representation (GPL) with a high probability of getting some limited solution? Or does one attack what looks like an insoluble problem (i.e., a domain specific approach to parallelization) with only a slim hope of a more powerful solution or no solution at all? Most researchers and especially academic researchers who need quick results to get additional grant money or to get a PhD will choose the first approach. So, researchers can be forgiven for working on the problem of parallelization in the context of programming languages. It is easier to get started and even to get some limited results with that approach than with the alternative, which may not yield anything for years, if ever. At least, that has been the pattern up to now.

Domain Language Technology Just Emerging: Why is this true? We have a rich, mature set of general programming languages that we understand pretty well while domain languages have to be invented from the ground up. This reminds one of the Einstein quote; "We see what our languages allow us to see." When your language is predominately program code oriented, it does not provide the necessary vocabulary to directly discuss the problem domain and especially not to discuss and formalize the programming process in the ways used in this invention. One cannot even express certain domain oriented and programming process oriented ideas until one adds the right domain abstractions to the computation specification representation (e.g., APCs, convolutions, templates {see definition below}, and an intermediate language based on abstract method-like transformations by which one can define and abstractly manipulate DSL operators and operands) and the right domain abstractions to the execution platform representations (e.g., SIMD and multi-core machines).

Definition: Template. A template is a design notion required by the definition of the image convolution operator. A template is a neighborhood within an image upon which a convolution operates to compute a single output pixel in the output image. The output pixel will be at the same position in the output image as the pixel position of the center of the template neighborhood. Thus, the convolution of a full image is produced by centering the template neighborhood over each pixel in the input image and computing the output pixel that corresponds to the centering pixel.

The literature only contains brief hints of such abstractions and often, they are in research areas other than program generation. If the contributions of this invention were obvious, the literature would be rich with both kinds of abstractions, there would be hundreds of papers about them, and one could talk with colleagues about these ideas without long introductory explanations of them. Further, domain specific notions of this variety are just beginning to appear in their simplest, most incipient forms in a few workshops and conferences. To be clear, there is a rich domain specific literature with a GPL slant but very little in the way of domain specific models that allow one to express constraint and programming notions of the form used in this invention. This is certainly not the hallmark of maturity and obviousness. If it were obvious, one could explain what it was in a few sentences and the listener would shake his head and say "Oh, yes, I see. That is like . . . " But that does not yet happen.

Further, most of the existing domain specific languages (Marjan Mernik, et al, previously cited) are really narrowly focused programming languages rich with the level of detail that this invention eschews in its specifications and lacking the abstract structures that are needed by an automated generation system.

In summary, the strongest evidence that this invention addresses an unsolved problem is that the thirty odd year research struggle of the prior art to simplify the programming of parallel machines. This is a research struggle that has resulted in either research-oriented, toy solutions that cannot be scaled up to deal with real world programming problems or niche solutions that fall into one of the several (unsatisfactory) solution categories discussed above.

Further evidence that a general solution to the parallelization problem is absent is the crescendo of media reporting on the mainstream hardware market place and frenzy of recent activities and events associated with programming new parallel hardware. The unsolved problem of writing programs in languages that are completely independent of machine architecture and then automatically generating programs that are partitioned to exploit the machine's parallelism is becoming more acute as machines with parallel facilities enter the mainstream of computing.

The Empty Market Place

Interest and Market Pressure:

The problem of programming parallel machines is significant enough that one can find many books and tutorials devoted to parallelizing algorithms for various parallel machine architectures as well as systems and tutorials aimed at programmers for such machines. Large government research contracts have been let to work on parallel systems and in particular, on the problems of programming them. A simple Google search on research funding for parallel programming will return hits for dozens of projects and virtually all of those project descriptions will somewhere mention the difficulty of programming parallel computers. With the recent release of dual core and quad core chips (Intel and AMD) and the (projected) many-core computers of the coming decade, parallel computing is entering the mainstream of computing. Because of this evolution, the problem of how to program these chips is becoming more acute. It is a pressing need for chip manufacturers (who want to sell more chips), game developers (who want to escape the endless and costly reprogramming with every new chip and every new product) and many other segments of the computing world. Predictions for the number of CPUs possible in ten years are in double digits. Intel labs recently demonstrated an experimental 80 CPU device (e.g., Wall Street Journal, Feb. 12, 2007). Software consultants from Silicon Valley have recently reported numbers of back channel inquiries about solutions to the problem of programming multicore chips, a clear indication that the current solutions are inadequate.

Parallel machine architectures and the problem of programming them have generated a frenzy of market interest and elevated market pressure as indicated by the following news and events:

"The market for embedded multicore processors . . . [is projected to] grow from $327 million in 2007 to $2.47 billion in 2011." (Rick Merritt, "Chip Industry Confronts 'software gap' between multicore, processors", EETimes, Apr. 3, 2008).

Intel labs recently demonstrated an experimental 80 CPU device (e.g., Wall Street Journal, Feb. 12, 2007).

Multi-million dollars from Microsoft and Intel toward research initiatives on how to program multicore machines (e.g., Don Clark, Wall Street Journal, Mar. 17, 2008, and Rick Merritt, "CS gets with parallel program," EETimes, Apr. 24, 2008).

"Microsoft and Intel initiative . . . to solve one of their toughest technical challenges: programming the new generation of multibrained computers." (Don Clark, "Racing to Gain Edge On Multicore Chips," Wall Street Journal, Mar. 17, 2008).

"Stanford University and six computer and chip makers plan to announce . . . the creations of the Pervasive Parallelism Lab . . . $6 million over three years . . . " John Markoff, "Race Is On to Advance Software for Chips," The New York Times, Apr. 30, 2008.

"Everybody is madly racing toward multicore technology and they don't have a clue about how to program it." Says Professor William Daily of Stanford University. (Rick Merritt, "CS gets with parallel program," EETimes, Apr. 24, 2008).

" . . . next-generation multicore processors . . . will require one or more breakthroughs, because top researchers worked unsuccessfully for more than a decade to develop a model for high-end supercomputers." (Rick Merritt, "CS gets with parallel program," EETimes, Apr. 24, 2008).

"I wake up almost every day shocked that the hardware industry has bet its future that we will finally solve one of the hardest problems computer science has ever faced, which is figuring out how to make it easy to write parallel programs that run correctly," said David Patterson, professor of computer sciences at the University of California at Berkeley. (Robert Mullins, "Academia Tackles Parallel Programming Problem," Systems Management News, Apr. 18, 2008).

Numbers of back-channel inquiries to consultants on how the programming problem could be solved for such hardware (e.g., multicore machines).

"Others warned that the industry has its work cut out for it delivering the software that will harness the next-generation chips." (Rick Merritt, "Chip Industry confronts "software gap" between multicore, programming," EETimes, Apr. 3, 2008).

Parallel Programming chosen as one of seven "Grand Challenges" of IT. Jon Brodkin, "Seven 'grand challenges' face IT in next quarter-century, Gartner says," (NetworkWorld, Apr. 9, 2008).

There are books touting specialty programming algorithms for specialty classes of parallel machines (niche solutions) instead of a general solution applicable to many different classes.

Conferences have been held over the last several decades on parallel machines and the problem of programming them. Lots of solutions have been proposed none of which have vaulted parallel computing into the main stream of computing.

Speculation within PC specialty magazines (for example) about what kind of applications would benefit from multicore machine and whether or not they will ever be implement on multicore machines because of the programming difficulties.

An obvious solution does not engender than kind of activity with much of it spread over decades.

Where Are All of the Domain-Based Parallelization Products?: In the light of this kind of interest and pressure, any obvious domain-based parallelization solution would spawn a tens of products within a very short time. There are several niche products (e.g., more or less conventional programming languages with a few parallel programming extensions) specialized to this or that model of parallel computing but organizations are still reprogramming in these more or less conventional programming languages whenever new machine architectures appear. If there were truly general, domain-based parallelization products, that reprogramming would not be happening. The lack of identifiable general, domain-based parallelization solutions after thirty plus years of trying is strong evidence that this general problem has not yielded to the huge amounts of effort aimed at it. By implication, this invention must be non-obvious.

The lack of solutions to the problem of programming of multicore chips is illustrated by the recent announcement of a multi-million research initiative by Microsoft and Intel "to solve one of their toughest technical challenges: programming the new generation of multibrained computers." (Wall Street Journal, Mar. 17, 2008) Professor William Daily of Stanford University summarizes the state of the art: "Everybody is madly racing toward multicore technology and they don't have a clue about how to program it."

In the end, the market place is filled with parallel programming languages, libraries, specialized development environments, tools to aid programmers and more, but all are tied to specific architectures or provide inadequately general solutions. All require reprogramming when new machine architectures are introduced. None produce fully automated, fully adequate parallelization of programs. None allow completely architecture-independent programs and yet, this would be the ideal solution.

The failure of research to produce adequate solutions to and products for the automatic parallelization of computations for a variety of parallel architectures even in the face of intense market pressure is strong evidence of the underlying difficulty and non-obviousness of the problem.

OBJECTS AND ADVANTAGES

The objects and advantages of this invention are:

Constraints for Programming rather than Constraints on Programs: Conventionally in the field of program generation, constraints are entities that restrict or specify the computation that is to be programmed (i.e., what is to be computed) whereas in this invention, constraints have been extended from just constraining a program entity to also constraining a process for constructing that entity. In this invention, in addition to specifying the computation, constraints also restrict, affect, describe, record, apply, control, manipulate, change, combine or otherwise guide or modulate the process of constructing a particular implementation for that computation (i.e., constraints determine how that computation is to be organized).

From another point of view, program constraints may be differentiated from programming constraints by their respective restrictions. A program constraint may be expressed in multiple forms but it is restricted to express a single computational result, i.e., the given input data will uniquely produce some unique output data. The computation may have many forms or manifestations but it has exactly one answer. In program generation terms, a program constraint expresses an input-out predicate that specifies the logical relationship between the input and the output. It specifies what must be true of the computation. By contrast, a programming constraint specifies some aspect of the programming process. Thus, a programming constraint may be satisfied by many solutions of the computation, i.e., all or a part of the preferred computational method and organization by which program constraints are achieved. That is, there are many forms or manifestations that will achieve the same computation. The differences of these two types of constraints are summarized in Table 1.

Programming Constraints are Active Elements: In this invention, programming constraints are objects (packages of data and behaviors). This allows them to actively participate and guide the programming process by, for example, inventing details (e.g., target program variable names), populating the data of related programming constraints (e.g., setting up the relationship between the variables of an outer loop and the variables of a related, nested loop) and making programming decisions (e.g., determining whether two partitions can be combined).

Associative Programming Constraints (APCs): This invention introduces a mechanism called an Associative (or Associated) Programming Constraint or APC. An APC is a special kind of constraint that is associated with a part of the program (which is defined as the Associate of the APC). That association defines the locus of the APC's effect at a specific moment in the programming process. The role of an APC is to be an active agent of the programming process. APCs:

Record information about and constraints on the current programming state of its associate, Record inter-relationships with other related APCs (i.e., constraints among sets of APCs), Keep track of incipient but evolving program structures (e.g., developing loops or partitions), Make implementation decisions (e.g., what kind of parallel partitioning to implement), Provide executable behaviors that are available to effect a step, plan or transformation in the programming process by rewriting their associates as well as changing or propagating themselves to a new associate, and Identify a planned future programming step or plan.

In other words, APCs guide or modulate the programming process.

APC Propagation Synchronizes Dependencies Among Separate Program Parts: For example, as two loop constraints (APCs) associated with separate expression parts (e.g., separate convolution operations) propagate up the expression tree and merge, they synchronize equivalent loop variables keeping some, discarding others. The newly minted, combined APC (now associated with the parent expression of the two parts) assures that both sub-expressions are constrained to work together. Partitioning constraints perform a similar role for their associates.

Domain Specific Abstractions (DSA): The representation used by the generator is domain specific. The building blocks of the program, the target machine specification, the APCs and the supplementary programming information are all compositions of domain specific abstractions. This provides the following advantages:

Simpler Manipulation: DSAs are mostly functional expressions and thus, are simpler to manipulate and change than GPL code (e.g., abstract specifications may be substituted and moved without having to deal with data flow restrictions that may be inherent to GPL representations), Implementation Neutral: DSAs contain no information about the machine or execution environment and therefore, are invariant over execution platform architectures (i.e., they are pure computational what with no information on how the implementation will accomplish the what)

Explicit Rather Than Implicit: DSAs contain explicit domain knowledge that is only implicit in a GPL representation of the program (e.g., inferring what tests will naturally and ideally partition a computation from a GPL representation is, at best, extremely difficult and, at worst, impossible in a GPL representation), Exploitable in Programming Process: Domain knowledge (in terms of DSAs) can be exploited to provide guidance to the programming process (e.g., domain knowledge identifying partitioning tests, special case code and default tests is used in designing partitioning frameworks), Simpler Program Specification: DSAs simplify the specification of the program (e.g., the implementation form of the program is not determined by the specification of the computation and therefore, implementation details that complicate reformation of the program are absent), and Deferred Programming Decisions: DSAs allow detailed design decisions to be deferred until the detailed programming knowledge has been derived while allowing abstract planning to proceed in its ideal and necessary order (e.g., abstractions of partitioning tests allow a partition framework to be designed before a complete set of details about the test are known).

Intermediate Language (IL) Specifies Elements of the Implementation: The invention introduces the idea of an Intermediate Languages that is a generic, domain specific language for specification of an implied IMPLEMENTATION DESIGN facet. An IL provides a way to write definitions of domain specific operators and operands that are generic with respect to the specifics of the target computation but are concrete with respect to distinct facets of the implementation. In other words, each specific set of IL expressions supplies only its domain specific portion of the information required to write the final code. For example, the IL used to define a convolution operator supplies only elements that define the positional relationship among pixels in an input image and pixels in an output image. The IL expresses the target computation specifics as abstractions that are to be determined later. The user's program specification or the generator system itself will supply the target computation specifics required to write the final code.

While implementation oriented, the IL is a language that is unfettered by the formulation rules and constraints of GPLs. That is, it allows the generator to express elements of the planned implementation outside of the context that eventually will be imposed on it by having to re-expressing the implementation in GPL terms. This defers introducing the GPL rules and constraints until the broad macroscopic design has been constructed and settled, thereby allowing the low level GPL rules and constraints to be evolved within small, constrained parts of that design. Overall, this makes the generation problem easier. For example, it is easier to figure out the ideal partitioning in the abstract without having to deal with the myriad of constraints, variations, and details a GPL introduces (e.g., scoping rules and limitations, data initialization rules and limitations, special case constructions that might have to be introduced for particular data types like conditional expressions versus conditional statements in C, and so forth). The IL provides a way to separate program design from program coding and thereby, make both tasks simpler.

Moreover, the IL provides a way to represent different implementation factors as separate facets. So, image operators and operands introduce some IL particular to the image processing domain, other application domains introduce IL particular to those domains, data structure domains introduce still different IL, and so forth. The overall implementation arises from a composition of such domain specific implementation facets each of which contributes a particular piece of the implementation.

However, creating an actual implementation is not just a matter of simple assembly of expressions of IL because some design features require the IL to be adapted and custom tailored to express a specific design feature in terms of the context of the specific target computation. This requirement is accomplished by design feature encapsulation.

Design Features Encapsulated by Specialization of IL and DSAs: Implementation design features (e.g., parallelization mechanisms) are incorporated into the target program by incremental specialization of DSAs and IL components in the context of the specific target computation whereby they will eventually evolve into code that manifests those design features. As domain specific abstractions (i.e., DS operators and operands) and IL components are incrementally specialized, the design of the target implementation becomes more defined (e.g., partitioning becomes clear), more structured (e.g., partition sets may become associated with GPL structures like threads), and possibly more adapted to the implementation opportunities provided by the execution platform (e.g., adapted to multi-core and/or instruction level parallelism). Consider the following examples of design encapsulation.

Relocating the indexing of a template by specializing the template object and its IL incorporates an implementation language requirement (i.e., loops that iterate from 0 to 2 rather than from −1 to 1) and thereby makes the iteration structures more implementation language-friendly.

Specializing a template and its IL definitions based on DS knowledge provides a partition-oriented set of cases that can be computed separately and possibly in parallel.

Specializing a template for multicore-oriented threads and/or for SIMD vector instructions by specializing their defining IL components based on the execution environment specializes the structure of the implementation for a particular execution environment.

Merging compatible partition sets or formulating Cartesian products of incompatible partition sets allows the eventual implementation to evolve the correct grouping and sharing of loops as well as the correct splitting of loops.

Extending or contracting data structures (e.g., extending an image dimension from k to n) and/or operator spans (e.g., a convolution's span) may revise the partitioning case structure of the implementation as well as provide logical assertions (e.g., $(0<k<(n-1))$) that will define how to generate loop iteration limits for specific loops (when the time comes to express the implementation in a GPL).

APC Propagation and Change Plus Specialization IS the Programming Process: APCs may be propagated from point to point within the program building blocks and in the course of that propagation may affect, describe, record, apply, control, manipulate, change, combine or otherwise constrain or modulate themselves, other APCs, and/or the program building blocks. The APC propagation and change drives the specializations of the DS entities and their IL that bit by bit define aspects of the final implementation. The sum total of that APC propagation and the change it engenders, therefore, IS a large part of the programming process.

Domain Specific Knowledge Guides Partitioning Process: Domain specific knowledge (in the form of user supplied knowledge and later, in the form of APCs) identifies computation specification expressions critical to partitioning. Additionally, rules that dictate how to program different kinds of partitionings for various parallel architectures are written in terms of domain specific (rather than programming language specific) representations. As a result, the rules are simpler because they do not need to deal with detailed variations that are expressible in and required by GPLs. In effect, the rules are dealing with abstractions that capture only the top level intent of the partition design.

Domain Constraints Eliminate Complex Analysis: Domain constraints directly identify the abstract tests that will produce ideal partitions of the computation for a particular parallel architecture as well as the parts of the computation specific to each partition and because of this, they eliminate the need for complex programming language analysis to try to infer those elements.

Automated Computation Partitioning Machinery: The target program implementation is automatically organized into computation pieces that can execute in parallel based on the computational restrictions and opportunities inherent in the specific computation itself and the parallelization opportunities provided by the machine specification. This invention easily handles different kinds of parallelism because the domain knowledge provides hints as to which kind of parallelism to use. This solves a long standing, heretofore unsatisfactorily solved problem in the programming of parallel machines.

Partitioning by Design Rather than by Renovation: Much like fundamentally changing the structure of a house after it is built, renovating a program for parallel execution after it is implemented in a GPL (or even a parallel GPL) is difficult and often impossible. In this invention, the partitioning for parallel execution is designed into the programming process such that partitioning is incrementally incorporated into the design from the start and during the ongoing implementation programming, rather than the alternative, which is an after-the-coding-fact attempt to renovate (or re-design) the code via optimizing transformations. That is, the generator designs firsts and codes later.

Ideal Partitionings: The generated code will have the natural, user specified, and (quite likely) optimal partitionings for the specific computation on the specific target machine. The generation process is unrestricted by the difficulties of analyzing complex programming language implementations.

Extensible, User Programmable Program Generator: The foundation of this invention is a generalized program generator which is parameterized in the same sense that a microprogrammed computer is parameterized. It is fully user extensible and re-programmable, allowing the user to extend or modify the programming transformation steps, the pattern matching primitives, the domain languages and abstractions, the constraints and their behaviors, the phases of the overall generation process, the type inference rules, general inference rules, the partial evaluation rules, and even the overall strategy of generation.

Automatic Generation of the Implementation: The implementation is automatically produced from the two separate specifications (i.e., an implementation free specification of the computation and a specification of the execution platform). Thereby, the specifications are far simpler than the eventual implementation because many of the elements that are explicit with explicit interrelationships in the implementation are implicit in the specifications.

Computation and Execution Platform Specs Separate: The specification of a computation is separately and independently stated from the specification of the execution platform upon which that computation is to execute. In this invention, in contrast to conventional GPL-based solutions where properties of the execution platform are often implicit in the program, the specification of the execution platform is separate, is explicit and may be changed without touching the implementation free specification of the computation.

No Reprogramming: The machine independent (i.e., implementation neutral) specification of the target computation does not have to be reprogrammed when it is moved to a different class of parallel machines or when new parallel machine architectures are introduced. It can be automatically re-generated for the new execution platform.

Moving to New Platform Is Simple: Moving a computation to a new execution platform means only a simple line or two change to the execution platform specification followed by automatic re-generation of the implementation.

Programming Costs Significantly Reduced: No reprogramming on porting computations to a new machine means no reprogramming costs, which are the majority of the costs of porting from machine to machine.

Lower Costs To Program New Applications: Since specifications of a computation are just the essential, implementation neutral computation with no complexities introduced by parallel structures, explicit iteration control or other machine or GPL specifics, initial programming costs are highly reduced.

New Markets Will Arise from Lower Cost Programming: Because of the lower costs of initial programming, applications that are now precluded from employing parallel computation because of high programming costs may now have the opportunity to employ parallelism and thereby change the marketplace.

Parallel Machines More Likely to Enter Mainstream: Because of simpler programming, lower initial programming costs, and the ability to fully exploit any kind of parallelism, parallel machines that heretofore have been niche market items mainly because of the complexities and costs of programming, will now be more likely to enter the mainstream of computing and host many mainstream applications (e.g., game software, signal processing, communications, etc.).

Unlimited Embodiments of Target Machine Architectures: There are no inherent limitations to or difficulties in the technique that prevent it from being extended to new classes parallel machine architectures.

New Parallel Machine Architecture Embodiments Straightforward: Extending the mechanism to new classes of parallel machine architectures can be accomplished by the introduction of analogs of the constraint and control framework definitions for the new architecture as well as appropriate transformations to create and manage them. The principles and structures developed for this invention provide a road map for creating analogs for other execution platforms.

Unlimited Extensibility of Application Domain Embodiments: New application domains (e.g., data structures, data bases, accounting, graphics, etc.) may be added by the introduction of an appropriate set of abstractions that capture the essential elements of the new domain and contain abstract partitioning tests, abstract implementation IL, and algorithmic frameworks (e.g., for the red-black tree data structure, one might define abstract tree node IL operators like color, key, left, right and parent).

Programming Representation Will Move from GPL to Domain Abstractions: Much of the focus on broadly general program representations (not just those amenable to parallel designs) will benefit from this demonstration of how use domain abstractions to create, partition, manipulate, and generate code. Because of that, programming will begin to accelerate the shift from GPL level representations to domain level abstract representations.

Remote Effect Constraints (REF): Not all constraint effects are local to their associates. Some constraints need to act remotely either in space (on parts of the program remote to an APC associate) or in time (at a later time in the generation process when anticipated program parts are finally created). REFs solve this problem One implementation of REFs in the preferred embodiment is to produce dynamically created transformations that act remotely in space and time. For example, programming integration and coordination decisions are represented in the preferred embodiment as dynamic transforms.

Elaboration on Differences from Prior Art

Full Independence of Computation and Execution Platform: This invention completely factors the specification of a computation (i.e., an abstraction analogous to a computer program in a conventional programming language but without the detailed design commitments found in programming languages) from the specification of the execution platform (or execution environment) architecture upon which it is to execute, thereby making computation and machine specifications completely separate and independently stated. Thus, the specification of the computation is implementation neutral meaning that it contains no information about the machine or execution environment and therefore, is invariant over execution platform architectures. The prior art abstracts to some degree parallel programming through the creation of parallel programming languages (e.g., HPF, ZPL, NESL, SISAL, UPC) but their models of specification still contain elements specific to particular classes of machine architectures (e.g., SIMD, or threads on multicore machines, or Message Passing Interfaces). In addition, because they are programming languages, their representational framework requires specification of organizational details of the implementation (e.g., specific loops that determine how the computation is partitioned) that will have to be changed if the machine architecture changes significantly. That is, programs in these languages will have to be analyzed for properties (e.g., what is the existing partitioning if any), abstracted (i.e., represented by some abstract form that is analogous to the template and partition abstractions used in this patent), reorganized (e.g., change the looping to re-partition the computation for a machine with a different architecture) and then transformed back into programming language code.

This is a complex process and often cannot completely capture the properties via analysis. (See the paper by Hall et al, July, 2005 describing the complex analyses in the SUIF compiler.) Hence, automated analysis may only identify a portion of the opportunities for parallelization. In addition, the analysis and abstraction steps are attempting to get to the same point at which this invention begins. In this invention, domain knowledge (see definition below and see also the next section) provides for free the answers that the GPL analysis and abstraction steps 1 and 2 (above) are seeking but often failing to produce. In this invention, the computation specification (the analog of the computer program in one of these languages) contains no hint of any machine architecture and no explicit GPL structures (e.g., loops, scopes, calls to thread routines, etc.) that commit to a specific partitioning of the computation.

Definition: Domain knowledge. Domain knowledge consists of explicit abstractions (e.g., CLOS objects) describing elements of a technology area. There are many kinds of domains. The domains discussed in this paper include:

the application (or problem) domain (i.e., image and signal processing) with abstractions like convolutions, image matrices, and templates, which define a submatrix within a matrix and the details of a convolution computation over that submatrix;

the machine architecture domain (e.g., parallel processing machines) with abstractions like Single Instruction, Multiple Data (SIMD) architectures, Multi-CPUs with shared memory, etc.; and the programming domain with implementation abstractions like matrices, loops, partitions, partitioning expressions, etc. and programming process abstractions like programming plans, programming action requests, etc. In programming languages, these abstractions are implicit within programs and completely interwoven with one another and with the details of the program, or perhaps part of the history of the program's creation (e.g., programming process abstractions). In this invention, these various abstractions are explicit objects and can be operated upon explicitly and separately.

Domain Specific Languages (DSLs) and Knowledge (DSK) Guide the Programming Process: Using domain specific knowledge in programming has the same advantage as theft over honest toil. (The previous sentence is adapted from a quote by Professor Tim Standish, Univ. of Irvine, Irvine Calif. in a paper titled Software Reuse, given at the *ITT Workshop on Reusability in Programming*, September, 1983. The original quote is "Software reuse has the same advantage as theft over honest toil.") While it is sometimes difficult to discover how to use DSLs and DSK (as it certainly was in this invention), once discovered, it makes the problem so much easier that one almost feels like it is cheating. DSL and DSK are applied to the programming process for parallel computing (via domain abstractions) in order to accomplish extensive, domain-driven organization of the computer program thereby tailoring it to various models of parallel computation. The invention exploits coordinated knowledge from the domain of the application or problem area (image and signal processing), the domain of parallel processing architectures, and the domain of the programming process.

Two key uses of domain knowledge in this invention are new to generation:

Using DSK to Identify Program Parts is Key to Partitioning. More specifically, the example (later in this patent application) uses domain specific APCs to identify the partitioning test code, special case code and default case code within IL definitions. These code pieces are used to create new, specialized abstractions (called templates) with specialized IL for the new abstraction. This specialized template and its IL serve to abstractly define each new partition. These code pieces are also used to create new IL abstractions associated with those new templates (viz. partitioning test condition) that serve as stand-in code for the eventual concrete partitioning test condition. These partitioning test conditions are said to be meta-conditions because their concrete expression as target program code depends upon information that has not yet been derived. They cannot be expressed as concrete code until the macroscopic design of the computation is completed, the various loop partitionings have been integrated, loop variable names have been chosen from a set of competing names, and the finalized organization of loop partitions and the chosen target program variable names have been coordinated across the computation. Nevertheless, macroscopic design and reorganization of the implementation can proceed secure in the knowledge that once the overall design is complete, the IL of the specialized template will refine to the correct concrete code for its context. Thus, DSK has "guided the hand" of the programming process to suggest a macroscopic implementation design (i.e., a partitioning), to provide abstractions (i.e., the IL) that can stand in for the concrete code during that implementation design process, and to refine those abstractions into the correct concrete code at the completion of the implementation design process.

Partitioning Rules Written in Domain Specific Terms. The rules that determine which kind of partitioning will be applied are written with domain specific terms that talk about the domain characteristics of the code and the machine (but not the implementation specifics of the code or the machine). For example, one partitioning rule is paraphrased as "if the partitioning test code (which, in the preferred embodiment, is signaled by an associated APC of type IdPartitionMatrixTest) is testing for a domain specific matrix decomposition case such as a matrix edge (which, in the preferred embodiment, is signaled by an associated APC of type MatrixEdge) and the machine is SIMD (which, in the preferred embodiment, is signaled by the occurrence in the implementation specification of a domain object that is one of the subtypes of SIMD, such as SSE, MMX etc.), then break disjunctions (i.e., OR tests) into separate partitions for each disjunct AND reformulate the default code's loops (when they are eventually generated) into expressions of SIMD instruction forms (i.e., the explicit looping will be replaced by an expression of SIMD instructions)." This rule causes a branch in the programming process (by associating new APCs—which are essentially data objects in the programming process domain—with specification expressions). The rule has "guided the hand" of the future programming process rather than explicitly and directly manipulate some program code. Later programming steps will do that explicit and direct manipulation of the code when the necessary code details have been determined, assembled, and built. This is a fundamentally new approach to program generation.

Prior art in optimization rarely makes much if any use of domain knowledge of the problem domain. (See Bacon, D. F., Graham, S. L., and Sharp, O. J.: "Compiler Transformations for High-Performance Computing", *ACM Surveys*, vol. 26, No. 4, December, 1994.) The examples in the referenced survey are expressed in terms of programming language representations that reveal and reflect the structure of the target machine rather than domain abstractions, which are non-committal to the target machine architecture. (See "Interprocedural Parallelization Analysis in SUIF" in Hall, et al, previously cited.) Further, there is no hint of associative processing constraints (APCs) or any other kind of programming process data object in optimization prior art that might modulate and coordinate the reorganization of the code.

Prior art in domain specific program generation has created inspiring models (e.g., Finite State Models of communication protocols) but has not addressed the problem of reorganizing (i.e., partitioning) computations for parallel computation. Nor has prior art in domain specific program generation used DSK as a "guiding hand" in the generation process in the way used in this invention. In general, domain specific program generation models to date have not performed major design-driven reorganizations (and particularly, no machine-architecture-driven reorganizations) of the target program design. That is, the broad structure of the eventual program has been highly similar to the broad structure of the program domain oriented specification. The maximum reorganization seen in previous work has been highly localized simplifications accomplished by well known algorithms, e.g., reorganization and simplification of mathematical formulas or state elimination in finite state machine specifications. In short, prior art in domain specific program generation has not been design driven in the sense that it starts with an abstract design pattern (Gamma, et al, 1995) and molds the computation to that pattern.

Design First, Code Later: The invention first performs a broad-brush, abstract design of the target program in the problem domain using methods and processes from the programming domain. The invention allows this to be done without having to deal with all of the GPL-level complexities and interrelationships introduced by the use of a GPL representation (e.g., LISP, ML or Haskell). During this process, only the broadest cross-program constraints must be dealt with (e.g., the broad pattern of iteration partitioning for computational parallelism). Dealing with the low level details of how partitioning interacts with the computation's detail actions can be deferred until sufficient information has been derived to generate the low level details. Only after this broad-brush design is complete, does the invention map the design into the GPL domain where it must then deal with the GPL-level constraints and interrelationships (e.g., variable scoping, data flow within the loops, mapping logically described loop ranges—expressed as predicate descriptions—into computable entities such as integer or variable expressions). What has not been understood in the prior art is how to create the broad-brush design without descending into the detailed complexities and interrelationships of the GPL-domain. That is, the prior art has not invented machinery to automatically break the programming process into two separate but related parts and thereby simplify the overall process, while still retaining fully automated generation. This is a major contribution of this invention.

Applicable to Other Application Domains: While this invention has focused on the application domain of image and signal processing as a way to allow concrete examples, the mechanism can be adapted to any other domain (e.g., data structures) whose domain elements require some kind of iterated processing (i.e., require looping, recursion, etc.). Application to other domains requires the choice of domain abstractions and the IL definitions for the new domain that are analogous to the image and signal processing abstractions. For example, extended data structures have subparts that are the subject of iteration. More specifically, for example, a binary tree comprises a left branch and right branch subparts. The application domain abstraction for the processing (say tree search) will contain the partitioning test expression and the various cases (e.g., empty tree, left branch succeed, etc.) along with their program parts. Associated APCs identify these elements in the same way that they did in the image and signal processing domain. With that, the partitioning process can proceed in a manner completely analogous to the example from image and domain processing. A few dozen such domains are believed to be sufficient to cover much of application programming.

BRIEF SUMMARY OF THE INVENTION

This patent describes a machine (FIG. 1a) and a method that automatically transforms an implementation neutral specification of a computation into an executable computer program whose computational structure is partitioned into pieces that can exploit high capability facilities of an execution platform, which includes facilities for execution parallelism. The exact form of the partitioning that is ideal for any specific target execution platform is determined by a combination of the structure of the target computation and the architecture of the target execution platform (i.e., the machine or machines that will execute the target computation). The execution platform architecture is specified separately and independently from the domain specific computation specification.

Both the implementation neutral specification of a computation and the specification of its execution platform are expressed as domain specific expressions. The specification of the desired computation is completely machine independent (i.e., implementation neutral) in that it contains no information about or commitment to any specific implementation or target execution platform architecture. It contains no commitments to any partitioning of the computation into separately computable pieces. Nevertheless, the computation specification may be automatically transformed by this invention into a partitioned computer program expressed in a conventional general purpose programming language (e.g., C) or specialized, parallel programming language (e.g., HPF or UPC) and targeted to any specific machine architecture desired. Targeting execution platforms with different architectures requires no changes to the machine independent specification of the computation. For example, the same computation would be partitioned differently (and automatically) for A single processor Von Neumann machine,
A single processor extended with SIMD (Single Instruction Multiple Data stream architecture) or low level parallel or vector instructions (e.g., a sum of products instruction),
A multiple CPU (e.g., a multicore PC) machine with shared memory,
A combination of 3 and 4,
A cluster of machines each with its own memory, or
Some other parallel architecture.

Information on which a specific partitioning is based comes from the application domain (e.g., image and signal processing), the program implementation domain (e.g., arrays and matrices), the programming process domain, and the execution platform domain (e.g., multicore or SIMD architectures).

This invention solves several problems of previous approaches to partitioning a computation for parallel computation such as Complexity of analysis required for optimization oriented approaches,
Missed opportunities for parallelization in optimization oriented approaches,
Initial programming costs for parallelizing computations,
Reprogramming costs associated with porting to a parallel machine with a different architecture, Inability to design the program in abstract terms that are generic and uncommitted to low level concrete details, which makes reorganizing and manipulating the overall design of the program difficult, and Excessive complexity of programs written in conventional GPL-s and/or parallel GPL-s.

Operationally, the generator uses domain specific knowledge supplied by the user to automatically determine an abstract partitioning framework for parallelization (i.e., a partitioning) early in the automated programming process long before the details of the code are generated (and before many code details are even determinable). That parallelization framework is determined by the architecture of the parallel machine (i.e., opportunities for multiple processors and/or for vectorization) and additionally determined by the architecture of the desired computation, (i.e., the natural partitions of a matrix computation).

The abstract partitioning framework for parallelization is part of the first generator phase, which formulates a macroscopic design for the overall computation in the problem domain in terms of an Intermediate Language (IL) that is unfettered by GPL restrictions and requirements. The IL is the mechanism whereby the user can inject concrete implementation details of the specific target computation into the design and the generator can inject desired design features (e.g., parallelism) into the design. Injecting design features is accomplished by specializing the IL to encapsulate the desired design features in the implementation, features such as partitioning for multicore and/or instruction level parallelism. Implied computational structures such as loops are introduced by adding constraints and the constraints are manipulated, combined, and synchronized to evolve the details of the design toward the representational form that will be required to cast it into GPL code. Finally, the invention refines the resultant form of the macroscopic design into implementation code. In other words, the generator first designs the overall program and its parallelization framework in the abstract (i.e., in the problem and programming domains) and then builds and molds the program to it in concrete, GPL terms (i.e., in the programming language domain). In short, it designs first and codes later. This notion is one of the key contributions of this invention.

BRIEF DESCRIPTION OF THE SEVERAL VIEWS OF THE DRAWINGS

Drawing Figures

FIG. 1c is an example of partitioning a computation.

FIG. 6 is of the key fields in Loop2D1 APC.

FIG. 60 Example Problem for SPMD Parallel Computation.

Figure 1A:
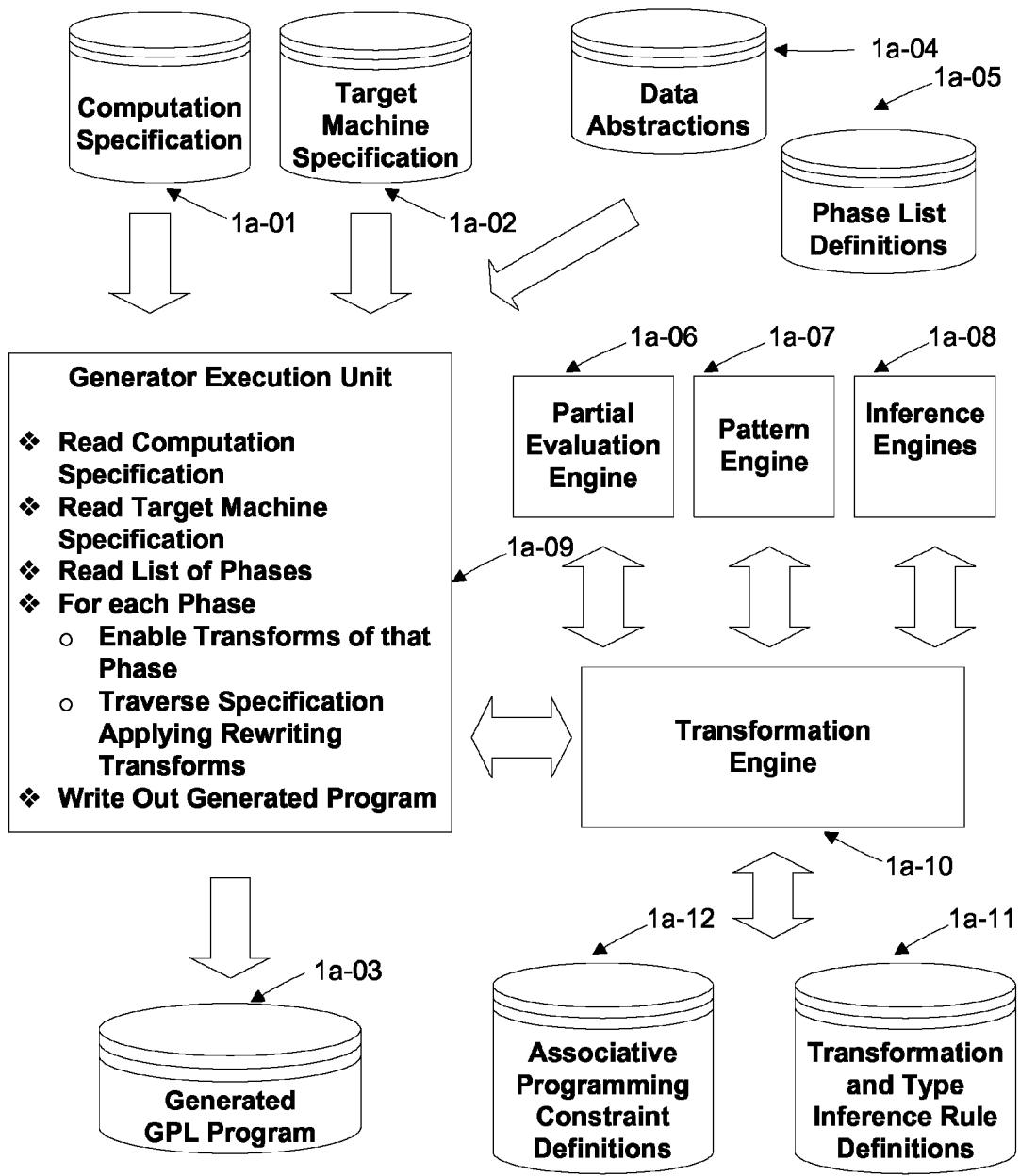
FIG. 1a is a block diagram describing the architecture of the generator system.

Table 1—Comparison of Program and Programming Constraints

Table 2—Elements of the Generator

Table 3—Elements of the Pattern Language

Table 4—Various Specializations of DS Abstractions

Table 5—Key Generator Operations

DETAILED DESCRIPTION OF THE INVENTION

Overview

The invention is an automated system that generates programs from an implementation neutral, domain oriented specification of the computation and a separate implementation independent specification of the execution platform (e.g., a parallel or other high capability platform). The generated program takes advantage of a broad range of opportunities for execution parallelism or other high capability features. The following sub-sections discuss the key ideas of the invention.

Domain and Representation Building Blocks: The generator is an object based system that builds the model of its world (e.g., its Abstract Syntax Tree or AST) out of domain objects, which at the lowest implementation level in the preferred embodiment are CLOS (Common Lisp Object System) objects. These domain objects provide the building blocks for a variety of domain specific languages (DSLs). These DSLs serve as computation specifications, execution platform specifications, intermediate design representations, intermediate programming process representations, and GPL-like representations of the generated target program. The generator's world comprises multiple domains, including:

One or more problem or application domains, which for the examples of this paper will largely be the signal and image processing domains, the data structure domain, and the numerical computational domain;

The programming language domain, which characterizes the representation of the generated code for of convention programming languages such as Java, C, C++, C# and so on; and The programming process domain, which characterizes the intermediate representational forms and the process by which those intermediate representational forms are created, changed and evolved into the final code produced by the generator.

Many previous approaches to program generation and manipulation have chosen conventional general programming languages (GPLs) as their universal representations for both the intermediate forms as well as for the generated output code produced by the generators. This work breaks with that tradition for the intermediate representational forms. The generator's intermediate representational forms within the programming domain are consciously different from conventional GPLs because conventional GPLs impose overly strict formation rules and inter-component constraints on the representation—rules and constraints that do a good job of representing the final code but do a poor job of representing the intermediate forms because the intermediate forms are in the midst of the evolution of their program formations and inter-component relationships. Consider an analogy from architecture world. An architect's model of a building initially abstracts away various constraints and restrictions of the physical world, such as wood, concrete, plasterboard, nails, glue and gravity, to allow the broad, macroscopic design of the building to be easily sketched out and changed in the abstract, unfettered by the constraints of the physical world. Similarly, the intermediate representations in the programming process domain abstract away the conventional GPL constraints and allow the evolving macroscopic program design to be sketched out and changed unfettered by the rules and restrictions introduced by conventional GPLs. This allows one or more implied, abstract design patterns and their individual design features to drive the formulation and evolution of the target program. Thus, certain desirable design features (e.g., partitioning of a computation for parallel computation) can be imposed on the evolving macroscopic implementation design before having to deal with the rules and restrictions that the implementation language—a conventional GPL—will eventually require. When the broad, macroscopic design is settled, then the low level details and structures required by that conventional GPL can be derived, integrated and coordinated within small program locales with full confidence that the broad global relationships among the program locales have been formed so that the integration and coordination of those low level details can be confined to the program locales.

Intermediate Language and Implied Implementation Designs: Domain operations are specified as expressions of domain operators and operands. The domain operators (e.g., image convolutions—see extended definition below) and operands (e.g., images and image neighborhoods) are defined generically in terms of expressions of an intermediate language (IL), as well as other domain operators and operands from other lower level domains (e.g., from the arithmetic, data structure, database or other foundational domains). The IL represents the beginnings of the eventual implementation. The IL serves two functions. First, it provides a place where the user can inject problem specific definitions for the generic IL expressions and thereby specialize those definitions to the user's specific computation. Second, it allows generic stand-ins for the implied but not yet constructed implementation structures and entities, stand-ins that are unfettered by conventional GPL rules and restrictions. The definitions of these stand-ins can be incrementally changed and evolved without immediately affecting the broad design of the program. In other words, using the IL expressions, the generator can begin to represent the implied and abstracted implementation structures out of the very restrictive context that would be required by a conventional GPL implementation representation. Eventually, the rules and restrictions of conventional GPLs will have to be integrated into and coordinated with these incipient implementation structures. But initially, the IL simplifies the task of manipulating the macroscopic design into some desired architectural form by deferring the integration of those details until that macroscopic design has settled into its final, desired architectural form.

Extended Definition: Image Convolution. An image convolution (or a signal convolution) is a reduction operation that computes an output image (or signal) from an input image (or signal) by computing a corresponding output pixel (or signal datum) for each input pixel (or signal datum) via mapping a set of pixels (or a set of signal data) in a neighborhood around that input pixel into a single output pixel (or single output signal datum) that corresponds to that input pixel, which is at the center of the input neighborhood. The reduction operator over the neighborhood includes various definitional options such as sum of products, maximum value, minimum value, criteria-based selection of a value and other reduction patterns. A common example of a neighborhood reduction expression is the sum of products of individual neighborhood pixels and neighborhood coefficients, where the value of each neighborhood coefficient is determined by the relative position of the pixel within the neighborhood and possibly other data. Various choices for convolution definitions will allow specification of edge detectors, pattern detectors, contrast adjustors, digital focusing mechanisms, image enhancers, noise filters, bandpass filters, signal amplifiers, Fourier transforms, Fast Fourier transforms (FFTs), etc.

But why defer generation of the final concrete code? The short answer is that it simplifies the generation process. It is likely (and, in fact, virtually certain for any real world program) that the concrete code forms to be produced from the IL will change multiple times as additional design features are imposed on the evolving program. Making incremental changes to concrete code forms expressed in a conventional GPL would vastly complicate the problem in the same way that building an architectural model of a house with real materials would complicate making changes such as changing the number of floors and shuffling rooms between floors. A real-materials model is a bad representation for the design phase of a house and a conventional GPL model is a bad representation for the design phase of a program. But a domain specific IL-based representation allows incremental design feature changes to be isolated to the IL and domain entity definitions and therefore, have no direct immediate effect on the evolving program design until the broad macroscopic form of the program is settled and the generator is ready to incorporate the IL definitions.

The IL forms are domain specific and assume an implied but not yet finalized prototype implementation structure. For example, the portion of the IL specific to an image convolution operation context includes:

Generator variables that are stand-ins for the conventional GPL variables that will be used to iterate over the image (e.g., ?i and ?j might stand in for the implied GPL variables idx27 and idx28 that will eventually be used as loop indexes in the generated code), Generator variables that are stand-ins for the GPL variables that will be used to iterate over the neighborhood of a pixel (e.g., ?p and ?q might standing in for GPL variables like p15 and q16 that will eventually be used as neighborhood loop indexes in the generated code), and Method-Transforms (MT), a kind of program transformation that defines an implementation specific portion of the target computation (e.g., MTs are used to specify how to compute the image row and column indexes of a pixel from the image indexes of the pixel on which a neighborhood template is centered and a relative position within that neighborhood template). Method-Transforms are program transformations that are uniquely identified by two entities: 1) a method name (e.g., "row") and 2) an object (e.g., the neighborhood object s). For example, the expression "(row s . . . )" references an MT that will generate the code to compute the row index of an image from a relative row index within s and the image row index of the image pixel upon which s is centered.

The roles of the generator variables used in the IL are declared by including them in a Domain Programming Namespace (DPN) declaration that is associated with a context of domain operators and operands (e.g., the context of a convolution operator). Transformations associated with a DPN are thereby informed as to the implied implementation pattern and the role of each generator name in that implementation pattern. Each DPN represents an implied implementation structure (e.g., convolutions over images or recursive searches over data structures) whose implementation code and relationships with other implementation structures are initially not fully determined. They will be worked out incrementally during the overall generation process. The DPNs tie together the various objects, transformations, MTs and IL, all of which will contribute to the derivation of such details.

Specifying the Target Computation: To specify the target computation, the user supplies:

An implementation neutral specification of the target computation expressed in terms of domain specific operators and operands, Problem specific definitions of the domain specific IL used to define the domain operators and operand of the target computations (if default IL definitions need to be modified), and A specification of the desired execution platform and its special capabilities (e.g., multicore and/or instruction level parallelism).

The implementation free specification has a strong APL-like flavor to it, even though its syntax is decidedly LISP-like. The specification is APL-like in the sense that its expressions comprise application oriented operators (convolutions) applied to large-grain composite data structures (e.g., color images), where the result of those expressions are often other large-grain composite data structures.

The implementation free specification of the target computation is converted into an Abstract Syntax Tree (AST). The AST is the framework that will be manipulated into the desired design architecture within which the problem specific implementation details of the computation will be integrated. The evolution and manipulation is accomplished by sets of domain specific transformations that incrementally rewrite the AST in a series of translation phases each of which has a narrow set of translation objectives.

Encapsulating Design Features by Specializing the IL Definitions: Broadly speaking, generation is a two stage process—1) design then 2) code. During the design stage, the generator is restructuring the computational framework (i.e., the implementation free specification of the target computation) to include explicit design features that exploit optimization opportunities provided by the execution platform (e.g., parallelism) or that are required by the target programming language. Concurrently, the generator is encapsulating the coding details of those same design features in specialized versions of the Intermediate Language (IL) that are used to define the implementation forms of domain operations. During the follow-on coding stage, these specialized IL definitions will be refined into conventional programming language forms that manifest the specific design features that have been previously encapsulated in the specialized IL.

More specifically, specializing the IL to encapsulate various desired design features (e.g., computation partitions) is accomplished by specializing various domain design objects and their MTs based on the opportunities and requirements specified in the implementation dependent specification of the execution platform. FIG. 1b illustrates the encapsulation process. This process is, in effect, specializing the IL operator, operand, and MT definitions so that the concrete code generated from that specialized IL that defines those operators, operands and MTs will incorporate the design features. Later in the generation process after the various design feature encapsulations are completed, the MTs of the IL are ready to generate portions of the implementation that express the design features in a form that is compatible with conventional GPLs. In effect, the generator is building, specializing, and evolving a coordinated set of microgenerators (i.e., the MTs of objects in the IL) that will generate parts of the target program whose overall design or architecture is prescribed by the user. Thus, the desired target computation design requirements drive the formulation (i.e., determine the form) of the target program structure so that the computation is customized to fit the desired target computation design, not the reverse. In short, the generator "designs first and codes later."

One of the simplest examples of design feature encapsulation is where the index ranges of a neighborhood object (e.g., a neighborhood s) are relocated from the domain language convention of [-n, n] to a C language convention of [0, 2n]. This involves the creation of a new neighborhood object that is a specialization of s, say s-0, with customized MTs that are specialized versions of s's MTs. These customized MTs are formed by algebraic manipulation of the RHS of the MT. This is an easy transformation because the RHS of an MT is required to be an expression of pure functions.

The second example of design feature encapsulation addresses the problem of partitioning a computation for exploiting various forms of parallelism or for exploiting other high capability features of the execution platform (e.g., security mechanisms). FIG. 1c illustrates the partitioning process for a concrete partitioning test condition expression. It uses domain knowledge that is supplied by the user and is associated with some test conditional expression in an MT of some domain object that will be partitioned (e.g., an image matrix). The domain knowledge identifies the test condition that will partition the computation into a set of disjoint partitions that taken together cover the whole space of computations. The domain knowledge may further provide domain specific information that indicates the nature of the computation space and the manipulation method for forming partitioning tests that will produce the disjoint partitions. Let us suppose that the partitioning test condition is an expression in disjunctive normal form (i.e., $C_1 \vee C_2 \vee \ldots \vee C_n$ that partitions a matrix computation where the $C_i$'s are conditions on the matrix's indexes. The domain specific knowledge specifies that the partitioning strategy should formulate a decision table of partitioning test cases of the forms: $(C_1)$, $(\neg C_1 \wedge C_2)$, $(\neg C_1 \wedge \neg C_2 \wedge C_3)$, $\ldots$, $(\neg C_1 \wedge \neg C_2 \wedge \neg C_3 \wedge \ldots \wedge C_n)$, and $(\neg C_1 \wedge \neg C_2 \wedge \neg C_3 \wedge \ldots \wedge \neg C_n)$. Other kinds of computational spaces may require different partition strategies. For example, the partitioning strategy may require computation specific partitions that share some common data and further, may specify a synchronization strategy among partitions to share that data. In other words, the domain knowledge may impose a design pattern relationship among partitions. This information is codified by the partition type that is specific to a specific design pattern. For example, a client-server design may impose sequential execution on the processing of some shared data but allow parallel processing of non-shared data. The generator allows an unlimited variety of such partitioning designs.

Each partitioning test expressed in the decision table example in the previous paragraph is associated with an object (e.g., s-0-edge,), which is a specialized version of the object (e.g., s-0) associated with the MT in which the partitioning test condition occurred. The specialized MTs for such specialized objects are formed by a process that assumes one of the partitioning condition's disjuncts to be true and all of the previous disjuncts from earlier partitioning conditions to be false (i.e., assume one of these cases) and then partially evaluates the RHS of each MT under that assumption to produce the specialized version of that MT. If an MT contains the form "(if $(C_1 \vee C_2 \vee \ldots \vee C_n)$ (then branch1) (else branch2))", the first n cases would simplify this form to "branch1" and the last case to "branch2". For each case, the process creates a new specialized object and a specialized set of MTs for that object. Thus, each object has new IL specialized to it and also specialized to a specific partition characterized by one of the partition test cases.

In addition, for each of these cases, the specialization process also creates new MTs that are design abstractions representing the partitioning condition (e.g., an MT like partestx (s-0)). The partitioning condition MT's are used in some IL expression or expressions defining part of the target computation (e.g., a convolution expression). These new partitioning condition MTs allow the generator to defer refining the partitioning conditions to concrete form until the macroscopic design is settled and various implied design patterns (e.g., loops) have been combined and coordinated. Eventually, expressions of partestx MTs and other similar design abstractions will become concrete logical expressions (e.g., (idx27 !=0)) and these might become part of an if-then statement or might cause loop index limits to be redefined. However, until the if-then statements and loops are formed and integrated, until shared loops are determined and combined, until final index names have been choose for shared loops, and until any additional loop control conditions that might change the concrete realizations have been determined (e.g., (0<=idx27<=maxdim1)), it is much simpler to manipulate the design abstraction (e.g., partestx(s-0)) than to manipulate is concrete realization. Any concrete realization at an early generation phase is subject to significant later changes and further integration. Thus, the generator can manipulate the partitioning condition as an abstraction and defer the generation of the concrete form of the expression containing that object until after the macroscopic design is settled and all of the programming details sorted out.

An example of manipulating the design of the target program in the abstract is the process of cloning code. For example, one can specialize code that operates on a neighborhood s-0 to code that operates on a specialized neighborhood s-0-edge1 simply by substituting s-0-edge1 for s-0 in that code. Thus, cloning and specializing code can be done simply and abstractly. In such a case, the generator is manipulating the design of the computation in the programming process and problem domains, not in the conventional GPL domain.

An advantage of manipulating design abstractions (e.g., partitions) is that this allows a series of separate but possibly interrelated design features to be incorporated incrementally into the MTs (and thereby into the IL) by a series of specializations in separate generation steps. When the macroscopic design of the computation is settled, the appropriately specialized, underlying MTs will generate the correct detailed code from the specialized IL definitions of the domain expressions. Partitioning conditions will refine into sets of assertions that in combination with other assertions arising from other generation steps, will allow the generator to infer the control details of a loop. For example, the generator will infer the index minimum and maximum values for a loop associated with a specific partition of the computation. In certain cases, illustrated later, some loop indexes become constants and the looping operation will simplify away leaving only the loop body. But this simplification will occur later in the generation process.

The third example of design feature encapsulation arises when the execution platform has instruction level parallelism capability, e.g., vector instructions. If the computation can exploit them and the user requests their use, the design of the target program can be formulated to use them. Using the convolution operation as the example, this case produces a cascade of two interdependent specializations, one for the image matrix's outer loop and a second, dependent specialization for the neighborhood's inner loop. This cascading is a reflection of the interrelationship between the two loops. The first specialization creates a new matrix computation object and new MTs that will later trigger the specialization of the neighborhood computation using the data context information from the earlier specialization. This example will be shown in detail later in this document.

Manipulating Partitions: The generator introduces a partition object as a design entity that keeps track of the relationships between generic objects and specialized versions of those objects that encapsulate design features. Similarly, a partition set object is used to keep track of related partition objects. The relationship of generic to specialized objects is used to clone specialized, partition-specific loops from generic loops by substituting the specialized object for the generic object. This is the technique whereby design features are incorporated into generic code forms.

Additionally, partition objects can be propagated, combined and manipulated to achieve various design objectives while deferring the expression of those partitions in concrete code. Examples of these operations include the following:

Compatible partition sets (i.e., partition sets implying loops with matching ranges and increments such that mergable partitions have provably equivalent partitioning conditions) may be mergable, which will allow multiple loops (i.e., passes) over data items to be merged into a single loop (i.e., pass);

Partially compatible partition sets (i.e., partition sets in loops with matching ranges and increments but without provably equivalent partitioning conditions) may be merged by formulating the Cartesian product of the two partition sets, an example of which is the Cartesian product to combine two different kinds of specializations e.g., native partitioning for parallel computation and partitioning arising from a matrix extension;

Loops that have one range that is a sub-range of the other, subject to the semantics of the domain specific expressions, may be made compatible by encapsulating a design feature that extends the loop of one object with MTs that generate special case computations for the virtual portion of the extended data object; and Partition sets may be converted to thread sets with one or more partitions to a thread (i.e., by splitting big partitions and grouping tiny partitions) to balance the computational load for parallel execution of partitions on multiprocessor execution platforms.

Associative Programming Constraints: Since the details of various programming elements are built up bit by bit over the generation process, the generator needs a mechanism to package up those details, specify incipient program elements (e.g., loops) before they are expressed as GPL elements (e.g., GPL loops), associate them with portions of the computation, and evolve them until sufficient information is available to formulate them as conventional GPL elements. The mechanism is called an Associative Programming Constraint (APC), which is associated with some portion of the computation. APCs are domain objects that record the state of, constrain, and characterize loops, recursions and so forth. APCs are first class data objects and can be manipulated, combined, propagated, extended and refined according to a set of domain specific rules implemented as transformations that rewrite the AST form of the evolving computation. Once their final location is determined and their detail specifications are complete, they are re-cast into a form that closely parallels conventional GPL structures and elements.

Beyond just providing constraints on the evolving program structures and elements, APC's also contain programming process structures and elements such as desired future programming actions and plans. More specifically, an APC might contain, for example, a request to re-code a loop as an out-of-line routine enclosing a call to a thread set. Again, this allows the generation of the routine-but-messy programming details to be deferred until the broad macroscopic design context is settled. In short, APCs record, guide, and modulate the programming process.

Domains: The reduction to practice implementation of this invention is called DSLGen (short for DSL Generator). It internally expresses everything in its world (i.e., input specifications, Abstract Syntax Tree (AST) expressions, output programs, and so forth) in terms of structures built out object instances of Common Lisp Object System (CLOS) classes and subclasses. These are organized into a class hierarchy, which allows the introduction of various kinds of inheritance. For example, the generator's low level machinery such as constraints, program transformations, type inference rules, and logical inference rules all may inherit from their class' superclasses. The inheritance hierarchy is user extensible and each newly added problem domain introduces new domain specific operators, data types, method names, type inference rules, and perhaps DSL classes, transformations, and logical inference rules. The following outline shows some of classes (in the top few layers of the inheritance hierarchy) that will be important to explaining the ideas in this description. The domain specific portion of the inheritance hierarchy below shows only the classes necessary for discussing the problem domain used in this description (i.e., the graphics and digital signal processing domains). Other domains (e.g., data structures) introduce a variety of other domain specific classes. The top domain specific class is the DSTypes class.

Figure 46:
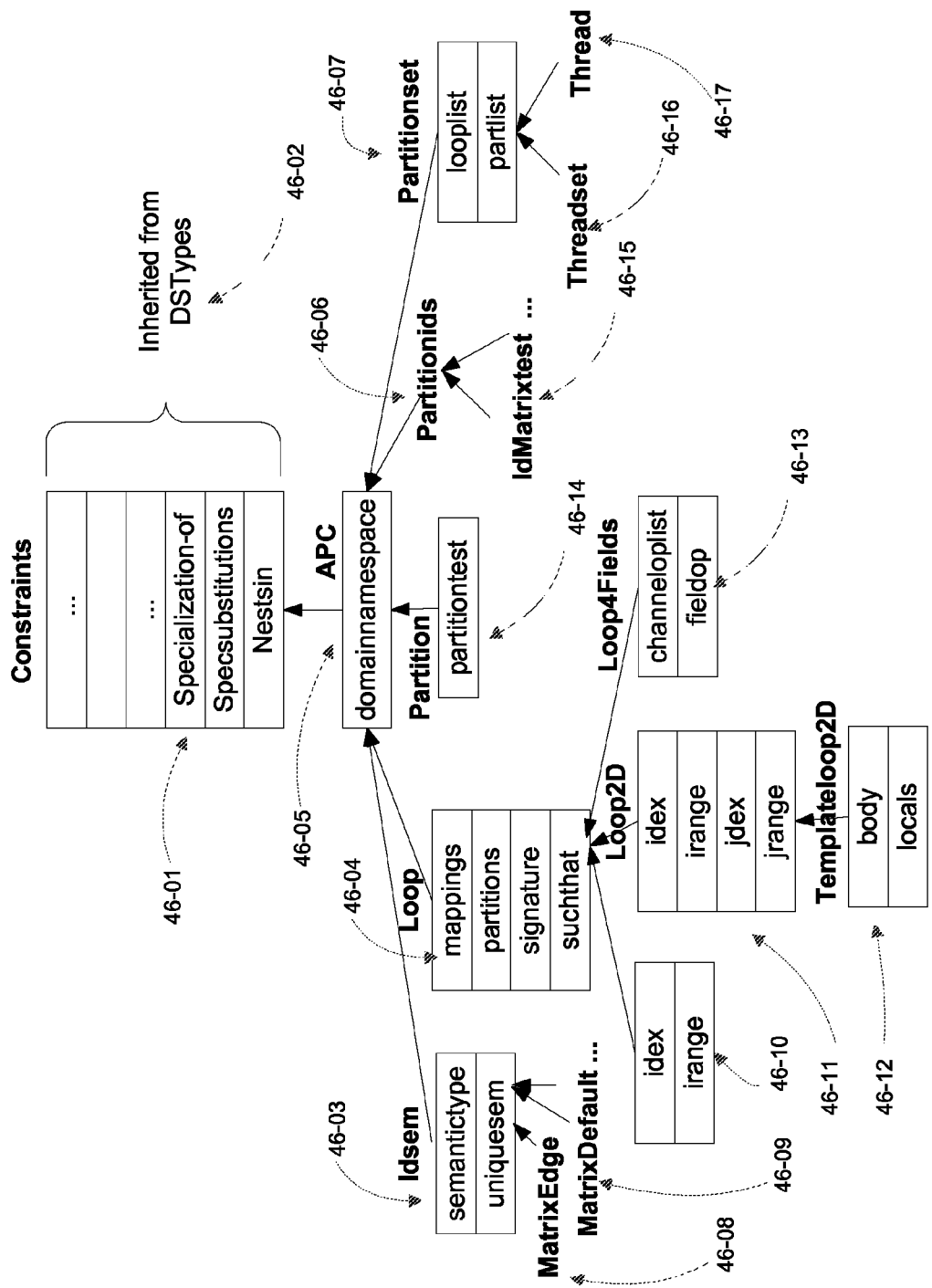
FIG. 46 shows selected constraints, slots and their inheritance.
Figure 47A:
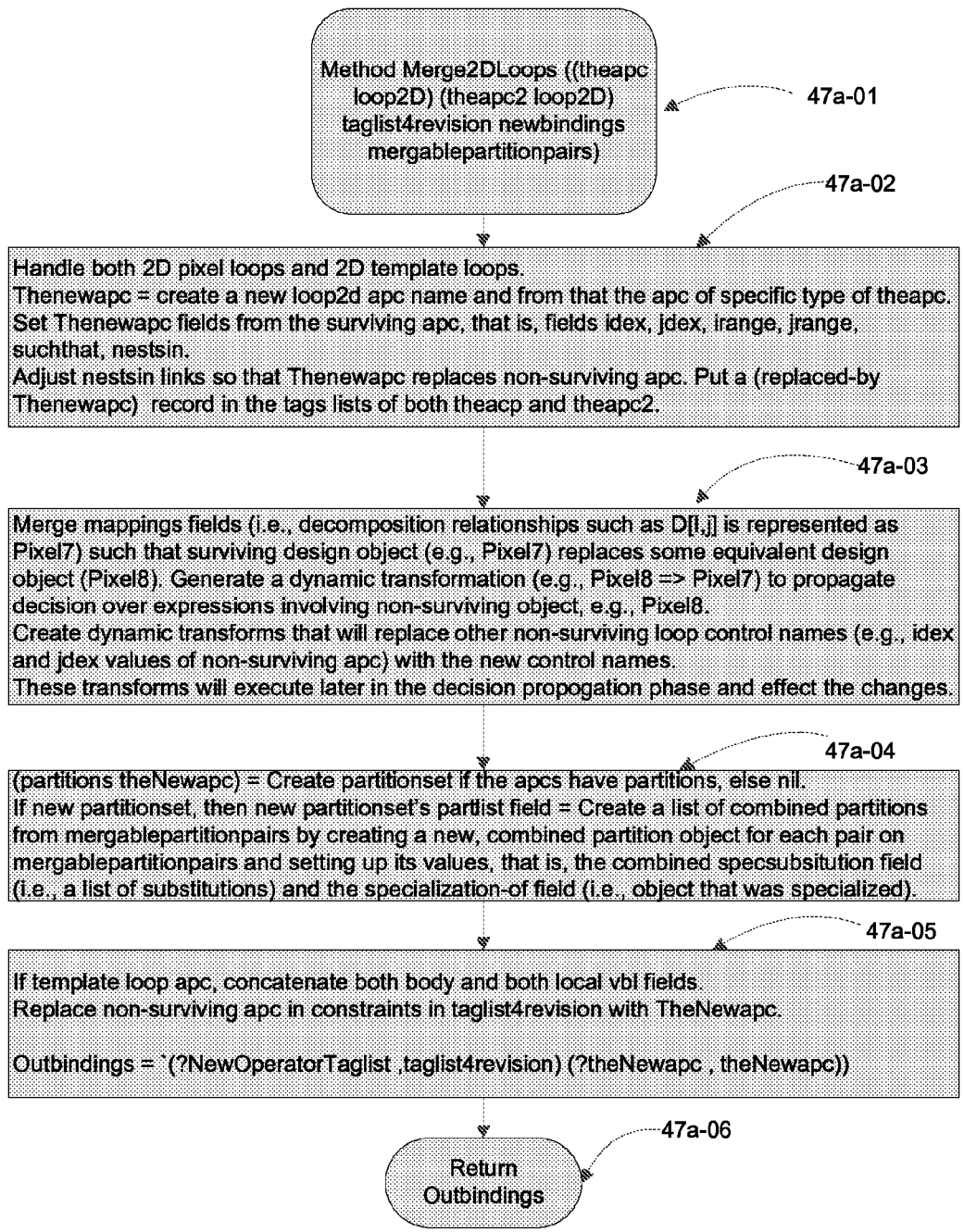
FIG. 47a is the merge2dloops method that merges two compatible loop apc-s (either matrix loops or template loops) so that loop control can be shared.
Figure 47B:
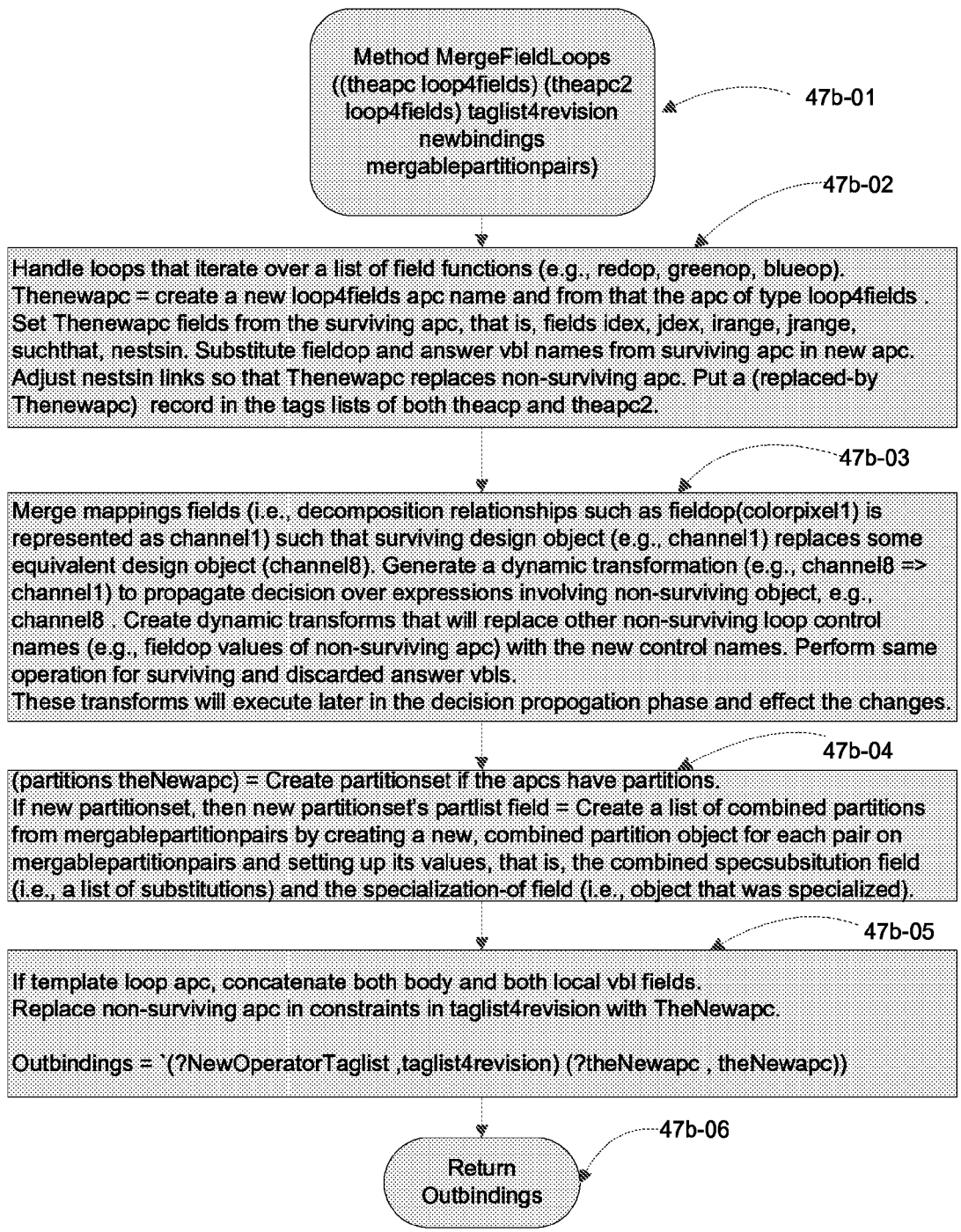
FIG. 47b is the mergefieldloops method that merges two compatible field loop apc-s so that loop control can be shared.
Figure 48A:
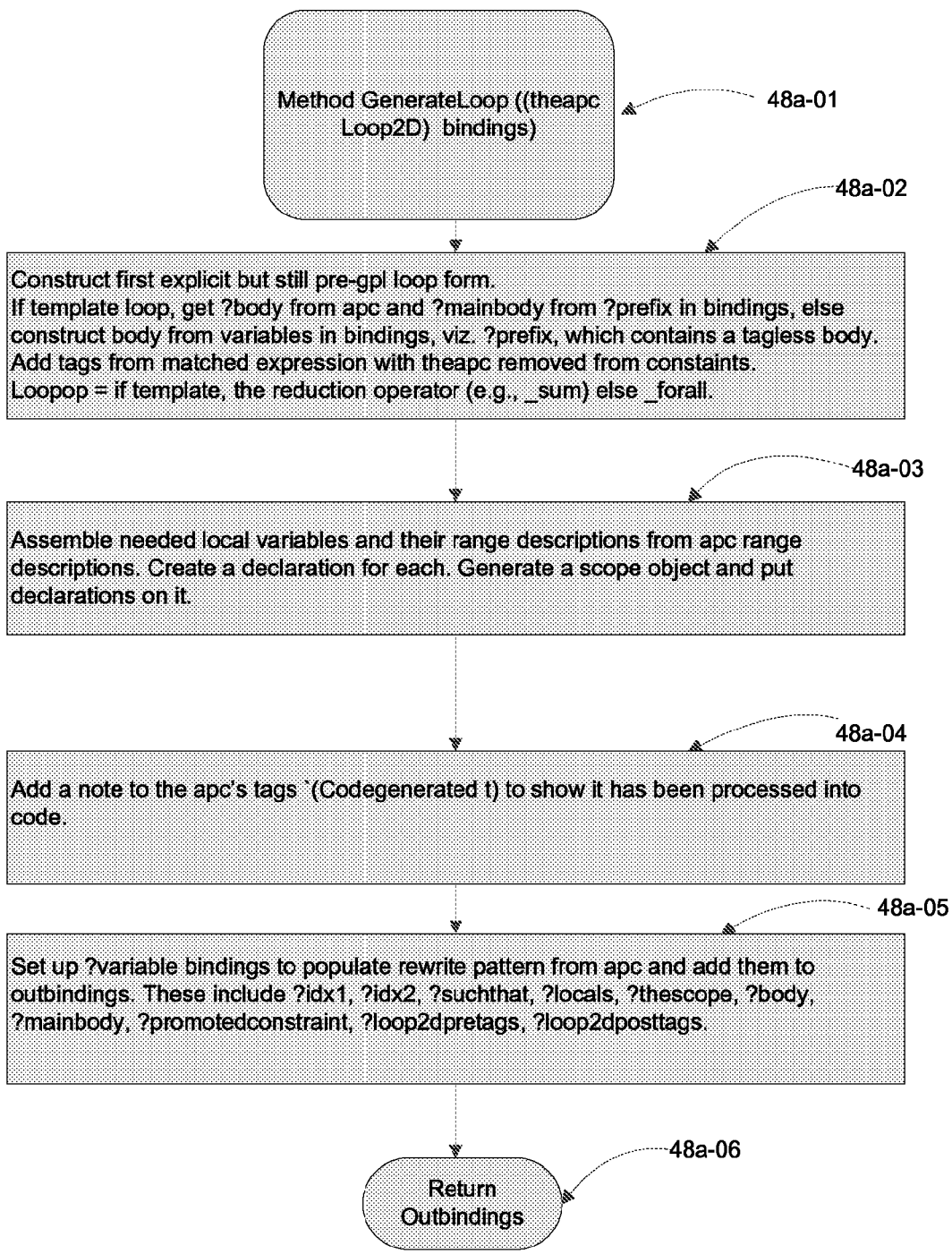
FIG. 48a is the GenerateLoop method for 2D loops (either matrix loops or template loops), which extracts data from the apc and binds it to ?variables that will be used in the rewrite pattern of the transformation that effects the loop generation.
Figure 48B:
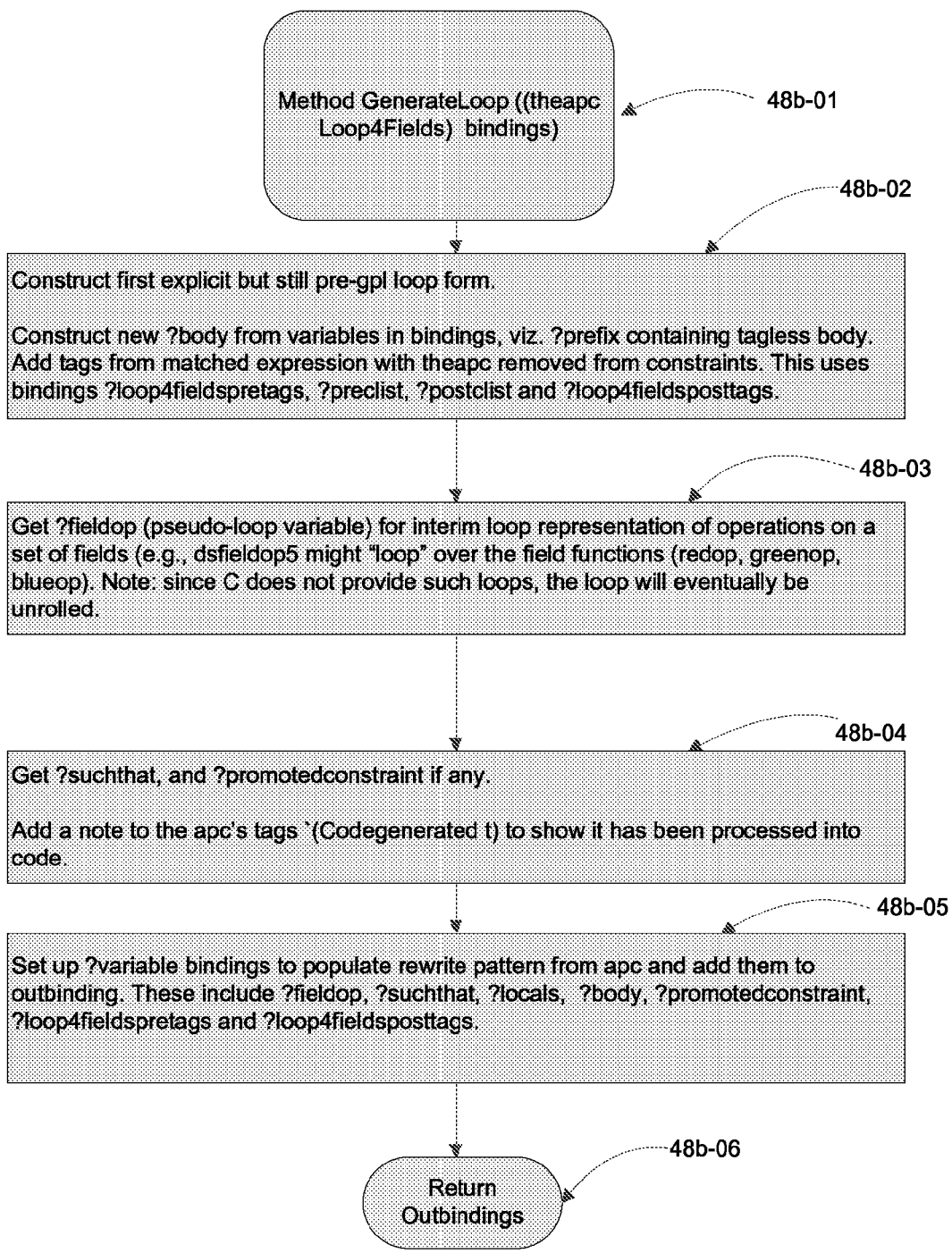
FIG. 48b is the GenerateLoop method for field loops, which extracts data from the apc and binds it to ?variables that will be used in the rewrite pattern of the transformation that effects the field loop generation.
Figure 49A:
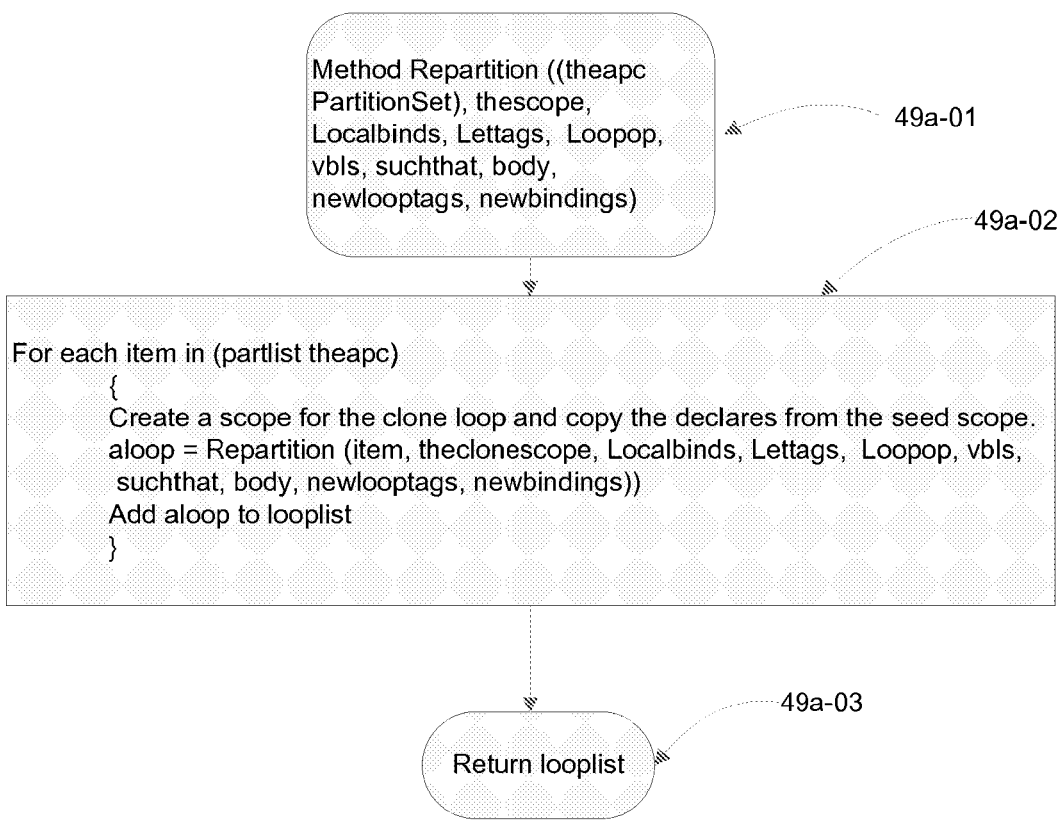
FIG. 49a is the Repartition method for a PartitionSet.
Figure 49B:
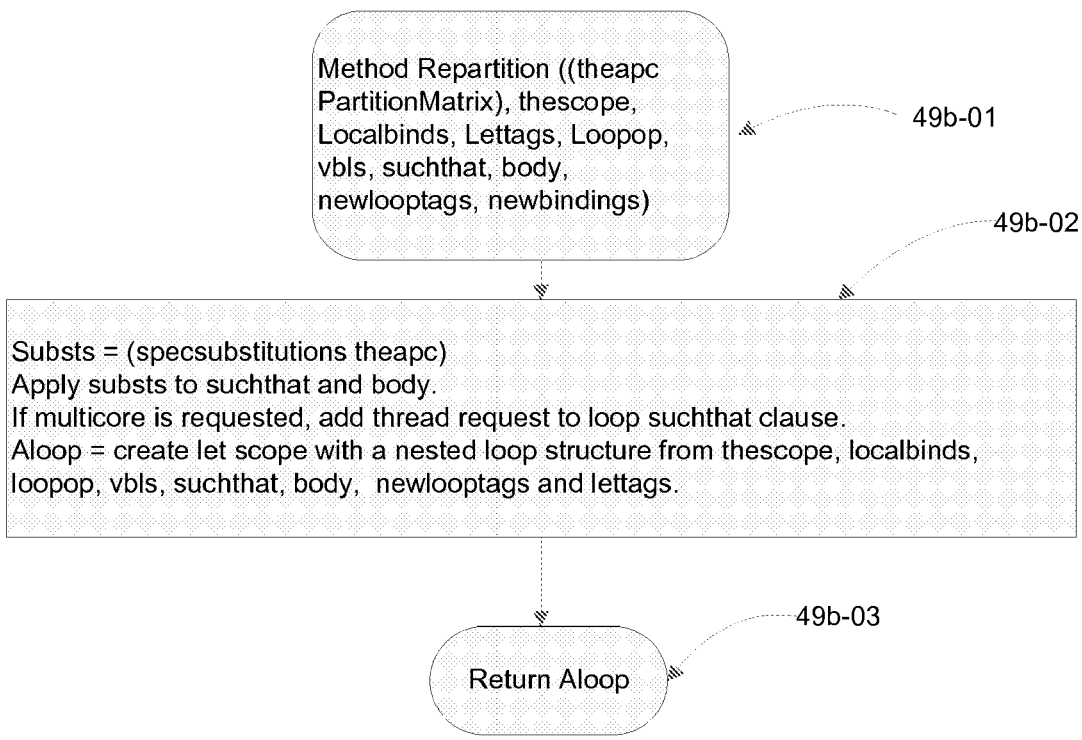
FIG. 49b is the Repartition method for a single Partition-Matrix partition object.
Figure 50A:
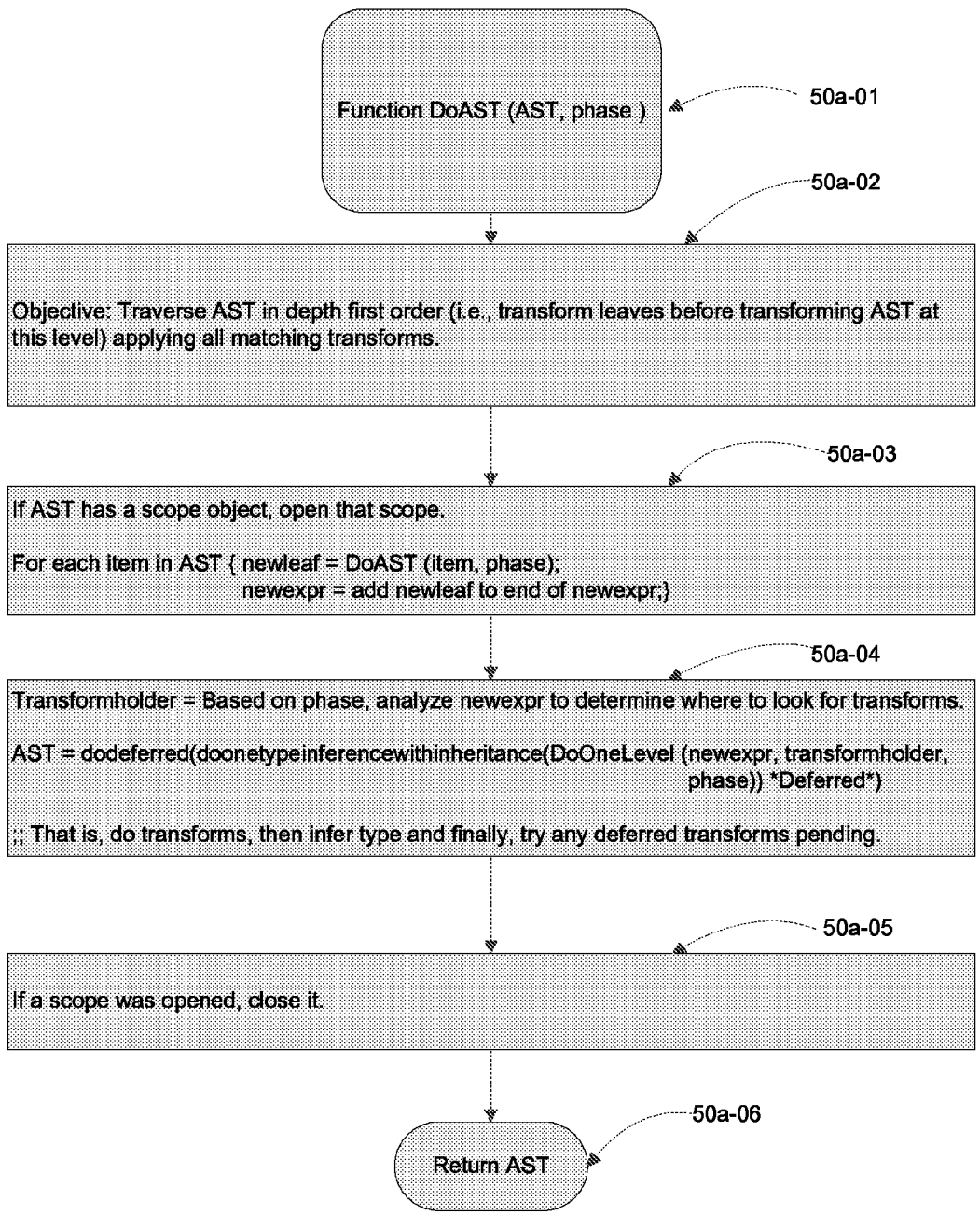
FIG. 50a is the DoAST function, which traverses the AST in depth first order (i.e., transform leaves before transforming AST at this level) applying all matching transforms.
Figure 50B:
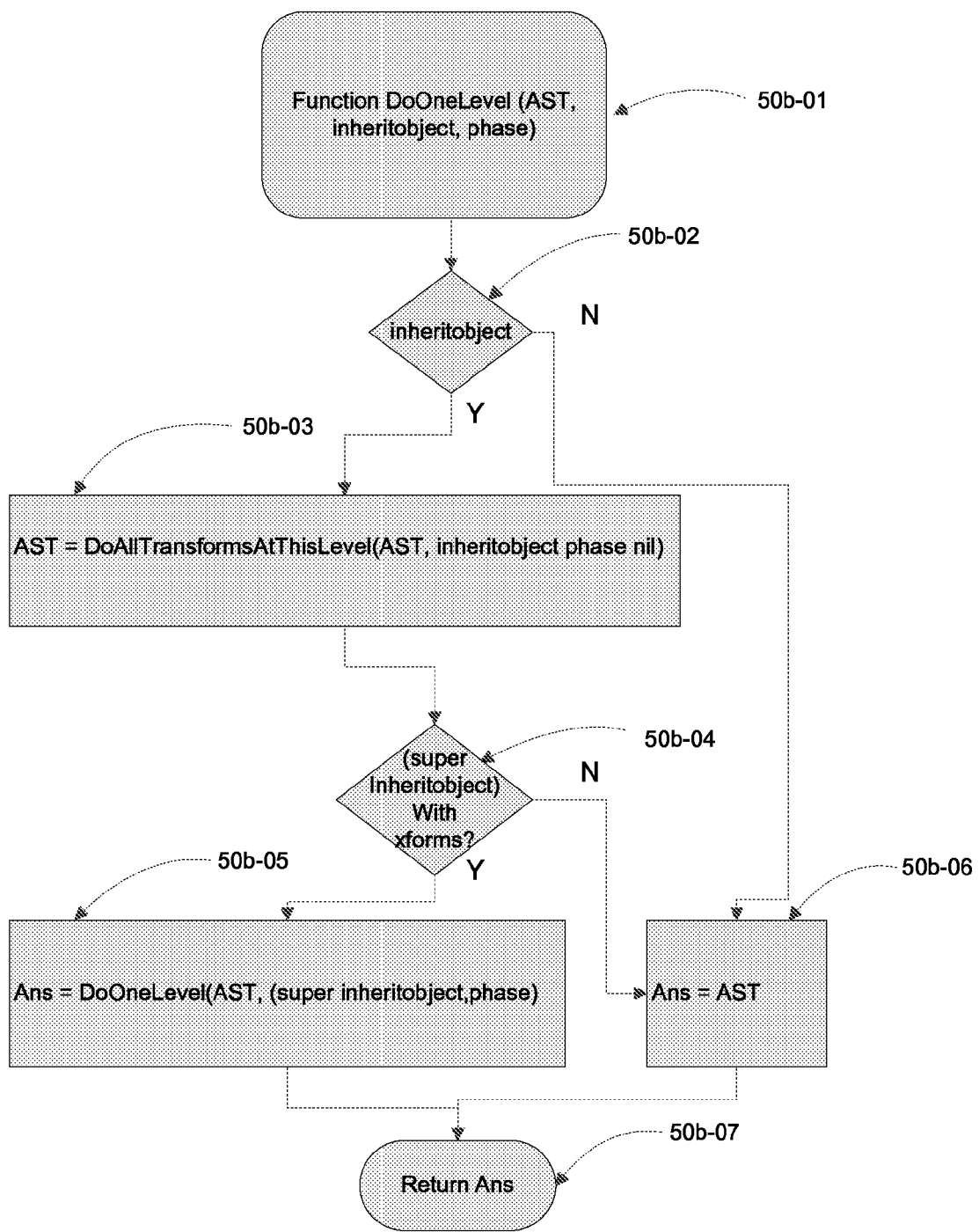
FIG. 50b is the DoOneLevel function, which applies all matching transforms at all inheritance levels to one level of the AST.
Figure 50C:
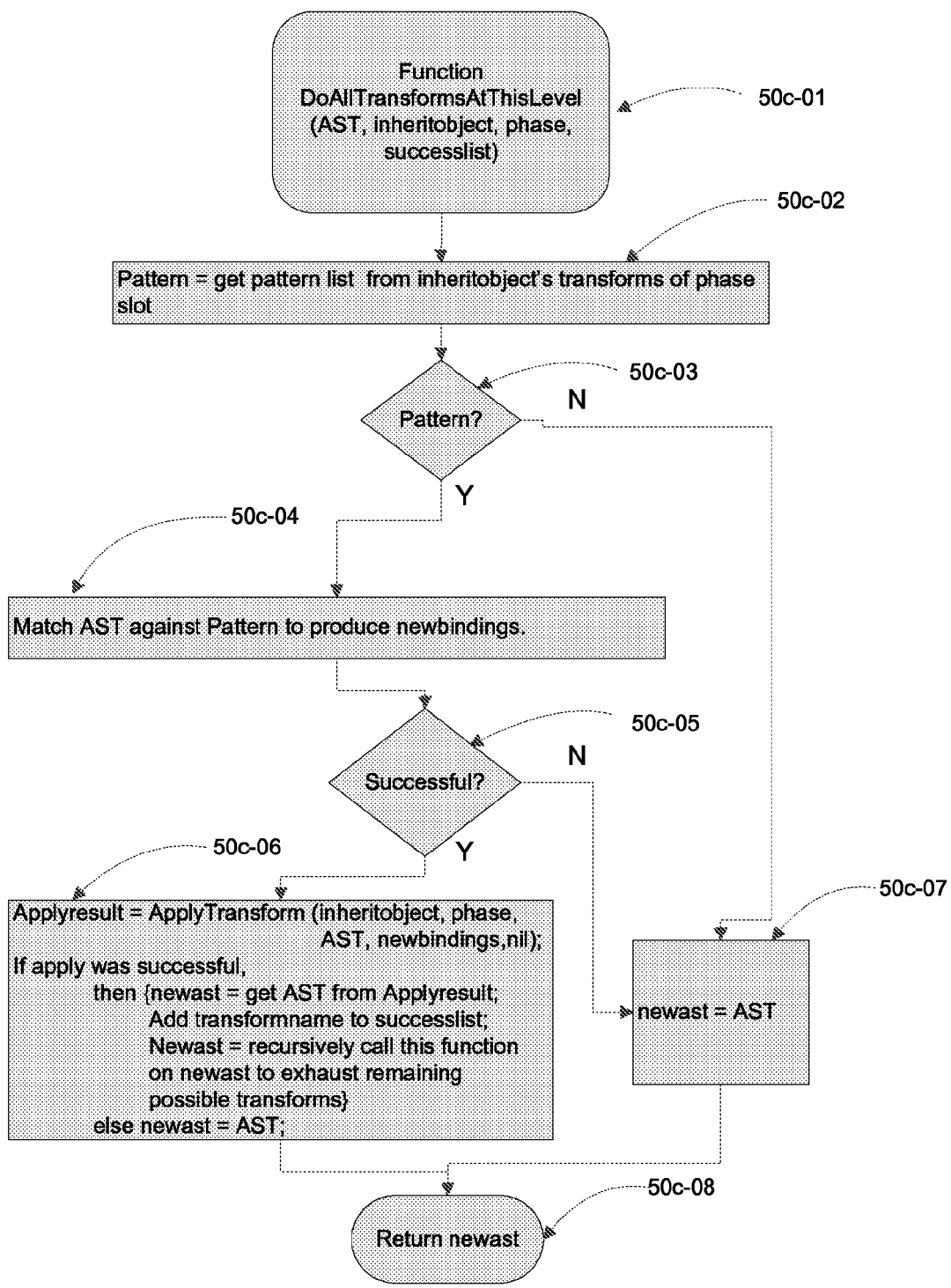
FIG. 50c is the DoAllTransformsAtThisLevel routine, which applies all applicable transformations to the current AST expression at the current inheritance level.
Figure 50D:
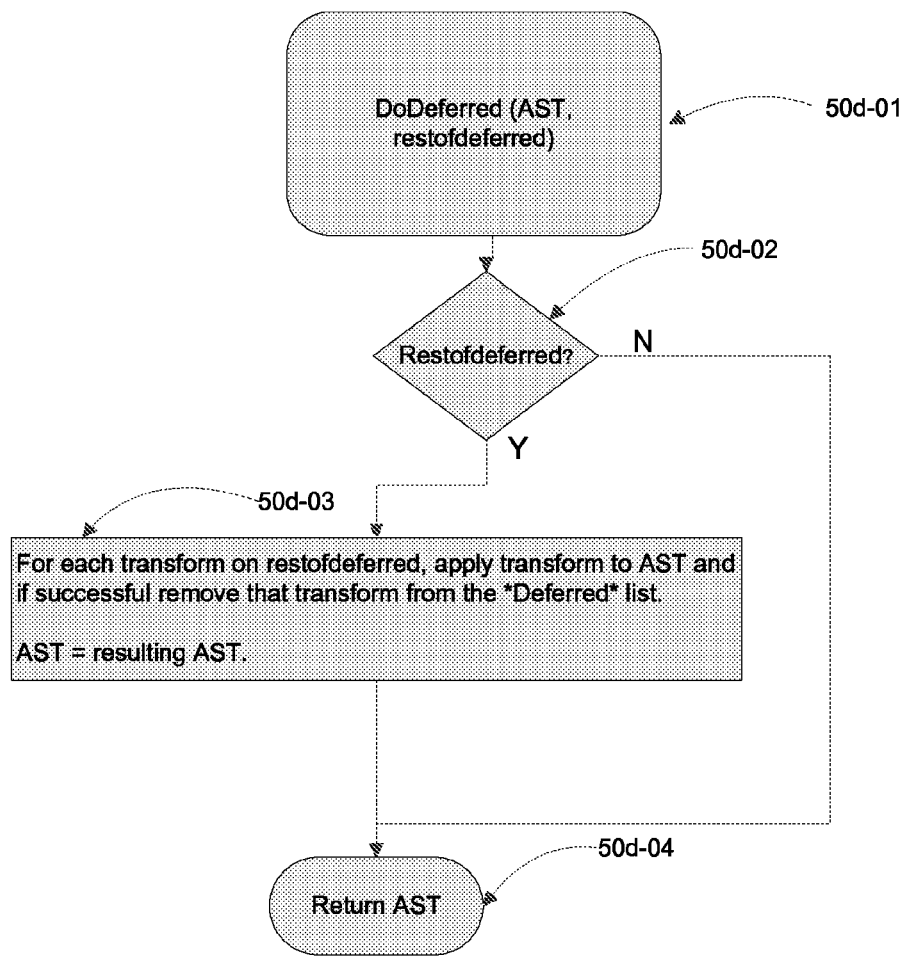
FIG. 50d is the DoDeferred function, which applies dynamically generated transformations at each level at the AST tree is built up from the leaves thereby providing a method for moving dynamically generated code up the tree that is being rebuilt.
Figure 50E:
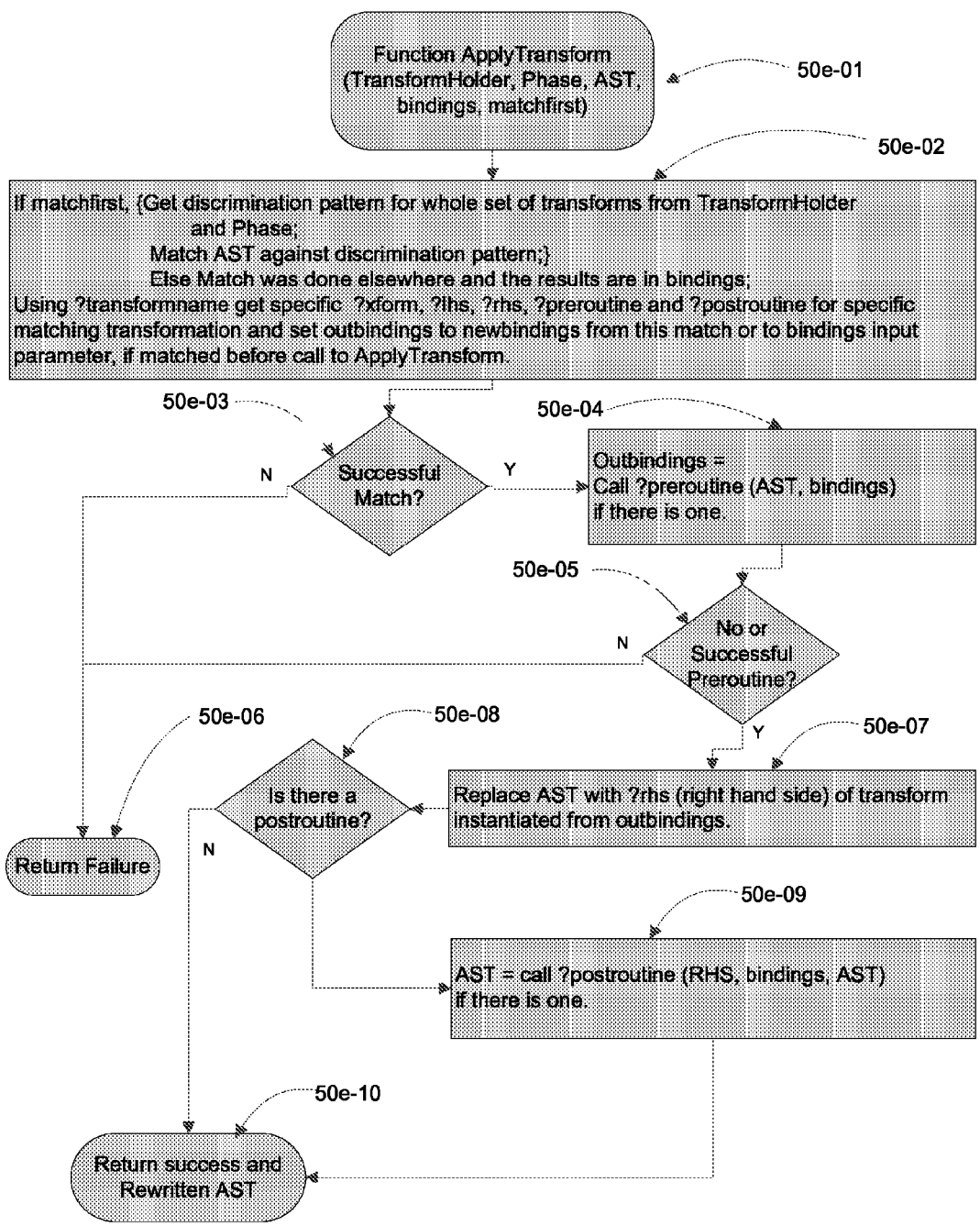
FIG. 50e is the ApplyTransform function, which performs the actual transformation rewrite operation. Note, that for ease of understanding, all figures describing specific transforms (e.g., the compositeleaf transform of FIG. 13) show the effect of ApplyTransform logic projected onto the specific data of the specific transformation. However, each transform is just a 5-tuple of data that drives ApplyTransform.

DSTypes—Top DS type
    ADT—Abstract Data Types (ADT) are domain objects that can have method-like components (called Method-Transforms or MT components) out of which IL definitions for domain specific operators and expressions are built. Expressions of MTs become the pseudo-code that partially specifies the definitions of domain specific operators and operands.
        IATemplate—General sub-image entity having size, shape, coefficients and (optionally) special case behaviors. It is used by image operators. The coefficients can be functions, variables, or numerical values.
            Neighborhood—Commonly used special case of IATemplate in which the coefficients are integer types.
    Constraints
        APC—Associative Programming Constraint, which has subclasses such as Idsem, Loop, Partition, PartitionIds, PartitionSet, ThreadSet, TreeTrav and so forth. (FIG. 46)
    DSOperands—Data objects (for both the DSL and GPL languages).
        Composites
            CompositeProgrammingDomainTypes—Structures such as Array, Range, etc.
            ImageDomainTypes—Image, Pixel, Channel, etc.
            FauxLispTypes—Duplicates Lisp types & provides home for the generator's data.
        Scalars—The invention's atomic data types.
    DSOperators—Operators for both DSL and GPL languages.
        ArithmeticOperators—Both arithmetic operators (e.g., plus and minus) and functions (e.g., sin and floor)
        ControlOperators—If-Then-Else, code blocks, etc.
        DataOperators—Cons, list, etc.
        ImageOperators—Various convolution, template, neighborhood, and pixel operators.
        LogicalOperators—Operators such as and, or, not, xor, etc.
        Methods—ADT method names.
        RelationalOperators—Operators such as less and greater.
    PdPhase—Generation phase objects. These group sets of transformations that are enabled during the specific generation phase. Example phases are Createscopes, TypeInfer, LocalizeandPartition, Codegen, Inline, Repartition and so forth.
    Transform—Transformations are the atomic mechanisms used to rewrite the AST.

Architecture of the Invention

Figure 1B:
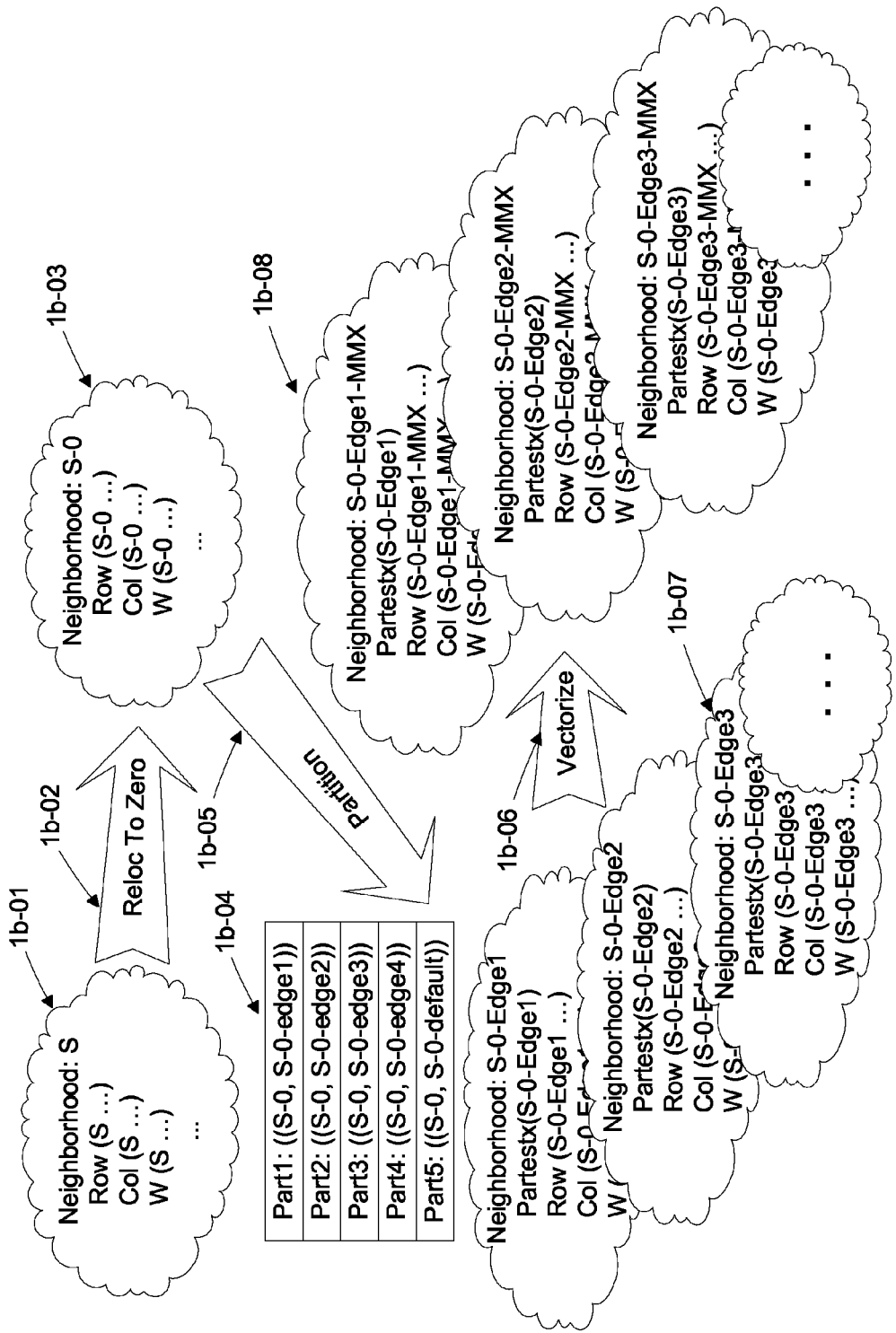
FIG. 1b is an overview of encapsulating design features.

This invention is built upon the generator architecture shown in FIG. 1*a*. In the preferred embodiment, the generator includes an execution unit that reads in a domain specific specification of a computation, reads a domain specific target machine specification, and processes them into an executable program expressed in a general purpose programming language (GPL) such as C. The execution unit makes calls to specialized processing engines, including:

1) A pattern recognition engine (Table 3—Elements of the Pattern Language), which matches patterns against expression subtrees and binds variables (e.g., ?loopindex) to subtree expressions (e.g., idx27),
2) A transformation engine (FIGS. 47*a*-50*e* and Table 2—Elements of the Generator), which executes transformations to effect rewriting of expression subtrees,
3) A partial evaluation engine, which simplifies generated code expressions by performing execution of parts of the code where some of the data items are known, e.g., "x+0" evaluates to "x" and "if false then 0 else (x+1)" evaluates to "(x+1)", (See Jones, Neil D.: An Introduction to Partial Evaluation, ACM Computing Surveys, Vol. 28, No. 3 (1996) and Jones, Neil D., Gomard, Carsten K., and Sestoft, Peter: Partial Evaluation and Automatic Program Generation (1993)) and
4) A type inference engine, which infers types for expressions whenever they are created or changed, e.g., the type rule "(DefOPInference ImageOperators (ImageOperators image iatemplate) image)" will match the type pattern "(ImageOperators image iatemplate)" against the types of a concrete expression such as "(rightconvolutionop A SP)" and because all types in the concrete expression are the same type or subtypes of the types in the type pattern, it returns "image" as the type of the whole concrete expression. See Table 2—Elements of the Generator, specifically, Type Inference Rule Definition for Operators and Type Inference Rule Definition for Methods.

The execution unit is data driven in the sense that the details of its operation are defined by:

1) A database of object oriented domain abstractions (user definable and extensible), which are the building blocks used to represent programs, (In this context "object oriented" is being used in the "Object Oriented Programming" sense. In the reduction to practice prototype, these objects are defined in CLOS (Common Lisp Object System) and the generator as a whole is written in Common Lisp. See Table 2, specifically, Pattern-Directed Transformation Definition, DSL Operator Definition, DSL Class Method Definition and Dynamic Deferred Transformation Definition.)
2) A database of processing phases (user definable and extensible) where each phase has some narrow programming/generation purpose (e.g., processing data definitions, determining the structure of loops, or determining the structure of parallel processing pieces), and where each phase is as a CLOS subclass of the CLOS superclass PDPhase,
3) A database of transformations and type inference rules (both user definable and extensible), where the transformations are grouped by phases such that any specific transformation is enabled for execution only during the processing of the phase with which it is grouped, (See Table 2),
4) A database of user definable and extensible programming constraint objects, which are implemented as CLOS classes with CLOS methods, (see DSL Class Definition in Table 2 and FIG. 46) that
    a) Have data and behavior (e.g., a partitioning framework object and its methods for creating and modifying such a framework), b) Are associated with and propagated among expression subtrees to
  i. Compute, define, and enforce the constraints within those subtrees (e.g., define a partitioning framework or plan for parallel execution of program pieces);
  ii. Record programming requests or suggestions (e.g., do not partition this loop),
  iii. Record relationships to problem domain concepts (e.g., a domain specific test expression that will naturally partition the computation);
  iv. Record future programming steps (e.g., program this loop using SSE vector instructions);
  v. Effect changes to themselves, other constraints, and the expression subtrees with which they are associated; and
c) Are used by the transformations to support the incremental expression subtree rewrite steps, which taken as a whole perform the overall programming process.

To make the description of the invention more intuitive, the next section will present the operational details of the phases, associative programming constraints, and the transformations in the context of a specific example problem in the domain of image and signal processing. The example will illustrate and define how partitioning for parallel computation is accomplished. However, the generator is general purpose and can be applied to arbitrary programming generation problems in the context of arbitrary programming domains (e.g., databases, business computing, communication protocols, etc.). For each new programming domain, the generator is "micro-programmed" via a set of phases, transformations, and constraints specific to that problem domain. By composing a few tens of elemental problem domains, the author believes, based on domain specific generation reports in the literature to date, that most of today's programming problems are amenable to automatic generation and partitioning.

Introduction to the Example

Figure 3:
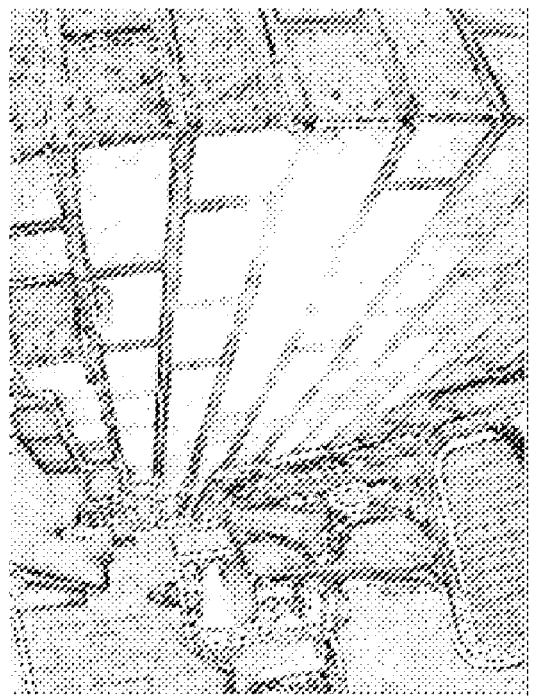
FIG. 3 is a grayscale image to be used as an example output of the target program produced by the generator.
Figure 2:
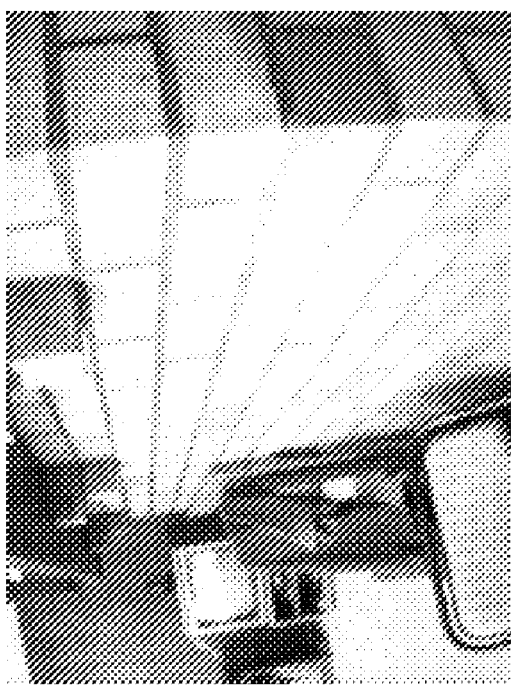
FIG. 2 is a grayscale image to be used as an example input to the generator.

Suppose, for example, that one wants to develop a program that performs Sobel edge detection (defined below) on a gray scale (i.e., pixels are shades of black or white) image. Such a program would take the image of FIG. 2 as input and produce the image of FIG. 3 as output. The output image has been processed so as to enhance edges of items in the image by a method called Sobel edge detection.

The computation of each gray scale pixel in B is computed from an expression involving the sum of products of pixels in a region around the corresponding pixel in A times a matrix of coefficients (defined by an entity called a template) that are associated with the pixels in that region of A. Mathematically, the computation of each b[i, j] pixel is defined as $$\{\forall i,j (b_{i,j} : b_{i,j} = \text{sqrt}((\Sigma_{p,q}(w(s)_{p,q} * a_{i+p,j+q}))^2 + (\Sigma_{p,q}(w(sp)_{p,q} * a_{i+p,j+q}))^2)\} \quad [1]$$

where the coefficients (also called weights) are defined to be 0 if the center pixel of the template corresponds to an edge pixel in the image, and are defined by two templates w(s) and w(sp) shown below, if not. P and Q are the indexes of the templates. It is convenient to index the templates from −1 to +1 for both dimensions so that the center coefficient is at (0, 0).

$$w(s) = P \begin{cases} -1 \\ 0 \\ 1 \end{cases} \begin{matrix} \overset{Q}{\overline{-1\ 0\ 1}} \\ \begin{bmatrix} -1 & -2 & -1 \\ 0 & 0 & 0 \\ 1 & 2 & 1 \end{bmatrix} \end{matrix} \quad [2]$$

$$w(sp) = P \begin{cases} -1 \\ 0 \\ 1 \end{cases} \begin{matrix} \overset{Q}{\overline{-1\ 0\ 1}} \\ \begin{bmatrix} -1 & 0 & 1 \\ -2 & 0 & 2 \\ -1 & 0 & 1 \end{bmatrix} \end{matrix}$$

Since an implementation of this computation for a parallel computer may not be organized like formula [1], it is useful to represent this specification more abstractly because such abstractions can defer the implementation organization decisions to a later point in the programming process and thereby allow the computation (i.e., what is to be computed) to be specified completely separately and independently from the implementation form (i.e., how it is to be computed). From a practical point of view, this means that the abstract computation specification is independent of the architecture of the machine that will eventually be chosen to run the code. So, by simply choosing a different machine architecture (i.e., a different how) for the implementation form without making any changes to the specification of the computation (i.e., the what), one can (with this invention) automatically generate a different implementation form that is tailored to the new machine's architecture. More to the point, porting from one kind of machine architecture (e.g., machines with instruction level parallelism like Intel's SSE instructions) to a different kind of machine architecture (e.g., machines with large grain parallelism such as multicore CPUs) can be done automatically by only making trivial changes to the machine specifications (i.e., the how) and no changes to the computation specification (i.e., the what).

It is commonly said that such specifications are written in terms of Domain Specific Languages (DSLs). To date, DSL's specifications have had one of two drawbacks.
1. Either the computation and the machine specifications are not completely separate and independent (in order to allow some degree of automation in the generation of practical code), or
2. They are truly independent, in which case one of several unfortunate situations arise:
   a. Either automatic code generation that fully exploits the architecture of the machine is impossible or
   b. Code generation is possible but the code falls hopelessly short of fully exploiting the machine architecture or
   c. Human intervention is required to generate good code, which vastly reduces the benefits of automation and puts a burden on the shoulders of the human to have deep knowledge of both specifications and of the process whereby they are reorganized into the final program (and that effort is probably on the order of the effort required just to write the implementation code in the first place) or
   d. The domain is simple enough that practical code does not need the benefits of a highly optimized implementation to take advantage of the machine architecture (a few such domains do exist but not many), or
   e. The domain (e.g., weather simulation) lends itself to one simple optimization strategy that requires no significant reorganization (e.g., the strategy replicates the code on many machines simultaneously) but unfortunately, such domains are relatively rare.

The invention described herein solves this problem and allows truly independent specification of both the computation and the machine architecture while providing a method and a machine that fully automatically produces implementations tailored to and highly optimized for the target machine. And it does so without the programmer having to know anything about the process whereby that automation is accomplished.

The Domain and its Applications

The example falls into the broad domain of image and audio signal processing and the more encompassing domain designation of digital signal processing (DSP). While the invention is not limited to just this domain, within this domain, the invention may be applied to problems such as (but not limited to):

Signal Processing
  Software Radios
  Signal analysis and processing (e.g., radar, sonar, etc.)
  Hi-Fidelity Sound Equipment such as DSP-based amplifiers, receivers, mixers, etc.
  Telecommunications (e.g., Telephone and other audio codecs)
  Speech processing (e.g., generation and understanding)
  Signal compression
  Signal filtering
Image Processing
  Digital TV Image Processing
  Hi-Definition Image Processing
  Scene Analysis
  Pattern Recognition (e.g., optical character recognition, face recognition, military target recognition and related problems)
  Retina modeling
  Computer graphics
Related Areas
  Games and game machine imaging and sound
  Neural networks
  Numerical computation and related mathematical algorithms Later, this document will outline how this machinery can be applied to a completely different domain, the domain of data structures and databases. In the data structures and databases domain, by choosing the Relational Algebra as the DSL and defining an appropriate set of transformations and APCs specific to the domain, one can partition data structure and database computations for parallel computation. But before we address this new domain, we will follow through the digital signal processing example in detail, starting with a description of the DSL for specifying computations in this domain.

Specifying the Computation

An obvious candidate for specifying a computation is a general programming language (GPL) such as C, C++, C#, or Java. However, GPL-s are not well suited to implementation-neutral specifications. With GPL-s, the architecture of the implementation, the architecture of the machine, and any parallelization is painfully explicit (and therefore, painfully biased toward a particular implementation and machine structure) but the prerequisite information and constraints needed to understand and alter that implementation structure are implicit in the GPL code and often quite well hidden. For example, the number of loops and what parts of a matrix each processes is specified in excruciating detail in a GPL but what constraints led to that organization (e.g., the architecture of the target computer) are implicit and often require careful analysis by a smart human programmer to infer what they are, if that inference can be made at all. Thus, in order to re-architect the code, one must infer hidden or implicit constraints on and relationships among pieces of the code in order to determine what changes re-architecting will require. Because of the difficulty of the inference process, reorganization of GPL code to a different architecture is quite hard to automate. And only modest progress has been made as witnessed by the lack of fully automated tools for parallelizing GPL code for machines with widely varying architectures.

In contrast, the specification system that this invention will use—the "Image Algebra"—is one in which the architecture is implicit and the constraints are explicit. (See Gerhard X. Ritter and Joseph N. Wilson, *The Handbook of Computer Vision Algorithms in Image Algebra*," CRC Press, 1996.) Since the architecture is implicit (i.e., many architectural decisions are left open until very late in the programming process), this invention will use the explicit constraints to guide the formulation of the architectural structures. For example, a single loop over a matrix may need to be broken into several distinct loops, thereby partitioning the calculation into pieces that can be computed on different cpu-s in parallel. On the other hand, to exploit low level instruction parallelism, the loop may need to be partitioned differently. More specifically, special cases (e.g., setting edge elements of a matrix to 0) may need to be partitioned into one of more separate loops in order to avoid condition tests that can interrupt the streaming of data between memory and the parallel instruction unit. Further, since parallel processing instructions (e.g., a sum of products instruction) usually have a fixed maximum number of data items that they can process, a loop performing the sum of products operation over a large region may need to be reformulated into a series of chunks each of which can be executed by a single parallel instruction and then the results of processing each chunk formulated into an expression that combines those results.

To accomplish this goal, we abstract the form of expression [1]. We do this by

Making the looping and indexing over the images A and B implicit thereby deferring decisions on exactly how to form the loops over these matrices and making the looping decisions easier to change and evolve, Introducing an abstract convolution operator (e.g., $\oplus$) to replace the explicit summation and multiplication loops, thereby deferring the decisions about the exact details of convolution's implementation, and Defining a set of method-like components (MTs) on the templates S and SP that abstract the properties of those templates and supply the programming details of the convolution operator (e.g., some of the specific details of convolution's implementation).

The external or publication form of this new expression is in a DSL called the Image Algebra (Ritter and Wilson, op. cit.). Re-expressing formula [1] in the Image Algebra produces the form:

$$b=[(a\oplus s)^2+(a\oplus sp)^2]^{1/2} \qquad [3]$$

where the intent (but not the exact implementation details) of the convolution is defined by the equation $$(a_{i,j}\oplus s)=(\Sigma_{p,q}(w(s)_{p,q} * a_{i+p,j+q}) \qquad [3a]$$

Any specific convolution instance is generically and partially defined by the right hand side of formula [3a]. To emphasize the genericity and incompleteness of [3a], the right hand side is sometimes referred to in this document as pseudo-code. The user must provide the computational specifics through definitions of the components (e.g., $w(s)_{p,q}$) and definitions of the iteration limits in that pseudo-code formula. Broadly speaking, the concrete realizations of convolutions are defined in terms of the process whereby they are programmed. Their eventual implementation form is subject to several elements—the component definition specifics provided by the user, the expression context in which they appear, the partitioning opportunities and requirements of the specific computation desired, the partitioning opportunities provided by machine upon which they are to be run, and the desires of the user. In the end, any specific convolution (in the context of an expression) may be implemented in a large number of different forms determined in greatest measure by the structure of the desired computation, its context, and the architecture of the machine on which the convolution is to run. Focusing upon the issue of partitioning the computation for parallel processing, the overall process of partitioning formulas such as [3] is one of designing a set of GPL language level looping structures that as a group, will achieve the overall computational objective of that expression while simultaneously, exploiting natural opportunities for parallelism in the computation. Thus, what is implied to be a simple looping structure in the abstract specification of expression [3] may ultimately be split, reorganized and massaged (i.e., partitioned) into several separate loops that taken together achieve the same computational intent but do so faster. To provide a little better idea of how this invention might reshape and reorganize the example computation, let's take a peek at what kinds of reorganizations (i.e., partitionings) are possible and desirable.

Figure 4A:
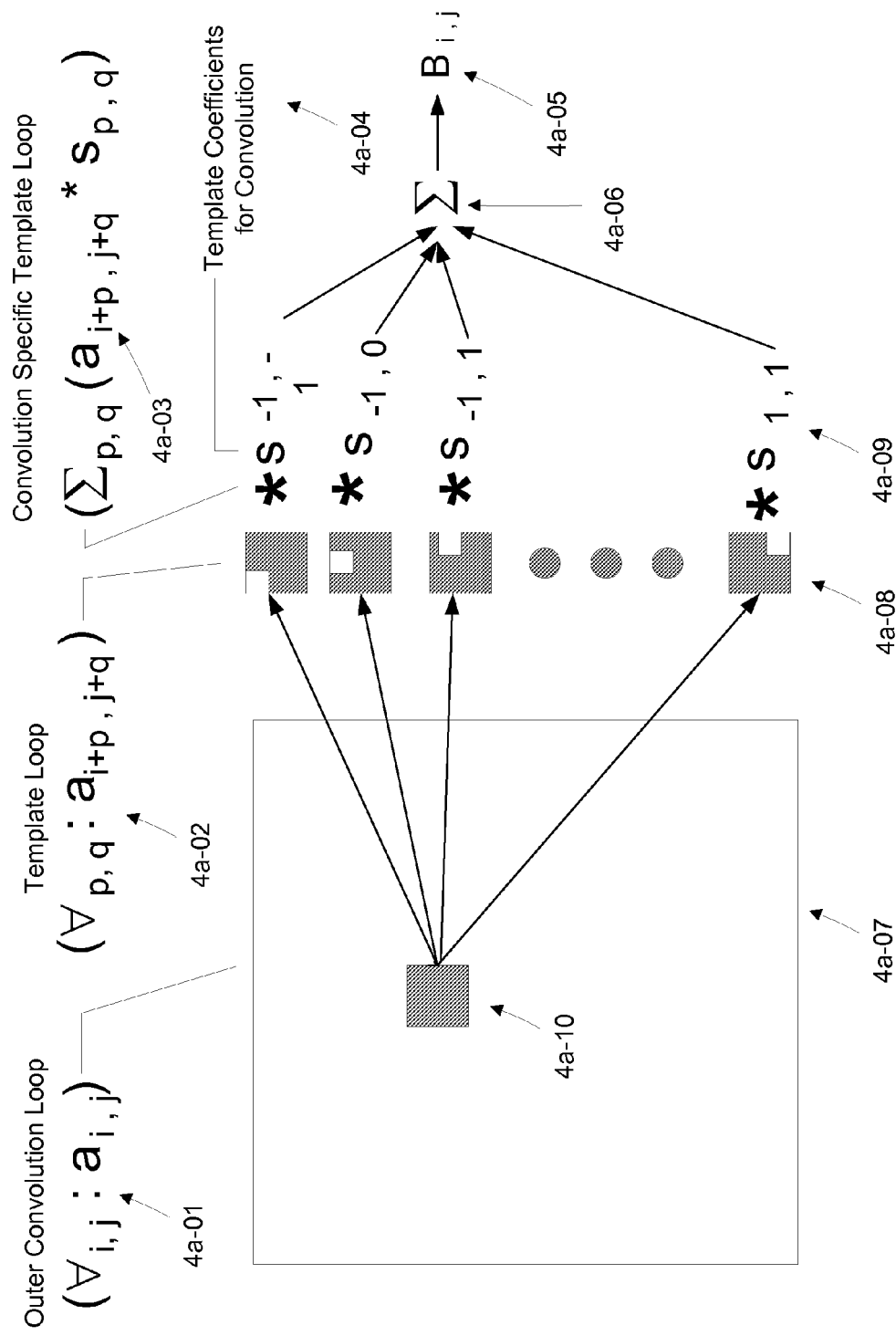
FIGS. 4a-4d is an example input convolution expression b=(a⊕s) and examples of several partitionings of it for parallel processing.

Focusing for the moment just on the expression "(a⊕s)" to keep the examples simple, the computational structure of the most abstract intent of that expression is illustrated by FIG. 4a. The convolution is implemented by two 2-dimensional (2D) loops, one nested inside of the other. The outer 2D loop of the convolution is the loop of i and j over the image a. For each [i,j] pixel in the image a, the inner loop of the convolution overlays a so-called "template" on that area of the image with the template centered on the [i,j] pixel. These small overlaid areas of the image are represented in the figure as small, dark gray boxes. The inner loop iterates over the template positions s[p,q] and their corresponding pixels a[i+p,j+q] in the image. For each image pixel (represented as a white square in the small, dark gray box) in the template area, the inner loop multiplies that image pixel with the corresponding template-based coefficient (shown as $s_{p,q}$ in the figure) and then sums the results of these multiplications to compute the new value of the corresponding [i,j] pixel in the image b. Since the pixel values are confined to a range of values, the computations are likely to be implemented as modular arithmetic. Further, there is the possibility for subtypes of pixel and/or of the convolution operator to introduce domain specific variations of the convolution formula (e.g., value normalization). Similarly, non-color fields of a pixel (e.g., opacity) will likely be defined to have their own unique convolution processing. In general, the user is free to define specializations of operators and operands in any way that is useful and desirable. However, to keep the discussion simple, we will ignore these complexities and just illustrate the general notions of generation. Below, we will define the template, specifically, "W(s) [p,q]", by which each of these $s_{p,q}$ coefficients are computed.

Figure 4B:
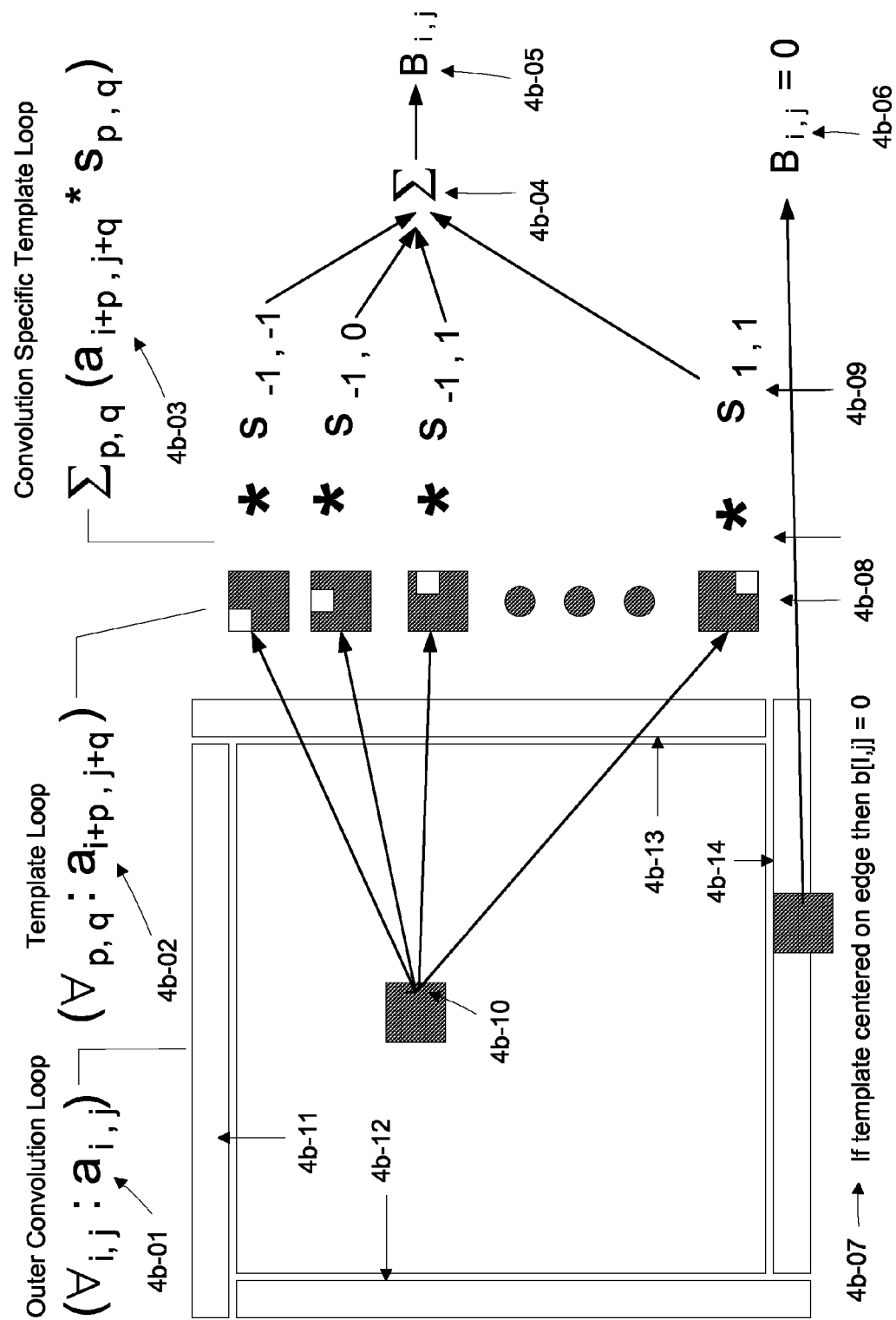
Figure 4C:
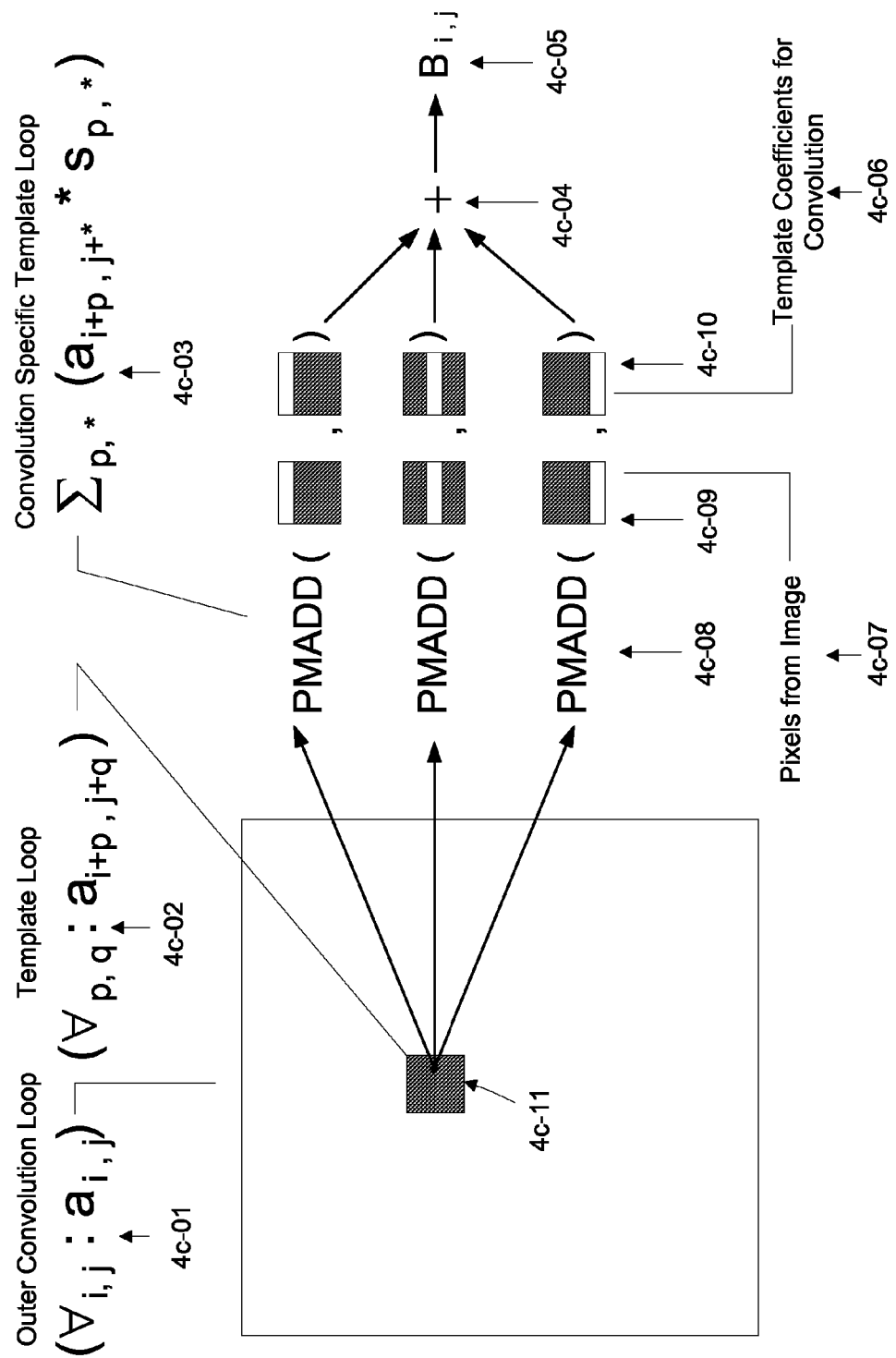
Figure 4D:
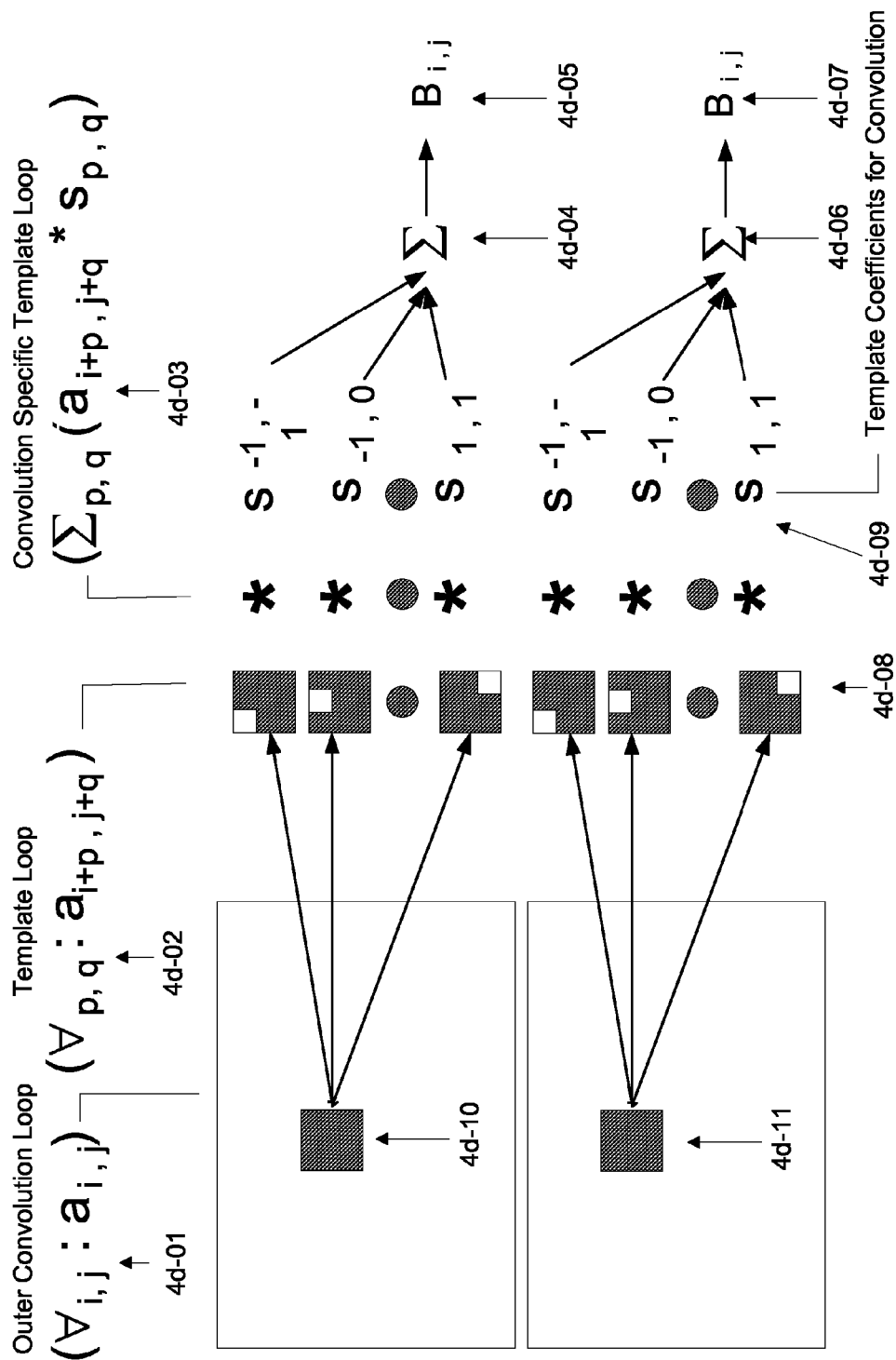

Given this understanding of the intended computation, FIGS. 4b, 4c and 4d illustrated some (but not all) of the various partitionings that this invention can produce from such input. FIG. 4b illustrates the situation where the user has defined the template such that there are two distinct kinds (or cases) of computation. When the template is positioned on the edge pixels in the image, the convolution is defined as a special case where the pixel is zero. For the non-edge, central positionings of the template, the full computation is specified. This case-based structure is relevant to parallel computation and specifically, to vector-based parallelization because testing for special cases can interrupt the smooth flow of data on the data bus and thereby, reduce or even eliminate the speed-ups possible via vectorization. Thus, in such a case, the ideal partitioning would be one where the special cases are handled as separate loops. Specifically, this partitioning results in five loops, one for each edge and one for the central area, which is illustrated in the FIG. 4b by the segmentation of the image matrix a.

FIG. 4c illustrates the ideal partitioning for a computation that will run on a vector machine. In fact, the image matrix shown in this figure could just as well be the central matrix area illustrated in FIG. 4b, thereby carrying that partitioning a step further. In FIG. 4c, the assumption is that there is a vector instruction (e.g., like the Intel PMADD instruction) that can perform a sum of products operation on several pairs of data items as a single machine operation. In this case, we assume the image area and the template coefficient matrix are in row major storage order and thereby can be processed a row of data at a time. In FIG. 4c, the data rows are shown as light colored bands in the small, dark gray squares.

Finally, FIG. 4d shows a partitioning that splits the convolution into two independent tasks that can proceed in parallel. This kind of splitting is somewhat arbitrary and is driven largely by the opportunities presented by the hardware. The partitioning shown in FIG. 4d would work well on a dual CPU, shared memory machine (e.g., a dual-core machine) and could easily be implemented by threads. If there were more than two CPUs, the computation could be partitioned into more tasks. This of course assumes that the speedup produced by further splitting is not eaten up by the overhead of the set up code. Notice that this opens up the opportunity for the generator to perform analysis that further optimizes the computation by analyzing such trade offs and picking that trade off or combination of trade offs that provides the optimum computational improvement.

The essential purpose of the remainder of this section is to define the machinery that will derive those various implementation forms from the computational intent in combination with the various constraints on the programming process, notably those constraints that specify the elements of the target machine that the user wants to exploit.

Specifying the Computational What

The generator's internal form of expression [3] (i.e., the form stored in the automated generator's data structure) is more pedestrian and not as cosmetically appealing as [3] but it is operationally far more easy to deal with. Internally, the expressions are written in prefix form (i.e., (operator operand1 operand2 . . . )) where the operators are represented in this document by text strings (i.e., ":=" is assignment, "expt" is exponentiation, "sqrt" is square root, "+" is addition and "rightconvolutionop" is ⊕). From this point on, this discussion will use the internal form for expressions. So, equation [3] is re-expressed in internal form as (:= b (sqrt (+ (expt (rightconvolutionop a s) 2)     [4]
(expt (rightconvolutionop a sp) 2))))

Figure 5:
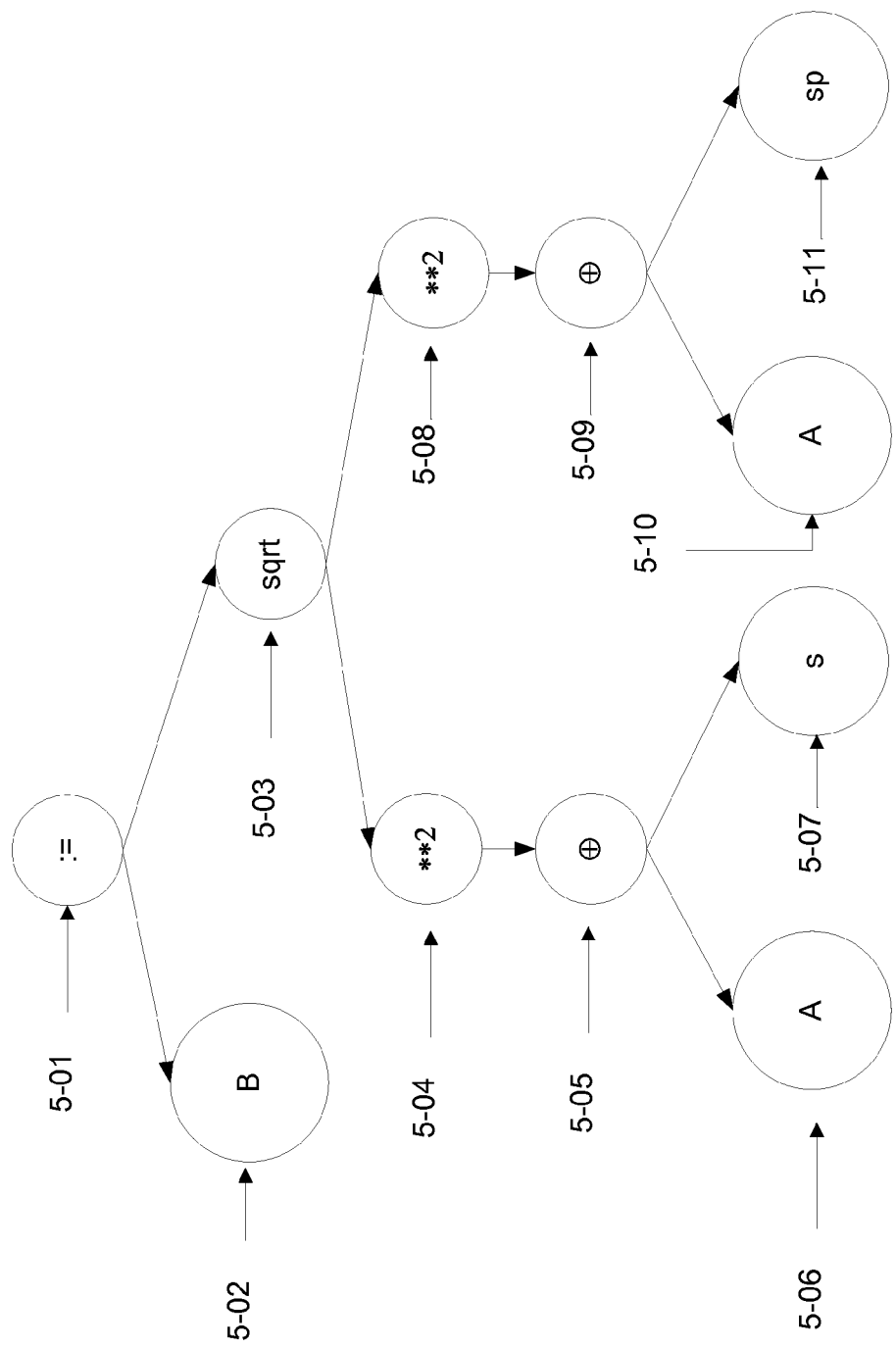
FIG. 5 is an example input specification represented in internal (Abstract Syntax Tree, i.e., AST) form.

FIG. 5 shows the AST data structure of [4] in graphical form. Now, we must define the templates and operators of equation [4]. To start, expressions [5] and [6] declare to the generator the template objects s and sp as instances of the pre-defined domain type IATemplate, a conceptual matrix of coefficients whose elements are of type DSInteger (specified by the ":of" keyword parameter value). The value of the ":form" keyword parameter declares the high and low values for the template array indexes. An IATemplate is the implementation form of the Image Algebra template entity. The exact structure and details of a template will be elucidated through the example.

(DSDeclare IATemplate s :form (array (–1 1) (–1 1)) :of DSInteger)    [5]
(DSDeclare IATemplate sp :form (array (–1 1) (–1 1)) :of DSInteger)    [6]

Defining Elements of the Intermediate Language

Figure 54:
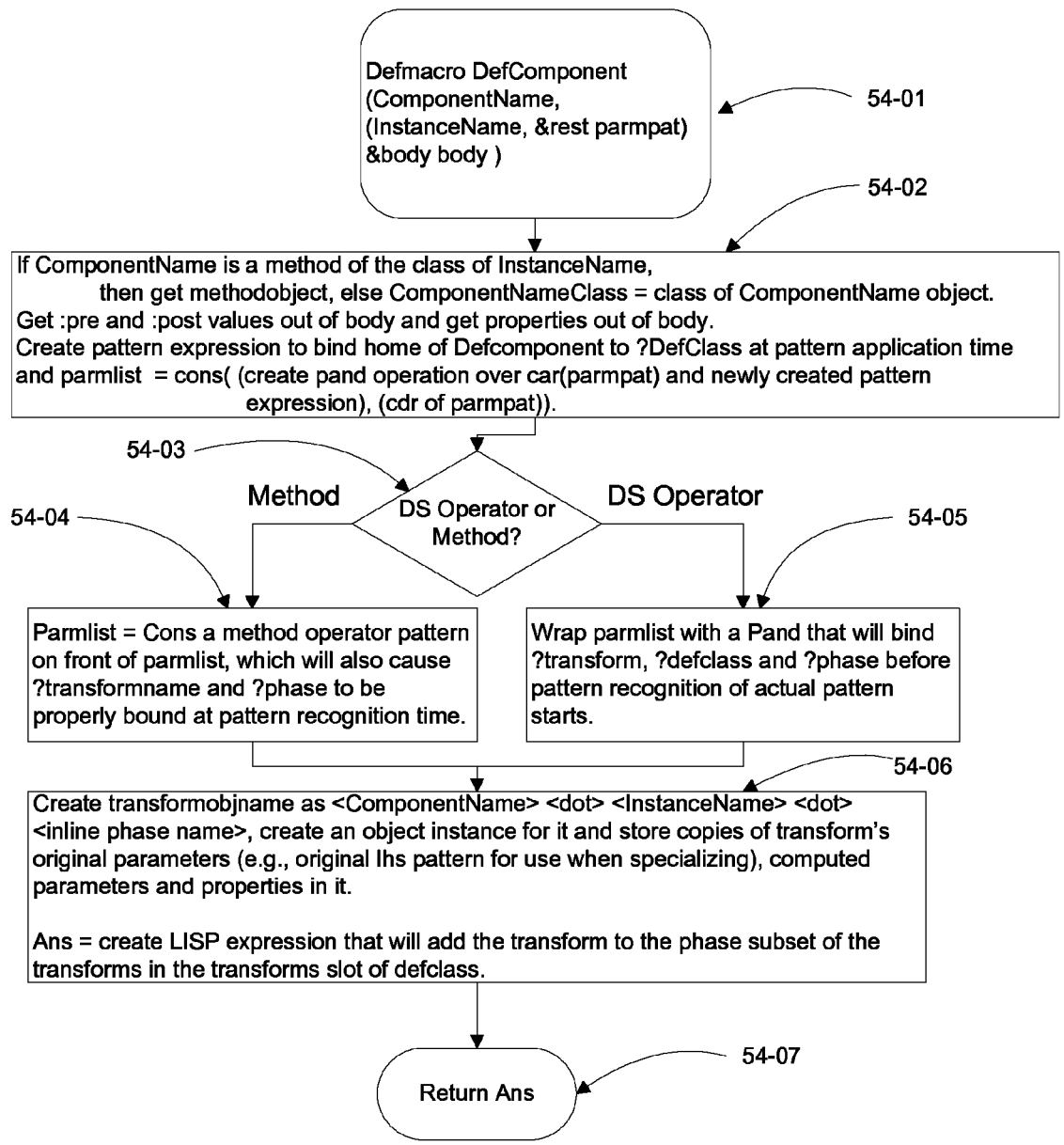
FIG. 54 Definition of Defcomponent Macro.
Figure 55:
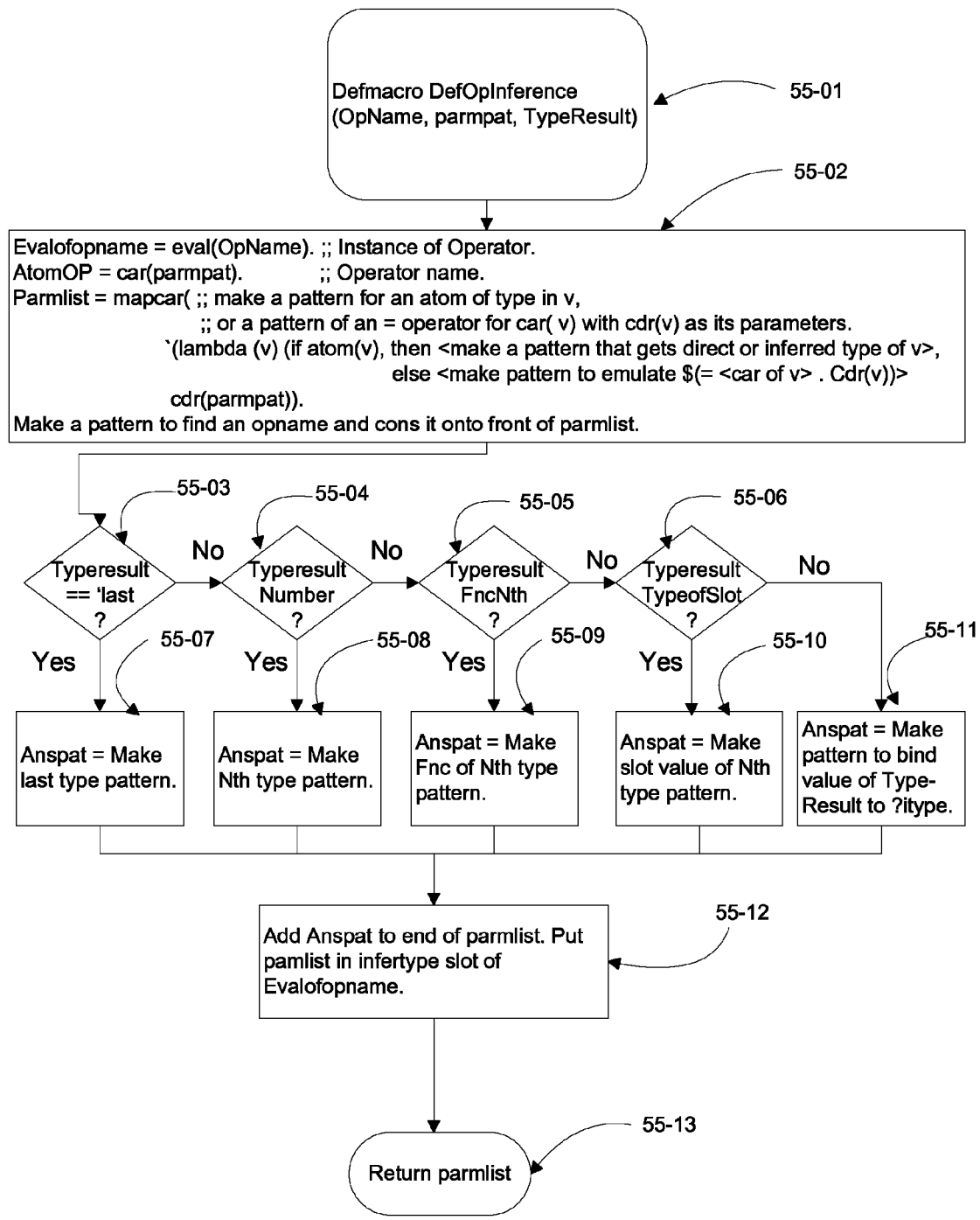
FIG. 55 Definition of DefOPInference Macro which builds inference rule patterns for operator expressions.
Figure 56:
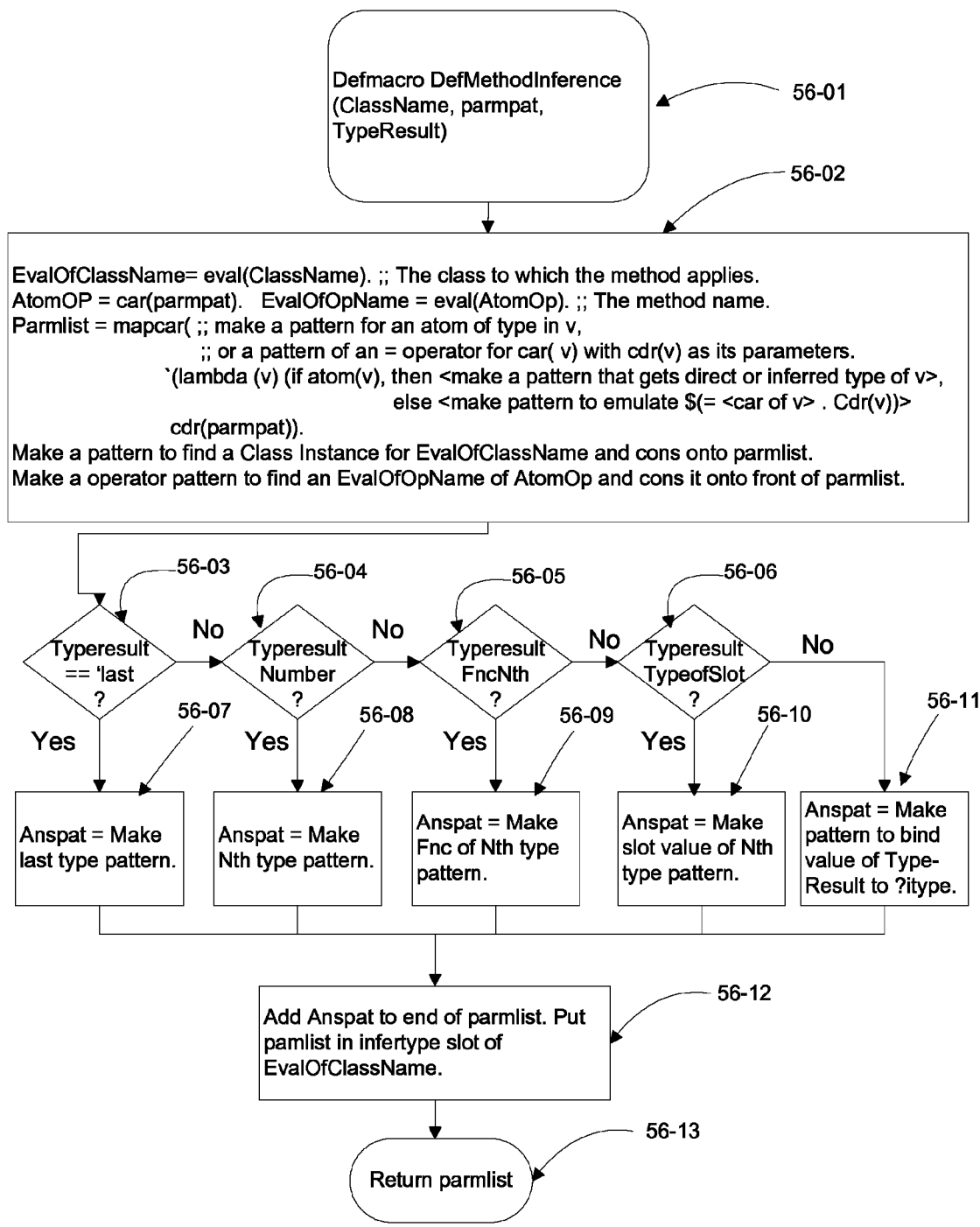
FIG. 56 Definition of DefMethodInference Macro which builds inference rule patterns for expressions of calls to methods of classes.
Figure 57:
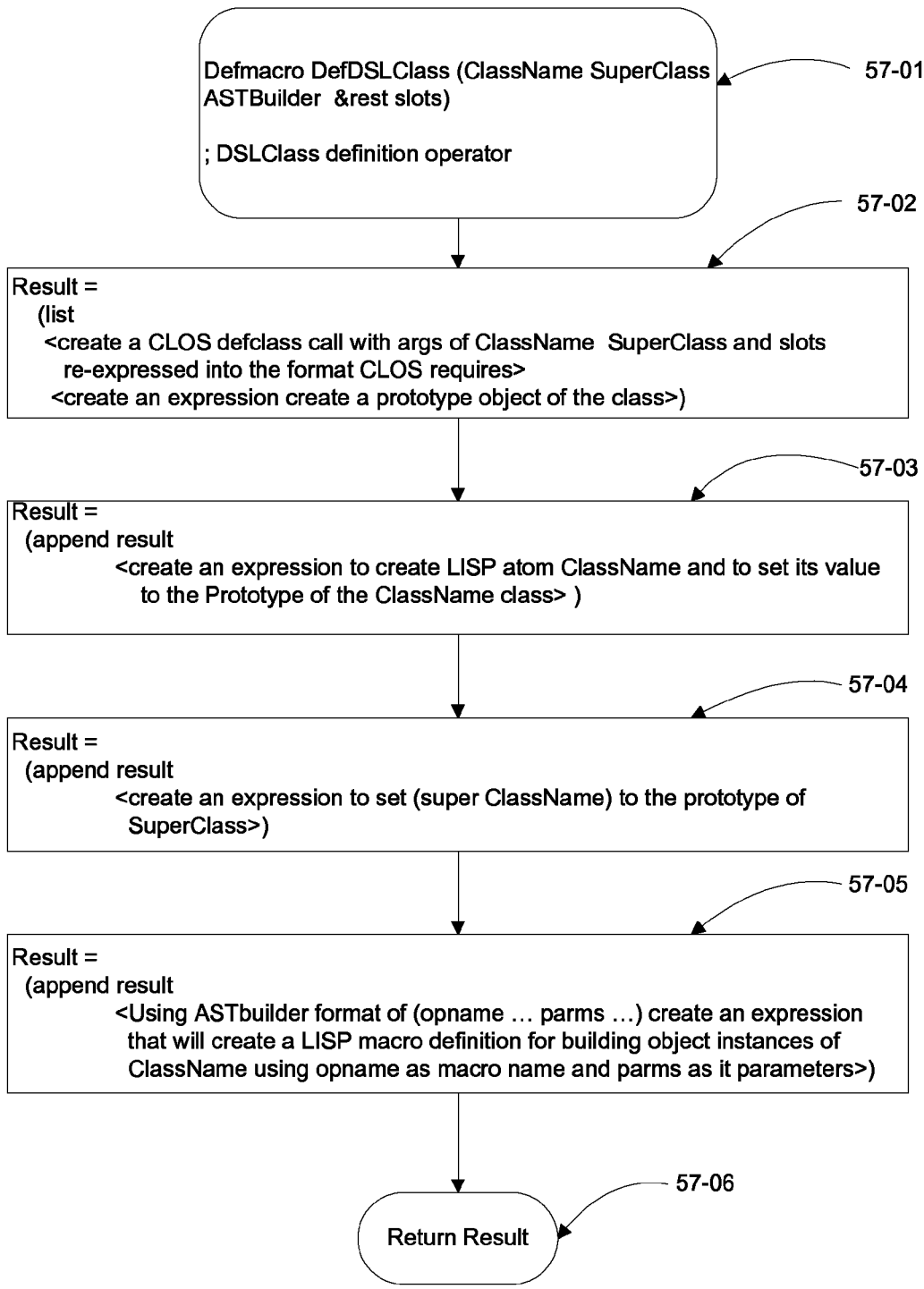
FIG. 57 Definition of DefDSLClass Macro which defines domain entities, their slots, their inheritance relationship and constructs a macro that will build instances of the class for the AST.

Recall that generic IL operators and operands are used to define domain specific operations. These generic IL operators and operands are predicated on some assumed implementation pattern, which in this example is the pattern of loops over template neighborhoods of matrices nested within loops over matrices. To make those generic IL operators and operands concrete and specific to the user's computation, the user will supply computation specific definitions for those generic IL operators and operands. These definitions are expressed in terms of MTs (Method-Transforms created by the Defcomponent macro, FIG. 54) that are method-like functions of an IATemplate object (informally, the neighborhood object). The MTs will be specialized to incorporate various design features, e.g., partitioning for parallel execution. Once that process is complete and the overall computation [4] has been manipulated into the desired macroscopic design, those (now specialized) MTs will be refined into concrete code within that macroscopic design.

The MTs of IATemplate types for this example include the following:

The row and col MTs define the formulas for computing row and column indexes in the matrix coordinate system of some current pixel from the current pixel position in the matrix coordinate system of the center of the neighborhood (e.g., [idx3, idx4]) and a relative pixel position in the neighborhood coordinate system of the current pixel within the neighborhood (e.g., [p5, q6]), The w MT defines the formula for computing a template coefficient for given a pixel index in the matrix coordinate system (e.g., [idx3, idx4]) and the index of the coefficient of interest in the template coordinate system (e.g., [p5, q6]), and The partestx MT defines a test condition that will partition a computation into one of a set of related partitions that taken together cover the whole computation. Partestx is automatically generated for the user and will be explained later.

Important Idea Domain objects and their MTs define the implementation-specific but still abstract IL that will stand-in for the concrete code. The generator will specialize these objects and MTs (and thereby specialize the IL) to encapsulate one or more design features as a way to shape and coordinate elements of the target program to the user's requirements. Simultaneously, the generator will manipulate the computation context defined in terms of these abstractions—in the absence of the yet-to-derived code details—to form a design of the target program that is also shaped to the user's requirements. Domain specific definitions expressed in terms of this stand-in IL are often referred to by the moniker pseudo-code to emphasize its abstract and incompletely specified nature. Once that design is completed and coordinated across the full computation, the concrete coding details of the IL can be inlined and the design refined into GPL-like code.

Domain Programming Namespace (DPN): The generator must have some explicit representation for the IL's implied context. That is, if the IL needs to refer to the indexes of the outer loop of a convolution, how does it do that? Those outer loop indexes do not yet exist, at least not yet in final form, when the IL is being used. The generator must have a set of programming names that correspond to the domain entities that it is manipulating (e.g., the indexes of the outer convolution loop) so that there is a common set of names used by the generator elements that will be manipulating the program parts. In the case of partitioning a convolution, the context of a convolution contains two nested loops (i.e., the outer convolution loop and the inner loop), the indexes of those loops (e.g., ?i, ?j, ?p and ?q), the ranges of those loops (e.g., [0,(m−1)] for ?i, [0, (n−1)] for ?j and [−1,1] for ?p and ?q), the data structures over which those loops iterate (e.g., image a or template s), the data flow relationships among the various data items (e.g., ?a[?j] depends on ?a, ?i and ?j) and the candidate partitions for those loops. Each item in the namespace has a role and a value (e.g., (OuterIndex1 ?i) indicates the role of the design variable ?i is described by the semantic token OuterIndex1. The domain programming namespace establishes a set of domain names in the generator's context that are common among the transformations that are rewriting related target program expressions, the APCs that establish the constraints on the program to be produced, and the expressions in the target program specification. The values of these domain programming names (e.g., ?i and ?j) will eventually become pieces of the generated program. This domain programming namespace is the programming context by which the generator elements communicate. It defines the semantic role of each design variable. One can conceive of this domain namespace as being a part of the design implicit to particular sets of IL. It will change and evolve such that it eventually it disappears from the generated program except for a role of documenting the generated code in terms of the domain objects and operations of the original specification. The domain namespace will tie together various operators, operands, design components, APCs, and transformations that are defined later. A domain namespace is the analog of a scope in a conventional programming language with the difference being that it does not obey the same kind of nesting relationships that a scope does. With a namespace, the inclusion/exclusion relationship is not necessarily represented as a structural relationship as with a scope but rather as a semantic relationship (i.e., a convolution operator establishes a namespace). Further, inclusion/exclusion within a namespace can be established statically or dynamically. As an example, the following small domain programming namespace will be sufficient to handle the example. (In the following expression, the form "?name" is called a design variable, pattern variable or simply a variable. These variables will be bound to pieces of the target program (e.g., an index of a convolution loop) or other intermediate objects (e.g., a template) used in the design and derivation of the target program. Text to the right of the semicolons is comment information.)

(DPN convolution
  (template ?s[56])   ;; template name[57]
  (image ?a)   ;; image matrix name
  (OuterIndex1 ?i)   ;; first index of outer convolution loop

```
(OuterIndex2 ?j)           ;; second index of outer convolution loop
(LowIndex1 ?ilow)          ;; low of first index's range
(HighIndex1 ?ihigh)        ;; high of first index's range
(LowIndex2 ?jlow)          ;; low of second index's range
(HighIndex2 ?jhigh)        ;; high of second index's range
(InnerIndex1 ?p)           ;; first index of inner convolution loop
(InnerIndex2 ?q)           ;; second index of inner convolution loop
(LowIndexP ?plow)          ;; low of first index's range
(HighIndexP ?phigh)        ;; high of first index's range
(LowIndexQ ?qlow)          ;; low of second index's range
(HighIndexQ ? qhigh)       ;; high of second index's range
(PixelAPC ?outer)          ;; pixel loop APC
(TmpltAPC ?tmplet)         ;; template loop APC
(FieldAPC ?field)          ;; template loop APC
... )                                                              [7]
```

Applying the Intermediate Language

It will be easier to understand the MT components if we first look at how they are used during the generation process. The main job of the MT components (during the inlining phase) will be to substitute their bodies for any expression in the evolving program that matches their parameter patterns. They are, after all, transforms (i.e., expression rewrites). They are triggered during a generation phase that is specifically designed for inlining definitions once the macroscopic design of the program has been finalized and all desired design features have been encapsulated in the MT definitions (i.e., after the MT definitions have been specialize). To put this in concrete terms, let us look at the form of the convolution expression "(rightconvolutionop a s)" in [4] before this inlining phase occurs. Up to this point, the expression has been processed by a set of transformations that introduce abstracted loop objects (i.e., APCs) and their indexes. Each occurrence of a data item (e.g., a or b) will induce a separate loop introduction. These abstract loops will be propagated up the expression tree and combined, allowing some loop index variables to be discarded and some to survive. Simultaneously, other transformations are computing abstractions that represent loop partitions and partition sets but this is not relevant to the immediate discussion and its discussion will be deferred until later in the paper. After the introduction, propagating, and merging of loop abstractions and loop index variables, the convolution expression becomes

```
(rightconvolutionop (aref a idx3 idx4) (aref s p5 q6)
    (tags⁵⁸ (itype channel)
        (constraints templateloop2d3 loop2d5⁵⁹)))     [7a]
``` where (aref a idx3 idx4) is the internal form for the GPL expression "a[i,j]"; idx3 and idx4 are the surviving index variables for the surviving matrix loop, which is represented by the generator-generated APC loop object loop2d5; p5 and p6 are the surviving template index variables whose loop is abstractly represented by the APC templateloop2d3; and the "(tags ... )" expression is a property list for the rightconvolutionop expression. (In general, the "tags" lists are fundamentally property lists and are the reduction to practice method for forming associations between AST expressions and various properties such as APCs and expression types. Other methods could be chosen in reduction to practice. The invention is not limited to this reduction to practice method. More specifically, templateloop2d3 and loop2d5 are APCs that, respectively, constraint the template loops and the matrix loops. See FIG. 6 for an example of part of the format of a constraint.)

These abstract loop objects are Associative Programming Constraints (APCs) and while they will eventually evolve into concrete GPL loops within the program, they are in the midst of their evolution and are incompletely specified. For the purpose of motivating the specifications of the template components, we can safely defer the discussion of them. Their structure and role will become clear when we consider how the generator evolves, partitions, combines, and manipulates loop APCs into their GPL forms.

The inlining phase will substitute the pseudo-coded definition of rightconvolutionop into [7a], which will cause the expression to be rewritten into

```
(* (aref a (row s (aref c idx3 idx4) p5 p6) (col s (aref a idx3 idx4)
   p5 p6))
    (w s (aref c idx3 idx4) p5 p6)
    (tags (itype channel) (constraints templateloop2d3 loop2d5)))   [7b]
```

That is, for the GPL definition of a convolution that might be nominally written as "(*a[i,j] $w_s$(p,q))", the generator representation replaces the i, j, and w( ... ) elements by the (row s ... ), (col s ... ) and (w s ... ) MT expressions of template s. Why? Because the concrete GPL formulation has not yet been finalized for this instance of the convolution when [7b] is generated and therefore, the final, specialized GPL definitions of i, j, (w s ... ), (row s ... ), and (col s ... ) have not yet been determined. The MTs row, col and w could be specialized to incorporate one or more desired or required implementation design features before they are finally inlined. Further, the generator may reorganize the design of the loop or loops based on other constraints that arise during the programming process and this reorganization will occur before inlining. For example, if the computation is to be partitioned, several versions of [7b] will be generated, one for each partitioned loop. Each version will depend on a different specialization of the template s, e.g., s-edge1, s-edge2, s-edge3, s-edge4 and s-default. And the MT components (e.g., w, col, and row) for each such template specialization will be different specializations of the MT components originally provided by the user specification. That is, each case that changes how the computation is done (e.g., an edge pixel computation as compared to a non-edge pixel) will be defined by a different template whose MT components have been specialized to that particular case. But for the purpose of motivating the component definitions of templates, we will defer discussion of that complexity and pretend that we are using template s defined in [5] and the original versions of s's templates defined by the user (below). Given that momentary pretense, let us see how the user definitions of s's MT components are used to derive the GPL code and that will determine what those template MT components must look like.

To derive the concrete GPL details from the abstract form of [7b], the user-defined definitions for the row, col and w MT components of template s will be substituted for their expressions in [7b], thereby producing a concrete version of the right convolution operation that is customized to the user's definitions. With that usage-based motivation, we can now show some example definitions for the row, col and (later) w components for templates s and sp. These definitions of row and col have been simplified somewhat by omitting complexities and details that are not relevant to this discussion. The generator supplies default versions of row and col for plain vanilla matrix indexing but the user can define a more specialized kind of row and col computation if need be. In fact, in the reduction to practice implementation, the definitions [8a] and [8b] are the default definitions supplied by the generator and will be used by default unless the user supplies different definitions. In [8a] and [8b] as well as other follow-on examples, the form "?name" is variously called a generator variable, design variable, pattern variable or simply a variable depending on the context. These variables will be bound to pieces of the target program (e.g., a name of a convolution loop index) or other intermediate objects (e.g., a template) in the expression being matched. The variables are used in the construction and derivation of the target GPL program.

```
(Defcomponent row (s (aref ?a ?i ?j) ?p ?q) (+ ?i ?p (tags        [8a]
   (itype Iterator))))⁶¹
(Defcomponent col (s (aref ?a ?i ?j) ?p ?q) (+ ?i ?q (tags        [8b]
   (itype Iterator))))
```

In other words, these two expressions are simply defining how to calculate the indexes of the matrix pixel corresponding to some template pixel [?p, ?q] assuming that the template is centered on the matrix pixel [?i, ?j]. Thus, [8a] and [8b] define the matrix pixel corresponding to the template pixel [?p, ?q] as matrix pixel [?i+?p, ?i+?q]. The two components [9] and [10] are converted by the generator into transformations that are trying to match the patterns "(row s (aref ?a ?i ?j) ?p ?q)" and "(col s (aref ?a ?i ?j) ?p ?q)" against expressions in [7b]. For [7b], the two transforms will respectively match the "(row s . . . )" and "(col s . . . )" expressions with the value a bound to pattern variable ?a, idx3 bound to ?i, idx4 to ?j, p5 to ?p and q6 to ?q. These components will rewrite their respective matched portions of [7b] into (+idx3 p5) and (+idx4 q6). At this point, [7b] has become

```
(* (aref a (+ idx3 p5) (+ idx4 q6)) (w s (aref a idx3 idx4) p5 p6)    [9]
   (tags ...)).
```

But the inlining of the w component remains to be completed.

To make the task easier for the user, the definition of w's parameter pattern uses some previously defined generator patterns (shown below as [10a-b]) that are the values of the LISP variables Iter1AndRange and Iter2AndRange. Since the parameter pattern is determined by the convolution operator, this pre-definition can be taken a step farther by making it a property of the convolution operator so that the user only need to supply the body of w's definition. The LISP syntax "#." includes pre-defined LISP pattern values in the pattern. Furthermore, the English expressions enclosed in << . . . >> simply describe the intent of a pattern match in English without showing the detailed specification, which is irrelevant to this discussion. The patterns [10a] and [10b] bind idx3 and idx4 to ?i and ?j, respectively and then get the low and high values for idx3 and idx4 indexes from previously stored descriptions. For the sake of simplicity in the examples, let us say that these low and high values are 0 and 99 for both indexes. The constant pattern of [10c] uses [10a] and [10b] to formulate the ArrayReference pattern, which is used in the definition of the w MT shown as form [11]. The constraints "partitionmatrixtest" and "edge" in the "tags" property list within [11] are simply expressing the user supplied domain knowledge that the "or" test in w's definition can be used to partition the convolution computation into cases. Later in the discussion, these tags will become relevant but for the moment they can be ignored.

```
(defconstant Iter1AndRange
   '$(pand ?i << find ?i's min and max and bind to             [10a]
      ?ilow and ?ihigh>>)
(defconstant Iter2AndRange
   '$(pand ?j << find ?j's min and max and bind to             [10b]
      ?jlow and ?jhigh>>))
(defconstant ArrayReference '(aref ?a #.Iter1AndRange           [10c]
   #.Iter2AndRange) )
(Defcomponent w (s #. ArrayReference ?p ?q)
   (if (or (== ?i ?ilow) (== ?j ?jlow)
      (== ?i ?ihigh) (== ?j ?jhigh) (tags (constraints
         partitionmatrixtest edge)))
   (then 0)
   (else (if (and (!= ?p 0) (!= ?q 0))
      (then ?q)
      (else (if (and (== ?p 0) (!= ?q 0))
         (then (* 2 ?q))
         (else 0))))))⁶²                                       [11]
```

The reader may want to verify that calculating (w s . . . ) for p and q values in the set [−1, 0, 1] will produce the coefficients in the s matrix shown in [2]. Note that the "or" test will produce the 0 values for the edge cases as defined in the assumptions of the template definitions [2]. The w Defcomponent becomes an MT whose pattern "(w s #. ArrayReference ?p ?q)" will match the "(w s (aref a idx3 idx4) p5 p6)" expression in [9] with the binding pairs ((?a a) (?i idx3) (?j idx4) (?ilow 0) (?ihigh 99) (?jlow 0) (?jhigh 99) (?p p5) (?q q6)). Rewriting the expression (w s (aref c idx3 idx4) p5 p6) in [9], we get

```
(* (aref a (+ idx3 p5) (+ idx4 q6))
   (if (or (== idx3 0) (== idx4 0)
      (== idx3 99) (== idx4 99) (tags (constraints
         partitionmatrixtest edge))
      (then 0)
      (else (if (and (!= p5 0) (!= q6 0))
         (then ?q)
         (else (if (and (== p5 0) (!= q6 0))
            (then (* 2 q6))
            (else 0)))))                                       [12]
```

So, if the user defines the components [8a, 8b, and 11] for template s plus analogous components for sp, then the expression of [4] is defined. However, to fully define all of the IL that the generator will require, the user needs to define the ranges of the IATemplate neighborhoods of s and sp. This is accomplished by supplying definitions for two neighborhood MTs—PRange and Qrange.

PRange and QRange define the index ranges over the template neighborhood. These two components are defined for the template s as:

```
(Defcomponent PRange (s #. ArrayReference ?plow ?phigh ?p)⁶³
   (_Range ?plow ?phigh ))                                     [13a]
(Defcomponent QRange (s #. ArrayReference ?qlow ?qhigh ?q)
   (_Range ?qlow ?qhigh ))                                     [13b]
```

In the actual implementation, the parameter structure is somewhat more complex for reasons that are not relevant to this discussion (e.g., the parameters are constructed as patterns that allow optional forms). Further, the parameter structure is standardized for each of the methods for the convenience of the generator. For some definitions like these, some parameters (e.g., ?i and ?j in PRange and QRange) may not be used. In other cases, they are required.

The values of design variables (e.g., ?plow) will be expressions that may become pieces of the target program (e.g., target program variables, data and expressions). Alternatively, their values may only be intermediate forms that are discarded during the programming process when they get replaced by different pieces of the redesigned target program.

For both template coefficient matrices shown in [2], the inputs to PRange and QRange will be ?plow which is bound to −1 and ?phigh which is bound to 1. So, the result of both PRange and QRange of s will refine to the data structure "(_range −1 1)" which will be used at various points in the generation process. This result will be used in the construction of the inner convolution loop. Eventually, it may (or may not) be used in the inference of a loop structure in some specific GPL such as C.

The expressions [14a-16] define the IL for the sp template in an analogous manner.

```
(Defcomponent PRange (sp (aref ?a ?i ?j) ?plow ?phigh ?p)
    (_Range ?plow ?phigh))                                    [14a]
(Defcomponent QRange (sp (aref ?a ?i ?j) ?qlow ?qhigh ?q)
    (_Range ?qlow ?qhigh))                                    [14b]
(Defcomponent Row (sp (aref ?a ?i ?j) ?p ?q)
    (+ ?i ?p))                                                [15a]
(Defcomponent Col (sp (aref ?a ?i ?j) ?p ?q)
    (+ ?j ?q))                                                [15b]
(Defcomponent W ( sp #. ArrayReference ?p ?q)
    (if (or (== ?i ?ilow) (== ?j ?jlow)
            (== ?i ?ihigh) (== ?j ?jhigh) (tags
                (constraints partitionmatrixtest edge)))
        (then 0)
        (else (if (and (!= ?p 0) (!= ?q 0))
                (then ?p)
                (else (if (and (!= ?p 0) (== ?q 0))
                    (then (* 2 ?p))
                    (else 0)))))))                            [16]
```

Given these IL definitions, one can specify a Sobel Program with the following machine independent code:

```
;;*********** Sobel Program Specification *****************
(progn (dsdeclare dsnumber m :value 100)
    (dsdeclare dsnumber n :value 100)
    (dsdeclare image a :form (array m n) :of bwpixel)
    (dsdeclare image b :form (array m n) :of bwpixel)
    (:= b (sqrt (+ (expt (rightconvolutionop a s) 2)
        (expt (rightconvolutionop a sp) 2)))))                [17]
```

Separately and independently, one can specify what kind of machine architecture he wants the code to be generated for. In this case, the user wants an implementation that exploits the SSE instruction level parallelism of an Intel CPU and also is partitioned for multi-core CPUs.

```
;;******** Machine Platform Specification via Constraints ******
(PlatformArchitecture (tags (constraints (Parallelism
        (InstructionLevel SSE) (MultiCore 2)))                [18]
```

Important Properties of the Intermediate Language

MT component definitions in the IL have several properties that will be important to the automated programming process. First, the RHS of each MT is written as an expression of pure mathematical functions (i.e., its behavior is not determined by any "state" information such as could be provided by references to global variables that could change from application to application). Thus, it has a property referred to as referential transparency, which means it produces a value but no-side effects. Every call with the same set of inputs will produce the same output regardless of context. Because of this, pure functions are independent of their location and may be freely substituted anywhere with full assurance that the new context will not change the results they produce. This is quite important because the automated programming system will be moving such functions around or duplicating them for new contexts all of the time. Further, a pure function's value computation is determined by the computations of its constituent expressions and the rules of their combination. This is known as the principle of compositionality. Both of these properties are important to the IL component methods because the automated system will need to form new specialized versions of these methods as it sets about to partition the computation for parallel computation on a new machine. These properties are critical to this specialization process.

Another important quality of the automatic programming machinery is that a component definition (such as w) is expressed as a case structure (i.e., an if-then-else structure) that provides the symbolic form of the logical tests that distinguishes special case computations (i.e., the template centered on a matrix edge cell) from the default case computations. Such a case structure (abstractly) identifies the specific parallelization opportunities that can be exploited by one or more parallel execution regimes, e.g., low level instruction parallelism or multi-cpu parallelism. Further, the constraints are expressed as properties of the form "(constraints C1 C2 . . . Cn)" and are associated with the constituents of the definitions. In the case of w, the constraints identify a partitioning condition and provide some domain knowledge as to what kind of partitioning it is (e.g., "partitionmatrixtest" indicates data parallel partition of a matrix). They explicitly and symbolically identify which constituent is the logical expression that can be used to perform the partitioning, which constituent is the special case code (i.e., produces a value of 0 for the convolution of that cell) and which constituent is the default case code (i.e., produces the values shown in the matrices of [2]). They also identify some semantically meaningful names for these cases. These names (e.g., "edge") will allow the automated system to create human friendly names for generating new, specialized objects and components that it derives from those defined by the programmer. For example, the automated programming machinery could create new templates, e.g., s-0-edge1, s-0-edge2, s-0-edge3, s-0-edge4 and s-0-default, from s-0 (i.e., from the specialization of s that relocates its index ranges to 0). These new templates will be specialized versions of the s-0 template and codify programming decisions (e.g., partitioning decisions) made in the automated programming process. Such human oriented naming conventions are quite valuable for relating the human supplied specification to the automatically generated code or for hunting down residual bugs in the automated programming generator itself.

Operation: Generating the Implementation

In this section, we will step through the generation process showing a series of snapshots of the evolving implementation. The preferred embodiment of the generator exploits a series of phases that incrementally accomplish parts of the programming task, e.g., processing definitions, computing the loops, partitioning loops, and so forth. These phases start with expression [17] and iteratively rewrite it to produce a form from which GPL code (e.g., C code) can be generated directly. In general, each such phase traverses the expression tree and rewrites it bit by bit from the leaves up. (FIGS. 50a-e)

This is accomplished by sets of phase-specific transformations (i.e., transformations that are enabled only for one specific phase).

The generator divides the programming process into a series of generation phases each of which performs a specific generation task. By the end of these phases, the implementation neutral specification (i.e., the what) has been transformed into an GPL-oriented Abstract Syntax Tree (AST) from which GPL code (e.g., C) can be generated via a simple set of transformations that add in the surface syntax of C and produce a text file that can be compiled into executable code by the most basic of C compilers. We will call the internal representation of the program the AST whether it is more domain like (i.e., closer to the what specification) or more GPL like. Of course, it will evolve from the pure domain form to the pure GPL form incrementally from phase to phase.

Each phase is defined by a set of transformations that are enabled only for that phase and are applied to rewrite the parts of the expression tree that their patterns match, where the various methods of defining transformations are specified in Table 2. Transformations are fundamentally data, not program code. Therefore, their "behaviors" are implicit and are realized via the routines that apply them (e.g., ApplyTransform of FIG. 50e). Nevertheless, the Figures defining each transformation's behavior (FIGS. 8-45d) project some of the logic from ApplyTransform onto each specific transformation in order to make explicitly clear the order of actions and decisions in the processing of that transformation's data.

The form and structure of transformation specifications are defined in Table 2. Transformations are specified as follows: In addition to having a name; a phase, which is the only time they are enabled; and a home object where they are stored, transformations have additional elements: 1) A pattern that must match an expression for them to be applied to that expression; 2) A preroutine that performs data management functions and must also succeed for them to be applied to their matching expression; 3) A rewrite expression or RHS, which on success, is instantiated with binding list from the pattern matching process and preroutine, and replaces the matching expression; and 4) A postroutine, which is called with the instantiated and rewritten expression as one of its arguments.

Figure 8:
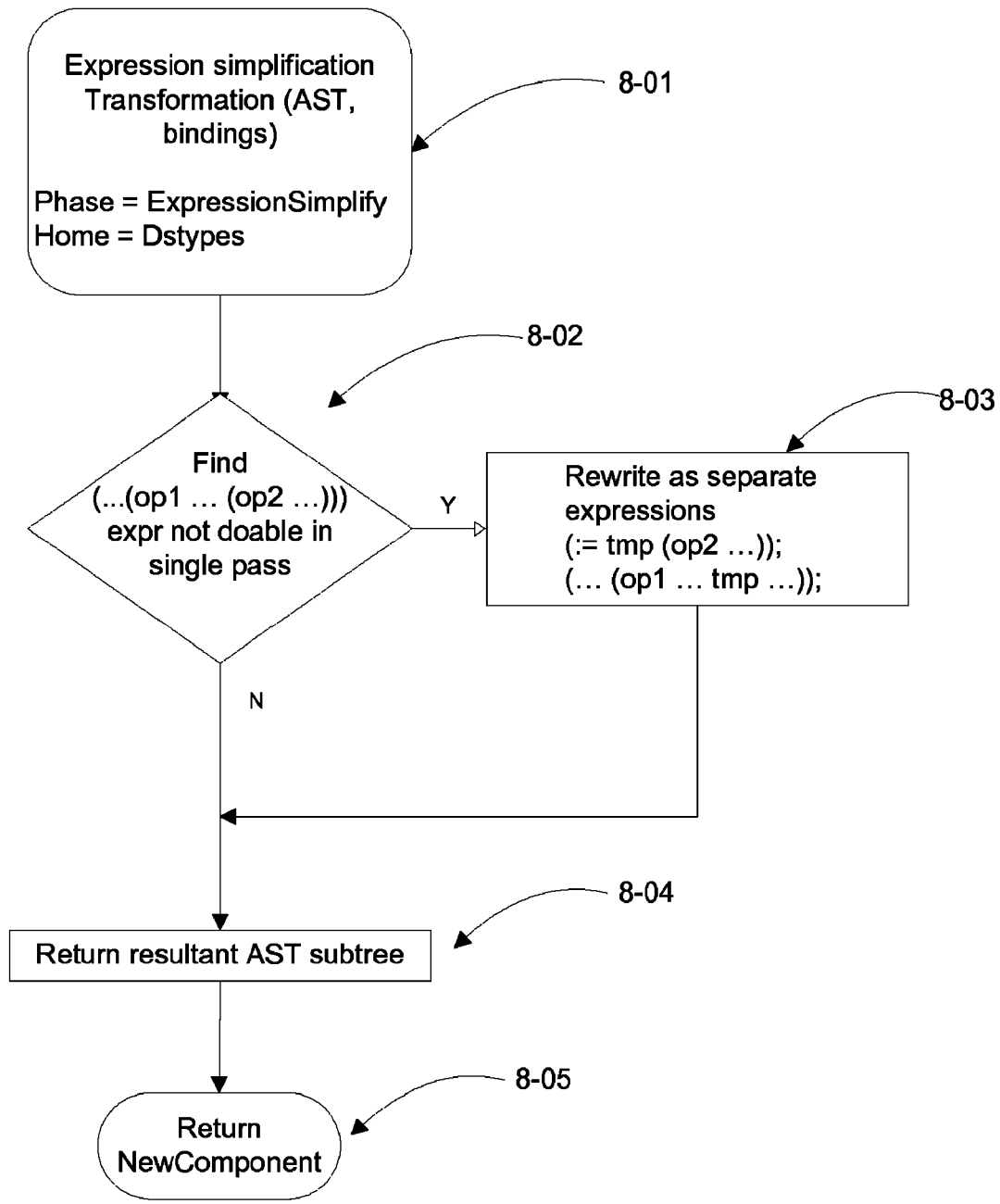
FIG. 8 is the transformation that breaks up expressions that can not be computed in a single pass.
Figure 9:
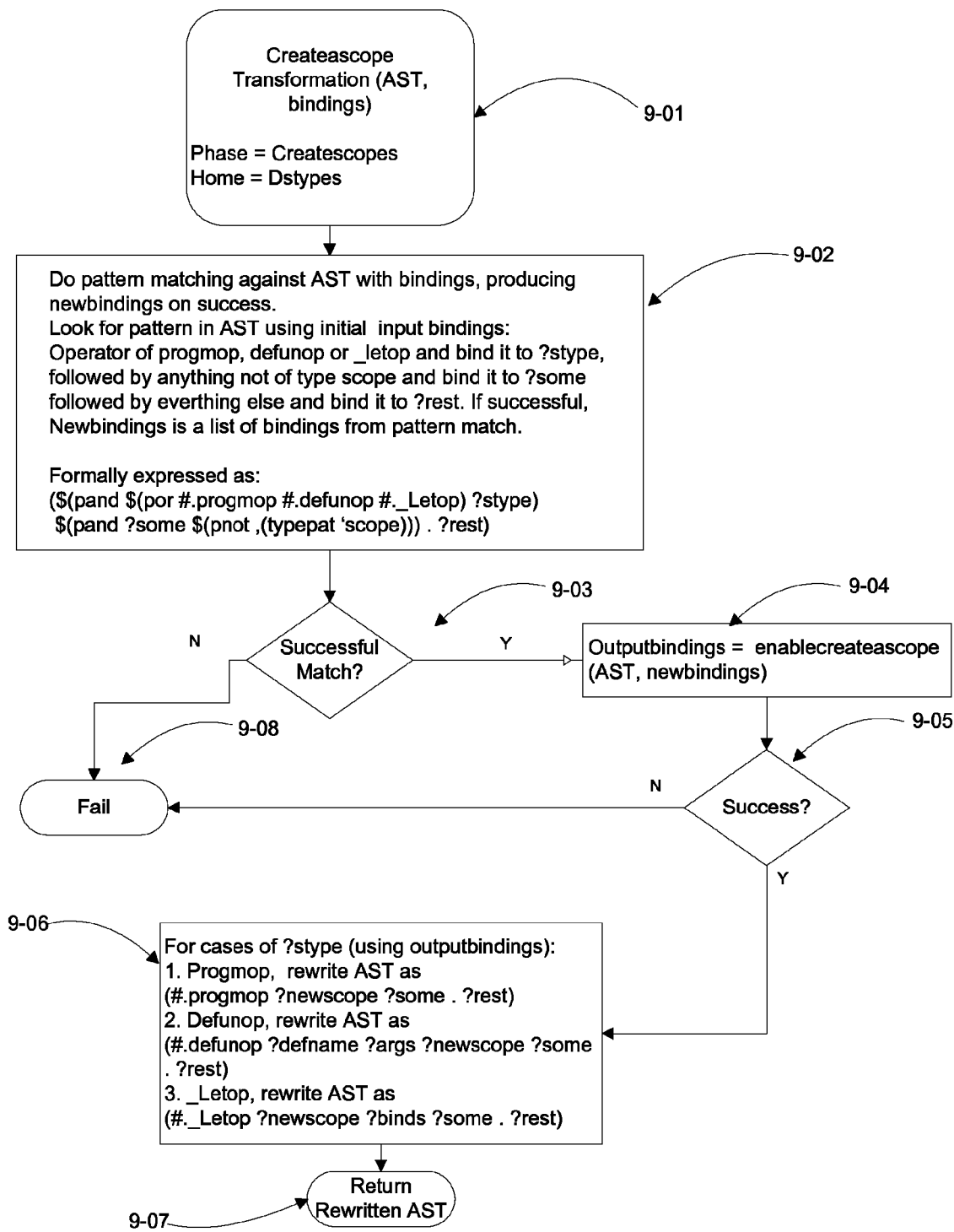
FIG. 9 is the transformation that creates scope objects.
Figure 10:
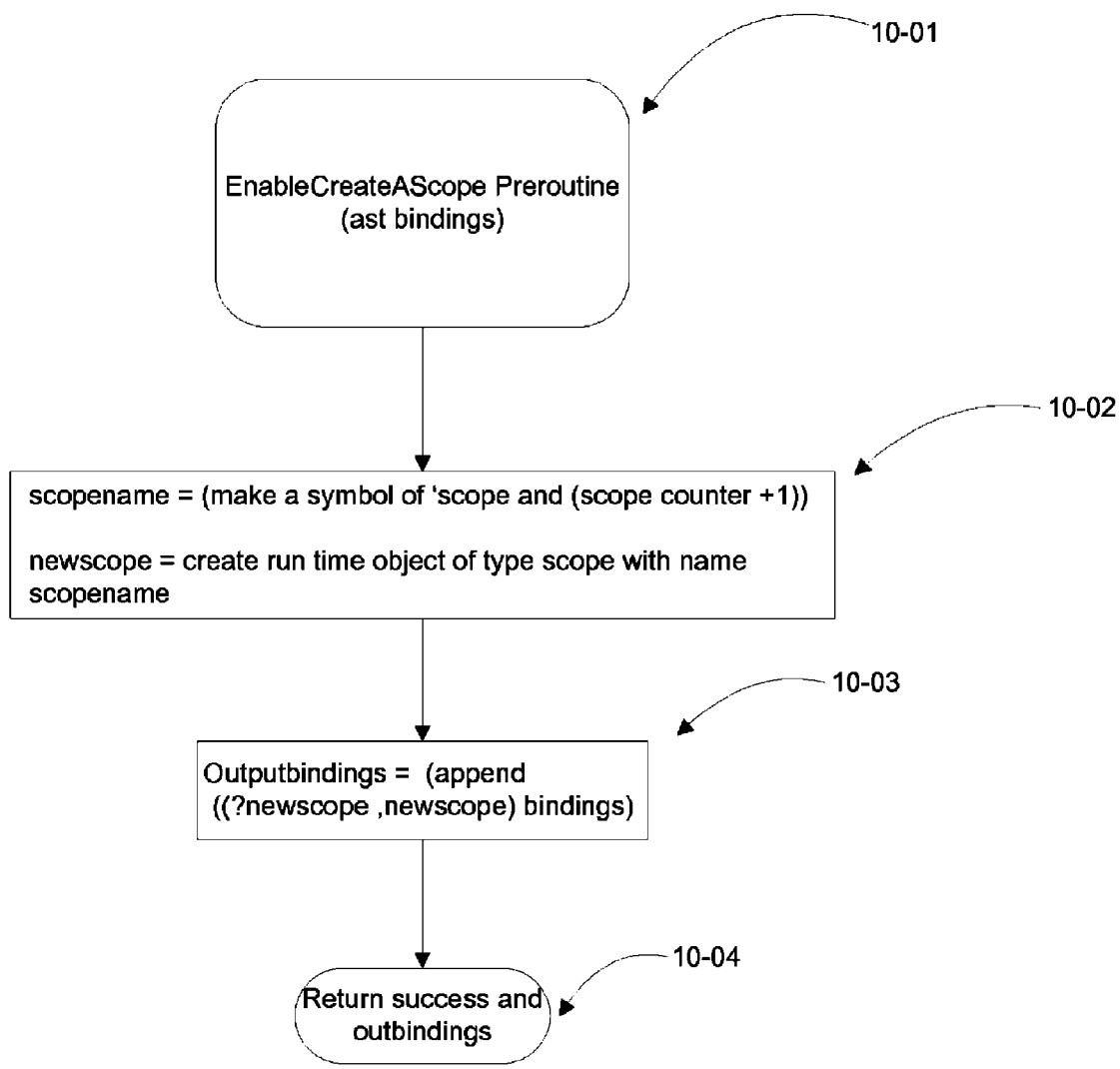
FIG. 10 is the preroutine enablecreateascope.
Figure 11A:
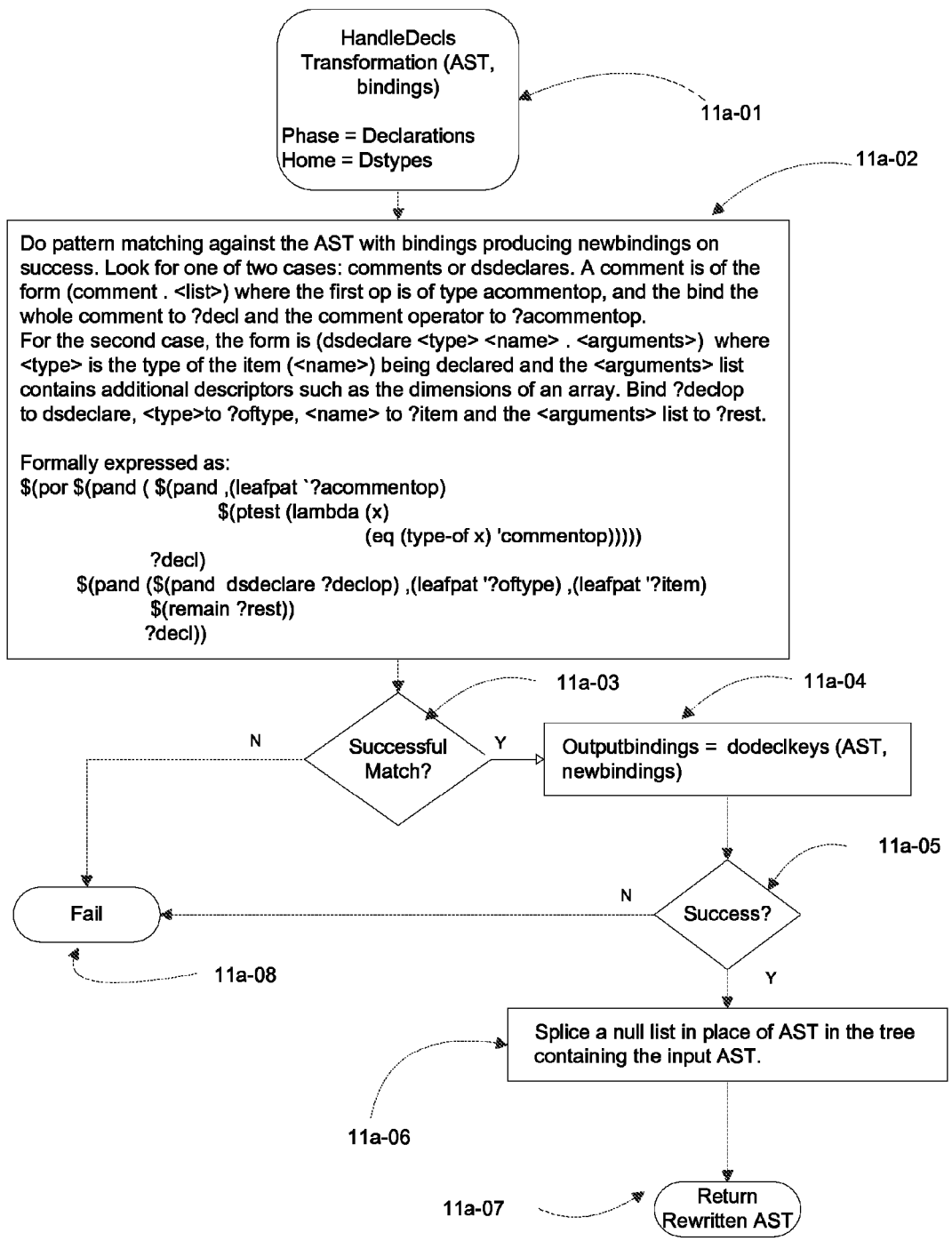
FIG. 11a is the transformation that handles comments and declarations.
Figure 11B:
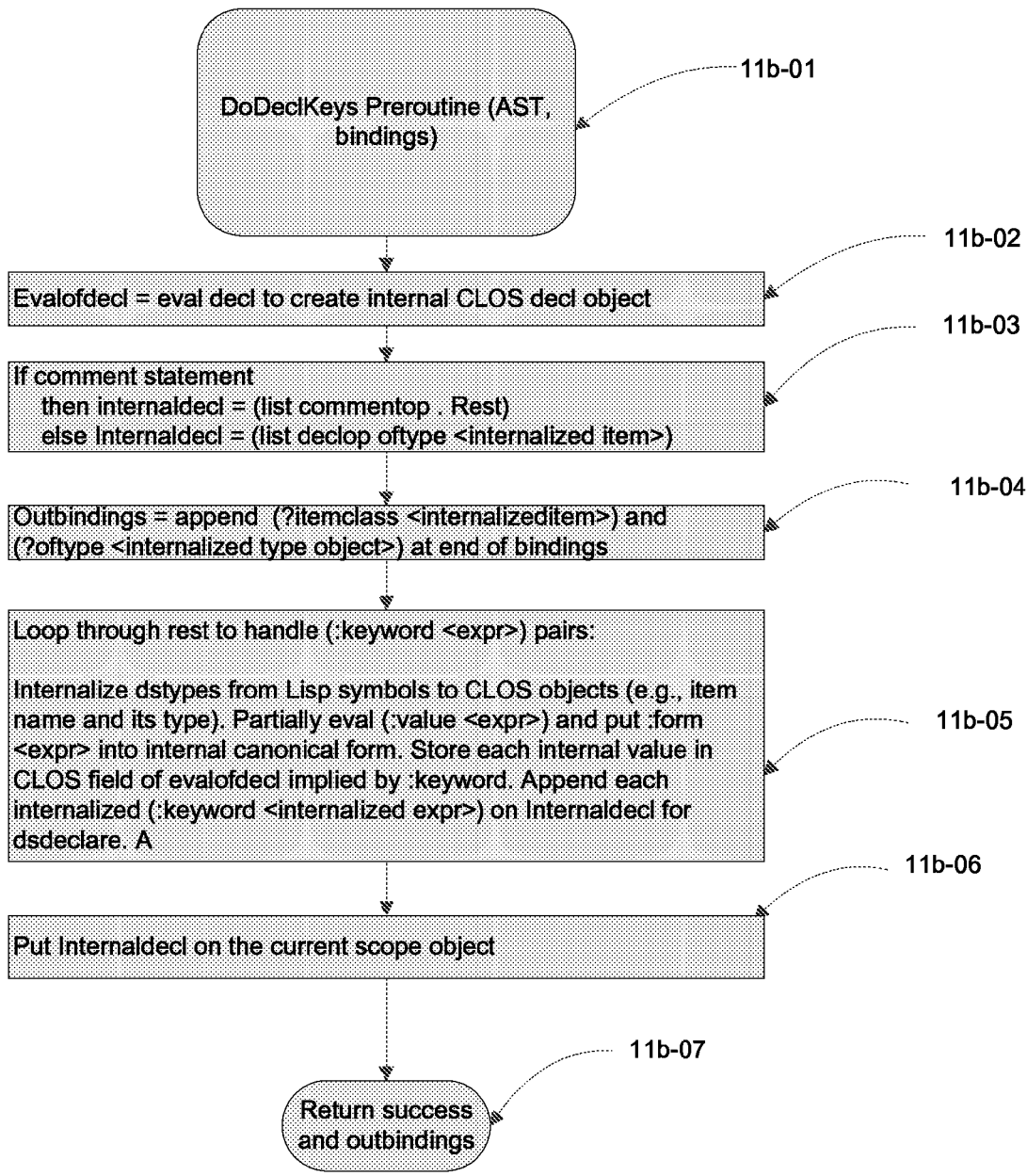
FIG. 11b is the preroutine for the transformation that handles comments and declarations.

While the exact set of phases for any specific problem domain may be programmatically changed, extended, and re-defined, the phases for the image and signal processing domain in the reduction to practice implementation include:

Expression Simplification. Statements that would require multiple passes over their expressions (e.g., nested convolutions) are rewritten into separate statements that each can be computed in a single pass over its expression. (FIG. 8)

Scope Creation and Declaration Processing. Declarations of programs or functions cause the creation of scope objects, which are used to store dynamically generated declarations until it is time to insert them into their GPL-like scope structure (e.g., a let body or a defun). At the same time, explicit user declarations (e.g., a, b, m and n in [17]) create generator objects that will represent the data items during the generation process. (FIGS. 9-11b)

Figure 12A:
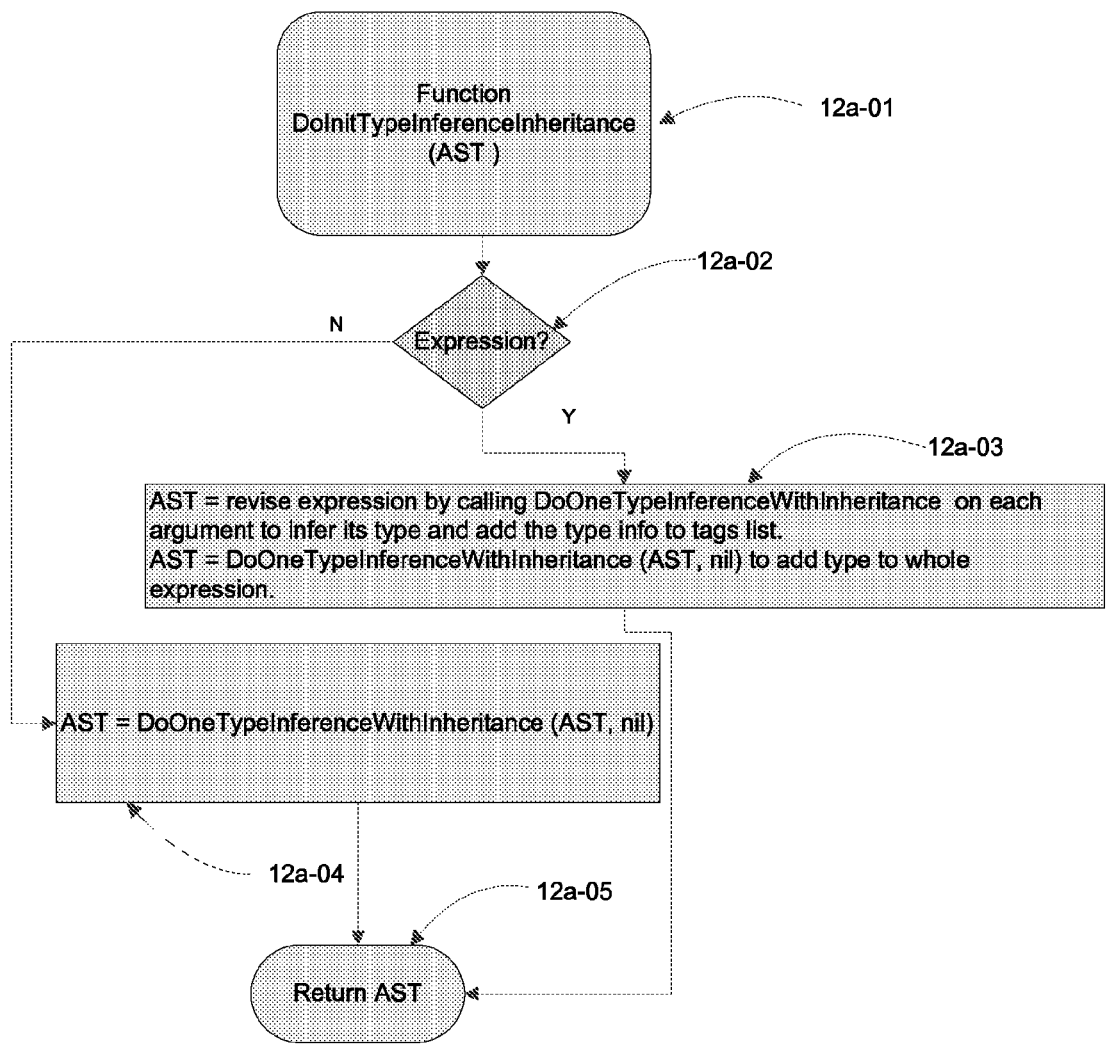
FIG. 12a is the routine that performs initial type inference on the expression tree.
Figure 12B:
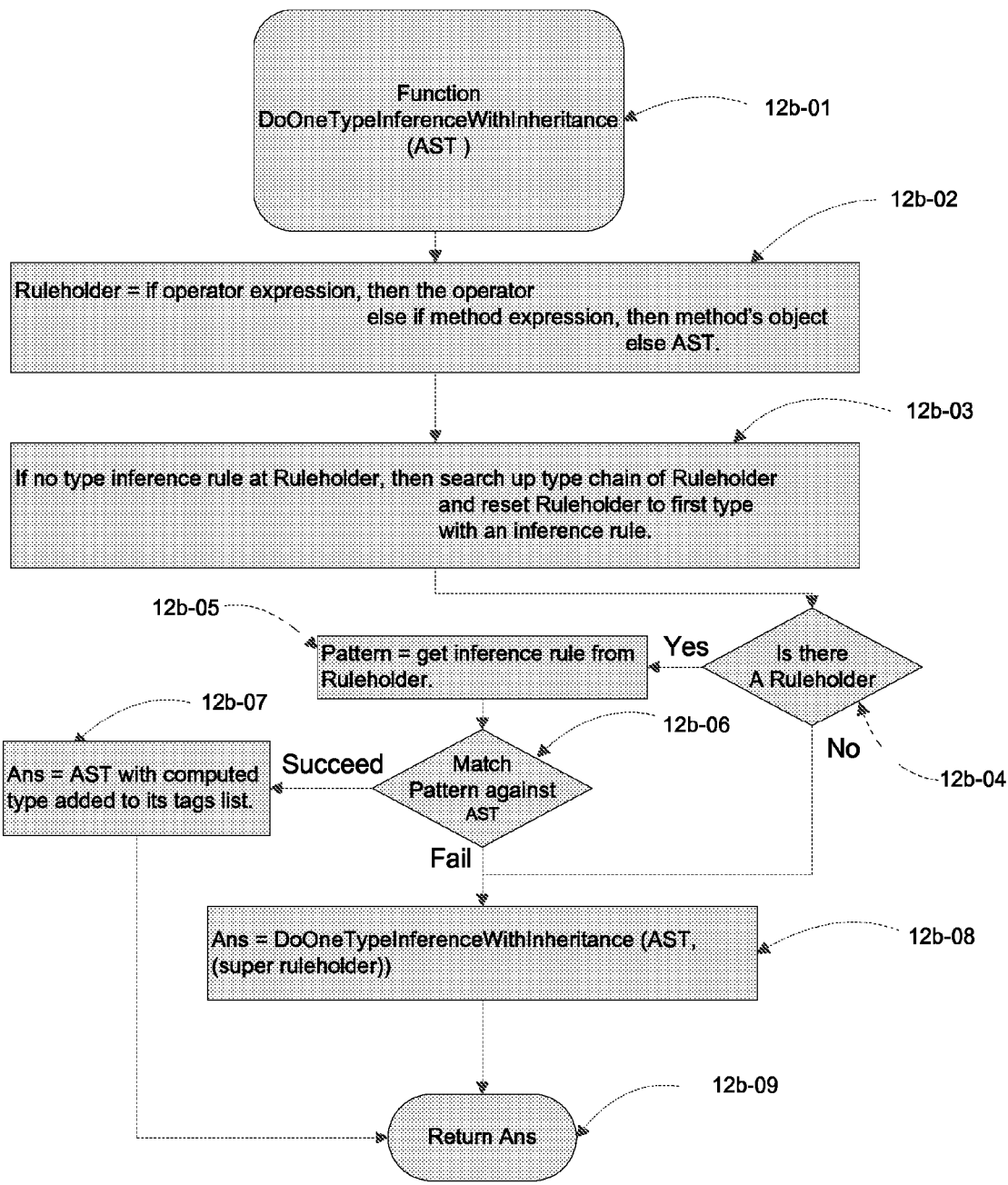
FIG. 12b is the helper routine that performs type inference on a single expression in the tree.
Figure 13:
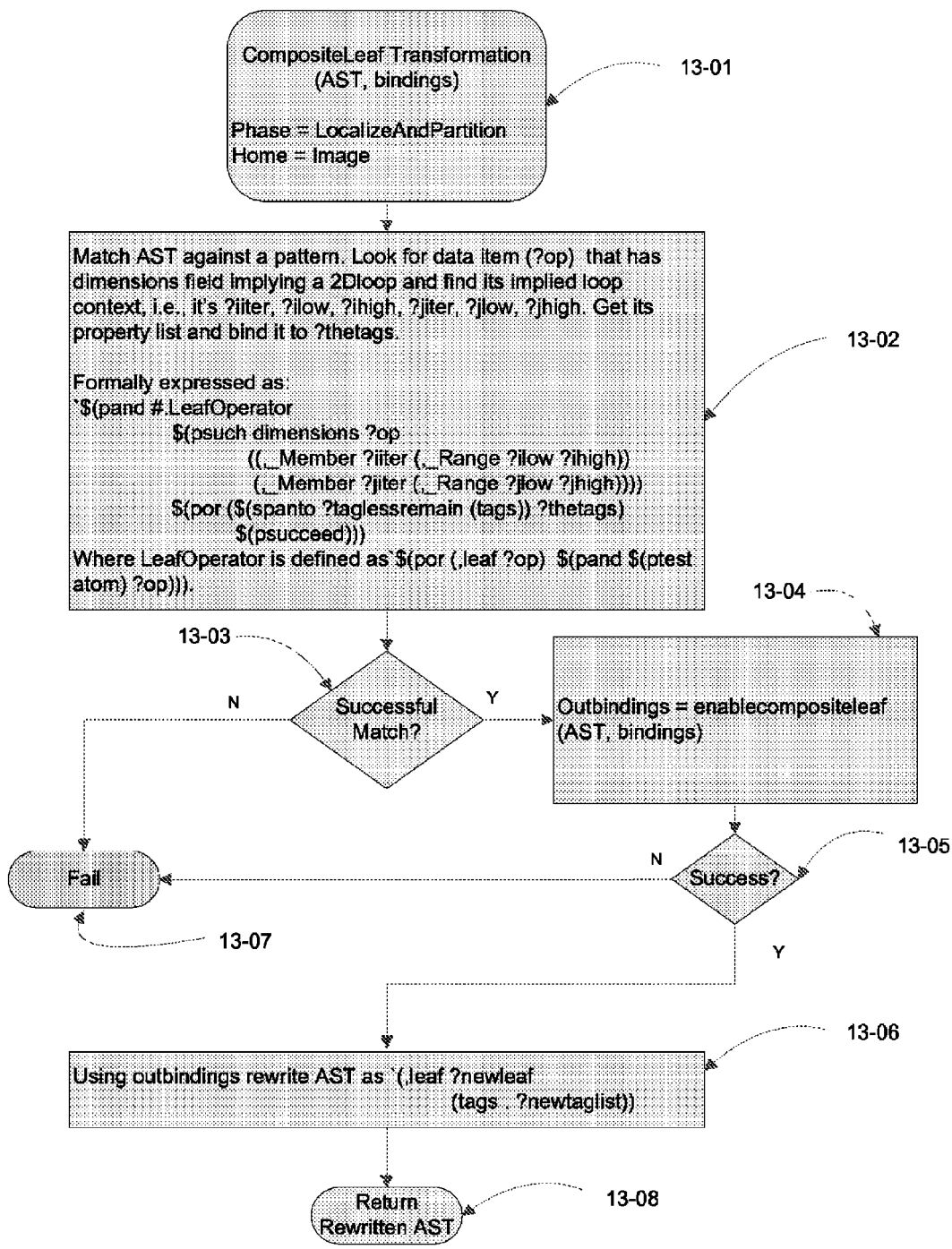
FIG. 13 is the transformation that detects composite types, replaces with an element and introduces a loop APC.
Figure 14:
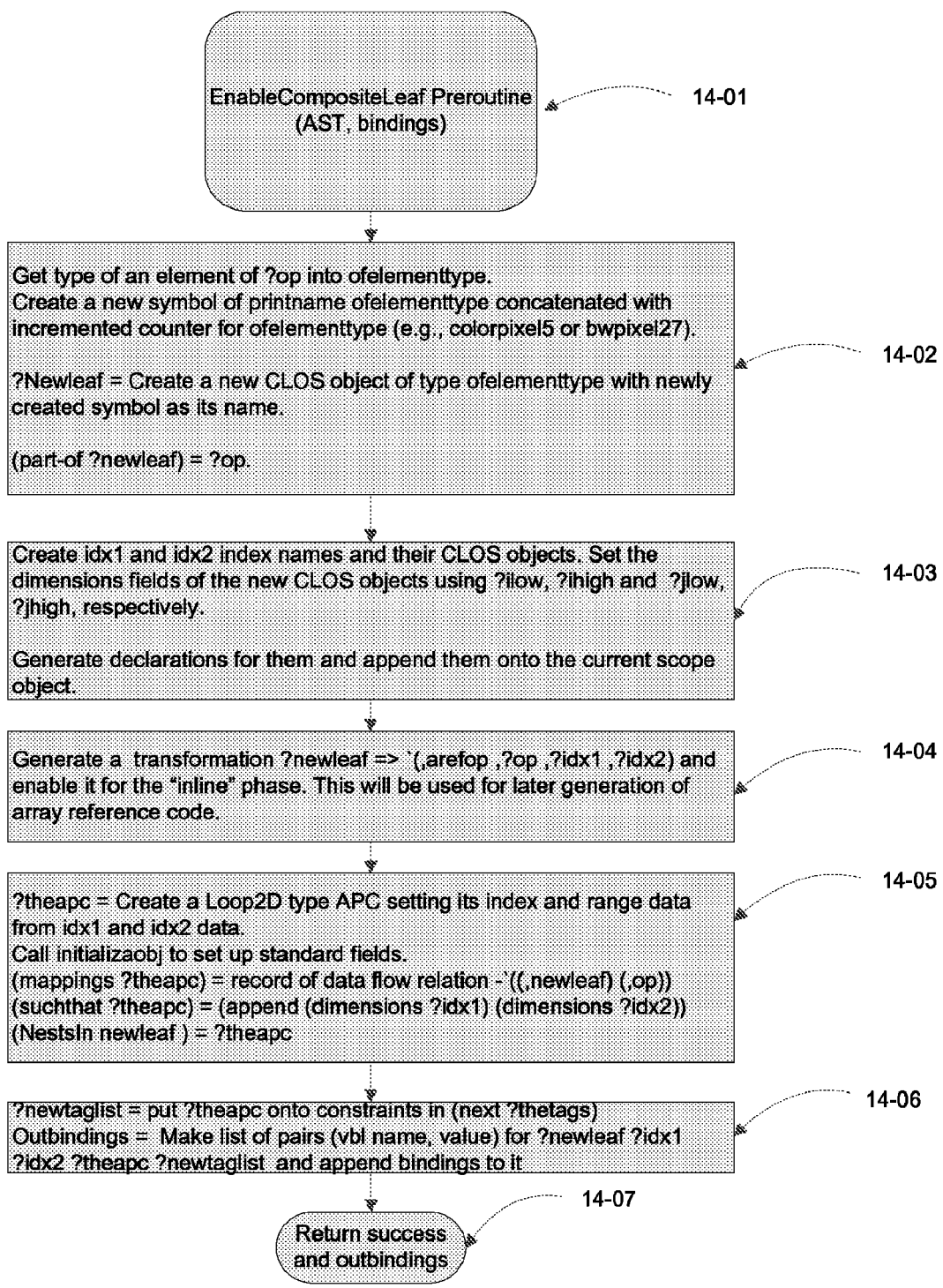
FIG. 14 is the preroutine for the FIG. 13 transformation, which does data structure housekeeping for the generator.
Figure 15:
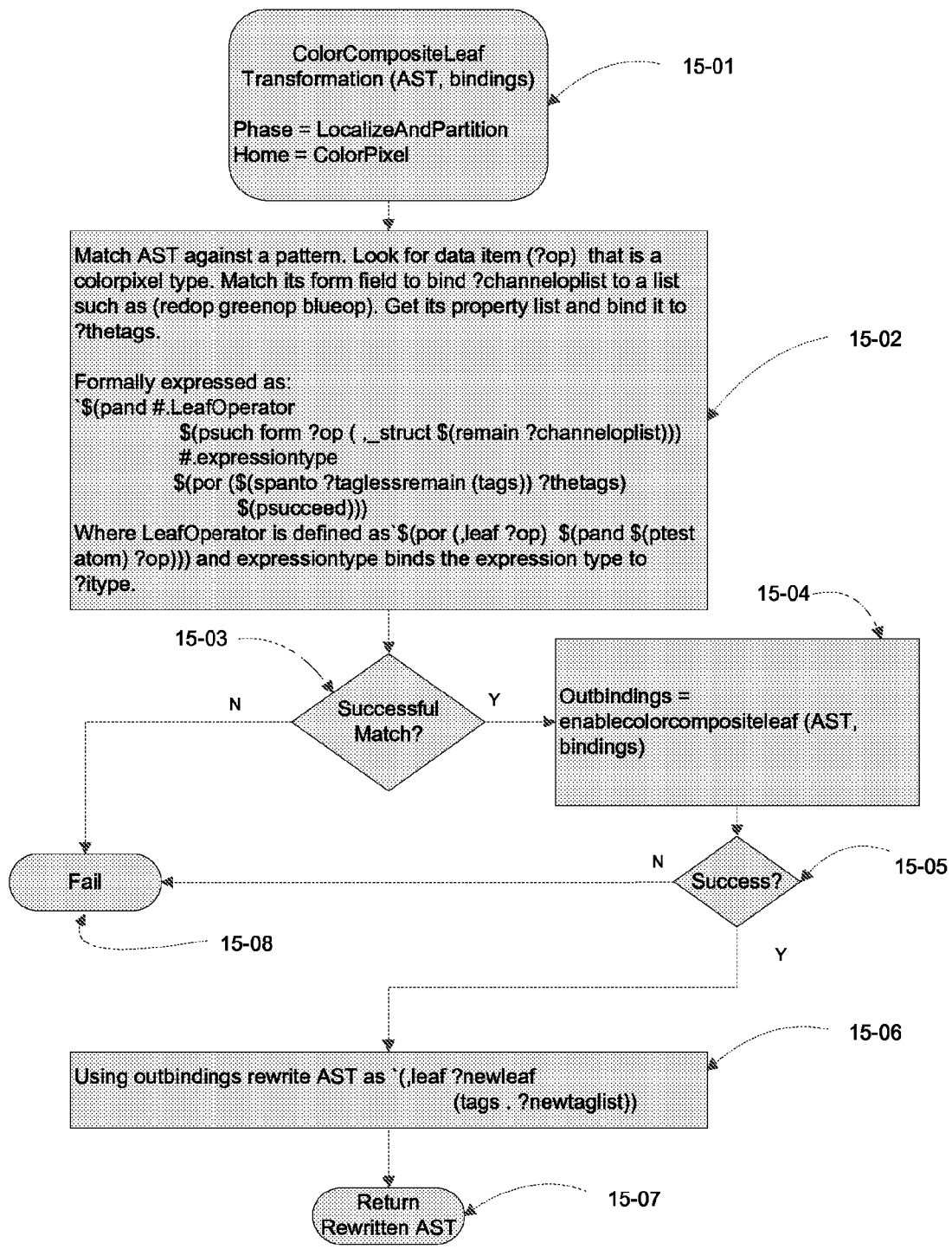
FIG. 15 is the transformation that recognizes a colorpixel and generates a field loop APC to reduce it to a channel data type (e.g., redop).
Figure 16:
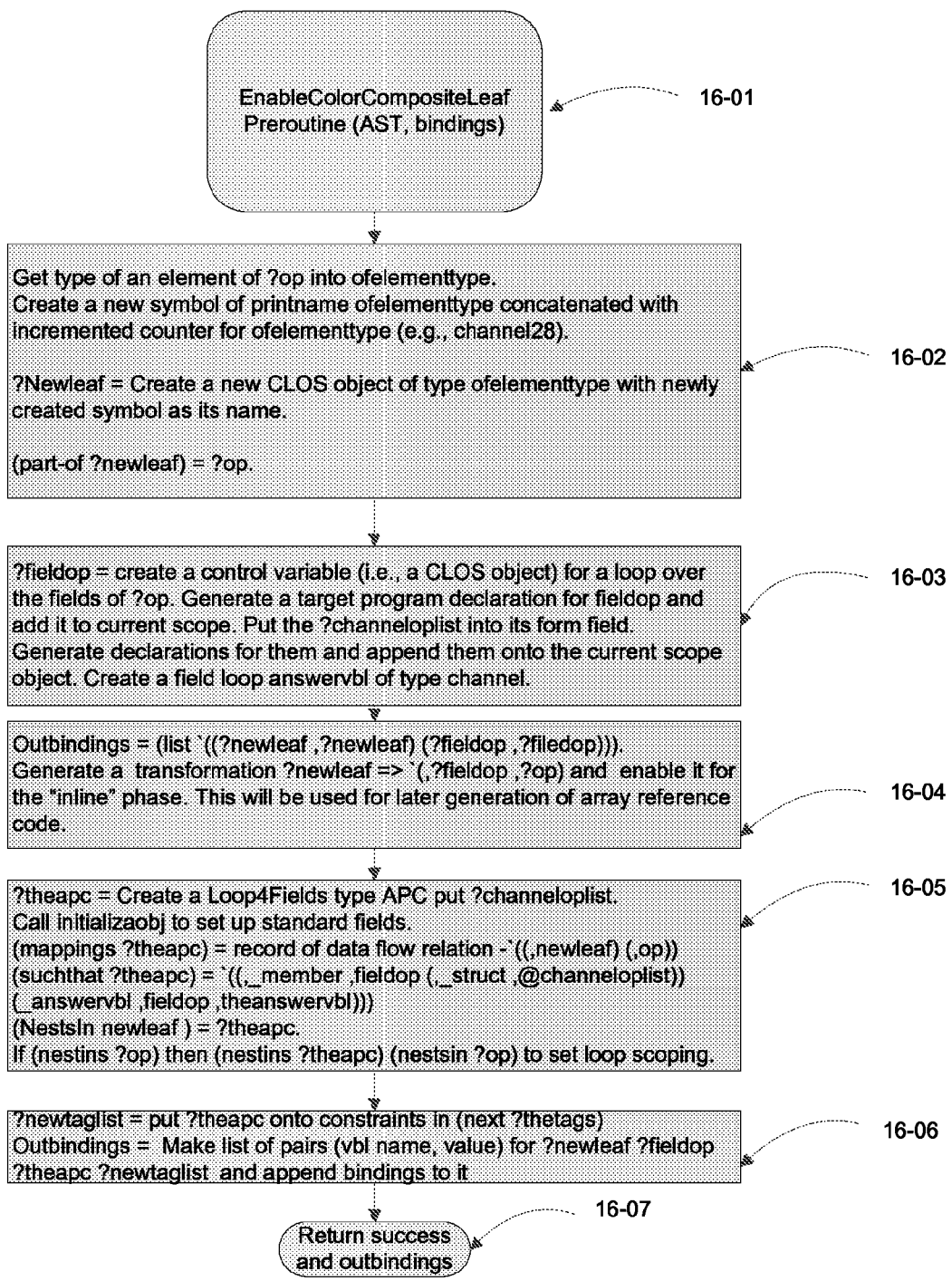
FIG. 16 is the preroutine for the FIG. 15 transformation, which does data structure housekeeping for the generator.
Figure 17:
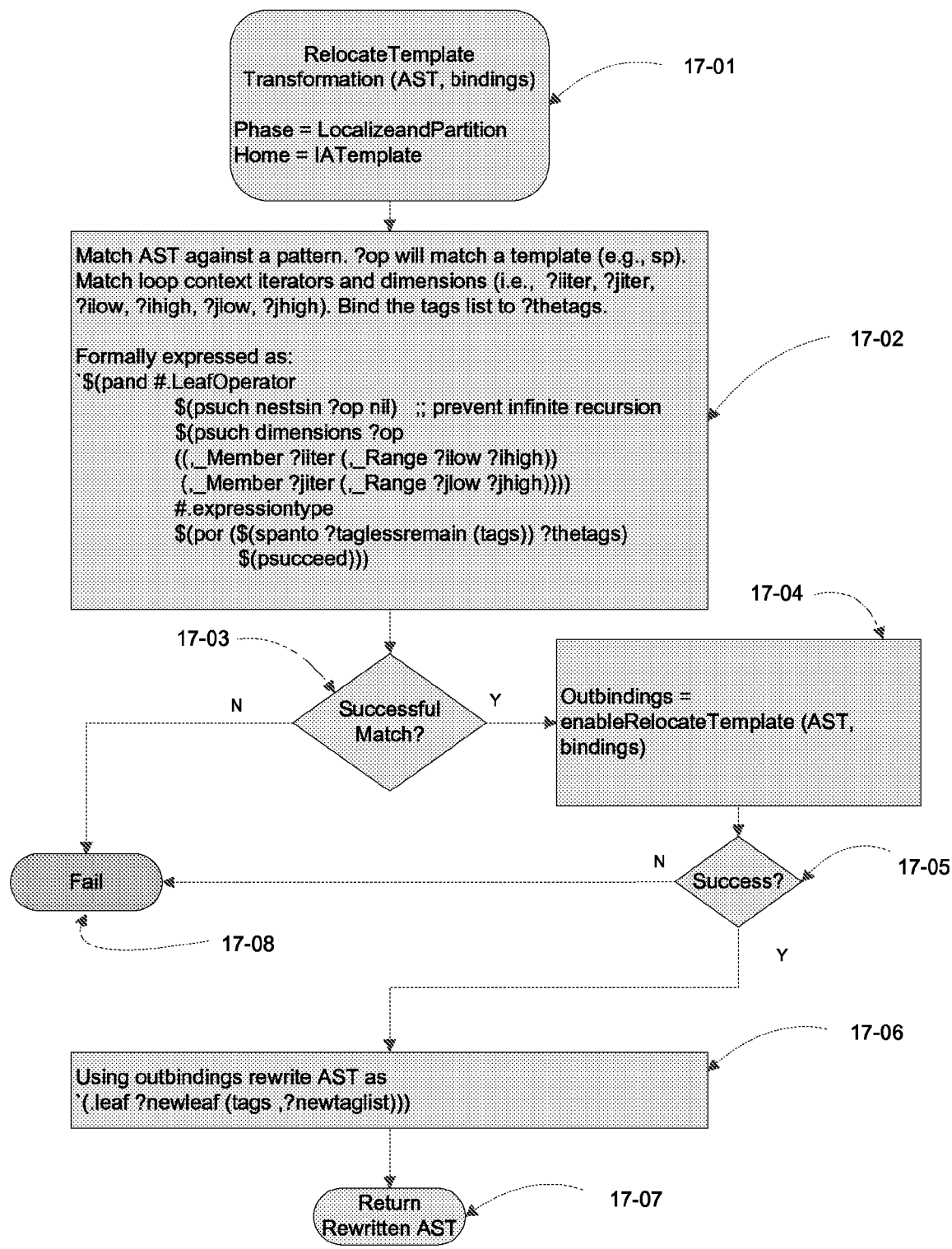
FIG. 17 is the transformation that relocates templates to C-friendly [0 ... n] ranges.
Figure 18:
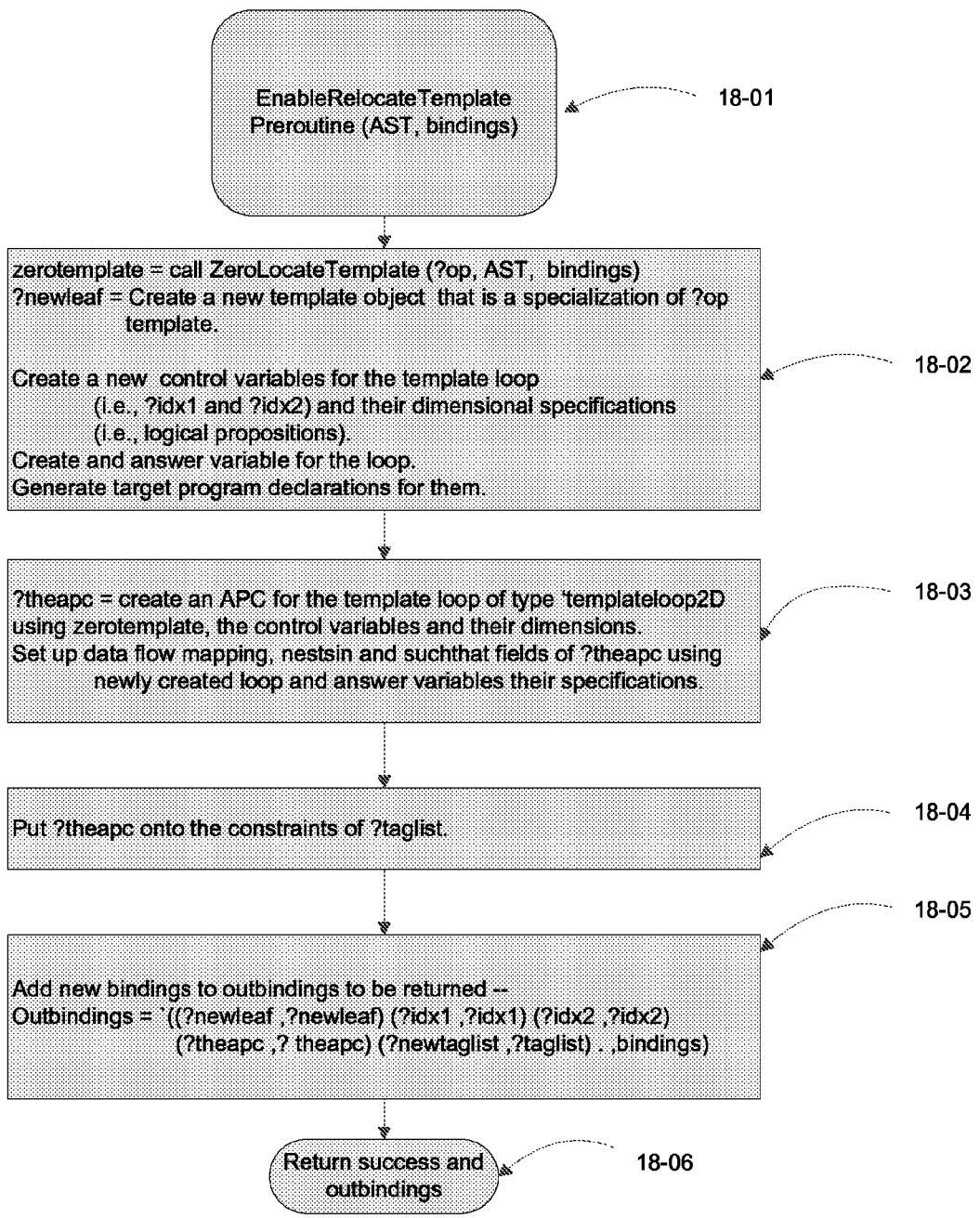
FIG. 18 is the preroutine for the FIG. 17 transformation, which does the rewrite of the template's Defcomponents.
Figure 19:
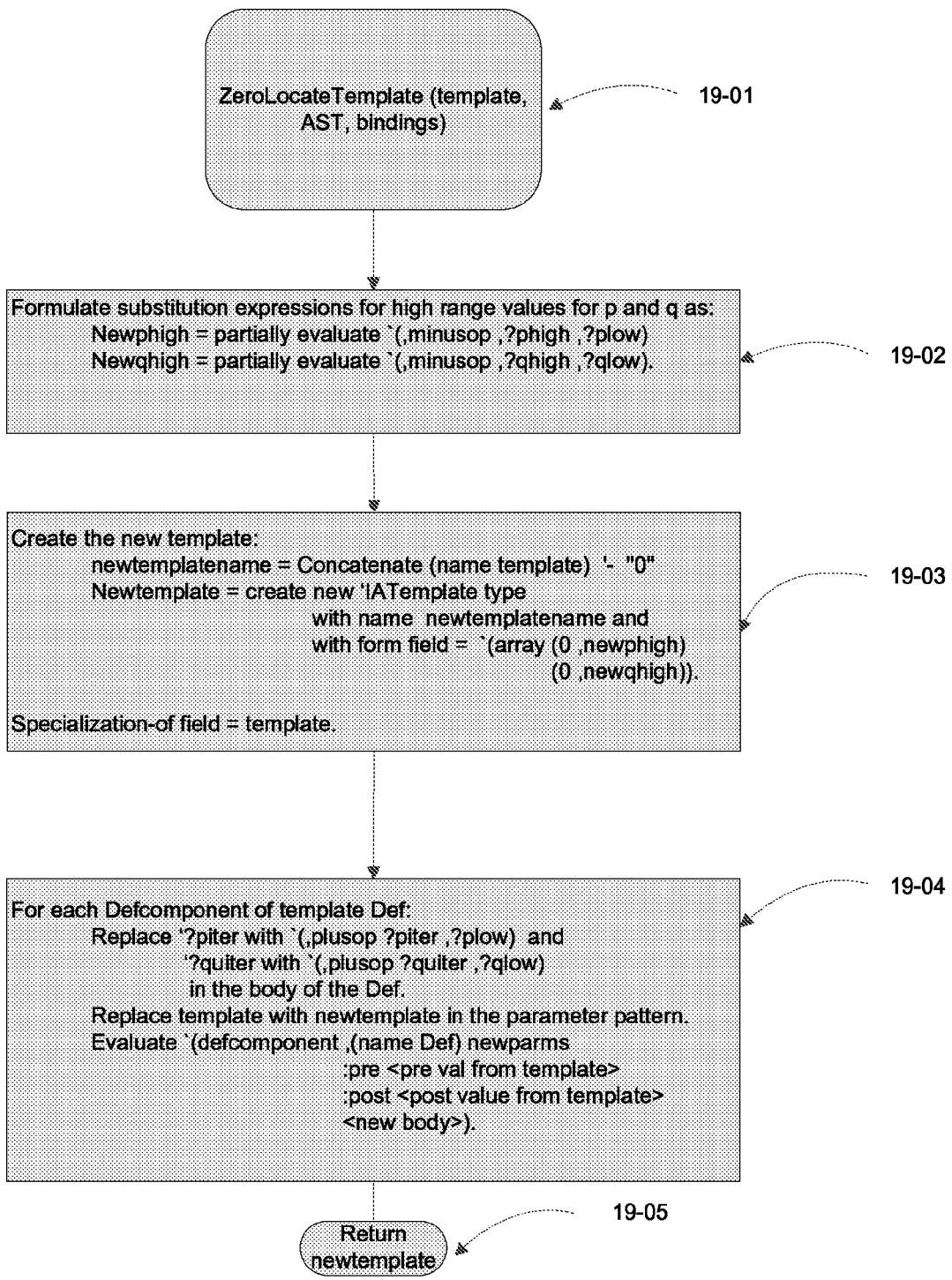
FIG. 19 is the routine that actually does the relocation of the Defcomponents of a template to start at zero.
Figure 20:
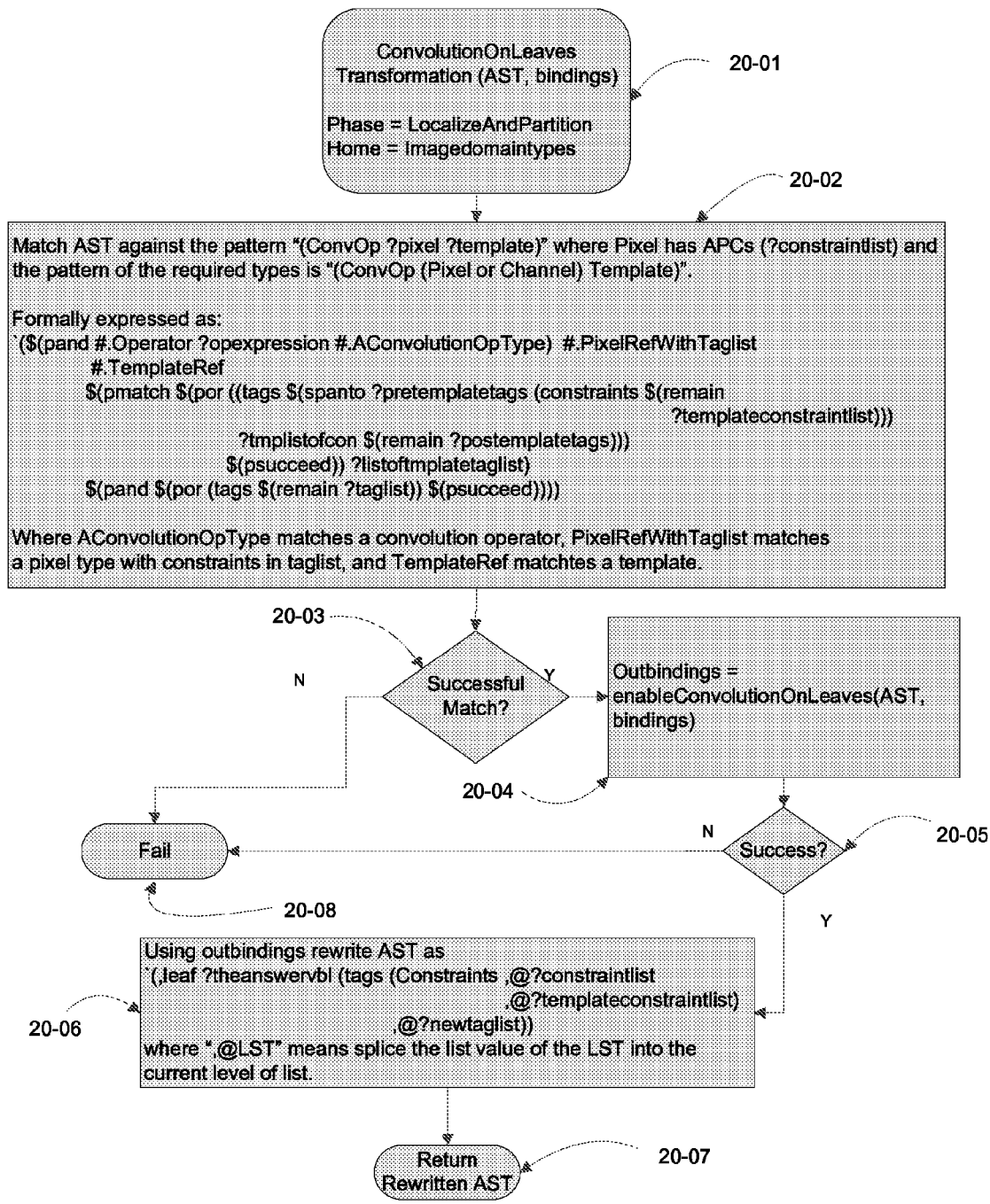
FIG. 20 is the transformation that recognizes (ConvolutionOp ?pixel ?template), partitions the template for parallel computation and coordinates the pixel and template APCs.

Initial Type Inference. Type inference rules are applied to the AST specification so that all items in the specification tree have their data type on their property lists (i.e., their "tags" list, as used earlier). This type information is kept up-to-date incrementally as the specification tree is rewritten. (FIG. 12a-b)

Localization and partitioning. This phase introduces loop abstractions (APCs) and loop variables implied by the data structure types and operators. These loop abstractions and their variables are propagated up the expression tree and are merged when possible to allow the maximum amount of loop sharing. When equivalent loop variables and abstractions are merged, some will be discarded while others survive. In addition, template neighborhoods will be re-indexed (via specialization) to iterate over a GPL-friendly range (e.g., [0 . . . n]) rather than a domain-friendly range (e.g., [−1 . . . 1]). (FIGS. 17-19) For example, s will be specialized to a new template s-0. Also during this phase, domain knowledge (e.g., the "partitionmatrixtest" and "edge" constraint objects in definitions [11, 12, and 16]) provided by the user in the definition of the IL are used to generate abstractions (i.e., APCs) for partitions and sets of partitions. These partition APCs are associated with some loop APC and will be used when their associated loop APC is transformed into a GPL-like loop structure. (FIGS. 6, 7a-e, FIGS. 13-28, FIGS. 46-47b)

Figure 29:
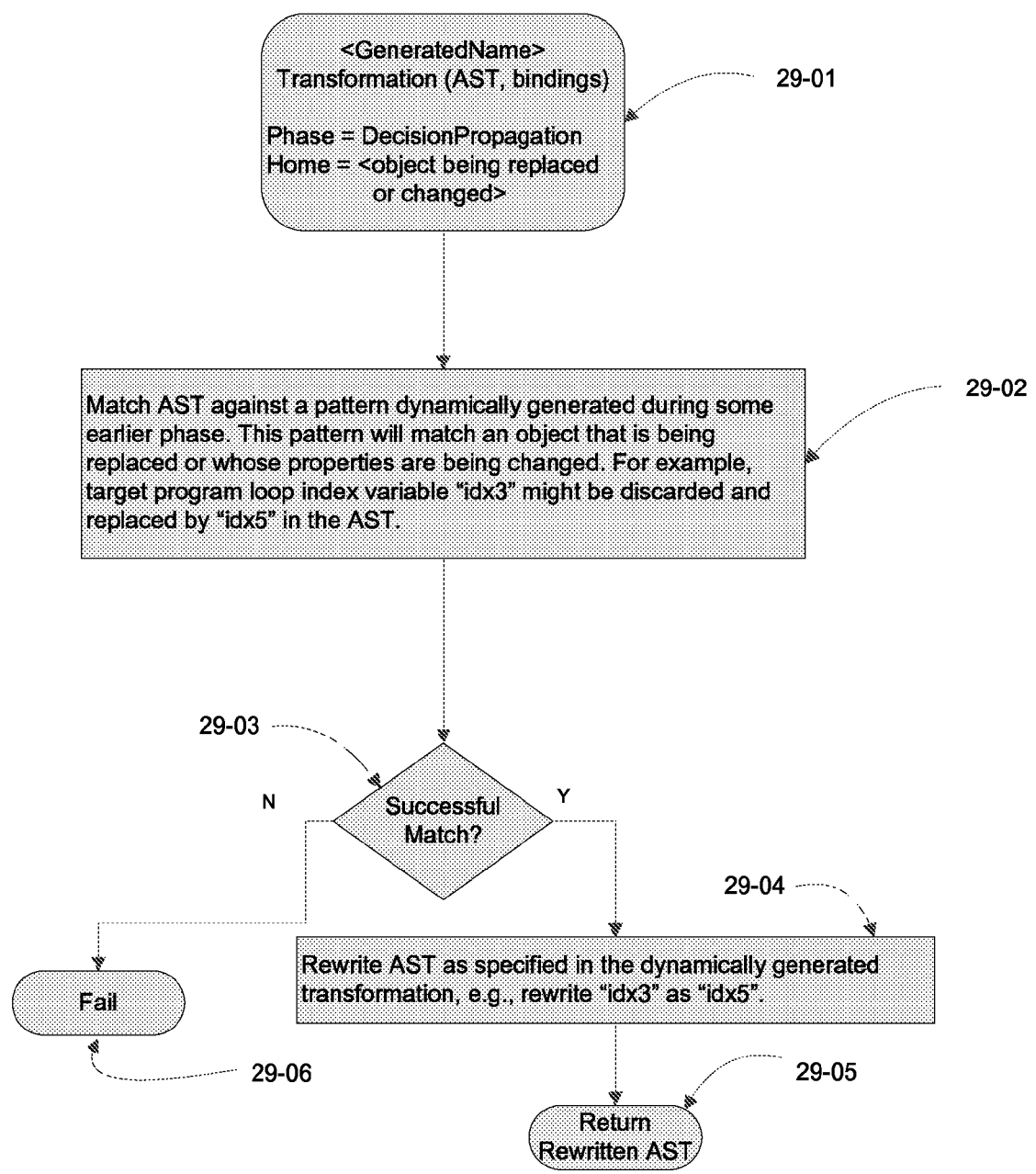
FIG. 29 is the 2DGenerateLoop transformation, which transforms an APC constraint into a pre-GPL loop with proposition-based description (i.e., suchthat field).
Figure 30A:
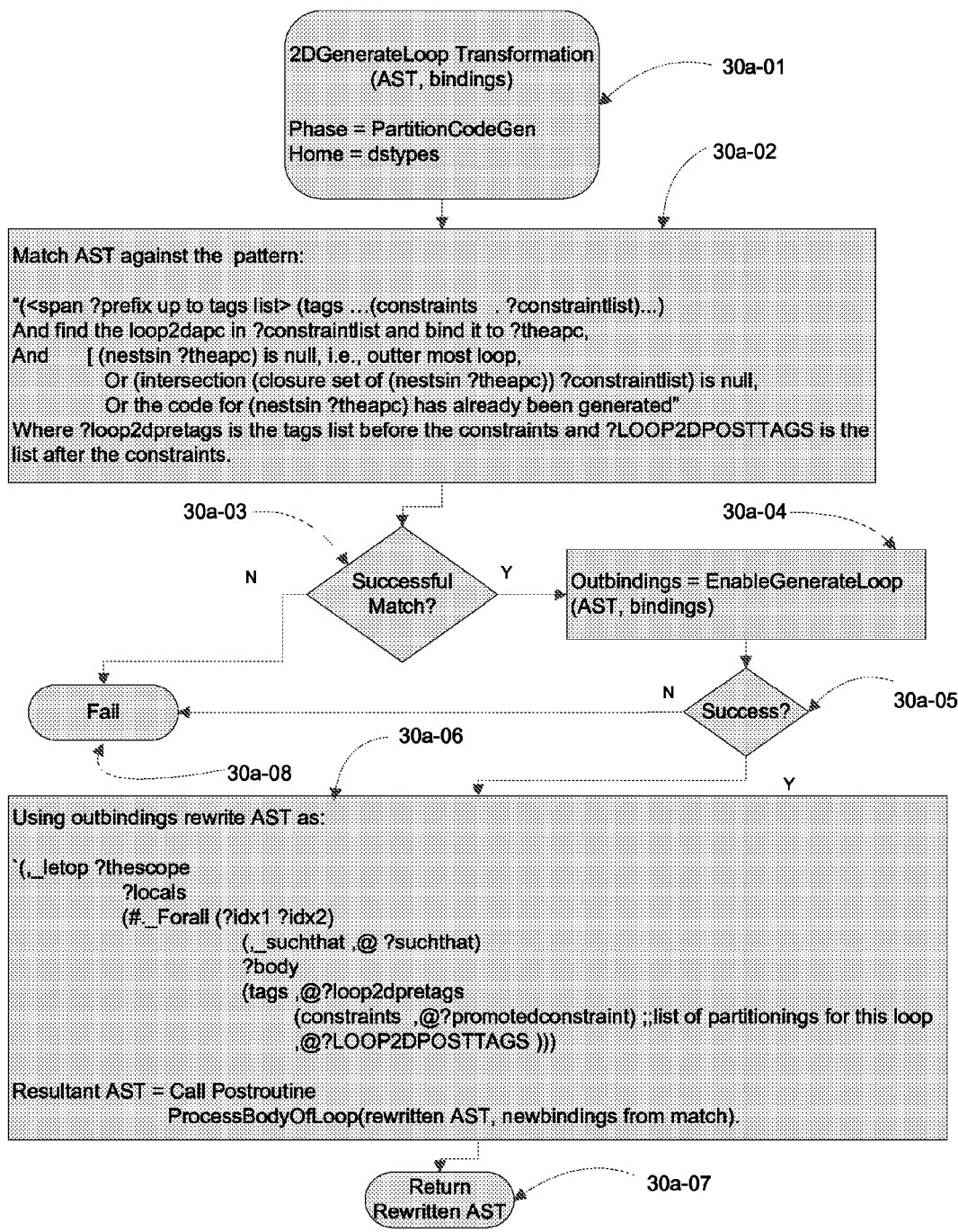
FIG. 30a is the preroutine for the 2DGenerateLoop transformation of FIGS. 29, 32, and 33.
Figure 30B:
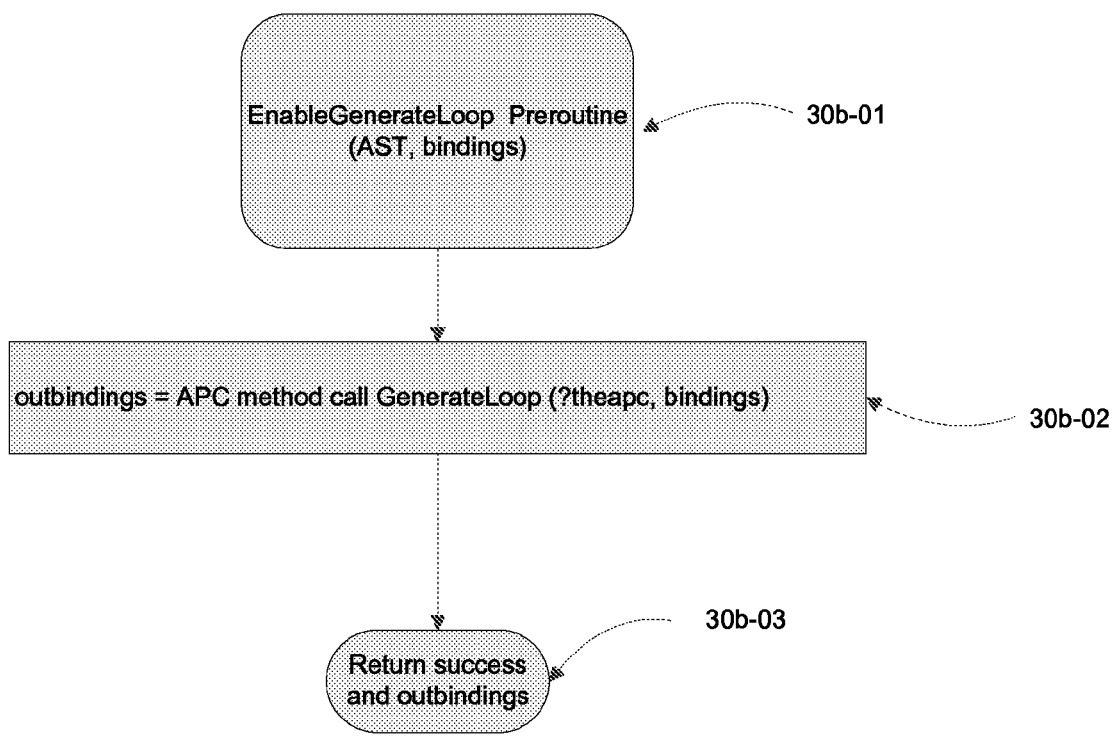
FIG. 30b is the postroutine for the 2DGenerateLoop transformation of FIGS. 29, 32, and 33.
Figure 31:
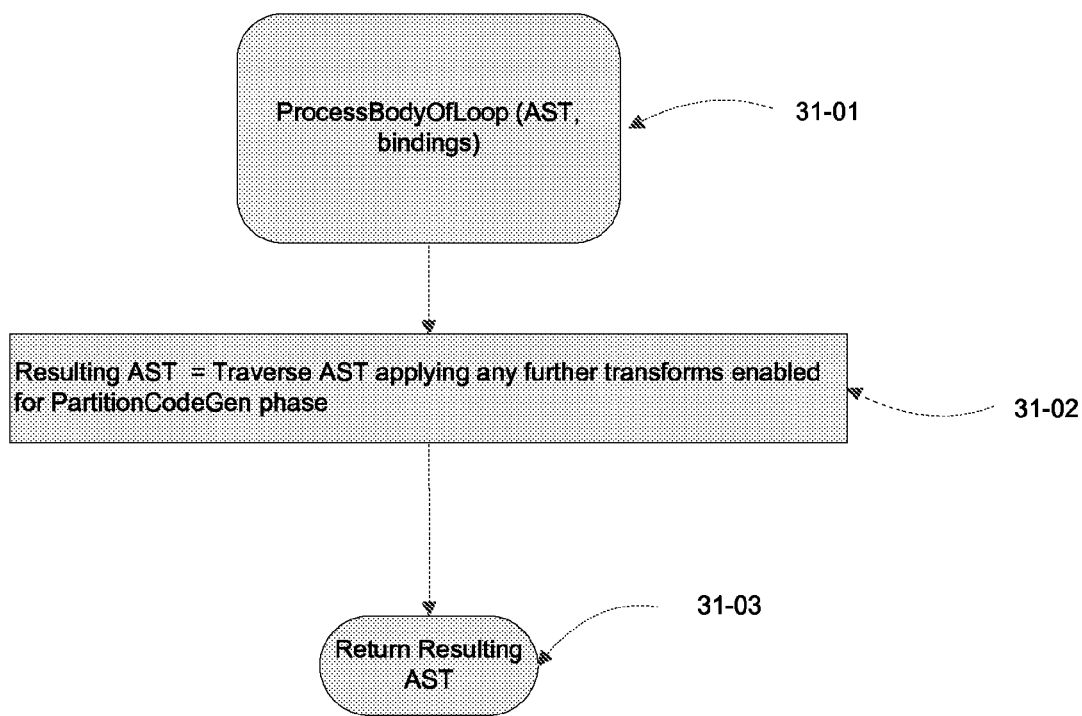
FIG. 31 is the ProcessBodyOfLoop postroutine of the 2DGenerateLoop transformation.
Figure 32:
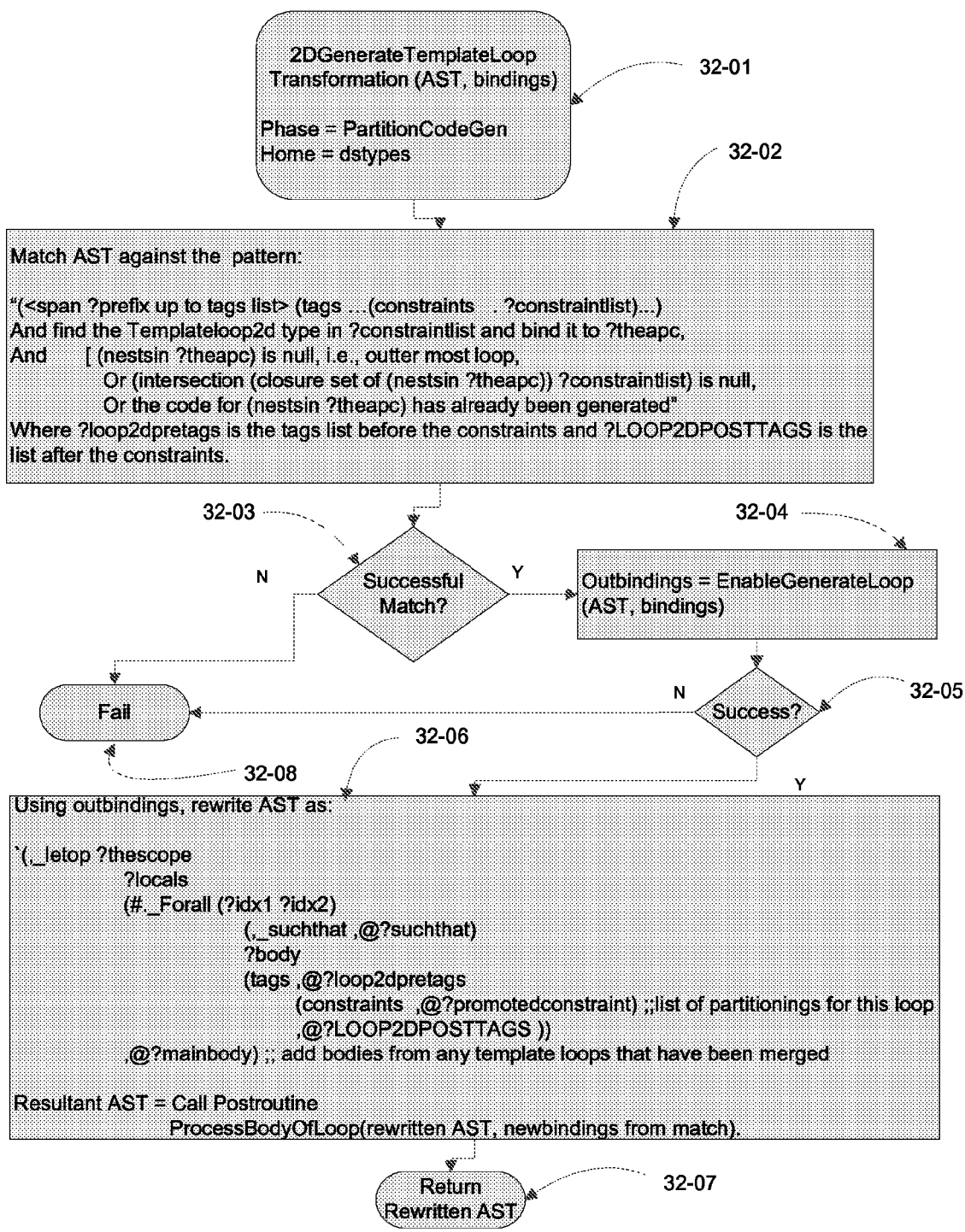
FIG. 32 is the 2DGenerateTemplateLoop transformation, which transforms a Template APC constraint into a pre-GPL loop with propositional description.
Figure 33:
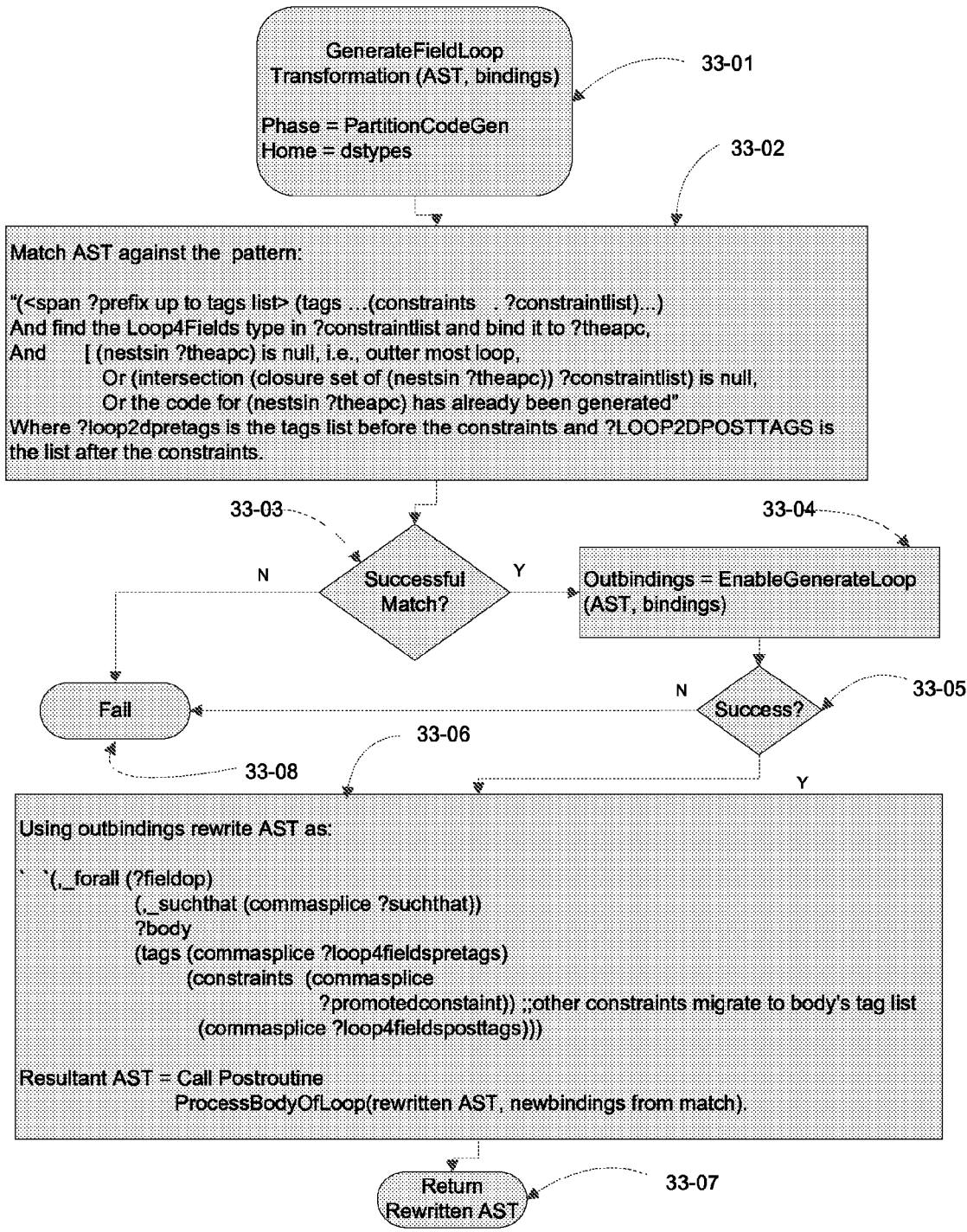
FIG. 33 is the GenerateFieldLoop transformation, which transforms a Template APC constraint into a pre-GPL loop with propositional description.
Figure 34A:
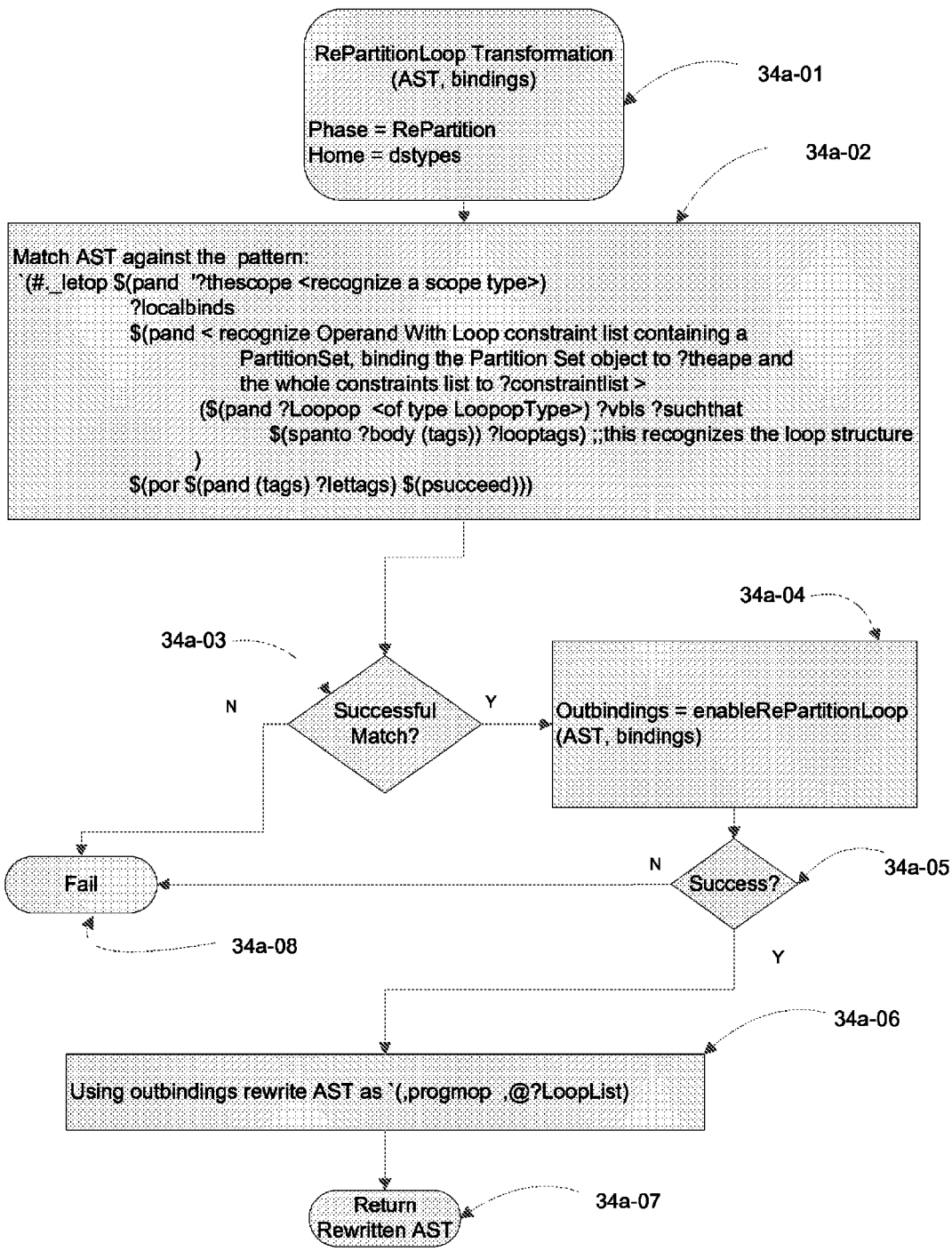
FIG. 34a is the ReParitionLoop transformation, which clones specializations of a loop based on partition objects containing specialized objects and their Defcomponents.
Figure 34B:
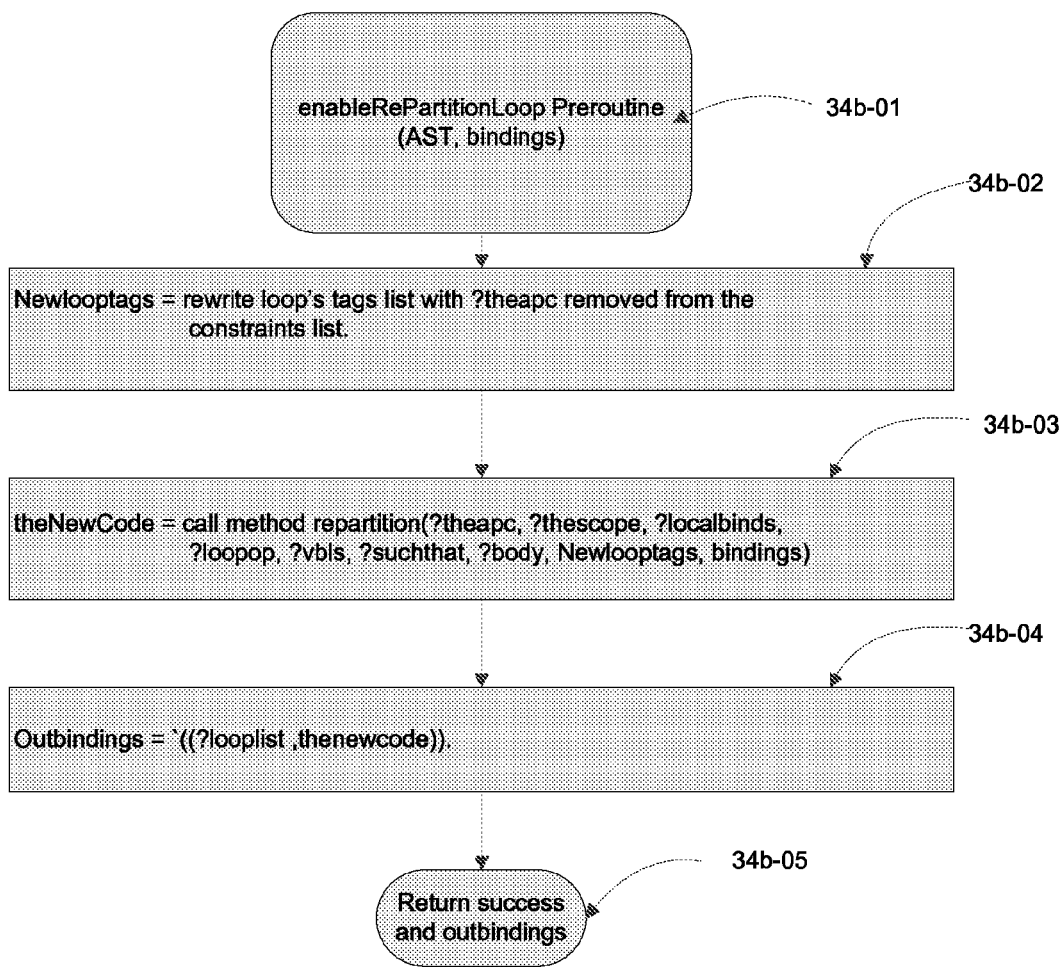
FIG. 34b is preroutine of the FIG. 34a ReParitionLoop transformation.

Decision Propagation. This phase effects and propagates the sharing decisions made in the previous phase. Each such decision (e.g., target program index idx3 replaces an equivalent idx5, which is to be discarded) is represented by a dynamically created transformation that will rewrite all lingering instances of discarded items (e.g., change idx5 to idx3). (FIG. 29)

Loop Generation. This is the phase where the GPL-like abstractions (e.g., loops and let scopes) first begin to appear in the AST. They are derived from loop APCs. The GPL-like loops generated in this phase are the seeds for various partition-specific loops. The GPL-like loops are still abstract in that none of the user defined template components or domain operators (e.g., convolution operators) have been inlined. Importantly, the range of the seed loop is abstractly specified by a set of logical propositions from which the concrete loop range and increment will be inferred. These logical propositions are quite different from the propositions used in formal proof procedures (e.g., in proof of correctness). The logical propositions are assertions about the eventual GPL forms from a problem or programming domain (not GPL domain) point of view. That is, although they may include propositions about the program (e.g., loop ranges), they may also include assertions about the programming process. For example, they may describe or refine loop range and increment information; they may introduce design notions such as loop answer variables that will require some data management code; and they may require certain scoping and privatization properties for generated variables. Some of the propositions that may affect the concrete range or increment values are still abstract and will remain so until the inlining phase is complete. Until then, it is not possible to infer the loop's concrete range or increment information because those design decisions have not yet been finalized. An example of such an abstract proposition is the IL partitioning proposition "(partestx s-0)," whose generation was triggered by the "(constraints partitionmatrixtest edge)" domain knowledge provided by the user. (FIGS. 30-33, FIGS. 48a-b)

Loop Partitioning. At this point, the seed loops are cloned based on the partition set APC associated with the seed loop. Each occurrence of a template (say s-0) in the seed loop, will be replaced by one of the specializations of s-0 in the various partition APCs (e.g., s-0-edge1, s-0-edge2, s-0-edge3, s-0-edge4 or s-0-default) to generate one of loop clones (i.e., a partition-specific loop). Each such loop clone will evolve into GPL code that handles a separate part of the convolution computation. A few other housekeeping tasks are performed (e.g., making scopes unique to each loop to assure that loops are thread-safe). (FIGS. 34*a-b*, FIGS. 49*a-b*)

Figure 35:
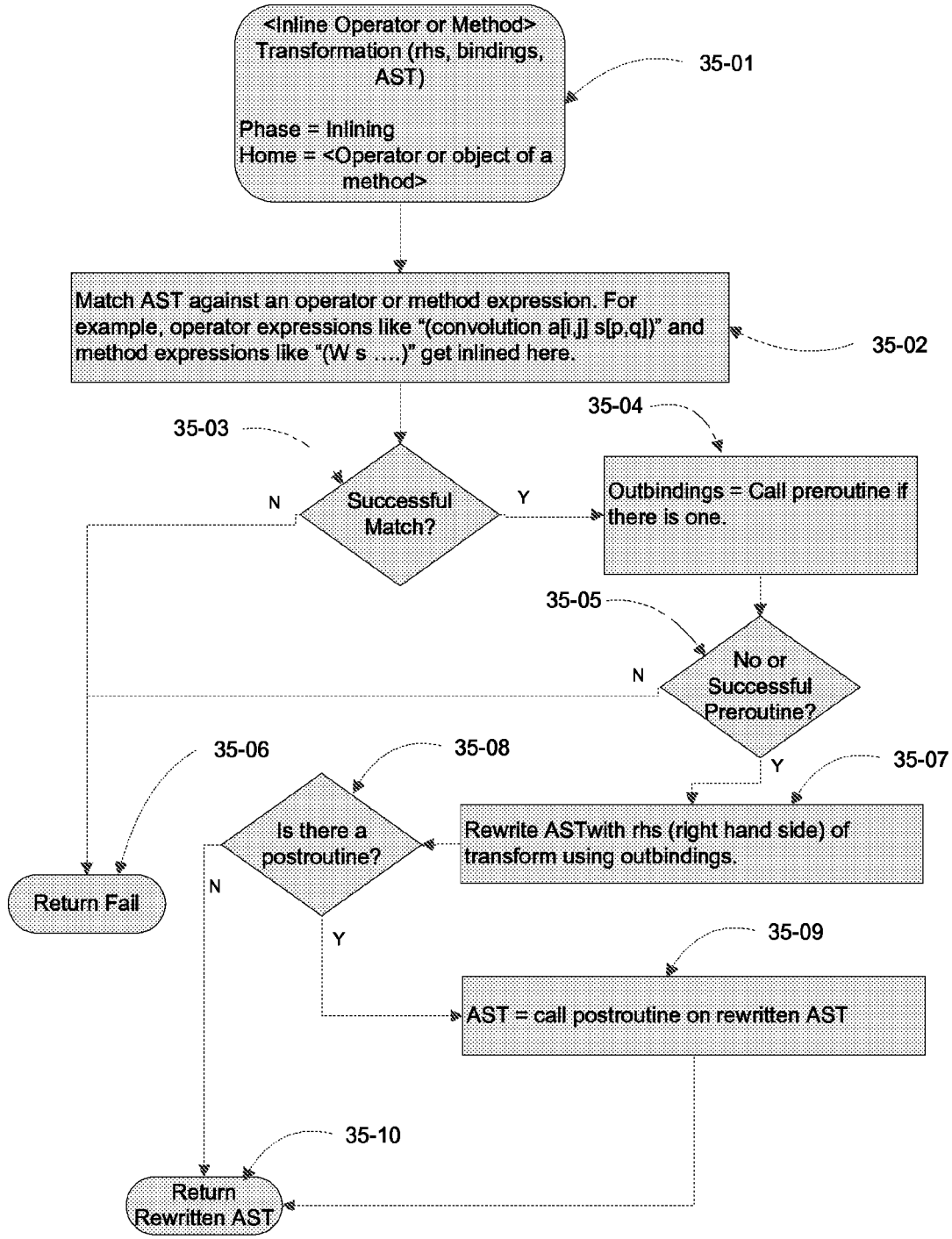
FIG. 35 is a generic form describing all inlining transformations that replace pseudo-code expressions with their concrete definitions (e.g., operators such as convolution and Defcomponents such as w). Each separate problem domain (e.g., image processing and data structures) will have its own unique set of inline-able transformations. This logic arises from ApplyTransform shown in FIG. 50e.
Figure 36:
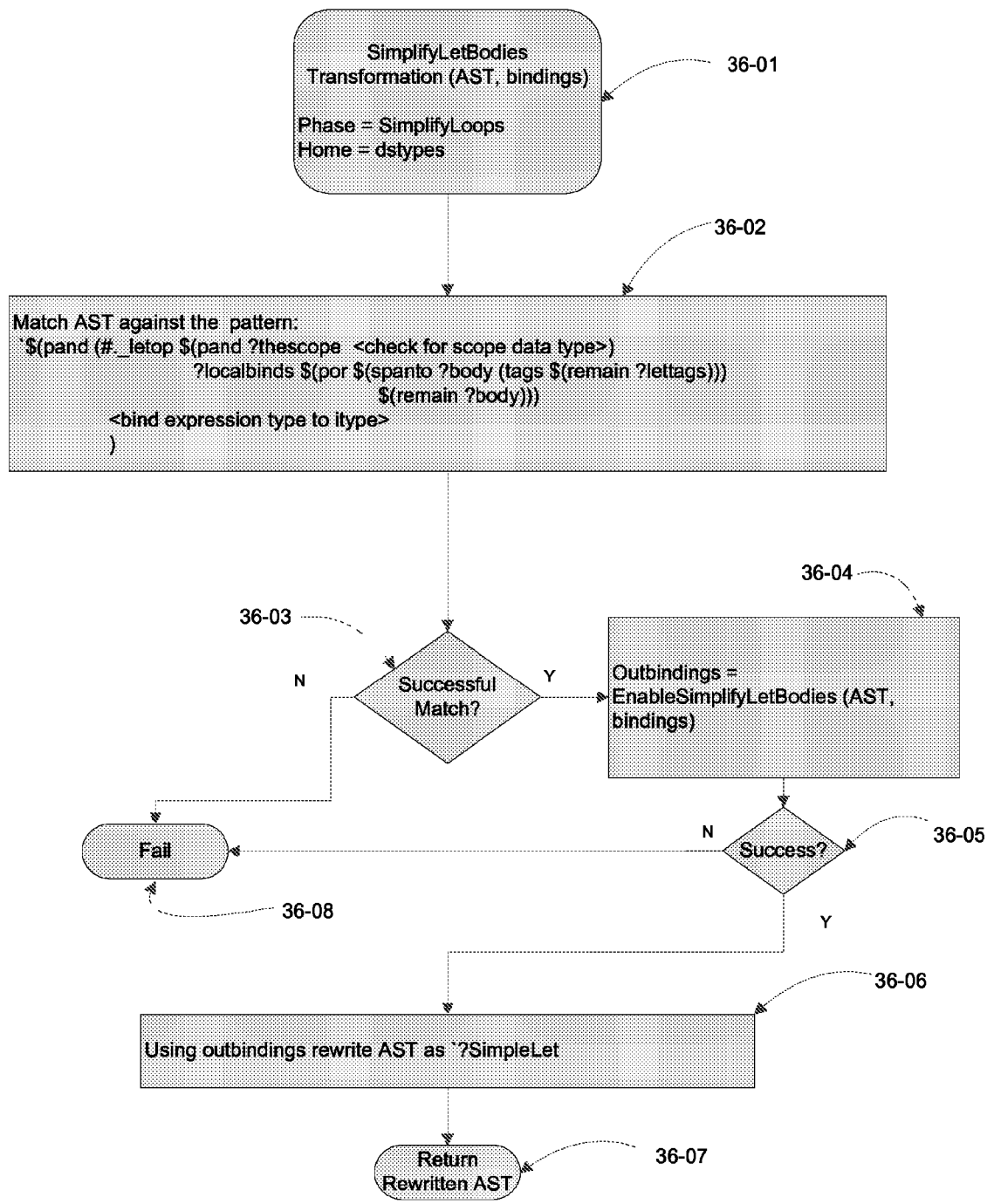
FIG. 36 is the SimplifyLetBodies transformation, which eliminates reduces code to minimal forms via partial evaluation.
Figure 37:
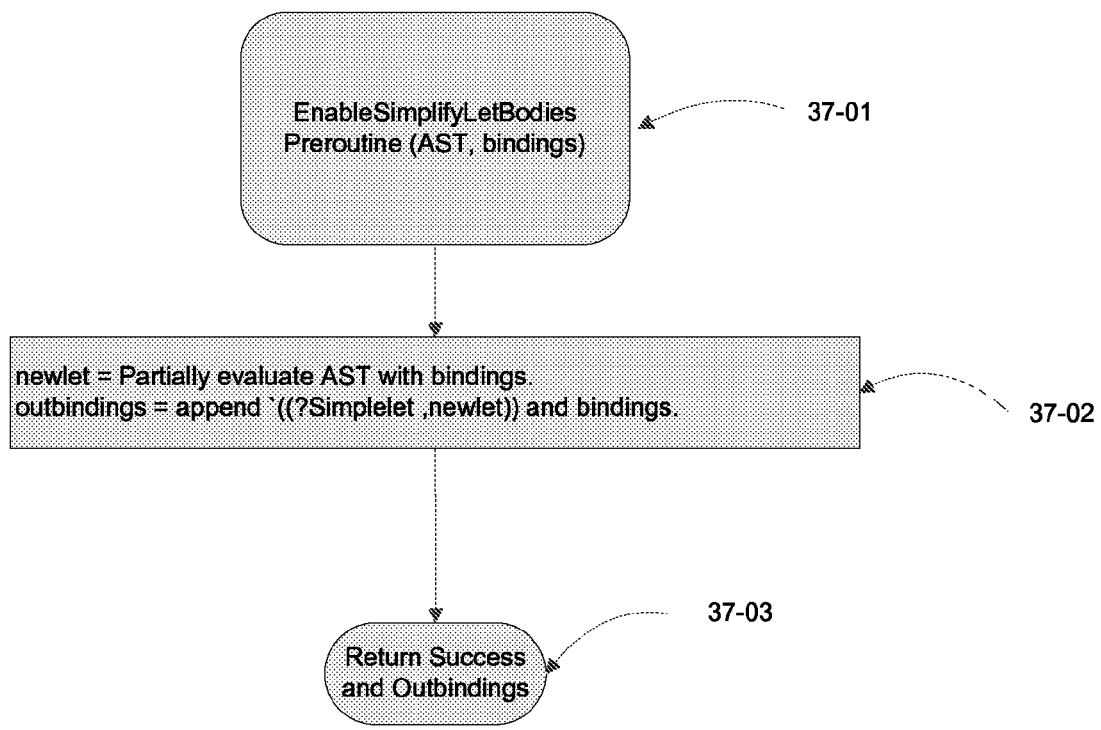
FIG. 37 is the preroutine of SimplifyLetBodies transformation, EnableSimplifyLetBodies, which does the actual simplification.
Figure 38:
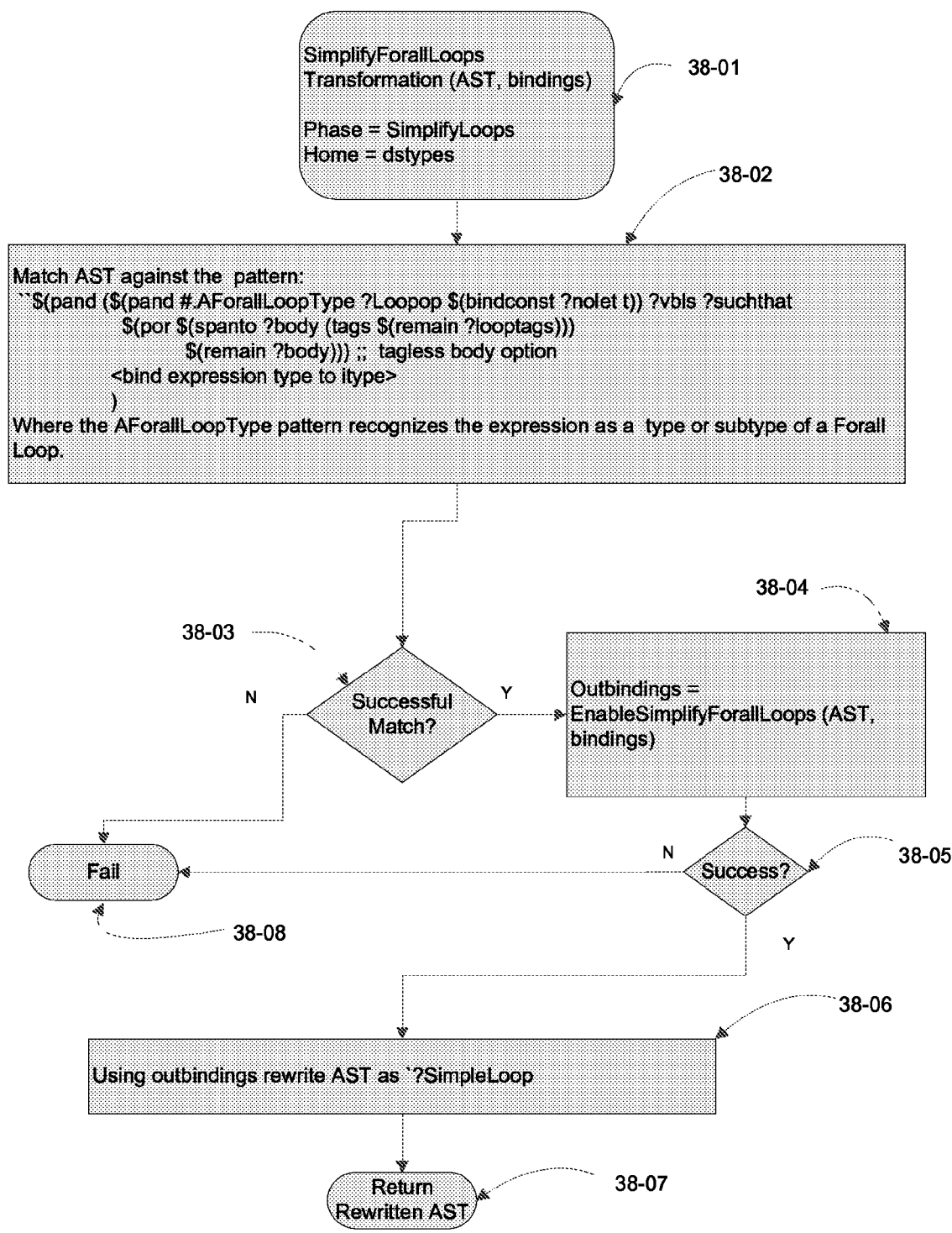
FIG. 38 is the SimplifyForallLoops transformation, which applies partial evaluation to eliminate redundant code and coverts loops over fields to a more GPL-friendly form.
Figure 39A:
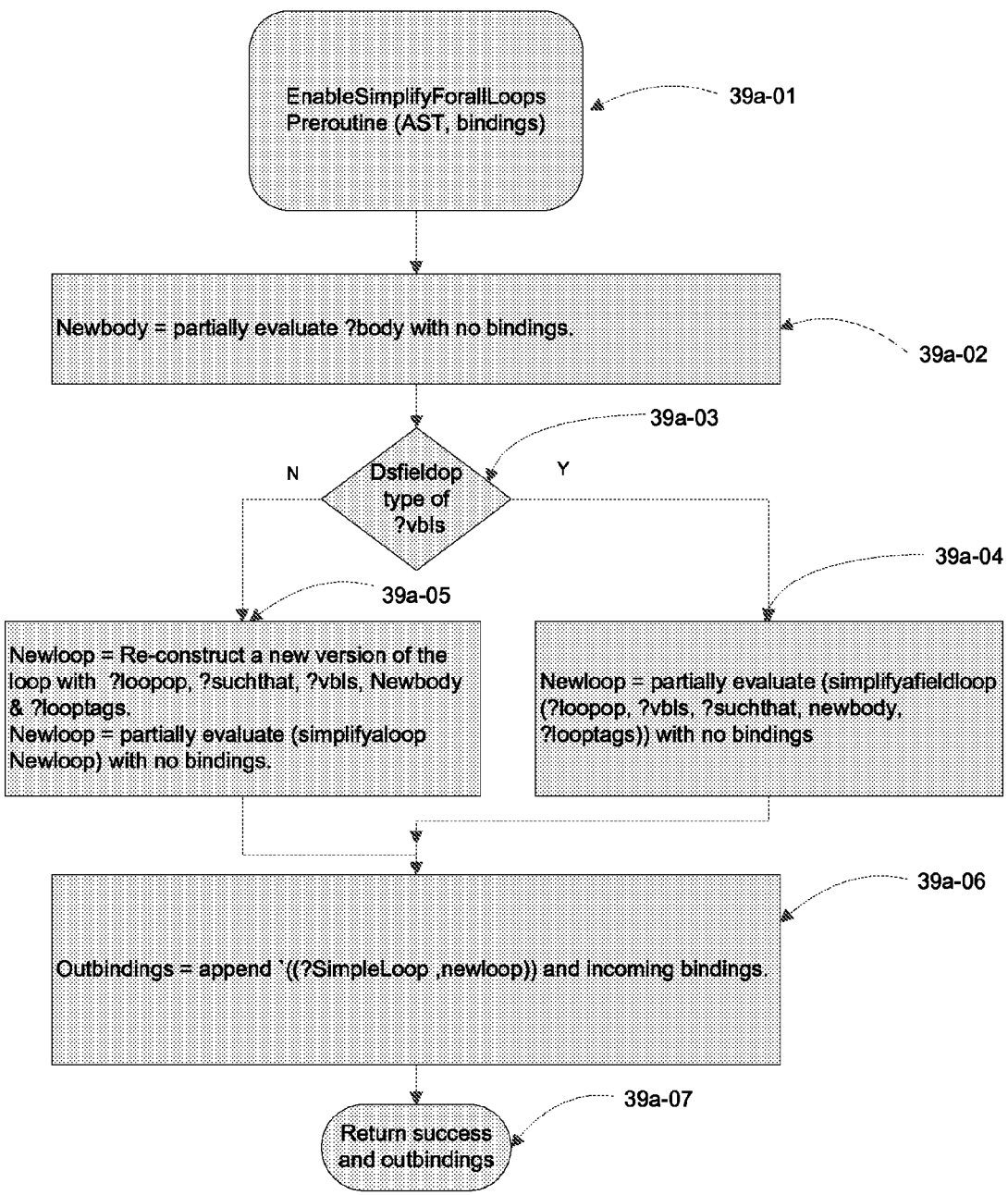
FIG. 39a is the EnableSimplifyForallLoops preroutine of the SimplifyForallLoops transformation, which does the actual simplification work via calls to other service routines.
Figure 39B:
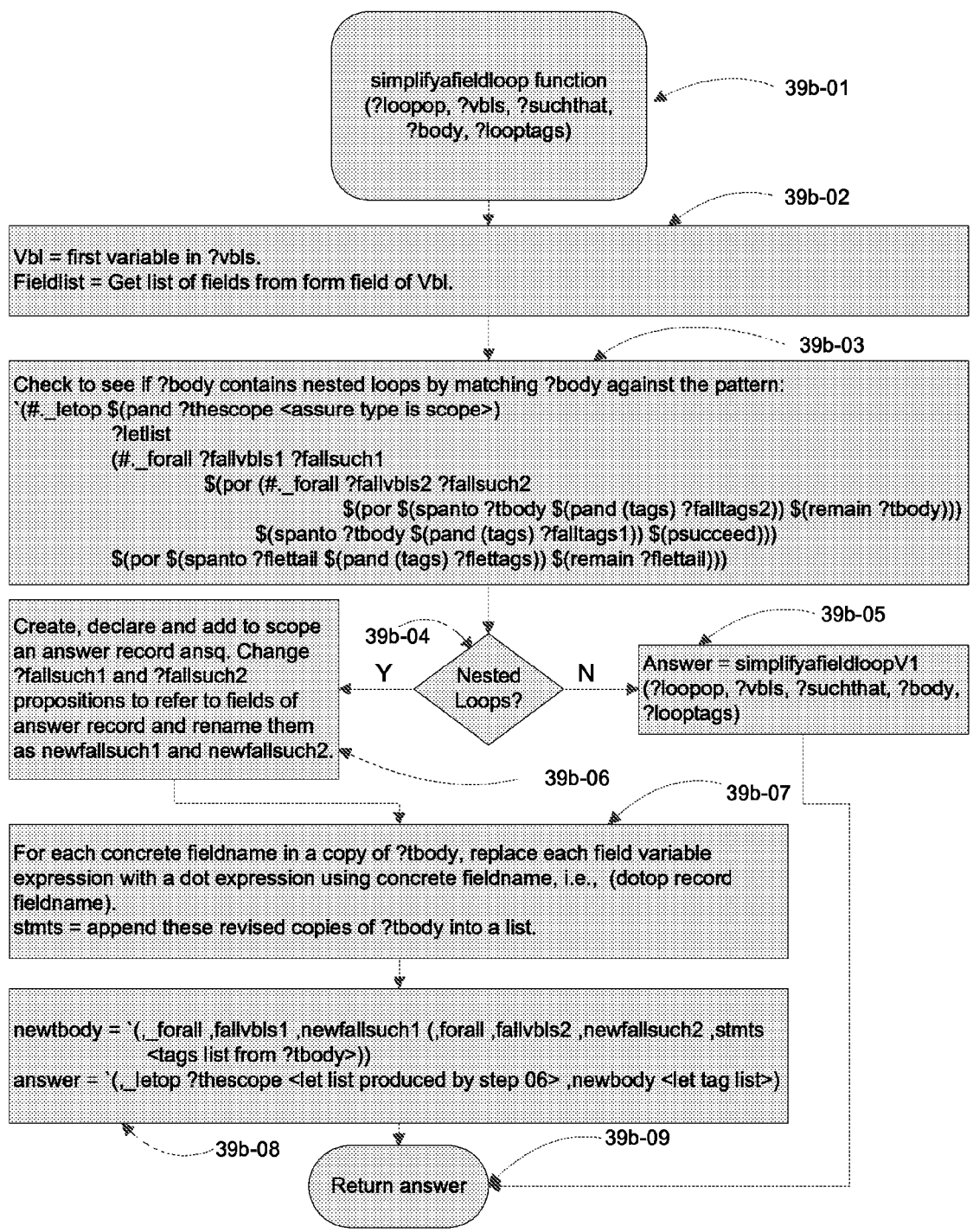
FIG. 39b is the Simplifyafieldloop service function called by EnableSimplifyForallLoops preroutine.
Figure 39C:
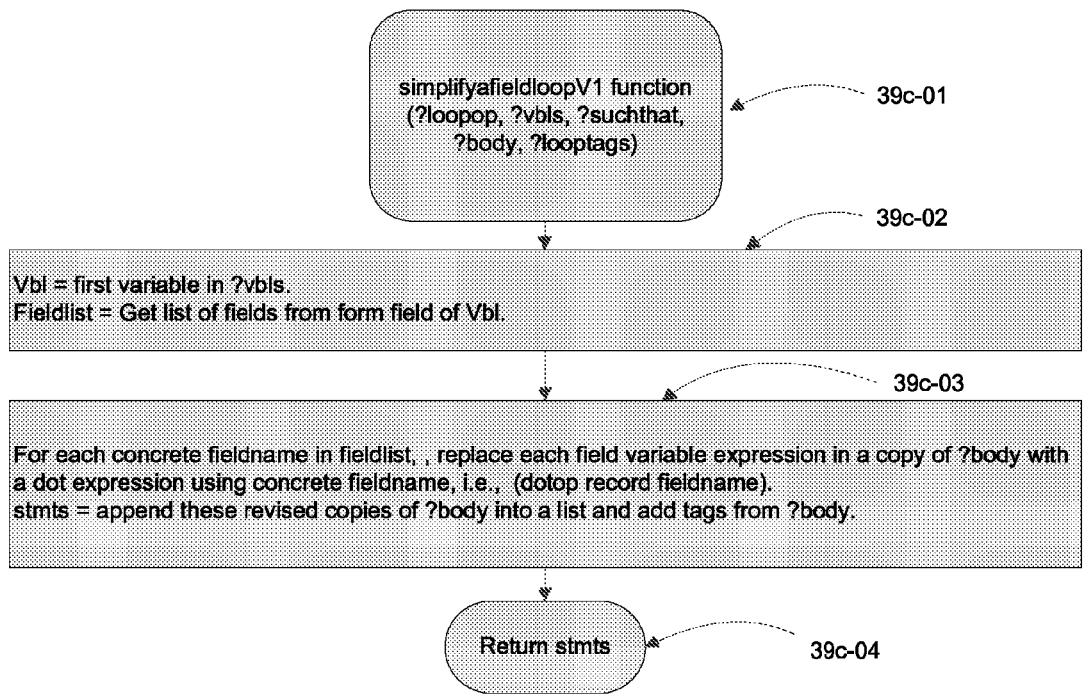
FIG. 39c is the SimplifyafieldloopV1 service function called by EnableSimplifyForallLoops preroutine, which converts a field loop body into a series of expressions with concrete fieldnames.
Figure 40:
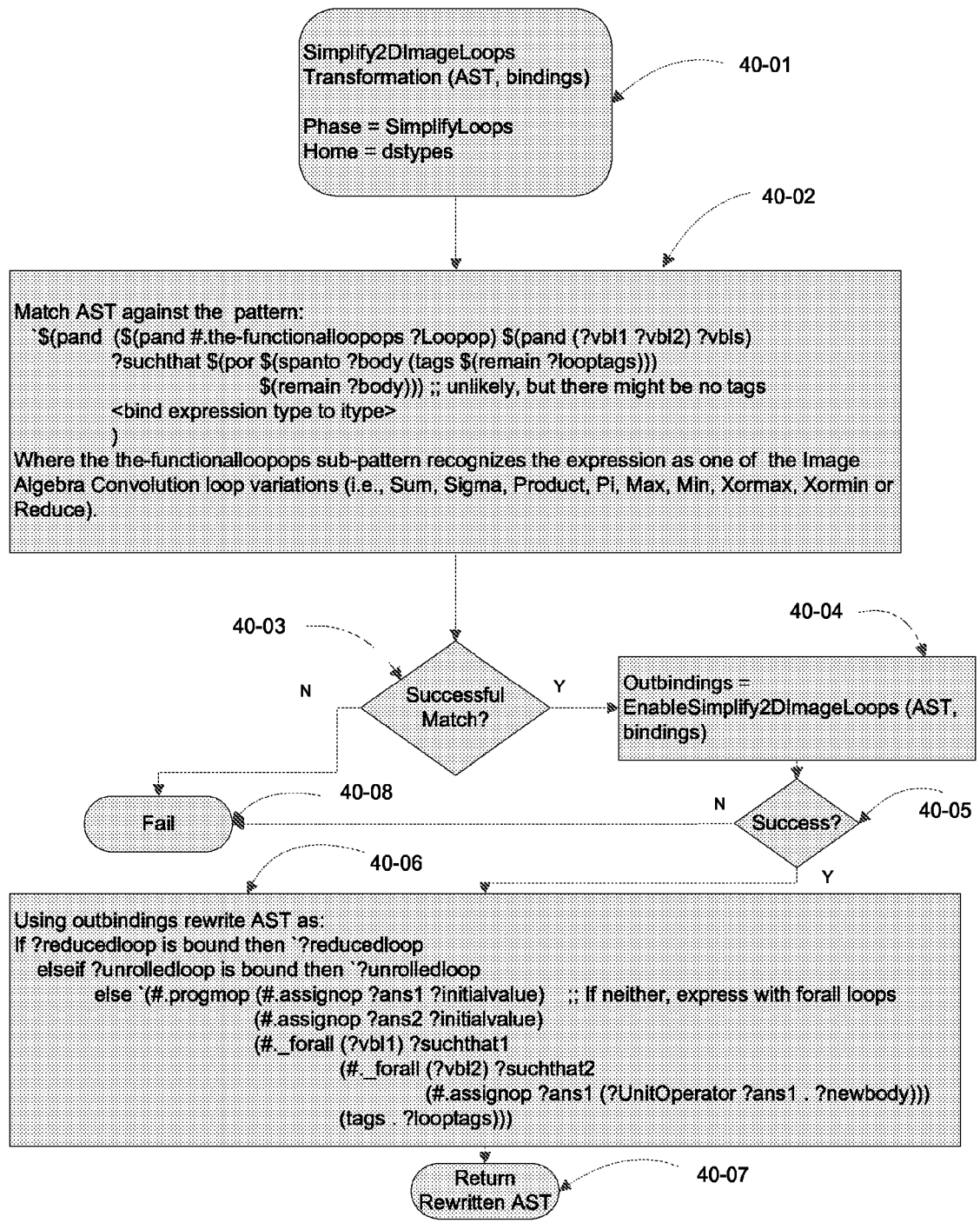
FIG. 40 is the Simplify2DlmageLoops transformation, which re-expresses the 2D loop in a pre-GPL form that incorporates conversions required by external constraints (e.g., execution environment).
Figure 41:
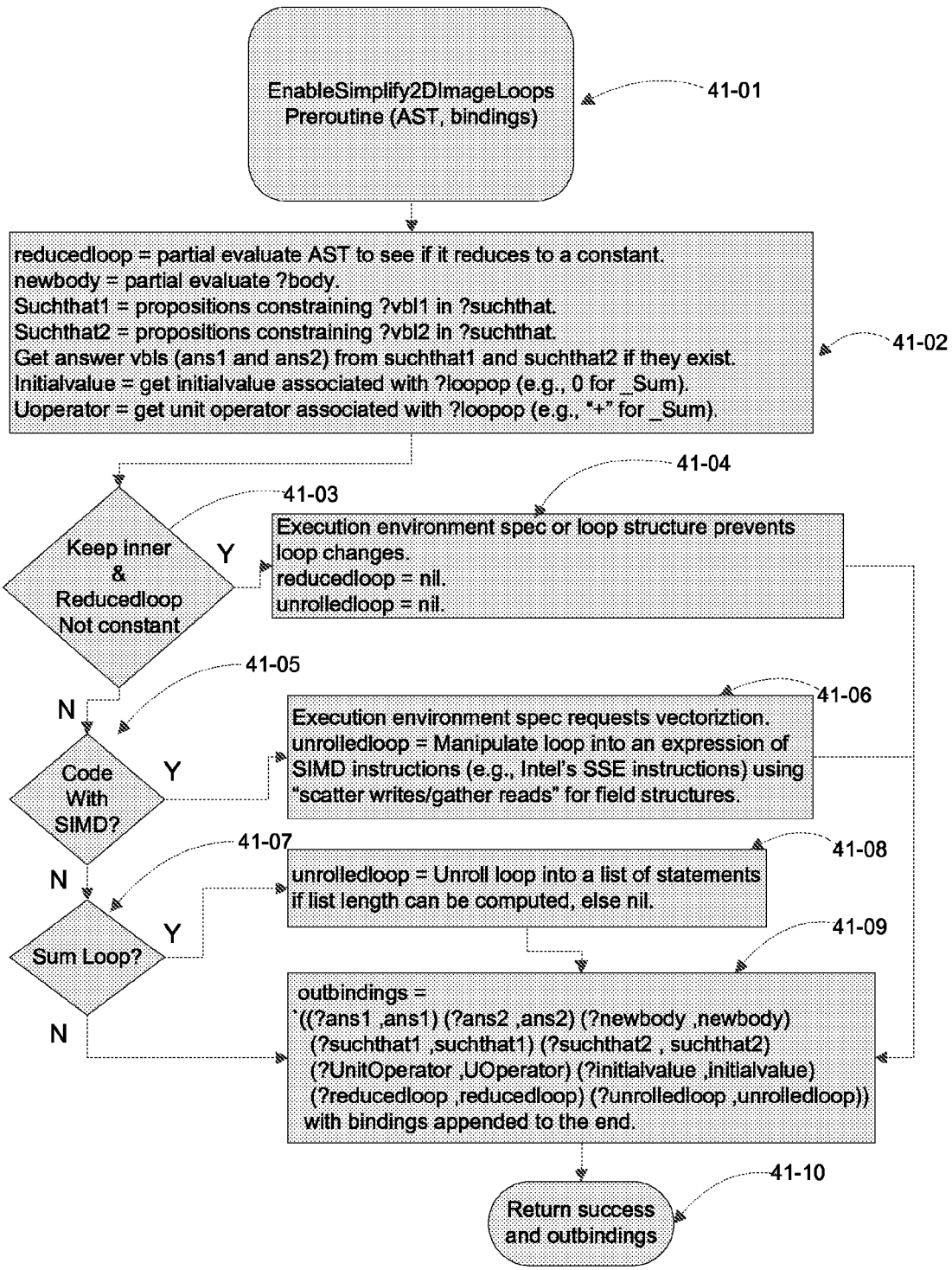
FIG. 41 is the Simplify2DlmageLoops preroutine EnableSimplify2DlmageLoops, which does loop manipulation if warranted and possible.

Definition Inlining. At this point, the domain operation definitions and the IL component definitions (e.g., row, col, w, and partestx) are inlined. After this phase, the domain specific abstractions (e.g., templates) will have disappeared from the AST except for some documentation on the property lists of the rewritten expressions to retain the domain knowledge underpinning the expression. Now, propositions like "(partestx s-0-edge1)" have become concrete propositions like "(==idx3 0)" and it is now possible to infer concrete loop range and increment information for loops. (FIG. 35)

Simplify Loops. Now, each clone loop is partially evaluated in an attempt to simplify it. And for the loops over the image edges, it works. The bodies of those loops reduce to an assignment of each pixel value to 0 because the arithmetic expressions of the form "(*(aref a (+idx3 (+p5−1)) (+idx4 (+q6−1)))0)" partially evaluate to 0 and the whole template loop summing up the 0's evaluates to 0. This leaves a loop over the edge pixels that assigns each new edge pixel to 0. In addition, some edge loops will evaporate completely (e.g., the loop over idx3 when "(==idx3 0)" is asserted to be true). Finally, the default loop (i.e., default of the image) does not simplify. (FIGS. 36-42*h*)

Figure 43A:
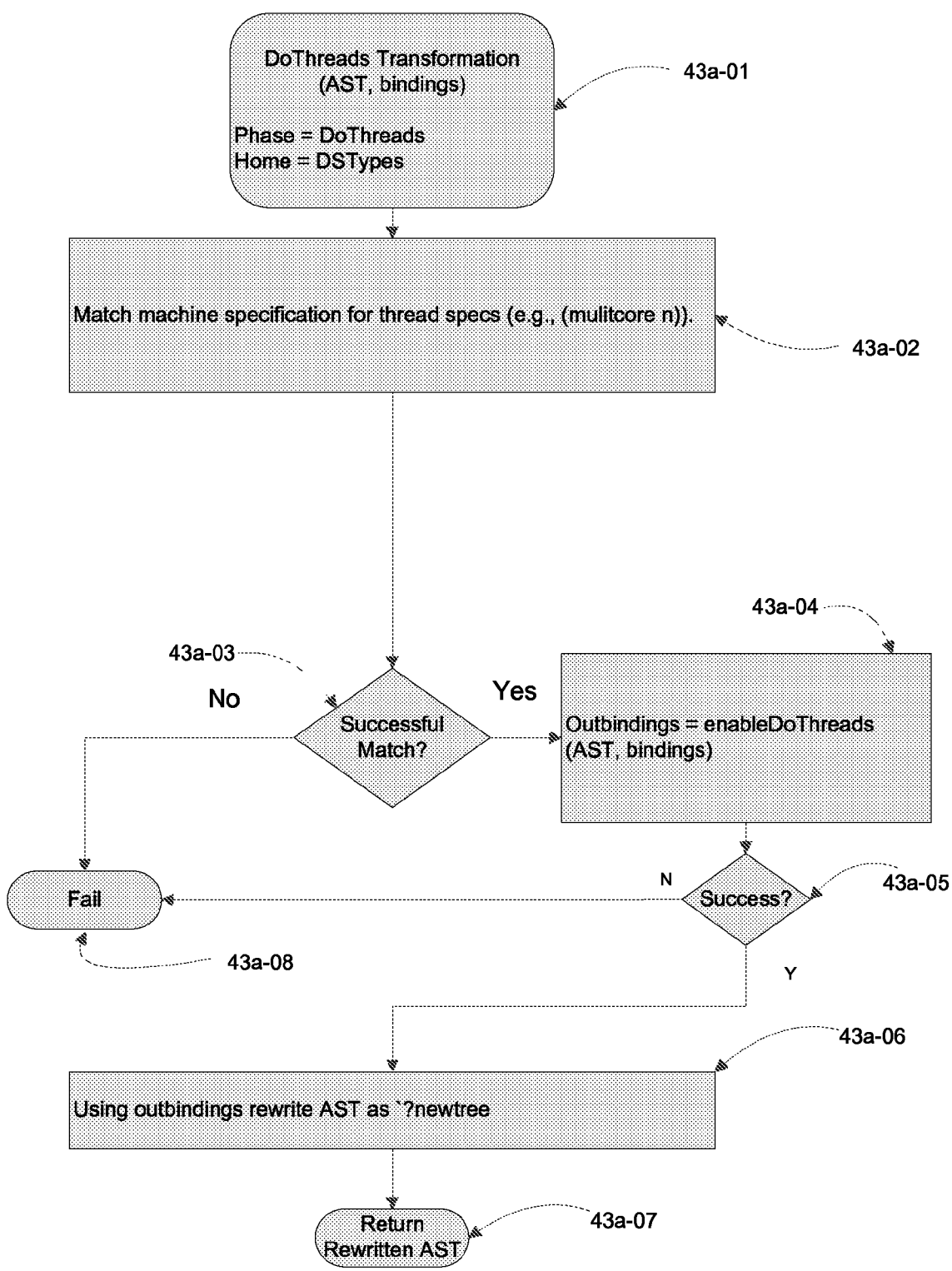
FIG. 43a is the DoThreads transformation, which if multicore threading is requested, builds as many thread routines as requested, assigns them to CPUs, finds loops with thread requests, moves those loops into the thread routines and sets up the data management code to connect to main line code.
Figure 43B:
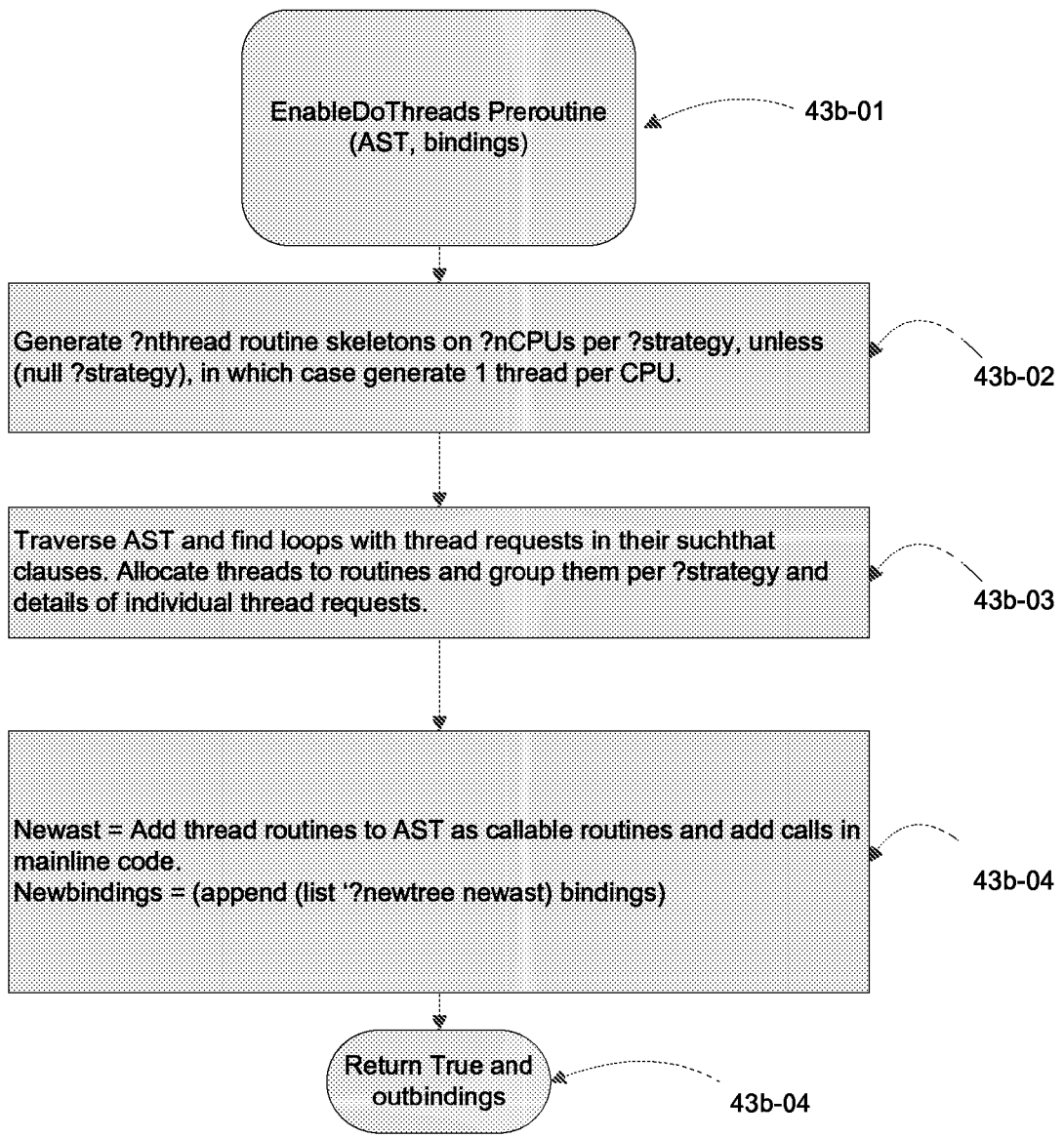
FIG. 43b is the EnableDoThreads preroutine.

Do Threads. If the machine spec has requested multicores, this phase builds out-of-line thread routines, finds loops with thread requests in their suchthat clauses, allocates them to the thread routines per a default or user requested strategy, and moves them out of line. It builds any data management code needed to interface to the mainline code. (FIGS. 43*a-b*).

Figure 44A:
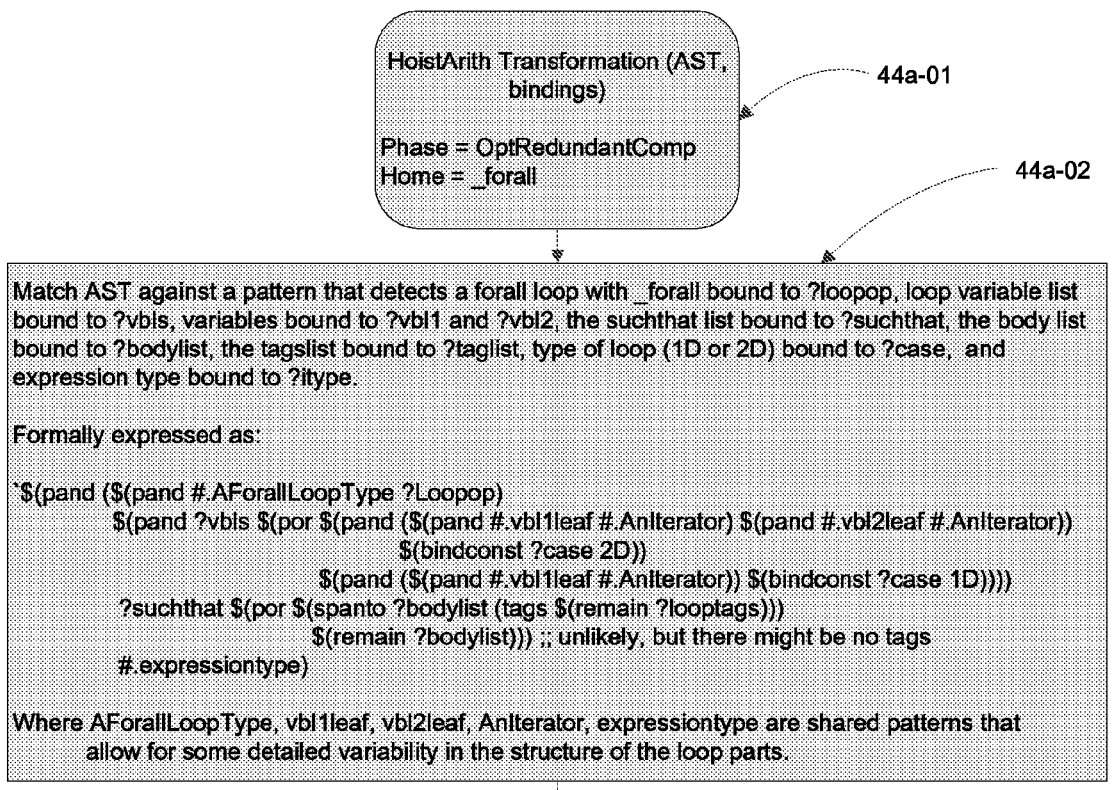
FIG. 44a is the HoistArith transformation that replaces the computation of redundant occurrences of arithmetic expressions with temporary variables whose values are computed only one. This optimization is optional and used only if the target compiler does not perform it.
Figure 44A:
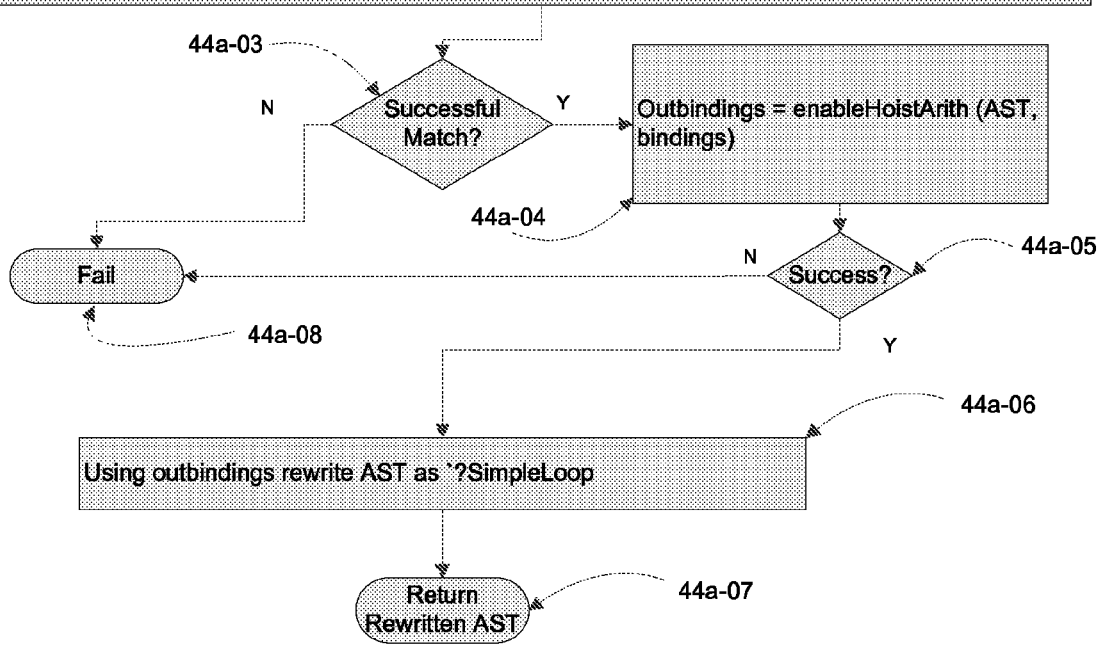
Figure 44B:
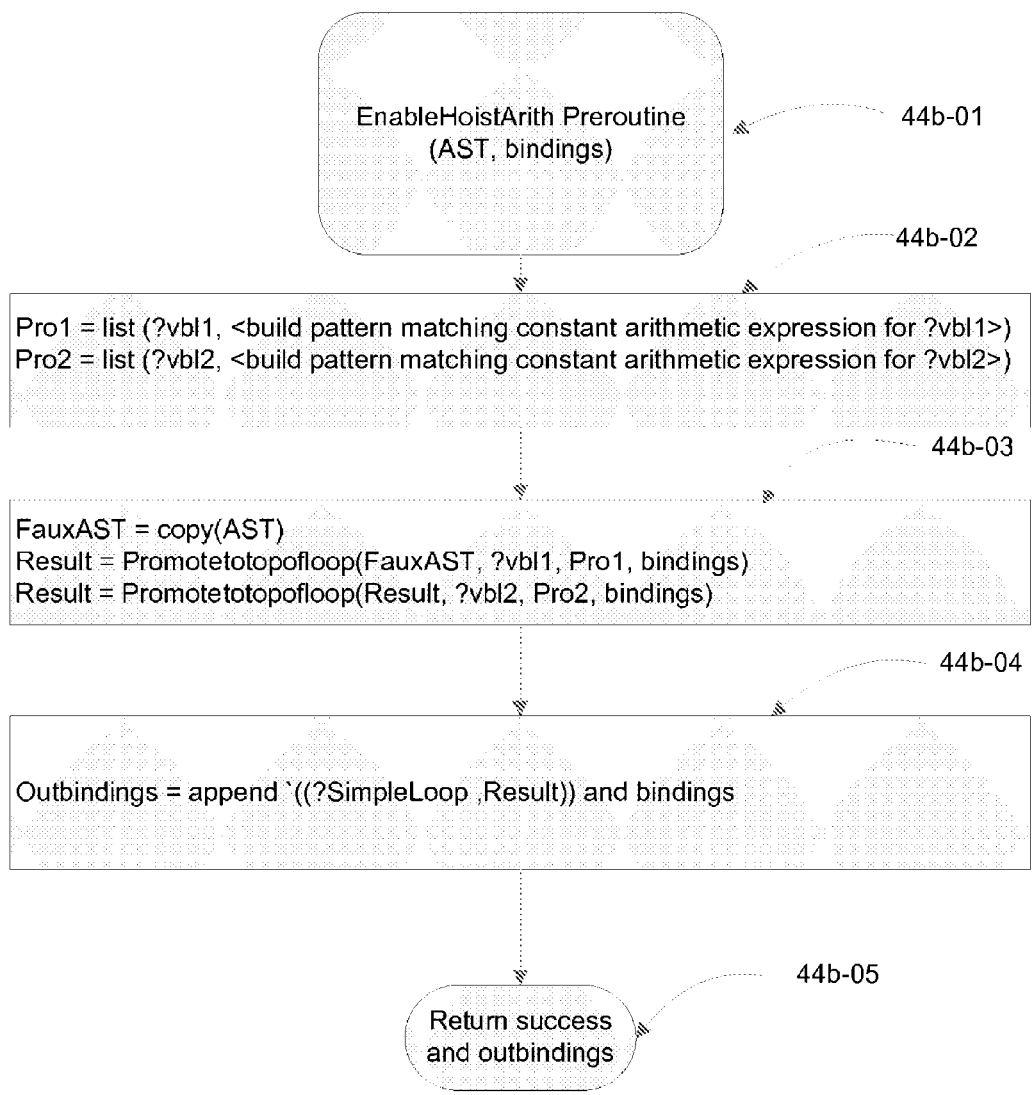
FIG. 44b is the EnableHoistArith preroutine for the HoistArith transformation.
Figure 44C:
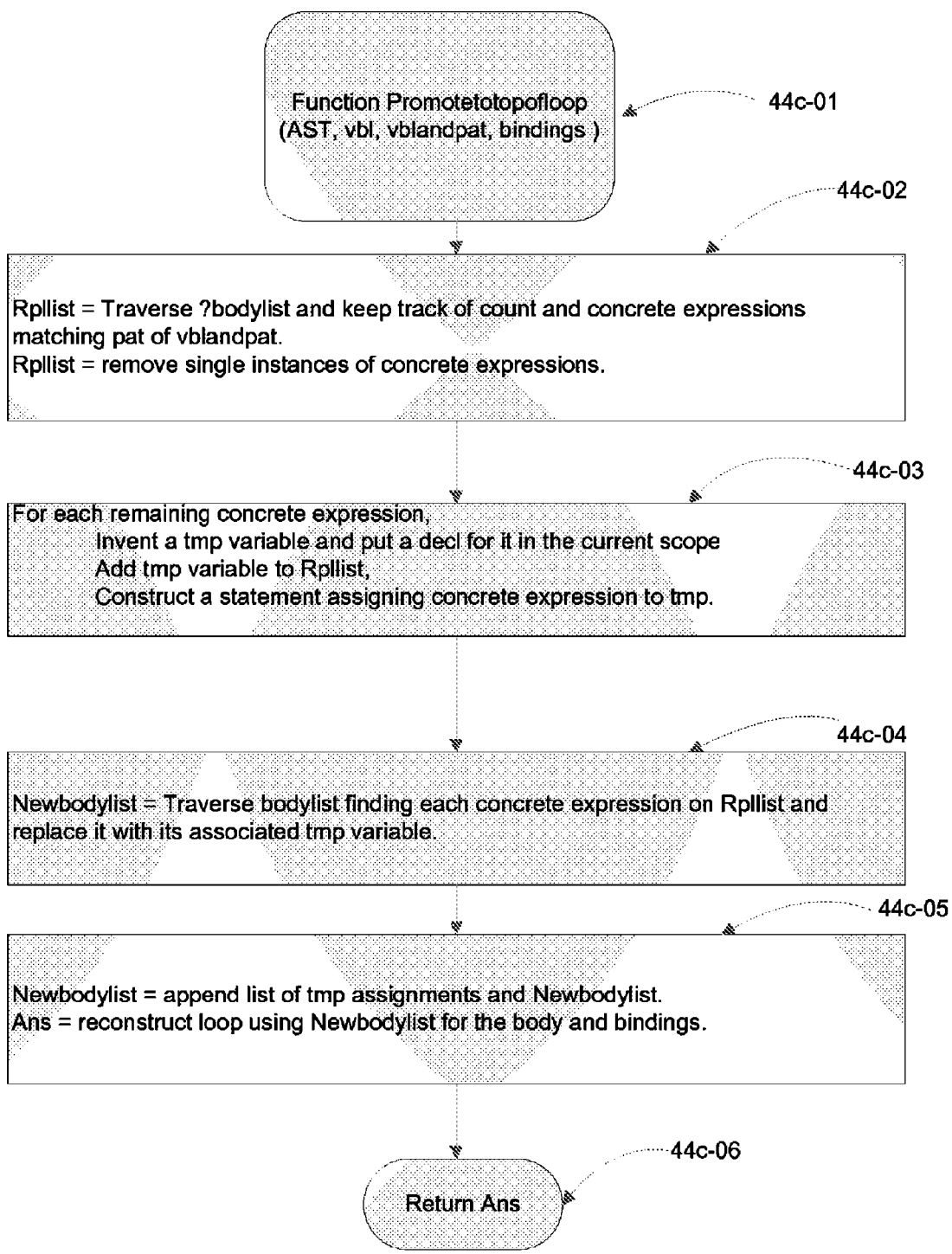
FIG. 44c is the Promotetotopofloop helper function that effects the moving of the expression computations.
Figure 44D:
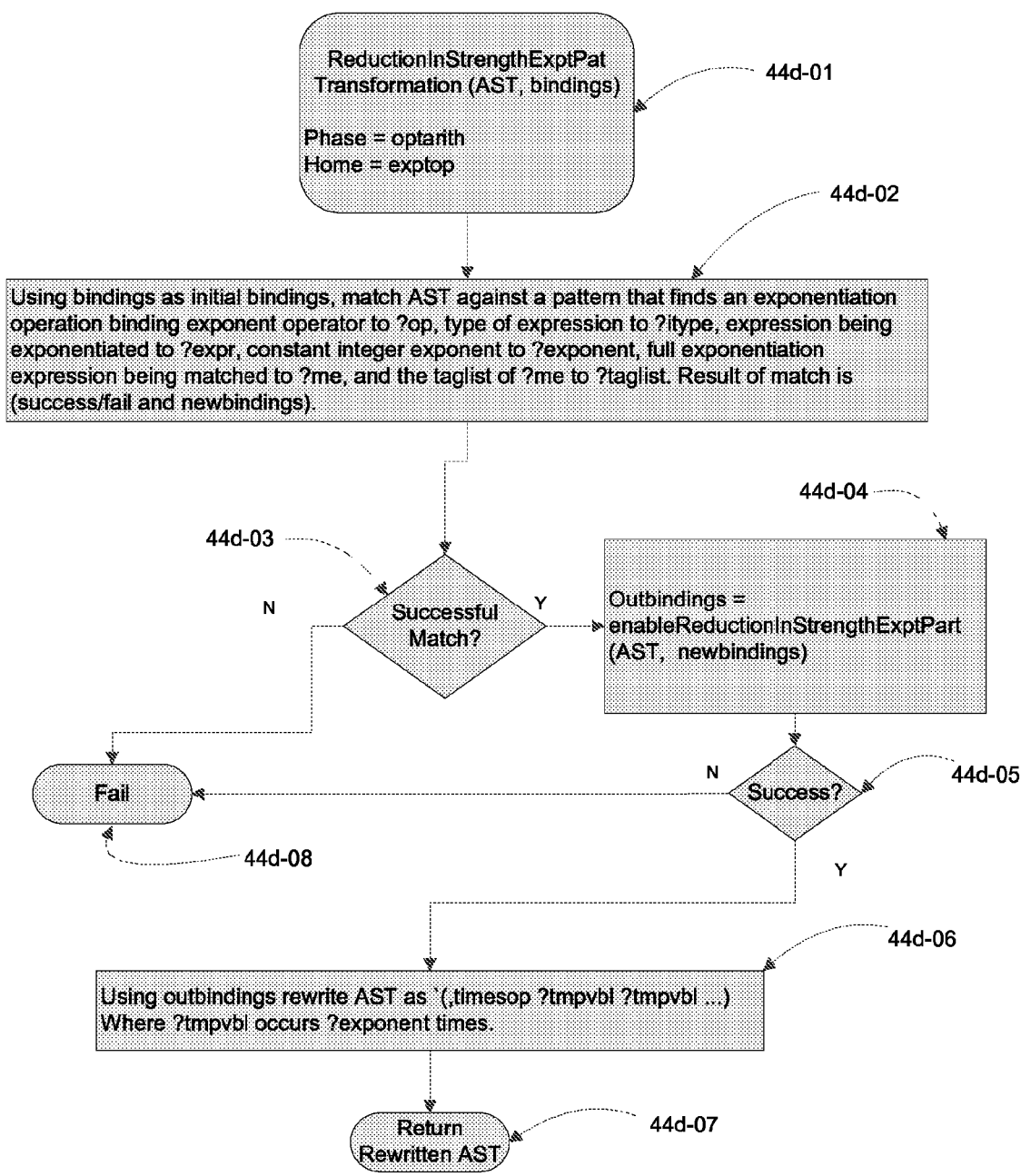
FIG. 44d is the ReductionInStrengthExptPat transformation that converts expressions like "(exptop<expr>2)" into "(timesop ?tmp5 ?tmp5)" with out-of-line code "(:=?tmp5 (exptop<expr>2))" moved before the usage.
Figure 44E:
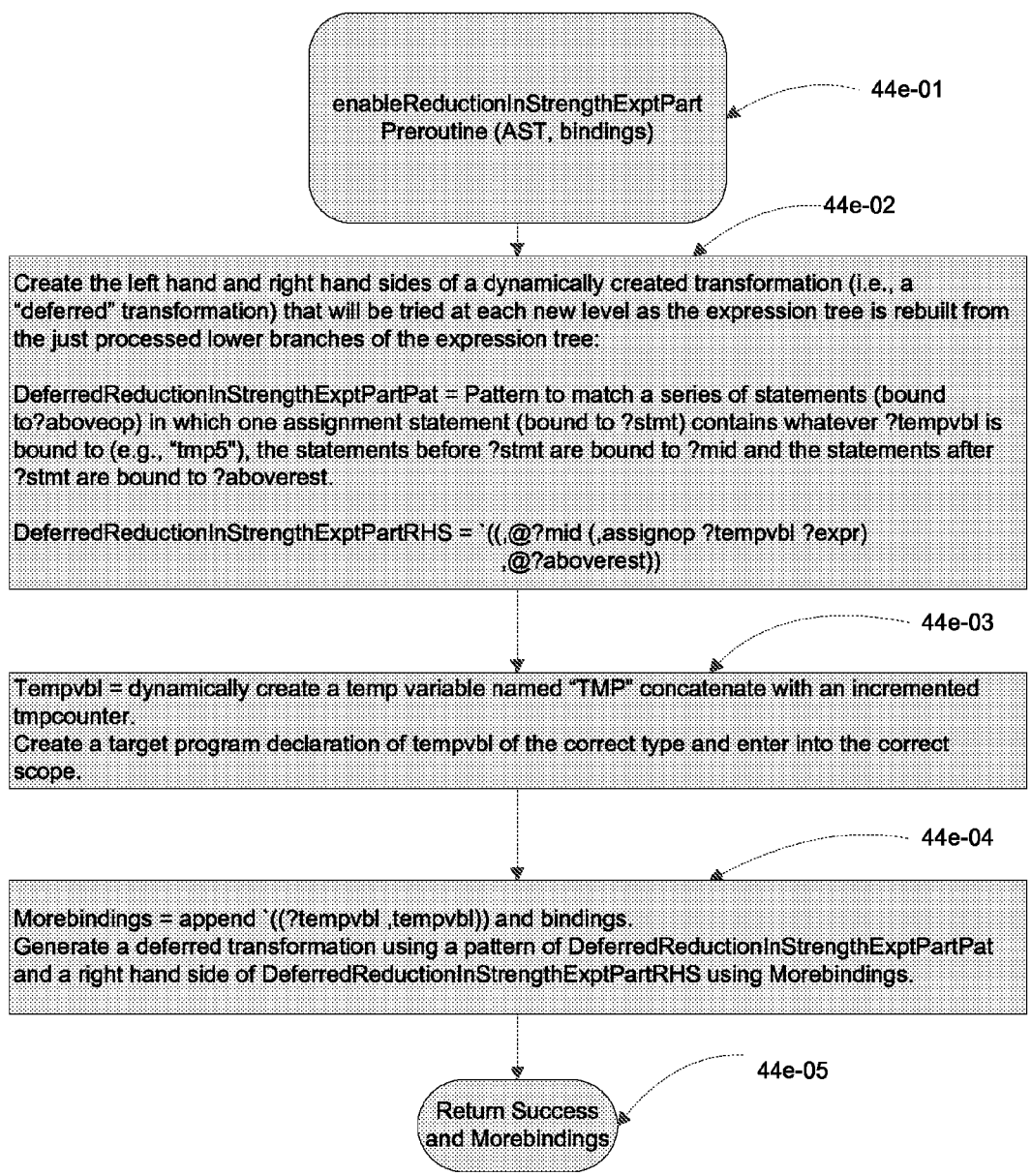
FIG. 44e is the enableReductionIn-StrengthExptPart Preroutine for the ReductionlnStrengthExptPat transformation.
Figure 45A:
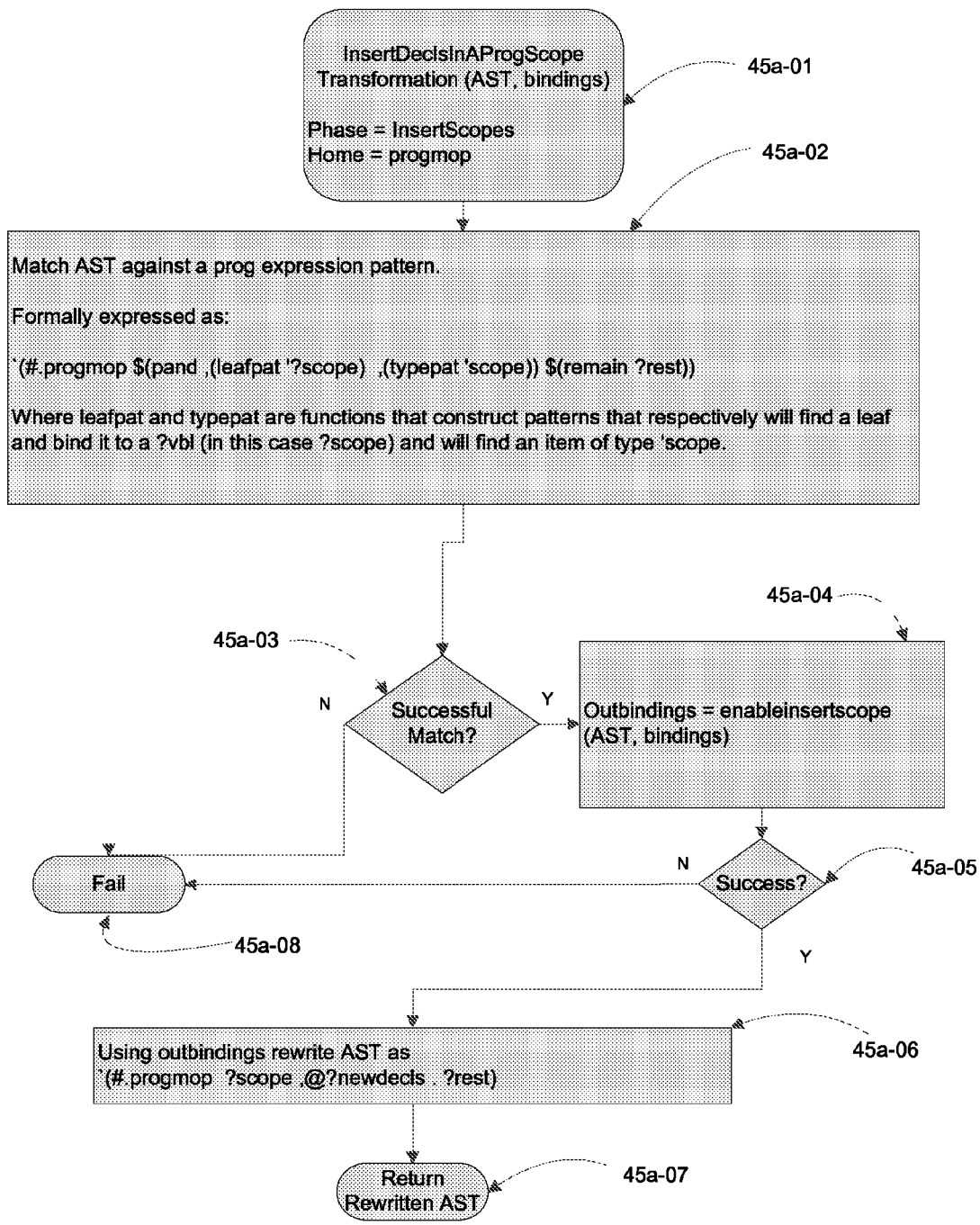
FIG. 45a is the InsertDecIsInAProgScope transformation.
Figure 45B:
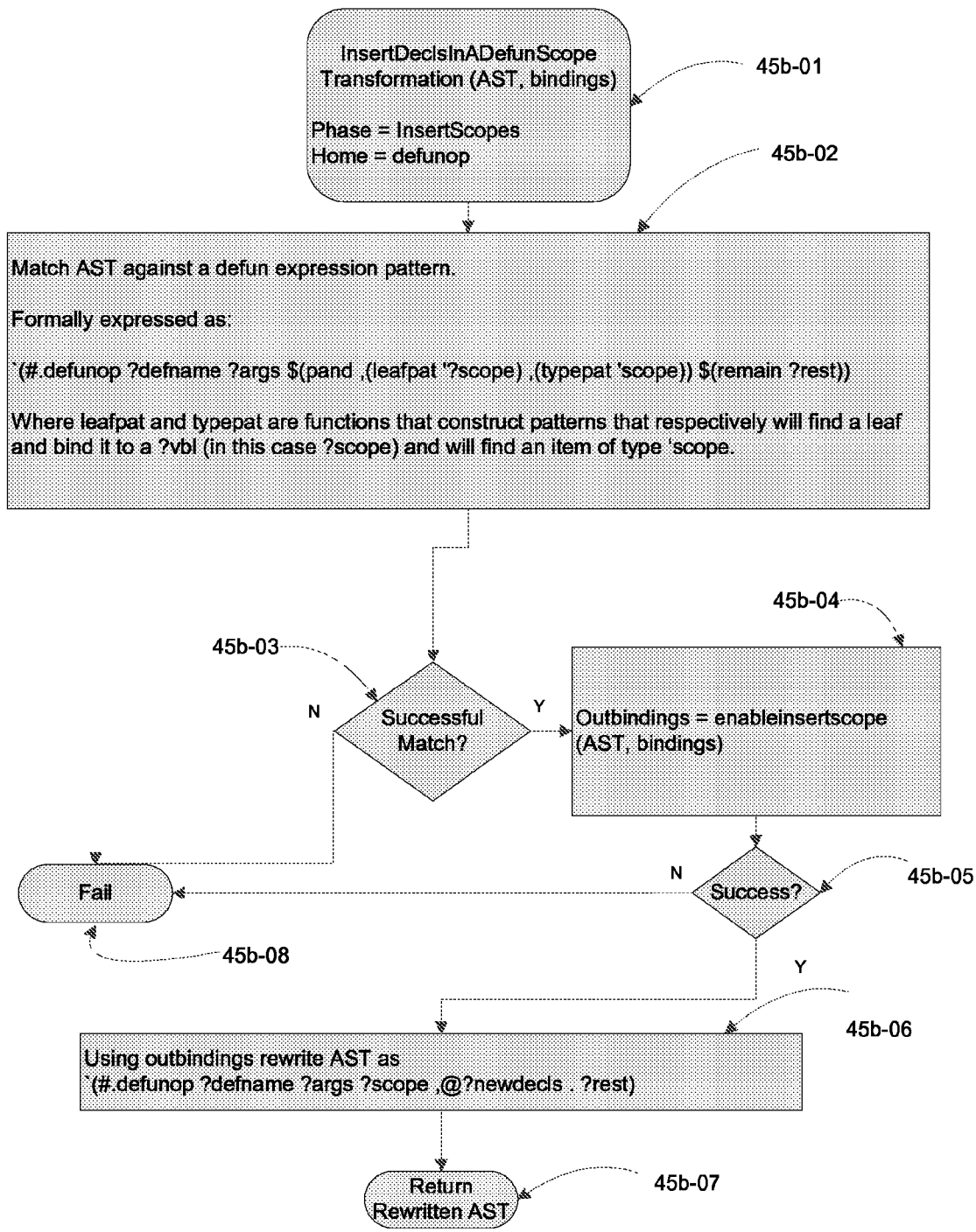
FIG. 45b is the InsertDecIsInADefunScope transformation.
Figure 45C:
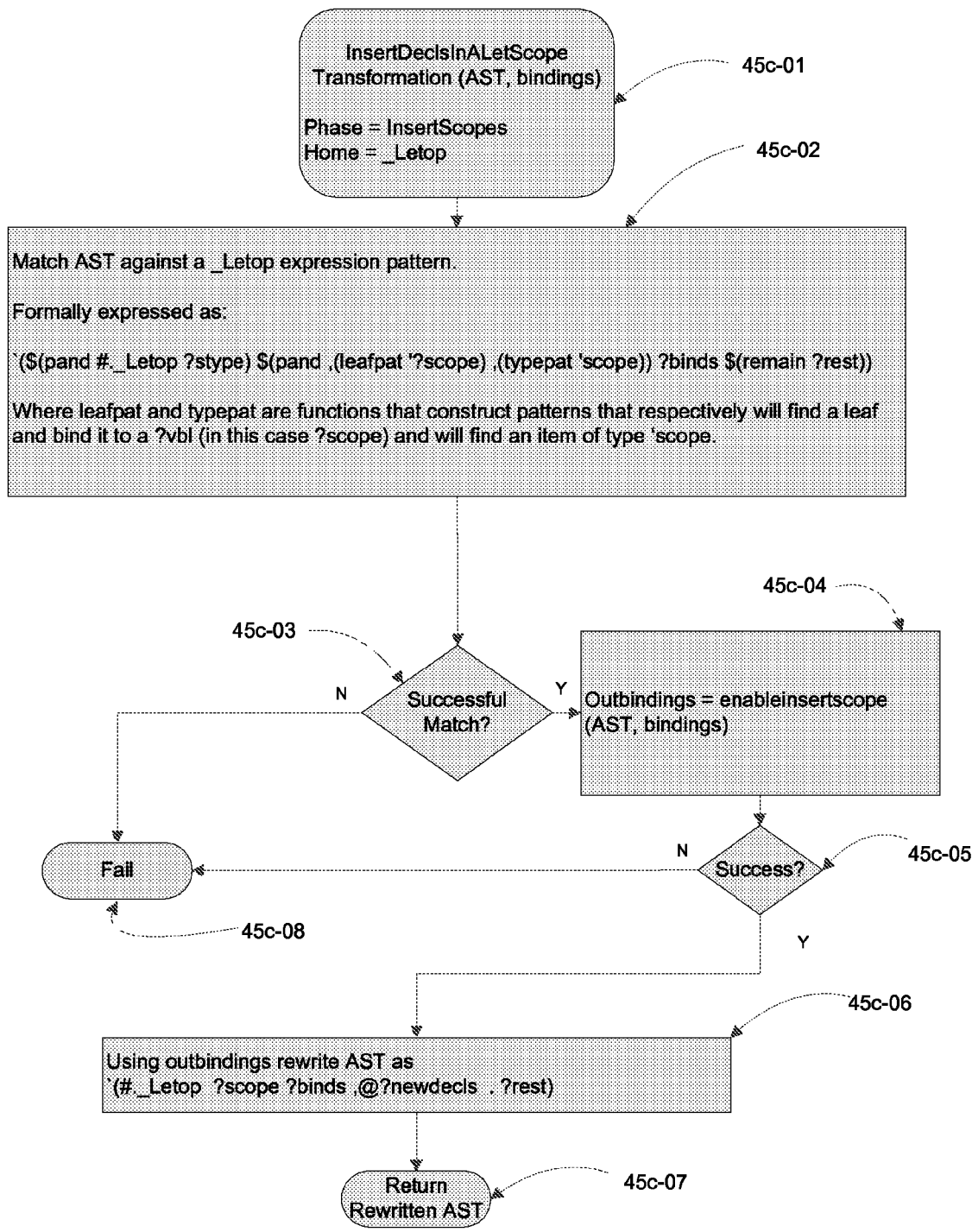
FIG. 45c is the InsertDecIsInALetScope transformation.
Figure 45D:
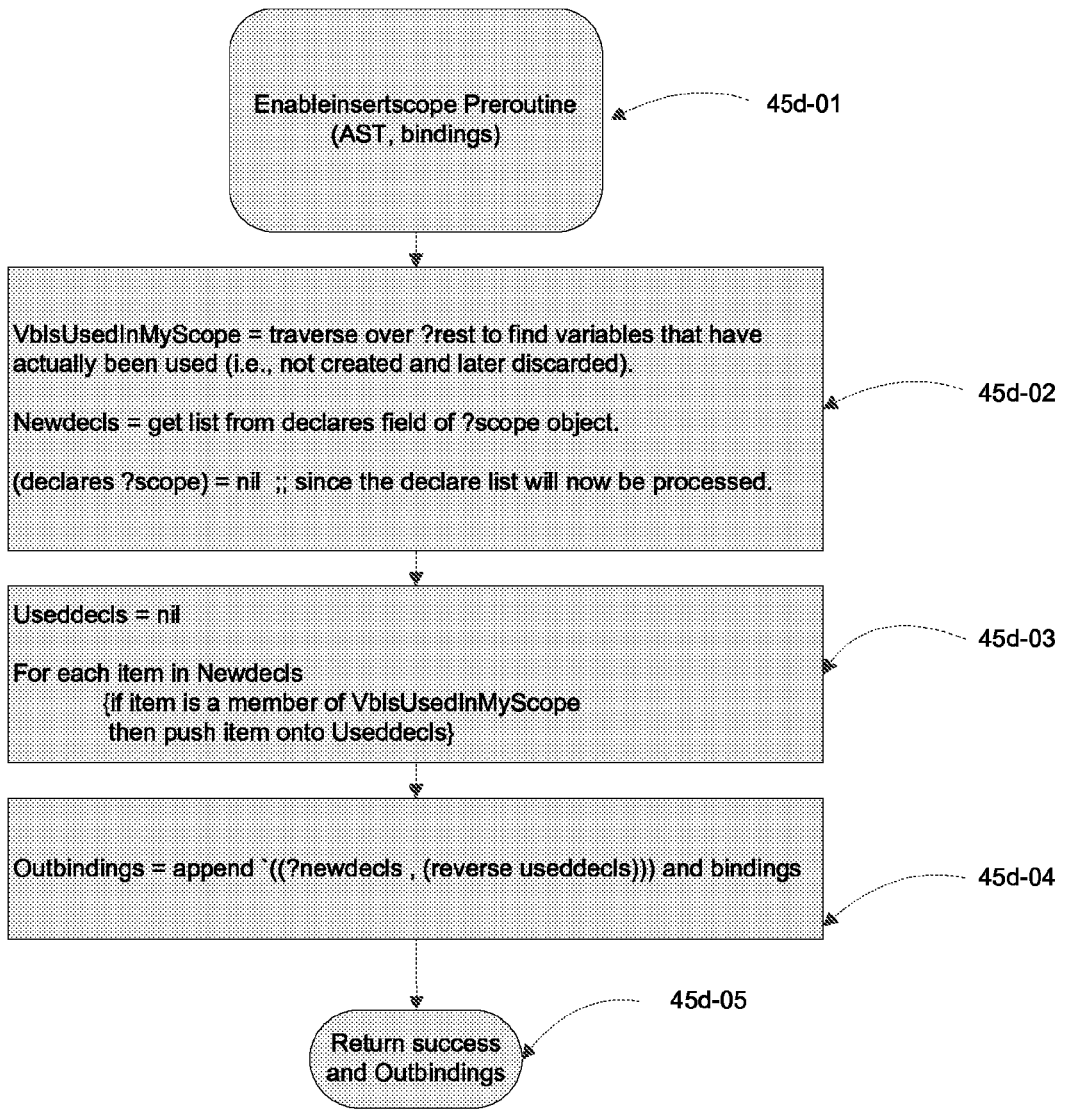
FIG. 45d is the preroutine for FIG. 45a-c.

Hoist Common Expressions. Not trusting that all C compilers will hoist multiply occurring arithmetic expressions of the loop indexes (e.g., "(*2(−q6 1))"), their computation is hoisted to the beginning of their loop and the variable that they are stored in (e.g., hoist3) replaces them in the body of the loop. If the user specifies it in the machine spec, the hoisting will be left to the C compiler. (FIG. 44*a-c*)

Opportunistic Optimizations: This phase performs opportunistic optimizations (e.g., reduction in strength optimizations). For example, the squaring of an expression (e.g., "(expt <expression>2)") is "reduced in strength" to a multiply (e.g., "(*tmp1 tmp1)") at the point of usage and the computation of tmp1 "(:=tmp1 (expt <expression>2))" is moved to just before the statement where tmp1 is used. The major benefit is that the <expression> is only computed once. (FIG. 44*d-e*) Again, the user may request that this processing be done by an optimizing C compiler.

Insert Declarations. Finally, declarations that have been stored in the various scope objects are inserted in the AST at the point the C compiler will need to find them. (FIG. 45*a-d*)

Generate GPL Code: The AST is converted into C code. The code is the "lowest common denominator" of C code meaning that it uses only the most basic facilities of C that can be expected to be available in any C compiler for virtually any CPU (including DSP chips).

Localization and Partitioning Phase

Overview of Localization and Partitioning Phase: The discussion skips the first three phases as they are quite straightforward and easily understood from the figures. The important and subtle operations start in the localization and partitioning phase and the description will start there.

In this phase, the generator traverses expression [17] associating looping constraints with those subtrees that imply loops (e.g., the matrices a and b, and the convolution expressions). The loop constraint objects (FIG. 6, 7*a-7e*) contain fields for the generated target program index names (e.g., idx3) and their ranges (e.g., [(0: (−m 1)]). During the traversal:

The templates (e.g., s and sp) will be specialized into new templates (e.g., s-0 and sp-0) to relocate their indexes from domain friendly ranges (e.g., [−1, 1]) to GPL-friendly ranges (e.g., [0, 2]). (FIGS. 17-19) To make the expressions more compact in the following discussion, the discussion will omit showing the specialized templates until it becomes relevant to the discussion in the phase that generates GPL-like loops and scopes.

Entities with implied loops (e.g., matrices a and b) are replaced with expressions for elements from those entities (e.g., a [idx3, idx4], which is represented internally by the form (aref a idx3 idx4)) and new loop constraints are created and associated with the rewritten expressions. Those loop constraints will eventually evolve into GPL-like loops.

The loop constraints for expressions are propagated up the tree and merged (if feasible).

Equivalent index names are merged (e.g., if index name idx4 from the first convolution of a and the index name idx5 from the second convolution over a are essentially the same, idx5 may be replaced by idx4 thereby allowing loop sharing).

Eventually, the whole expression is nested in a single loop, OR

If that is not possible (e.g., different sub-expressions require different loop ranges or some operation requires a complete pass over its matrix before another operation can even begin to process any element), then the earlier expression simplification phase will have modified the whole expression by breaking it into expressions that can be processed by a single loop (e.g., breaking it into two sequential computations connected by a temporary matrix or extending one of the matrices via specialization with phantom rows or columns) and this phase processes each such expression separately.

In previous work of this author (Biggerstaff, 2004), the process of creating explicit, minimal loops has been called localization of the loops. In this invention, the passive looping data from the earlier work is replaced by associative programming constraints (APCs), which are active objects with executable methods. Most importantly, the new mechanism for computational partitioning is integrated into the new localization process. By contrast to the previous work, the partitioning of a computation in this work is operating on domain abstractions rather than concrete GPL-like code and therefore, it is operating in the problem and programming domains. That difference eliminates many of the impediments and complexities of the concrete GPL-like code domain and thereby simplifies the design process and generalizes the solution space. This invention can easily handle many cases that were difficult or impossible for the former approach.

Creating and Propagating Loop Constraints: Let us examine a few key steps in this process to illustrate how localization with partitioning works. FIG. 5 shows the key expression of the program specification [17] in the tree data structure that the generator is actually operating on (conventionally called an Abstract Syntax Tree or AST). The first reference to the matrix "a" will cause the creation of a Loop2D1 constraint and then be rewritten (see FIGS. 13-14) as (aref a idx3 idx4 (tags (constraints Loop2D1)))[69].  [19]

where Loop2D1 is an instance of the Loop2D constraint class, which is a specialization of the vanilla loop constraint Loop. Loop2D captures the additional, domain specific knowledge that this loop is specific to an image matrix. See FIG. 46 for more detail about constraint objects, their slots and inheritance relationships. The form "(aref a i j)" in expression [19] is often shown in figures in the shorthand form "a[i,j]."

Figure 7A:
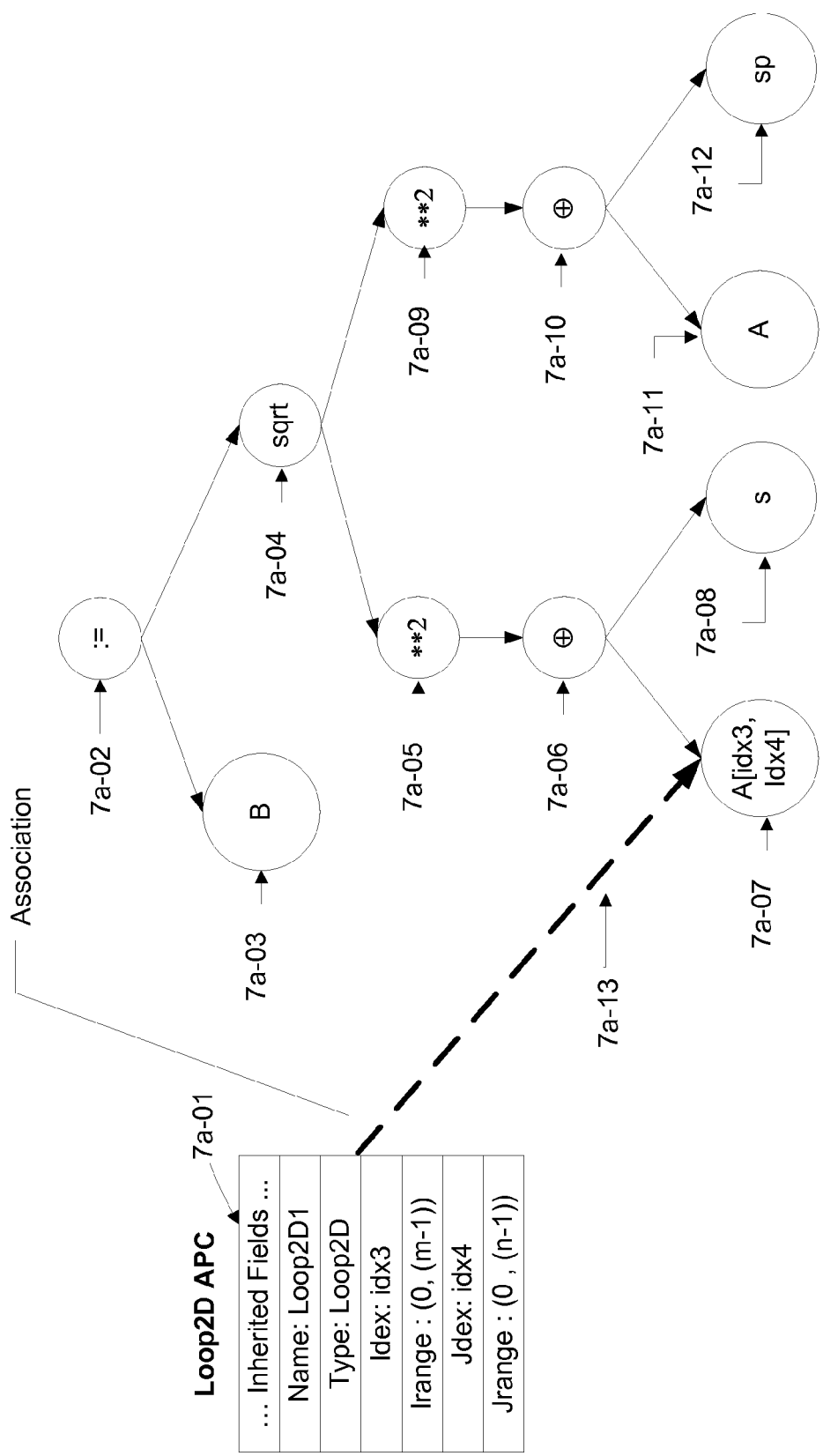
FIG. 7a is an example of a domain specific specification with a loop APC.
Figure 7B:
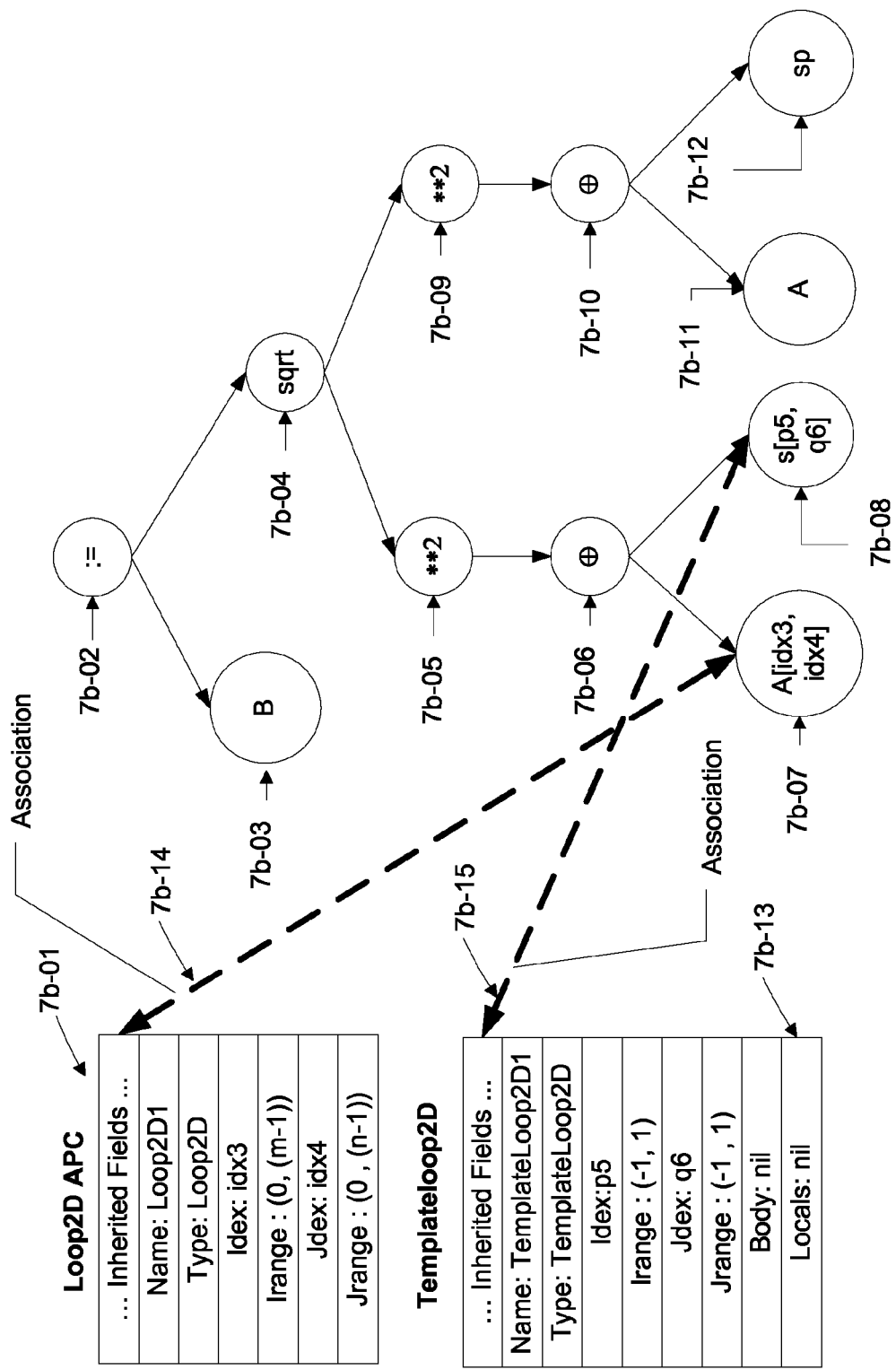
FIG. 7b is an example of a loop APCs associated with AST nodes after processing templates.
Figure 7C:
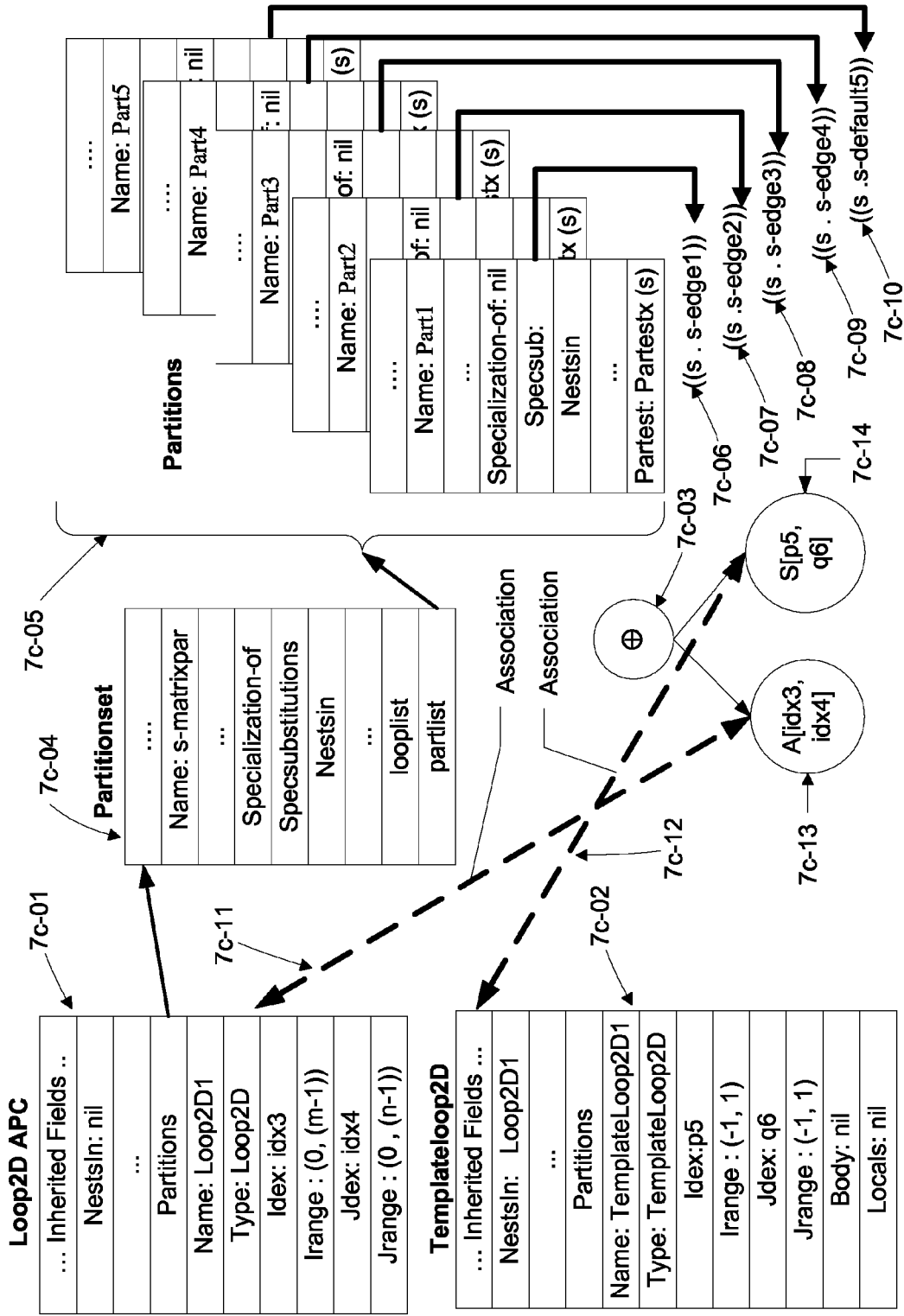
FIG. 7c is an example of a loop APCs associated with AST nodes after partitioning step.
Figure 7D:
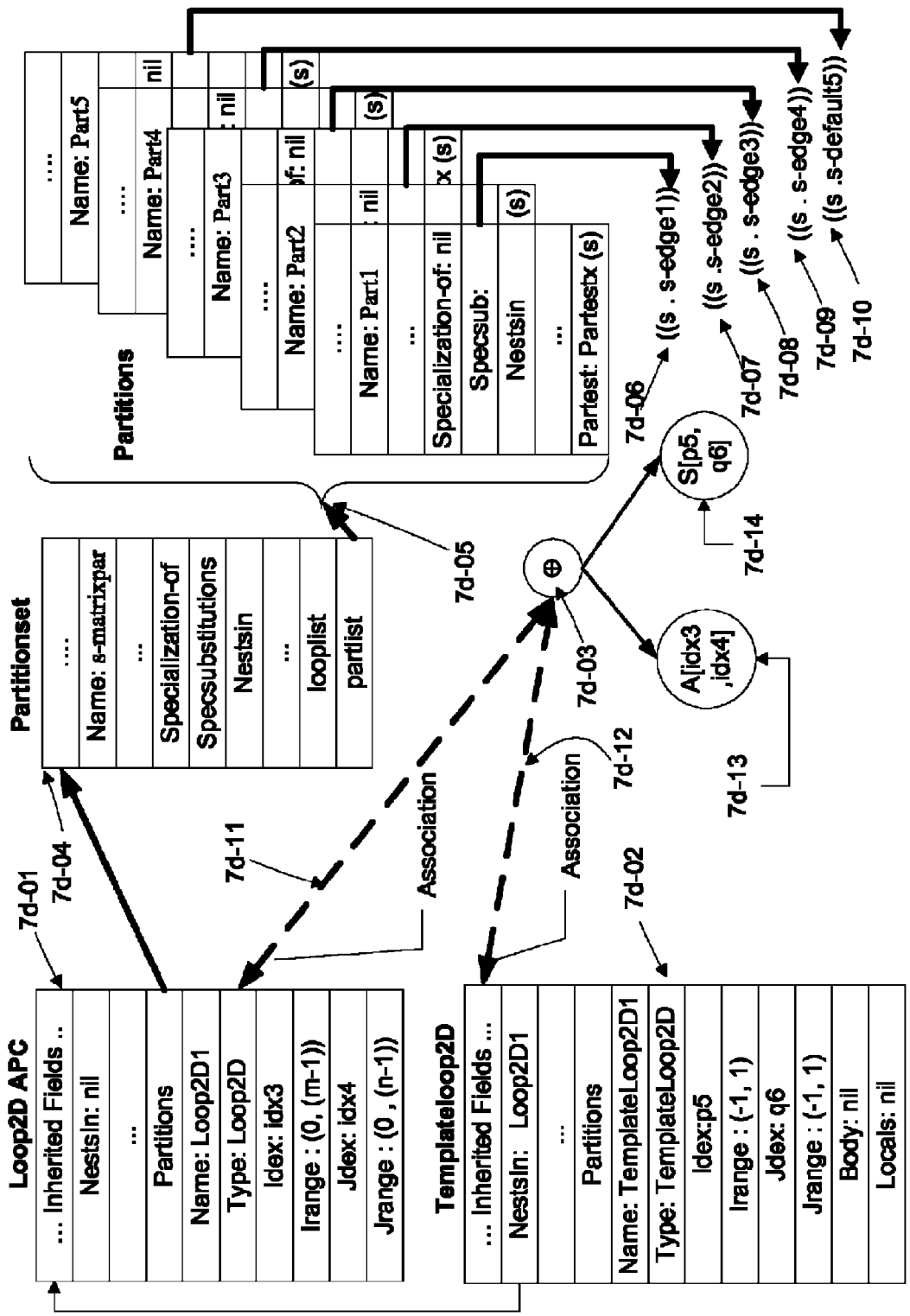
FIG. 7d is an example of a loop APCs associations after propagating up to the convolution.
Figure 7E:
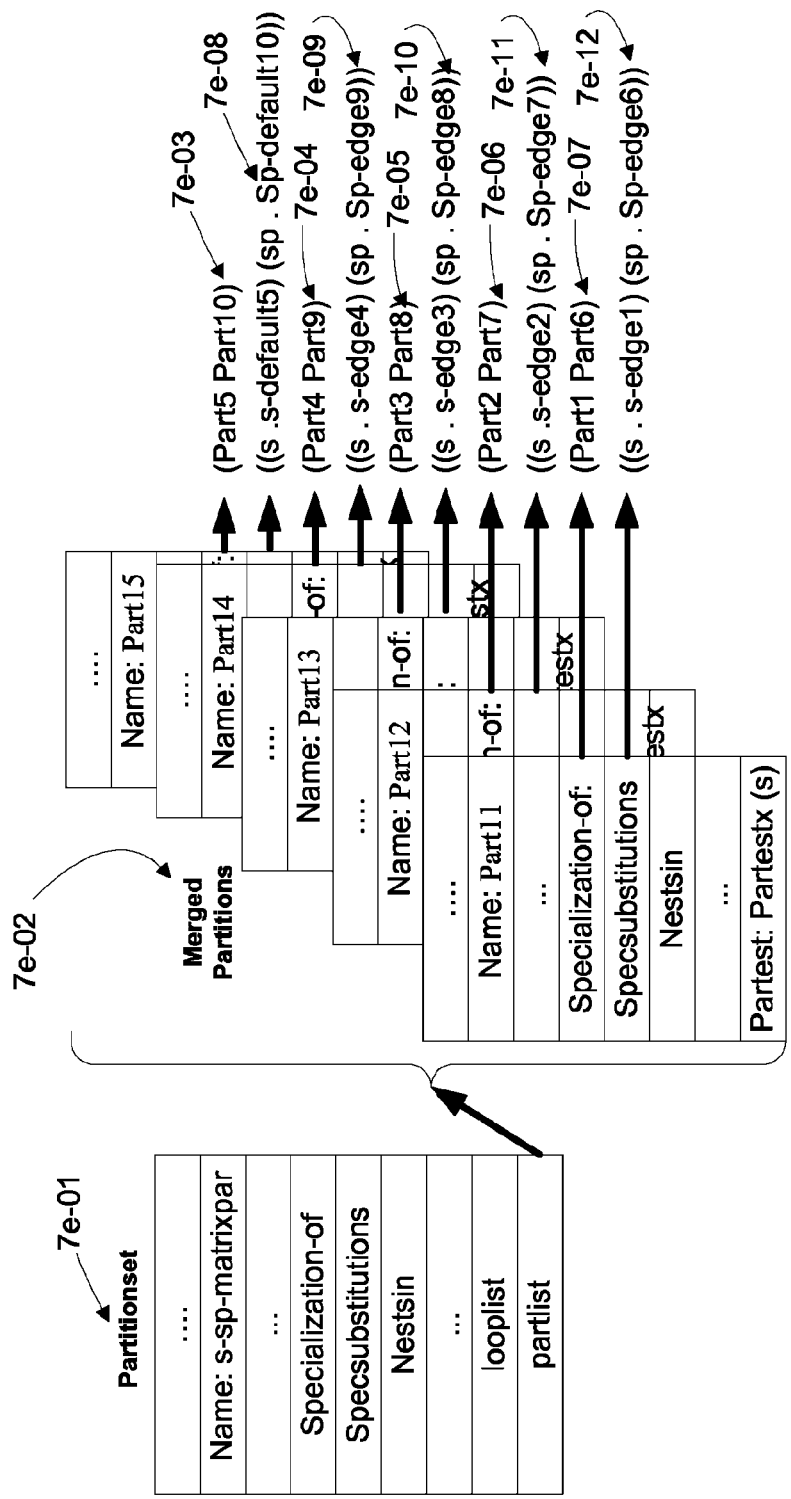
FIG. 7e is an example of merged partitions.

FIG. 6 shows the values of Loop2D1's important slots and FIG. 7*a* shows the relationship between the AST and the Loop2D1 APC. FIGS. 6 and 7*a* summarize the key APC fields, specifically, constraint name (i.e., Loop2D1), the loop type (i.e., Loop2D), index variable names and ranges (e.g., variable idx3 with a non-finalized range of (0, (−m 1)). Subsequent examples will show some of the properties of the APCs (e.g., additional object slots and object methods).

Next, the traversal will visit the template s, which will introduce a template loop APC (TemplateLoop2D1 in FIG. 7*b*) with new index names (i.e., p5 and q6) for the loop and rewrite s to an item in s, s[p5,q6]. For the sake of compactness in this discussion, we will ignore the fact that in the actual implementation, s has already been specialized at this point to a new template s-0, whose index ranges have been relocated to the GPL-friendly range [0,2] from the DSL-friendly range [−1,1]. We will re-introduce s-0 when it becomes relevant to the discussion. See FIGS. 17-19 for the details of relocating s to s-0.

After visiting the s template node, the traversal returns up the expression tree to the convolution node, (rightconvolutionop (aref a idx3 idx4 (tags (constraints Loop2D1)))
   (aref s p5 q6 (tags (constraints TemplateLoop2D1))))  [20]

where the ConvolutionOnLeaves transform (FIG. 20) is triggered. Its preroutine (FIG. 21*a*) and a number of service routines (FIG. 21*b-h*) will compute a set of partition APCs and organize them under a partitionset APC object (named s-matrixpar). s-matrixpar becomes the value of Loop2d1's partitions slot. (See FIG. 7*c*.) It comprises a group of convolution template objects that are specialized for each case of s-matrixpar. We will define these specialized templates as s-edge1, s-edge2, s-edge3, s-edge4 and s-default. To simplify the implementation, the version being described uses "Default" for the everything-else case rather than the semantic id "Center." In a more general implementation, Center would be preferred as it makes the generated code more meaningful for a human reader. It is an easy option to implement by adding a default property to "edge" with a value of "center."

The s-xxx names are automatically derived from domain specific information associated with the methods of s. (The details of how this happens will be explained in the following section.) After the creation of the partitioning constraint, the Loop2D1 constraint (now containing the newly created partitioning object "s-matrixpar" as part of its data) gets propagated up to the convolution operation and [20] is rewritten as (rightconvolutionop (aref a idx3 idx4) (aref s p5 q6)
   (tags (constraints Loop2D1 TemplateLoop2D1)))  [20a]

where the partitions slot of Loop2d1 now contains a pointer to the partition set (s-matrixpar) and the TemplateLoop2D1 APC's nestsin slot points to Loop2D1. (See FIG. 7*d*) When the convolution expression gets replicated over the partitioning's case instances (triggered by the existence of s-matrixpar), each specific case instance of the expression will be rewritten with the case's specific template (e.g., s-edge3), which assures that the correct set of specialized IL definitions get substituted for the specific case of the convolution operator.

The following section will explain what s-matrixpar is and how it and its partition objects get created.

Creating a Partitioning Constraint

This is the first point where the execution platform architecture constraints play a role, e.g., (constraints (Parallelism InstructionLevel SIMD)) or (constraints (Parallelism Multi-Core)). They will guide the partitioning computation and determine the kind of partitioning that results. Fundamentally, the mechanism that creates this partition uses a set of rules, to partition the loops for either SIMD and/or multicore parallelism. The first set of rules does the loop partitioning, which is common to both SIMD and Multicore partitioning. Later when we begin transitioning to a pre-GPL form by adding concrete program structures, different sets of transformations and routines will package the partitions for instruction level parallelism based on MMX (or more generally SSE) and/or multicore parallelism. The first step of that rule requires finding the piece of test code that partitions the matrix computation. (See FIGS. 21*b-c*) This is easily accomplished by looking for the domain specific constraints (in this case, "partitionmatrixtest") that are associated with code in the methods of s. It discovers expression [21] in the w method of s:

(or (== ?i ?ilow) (== ?j ?jlow)
 (== ?i ?ihigh) (== ?j ?jhigh) (tags (constraints partitionmatrixtest  [21]
 edge)))

This reveals a matrix partitioning test and further, defines, in domain specific terms that this tests for "edge", which will be used to generate names that are meaningful to the human reader. At this point, there are several different kinds of partitioning to choose from. Each is designed for a particular kind of parallelism or non-parallel architecture. So, the architectural specification has an effect on which kind of partitioning is chosen. For both instruction level and multicore parallelism, each edge case will be coded as a separate loop to simplify the code that is generated. (See FIGS. 21*d-g*) Thus, the partitioning machinery breaks the "or" expression into four cases (one for each edge) and adds a fifth (default) case for the default (i.e., when none of the equal tests are true and therefore, the whole "or" expression is false). Each of these cases will become a partition. For each partition case, the partitioning machinery creates a new, specialized template, This will create the following specialized templates:

s-edge1 where (== ?i ?ilow) is true,
s-edge2 where (== ?i ?ilow) is false and (== ?j ?jlow) is true, -continued

```
s-edge3 where (== ?i ?ilow) and (== ?j ?jlow) are false and (== ?i ?ihigh)
  is true,
s-edge4 where (== ?i ?ilow), (== ?j ?jlow) and (== ?i ?ihigh) are false and
  (== ?j ?jhigh) is true, and
s-default where (== ?i ?ilow), (== ?j ?jlow), (== ?i ?ihigh) and
  (== ?j ?jhigh) are all false.
```

For each of these specialized templates, it creates a new MT Defcomponent (ParTest) that will generate the code that tests for the specific partition case and uses the parameter list from w of s as the parameter list of the ParTest methods. As mentioned earlier in the description of Defcomponents, the actual implementation of the parameter structure is somewhat more complex for reasons that are not relevant to this discussion (e.g., the parameters are expressed as a pattern). To simplify this discussion, I have omitted this operational complexity and shown the parameters as simple lists.

```
(Defcomponent ParTest ( s-edge1 (aref ?a ?i ?j) ?ilow ?ihigh ?jlow
    ?jhigh ?p ?q) (== ?i ?ilow) )                                    [22]
(Defcomponent ParTest ( s-edge2 (aref ?a ?i ?j) ?ilow ?ihigh ?jlow
    ?jhigh ?p ?q) (and (not (== ?i ?ilow)) (== ?j ?jlow)))            [23]
``` and so forth. These MT Defcomponents provide abstractions that can be used as placeholders for the yet-to-be-generated target program code while the target code details are being developed. Recall that the localization process invents new variable names and upon discovering equivalent names, throws away unneeded names. The abstract ParTest methods are not used to generate final code until these processes settle on final names. For example, what might have been initially named idx1 and idx2 earlier in the generation process may actually end up in the final code being called something like idx3 and idx4.

The subject of what target program names are to be bound to ?i, ?j etc. raises the next problem. Like other MT Defcomponents, ParTest is just a transformation and inlining will require specification of those bindings. Since the system has a proposed set of bindings in hand when the ConvolutionOn-Leaves transformation (FIGS. 20-21a) executes, it will use those bindings to provisionally fix the "parameters" of ParTest for this context. Admittedly, those bindings may change (e.g., index "idx1" might be discarded and replaced by some "idx3") but there is machinery in place to effect such changes. To provisionally fix the binding context, the system creates a new MT Defcomponent Partestx (FIG. 21e), which simply wraps ParTest with a closure of the bindings, e.g.,

```
(Defcomponent Partestx (s-edge1)
    (closure (Partest s-edge1 (aref ?a ?i ?j) ?ilow ?ihigh ?jlow ?jhigh
        ?p ?q) ((?a a) (?i idx3) (?j idx4) (?ilow 0) (?ihigh 99)
        (?jlow 0) (?jhigh 99) (?p p5) (?q q6))).              [22a]
```

Thus, when Partestx(s-edge1) is inlined, it will produce a concrete expression in terms of the target program names (e.g., "(==idx3 0)"). Should further specialization of the s-edge1 template occur, it is possible to re-bind some of the ?variables and thereby, further specialize the Partest MT Defcomponent. The objective is to retain the ability to deal with the program in terms of domain abstractions (e.g., convolution loop index variables ?i and ?j) and not concrete program entities (e.g., idx3 or idx5) until the final structure of the GPL-like code is to be derived. The Partestx MTs retain this context.

When the GPL-like representation of a loop is eventually generated, it contains a conjunctive list of propositions, in the so-called suchthat field. These propositions semantically describe aspects of the GPL code to be generated. The GPL-like seed loop's suchthat field will contain an abstract proposition such as "(Partestx s)". Each cloned GPL-like loop will specialize the suchthat field by substituting one of the specializations of s (e.g., s-edge1, s-edge2, etc.) for s, thereby causing a different loop (i.e., different computational case) to be generated for each clone. Each partition object keeps track of the relationship between the general template objects (e.g., s) and the specialized substitution or substitutions (e.g., s-edge1 and sp-edge6) that define that partition. The following sections provide the details of how the GPL-like forms of the loops are generated from the loop APCs, how they are partitioned into clone loops and how inlining plus partial evaluation reduces those cloned loops to their concrete GPL forms.

The ParTest abstractions are needed long before the target final program names and expressions are known. When the time comes to determine if two partitions are mergable, that is, if they are really the partitioning the matrix in exactly the same way, these abstractions will be used to determine that mergability property.

Figure 21A:
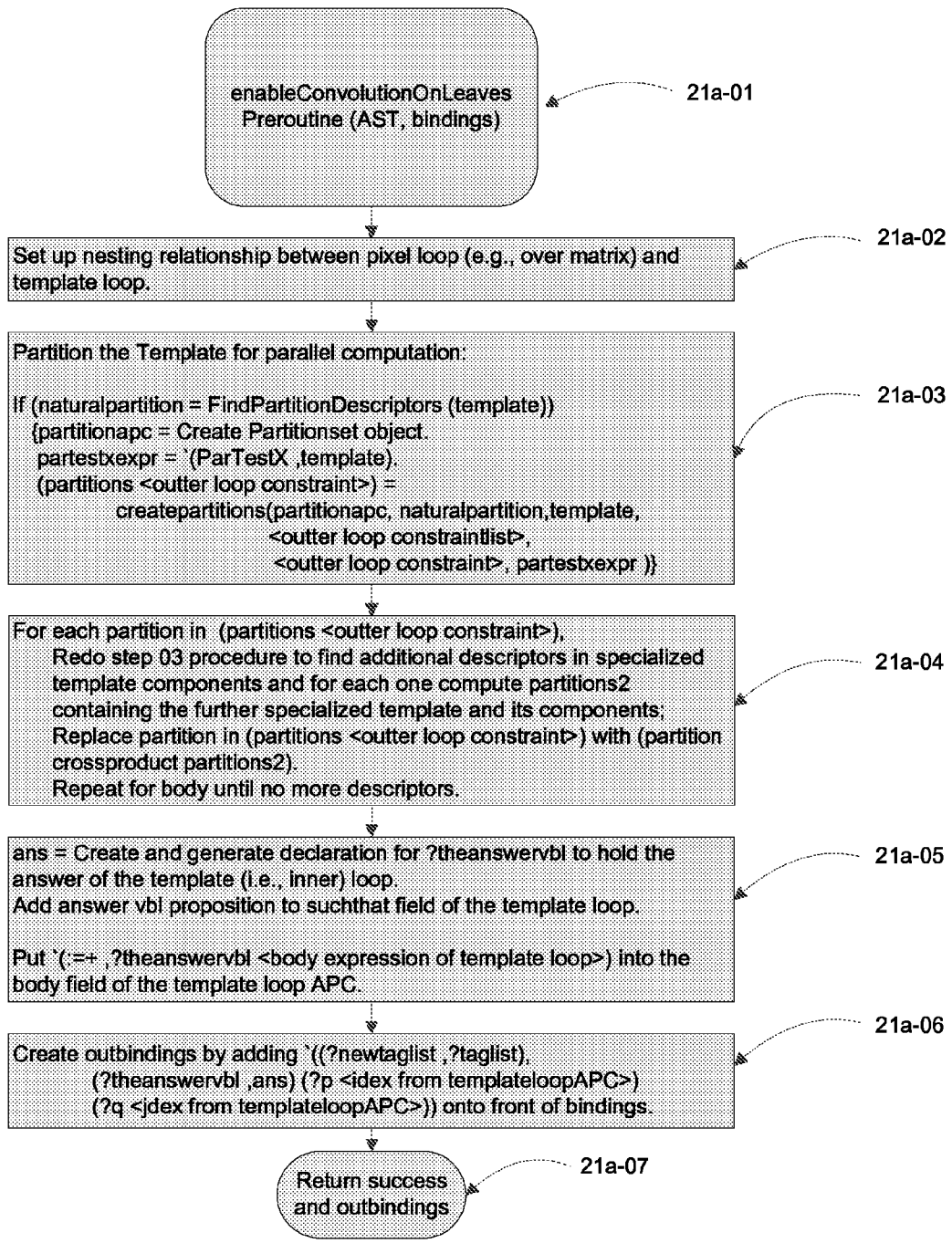
FIG. 21a is the preroutine for FIG. 20 transformation.
Figure 21B:
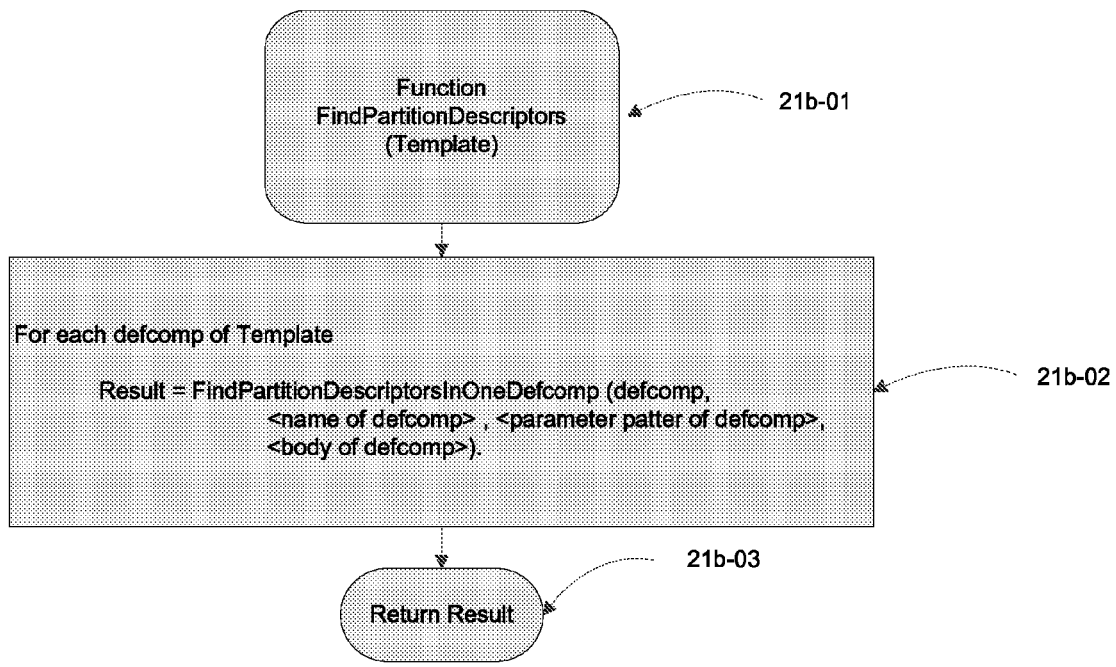
FIG. 21b-e are supporting routines for the FIG. 21 preroutine. In the course of creating partition objects, they create specializations of the template, one per partition.
Figure 21C:
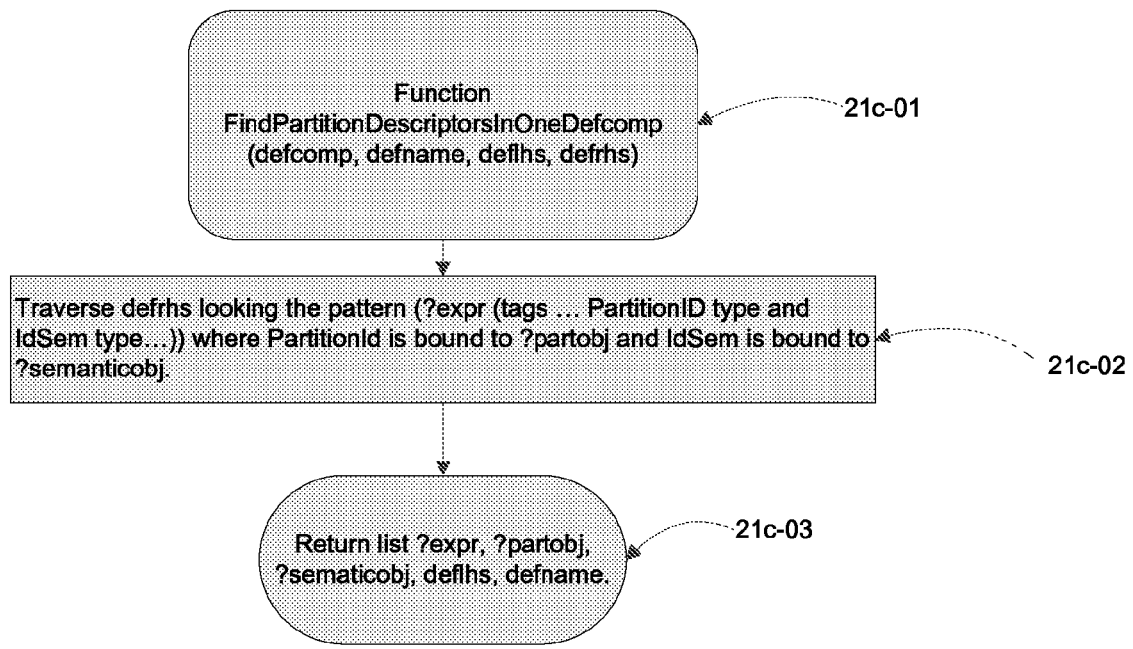
Figure 21D:
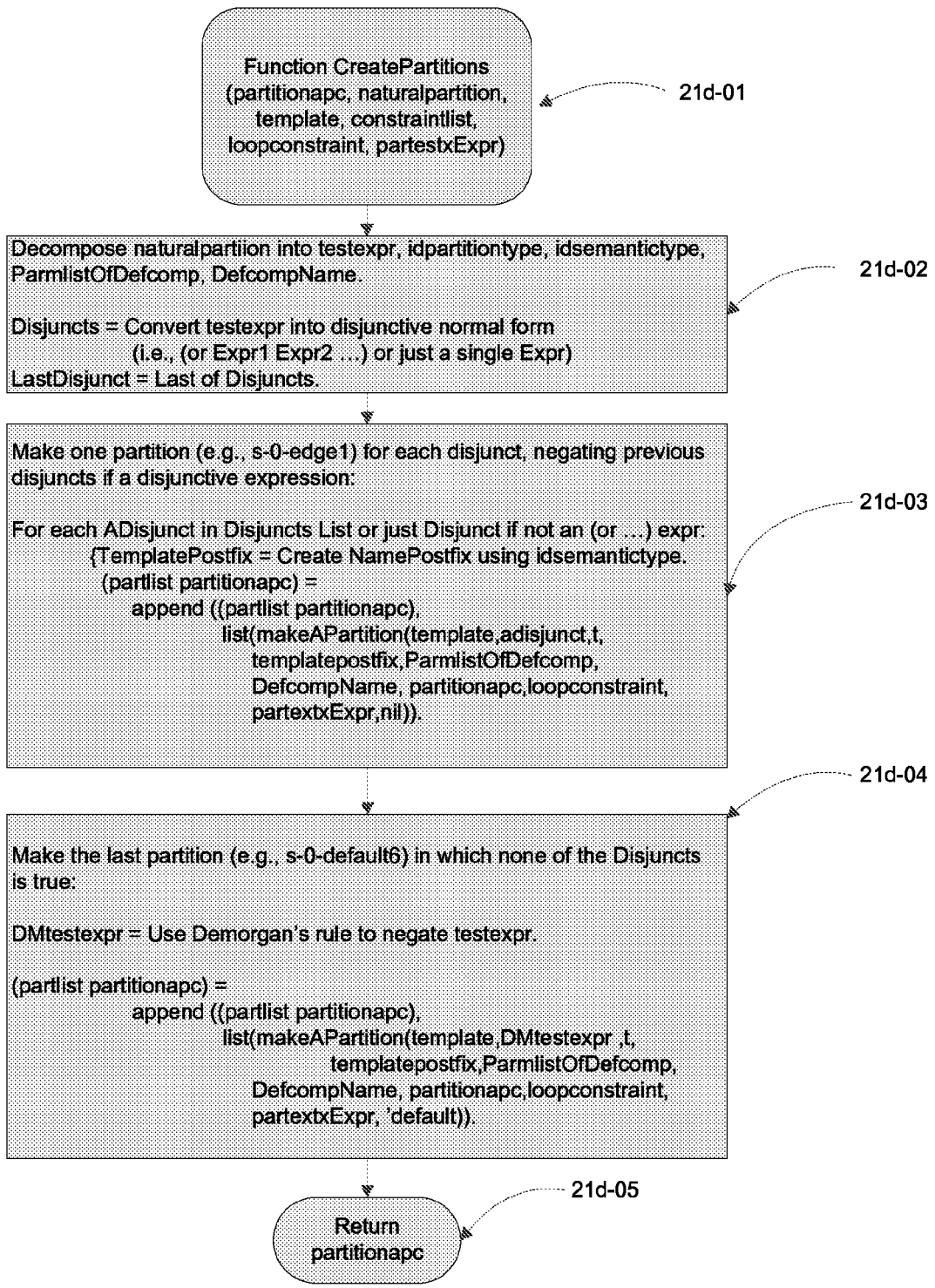
Figure 21E:
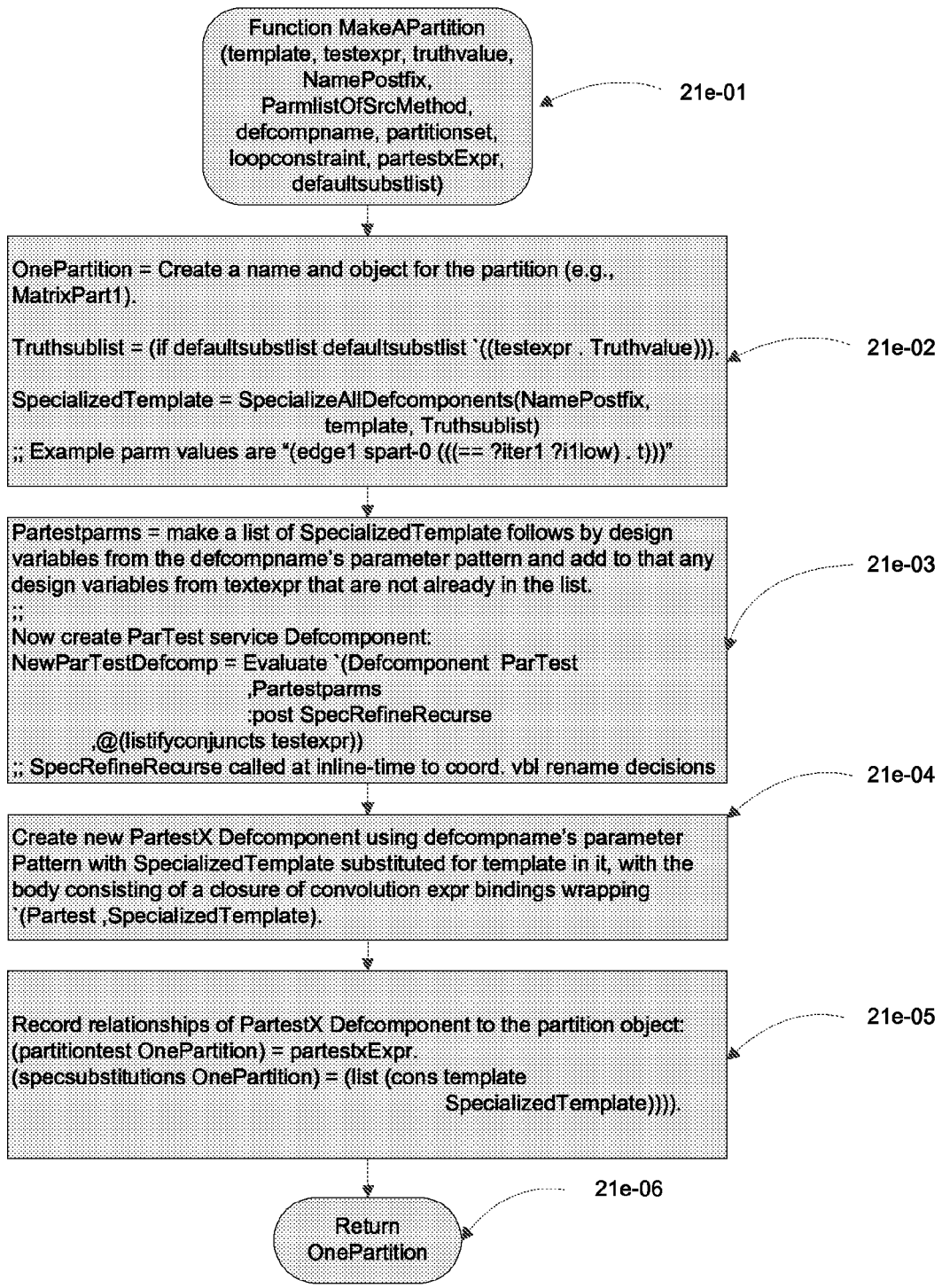
Figure 21F:
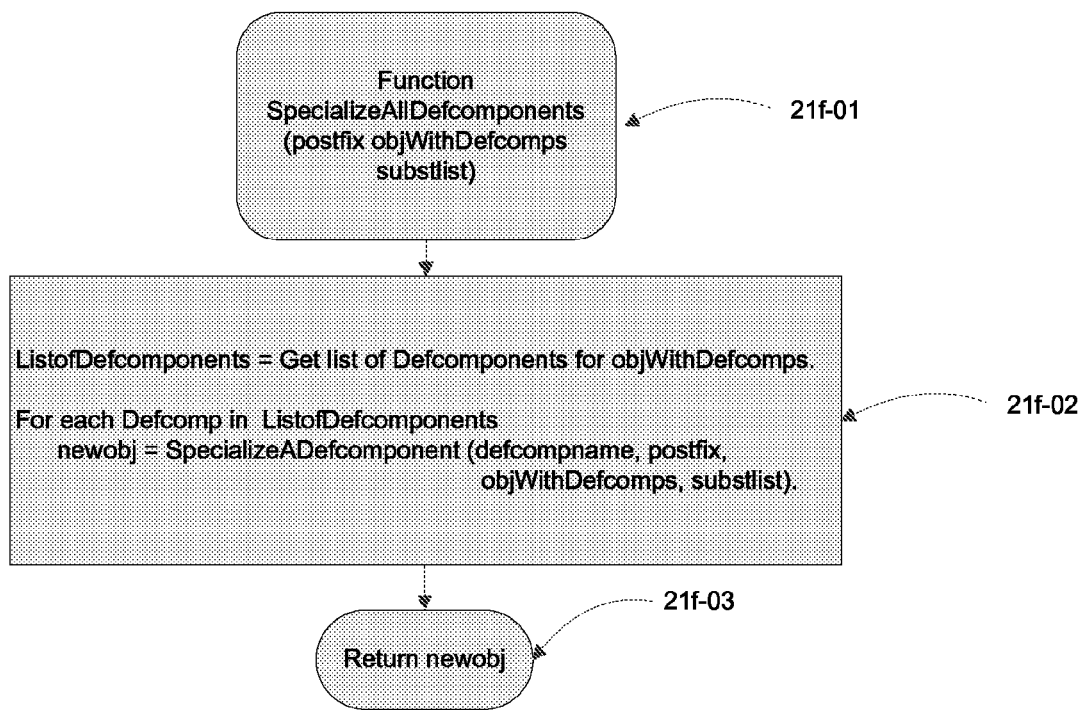
FIG. 21f-g are also supporting routines for the FIG. 21 preroutine and FIG. 21b-e. These are the routines that specialize Defcomponents for a template.
Figure 21G:
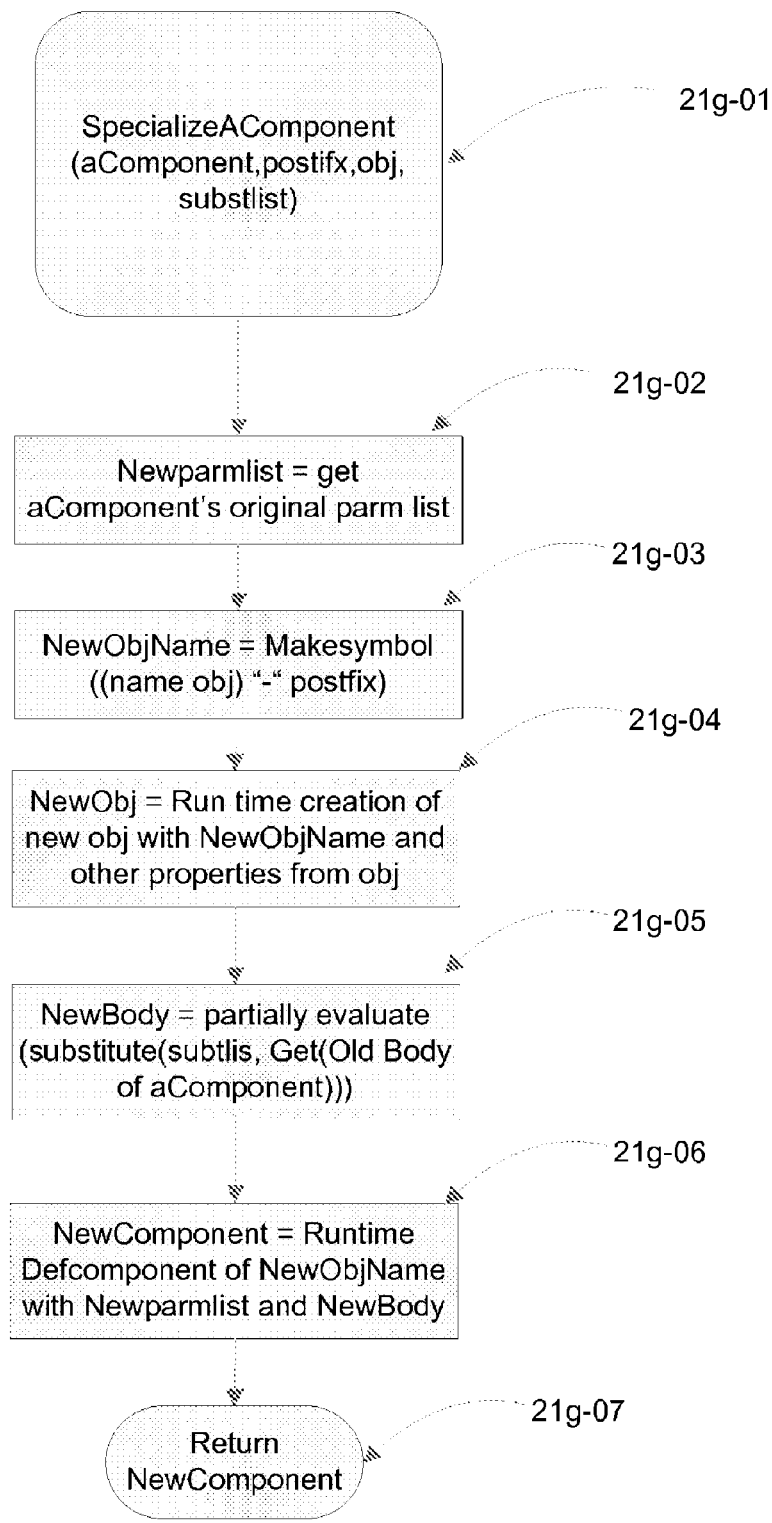
Figure 22:
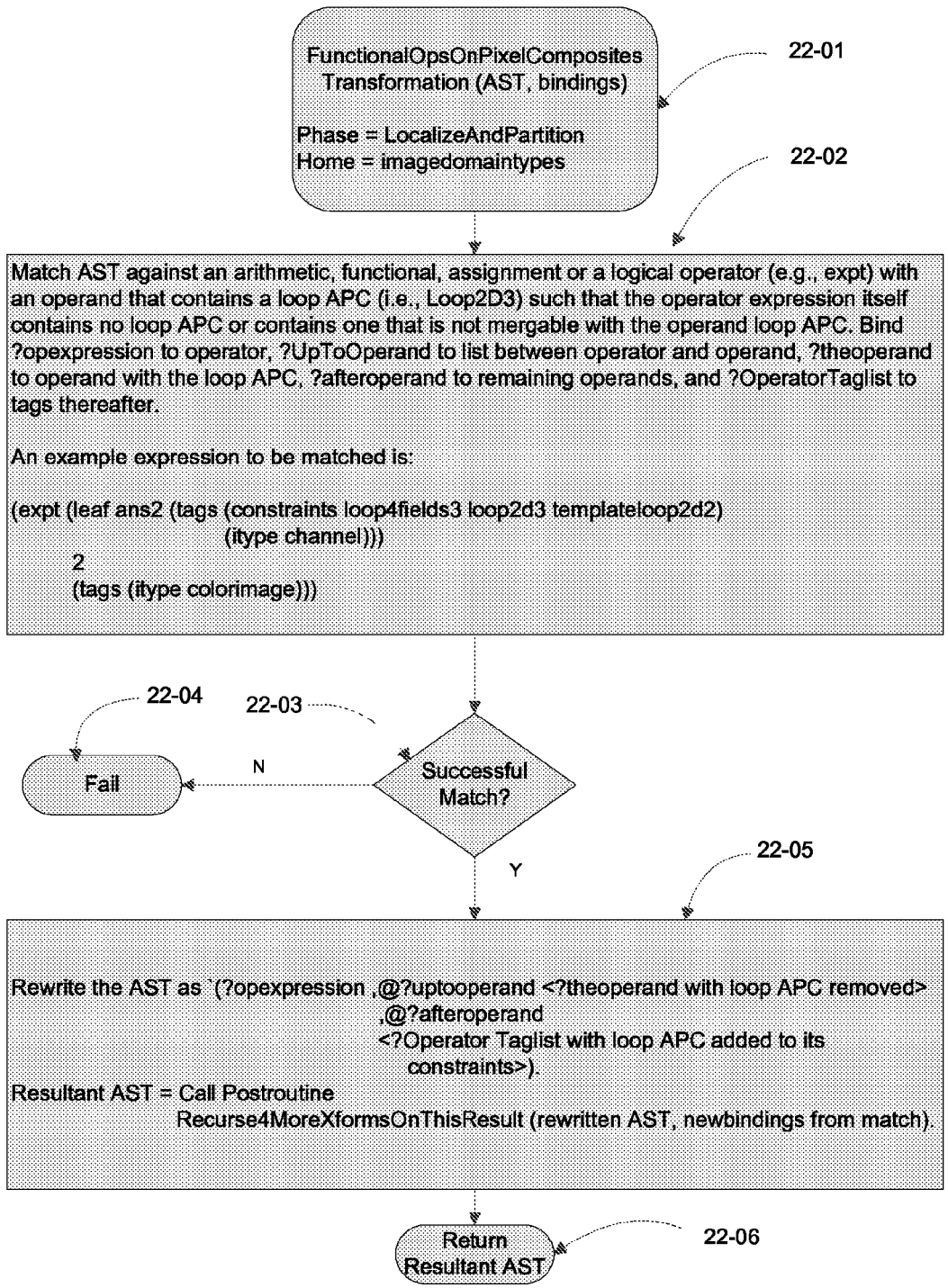
FIG. 22 is the FunctionalOpsOnPixelComposites transformation that promotes the first loop APC to be promoted up an expression level.
Figure 23:
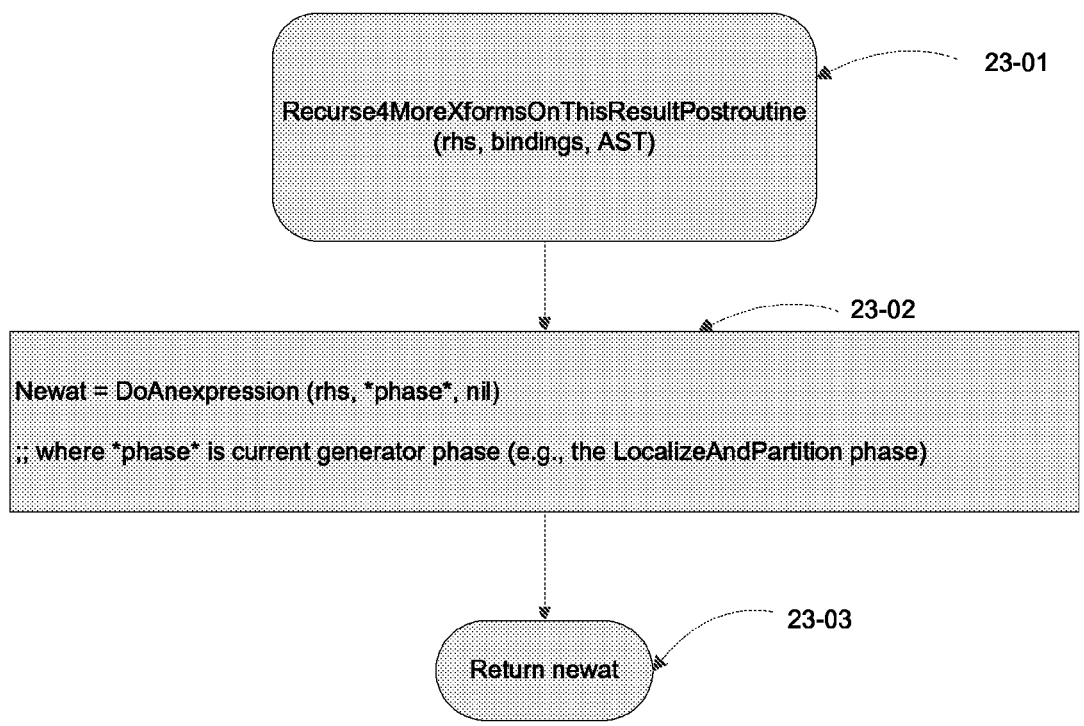
FIG. 23 is a postroutine used by FIG. 22 transformation and others that use recursive application of transforms to determine that they are applied in a specific order, which is determined by the transformation's patterns.
Figure 24:
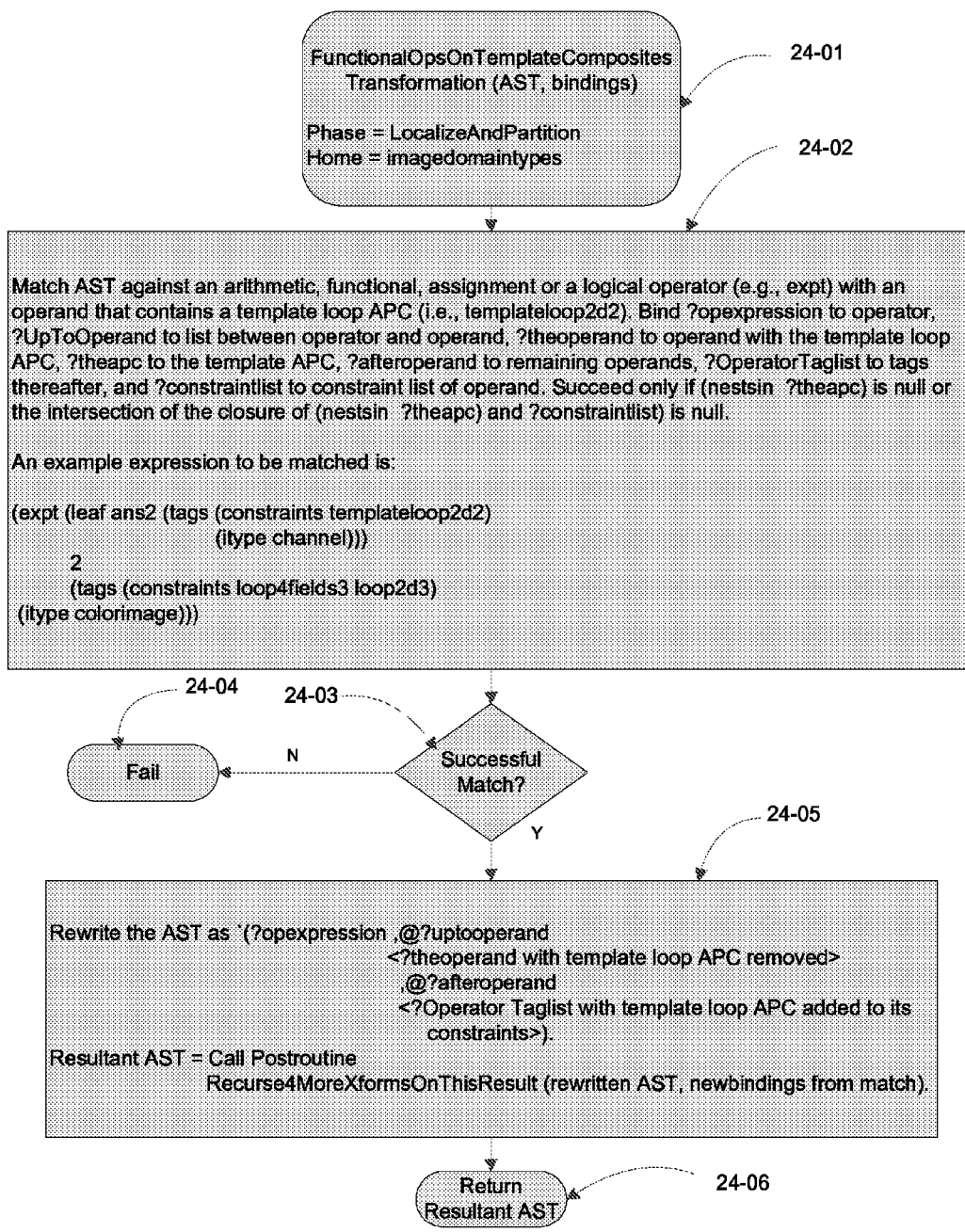
FIG. 24 is the FunctionalOpsOnTemplateComposites transformation, which promotes the first templateloop2d APC to be promoted up an expression level after any APCs in which it is nested have been promoted.
Figure 25:
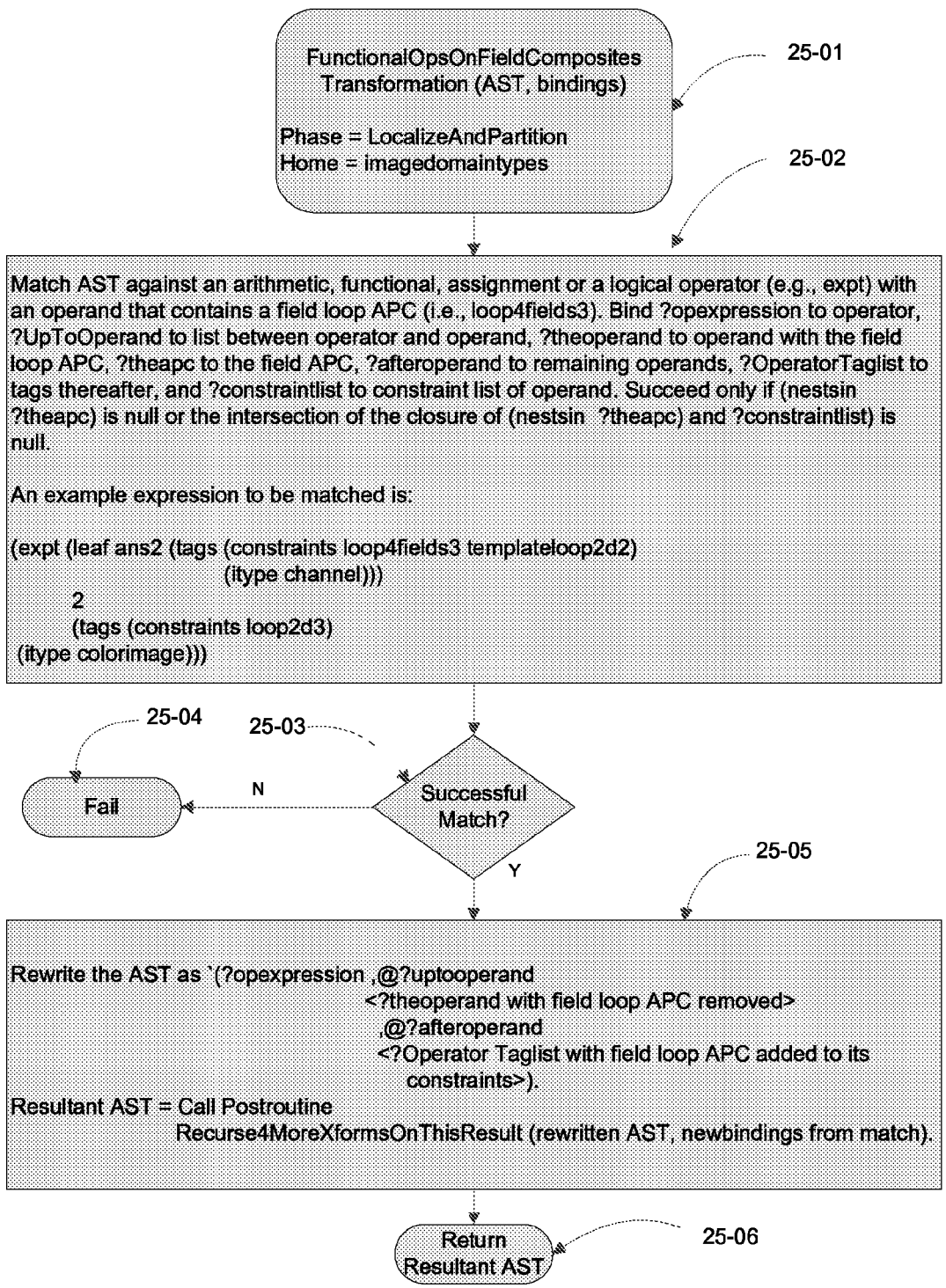
FIG. 25 is the FunctionalOpsOnFieldComposites transformation, which promotes the first Loop4Fields APC to be promoted up an expression level after any APCs in which it is nested have been promoted.

When the time comes to formulate the code for these specialized partition templates (i.e., s-edge1, sp-edge6 and the others), any seed code that is expressed in terms of s and sp will have to be specialized to s-edge1, sp-edge6 and so forth. What will be needed is a list that tells the generator what substitutions will effect these specializations. During the creation of the partition objects (FIG. 21d-e), these lists are generated and stored in the specsubstitutions slot (FIG. 7d) of each partition object (FIG. 21e). The substitution list "((s. s-edge1))" will be used to substitute s-edge1 for s thereby specializing the seed code to partition s-edge1. s-edge2 and so forth are handled analogously.

Finally, since these partitions reflect commitments to partitioned areas of the image matrix, those commitments are captured by introducing two new methods to the partitions: IRange and JRange. These are abstractions that will eventually evolve into the correct range specifications for each of these areas.

Next, the machinery will generate specialized versions of s's methods w, PRange, QRange, col, and row for each of the new, specialized templates. This step uses a simplification mechanism called partial evaluation. (See Jones et al, 1993 and Jones 1996, previously cited.) Partially evaluating code that contains some specific data can often simplify the code. For example, partially evaluating the mathematical expression "(*x0)" will produce the simplified form "0". Similarly, partially evaluating the conditional expression "(if True (then (+x5)) (else (call foo)))" will produce the simplified form "(+x5)". Since, w of s is the only method that will simplify under partial evaluation, we will use it as an example. Suppose that we want to produce a specialized w method for s-edge1. Substituting True for the case 1 test (==?i ?ilow) in w of s produces the definition

```
(Defcomponent w (s-edge1 #.ArrayReference ?p ?q)
    (if (or True (== ?j ?jlow)
        (== ?i ?ihigh) (== ?j ?jhigh) (tags
        (constraints partitionmatrixtest edge)))
```

```
        (then 0)
          (else (if (and (!= ?p 0) (!= ?q 0))
                (then ?q)
                (else (if (and (== ?p 0) (!= ?q 0))
                      (then (* 2 ?q))
                      (else 0)))))))                            [24]
which because the "(or True ...)" expression evaluates to True and
"(then 0)" evaluates to "0", w of s-edge1 partially evaluates to
(Defcomponent w (s-edge1 #.ArrayReference ?p ?q) 0)             [25]
```

That is, the weights of all these edge elements are defined to be 0. The other three W methods for the s-edge2, 3, and 4 templates will also be 0. However, w of s-default will simplify to

```
(Defcomponent w (s-default #.ArrayReference ?p ?q)
      (if (and (!= ?p 0) (!= ?q 0))
          (then ?q)
          (else (if (and (== ?p 0) (!= ?q 0))
                (then (* 2 ?q))
                (else 0))))                                     [26]
```

Analogously, the expression

```
              (rightconvolutionop a  sp)                        [27]
``` goes through similar processing resulting in a new form [28] with loop constraints for the matrix and the template

```
(rightconvolutionop (aref a idx5 idx6) (tags (constraints Loop2D2))
(aref sp p7 q8 (tags (constraints TemplateLoop2D2))))           [28]
``` where the constituent partition set constraint sp-matrixpar is defined in terms of a set of partitions generated by the specialize templates sp-edge6, sp-edge7, sp-edge8, sp-edge9 and sp-default. Analogous to s-matrixpar in FIG. 7d, sp-matrixpar is associated with the APC Loop2D2. After propagation, [28] evolves into form [29]

```
(rightconvolutionop (aref a idx5 idx6) (aref sp p7 q8)
              (tags (constraints Loop2D2 TemplateLoop2D2)))     [29]
```

Recursive Partitioning Conditions: What if there are further partitioning conditions indicated on the then or else branch of one of earlier partitioning conditions? Such a condition is likely to be the result of interactions with different design feature encapsulations. This is handled by recursively processing each newly minted partition with the Cartesian product of that partition and any new partitions within its specialized objects. (FIG. 21a) For example, s-edge1 might still contain a partitioning condition Cz, which might be introduced by a matrix extension encapsulation to make the dimensions of two matrices match. In this case, s-edge1 is specialized into two new objects: s-edge1-xtend and s-edge1-noxtend. If C1 is the partitioning condition of s-edge1, then (C1 ∧ Cz) will be the partitioning condition of s-edge1-xtend and (C1 ∧ ¬Cz) will be the partitioning condition of s-edge1-noxtend. The overall result with be a replacement partitioning set that contains a set of combined cases. It is possible that some cases in the replacement set will be dropped due to inconsistency. That is, if (C1 ∧ Cz) implies (C1 ∧ ¬C1) or (Cz ∧ ¬Cz), the case is dropped. An example is a case in which C1 asserts that the current pixel is in the top half of the matrix and Cz implies that it is on the bottom edge. This issue is further discussed in a later section titled Cartesian Product of Partitions.

Merging Partition Objects: After the two convolution expressions have been processed, the two constraints associated with them just propagate up to the expt expressions with no changes to the constraints. (FIGS. 22-25) When the traversal returns to the + operation, the mechanism has to determine whether or not the two loop constraints—Loop2D1 and Loop2D2—and their constituent partitions—s-matrixpar and sp-matrixpar—are equivalent and can be merged (i.e., can they share a loop?). If not, the whole expression will have to be rewritten as a sequence of two separate statements connected by an intermediate matrix. At this point, the localization and partitioning machinery is now processing the expression

```
(+ (expt (rightconvolutionop (aref a idx3 idx4) (aref s p5 q6)) 2
      (tags (constraints Loop2D1 TemplateLoop2D1)))
   (expt (rightconvolutionop (aref a idx5 idx6) (aref sp p7 q8)) 2)
      (tags (constraints Loop2D2 TemplateLoop2D2)))             [30]
```

Figure 26A:
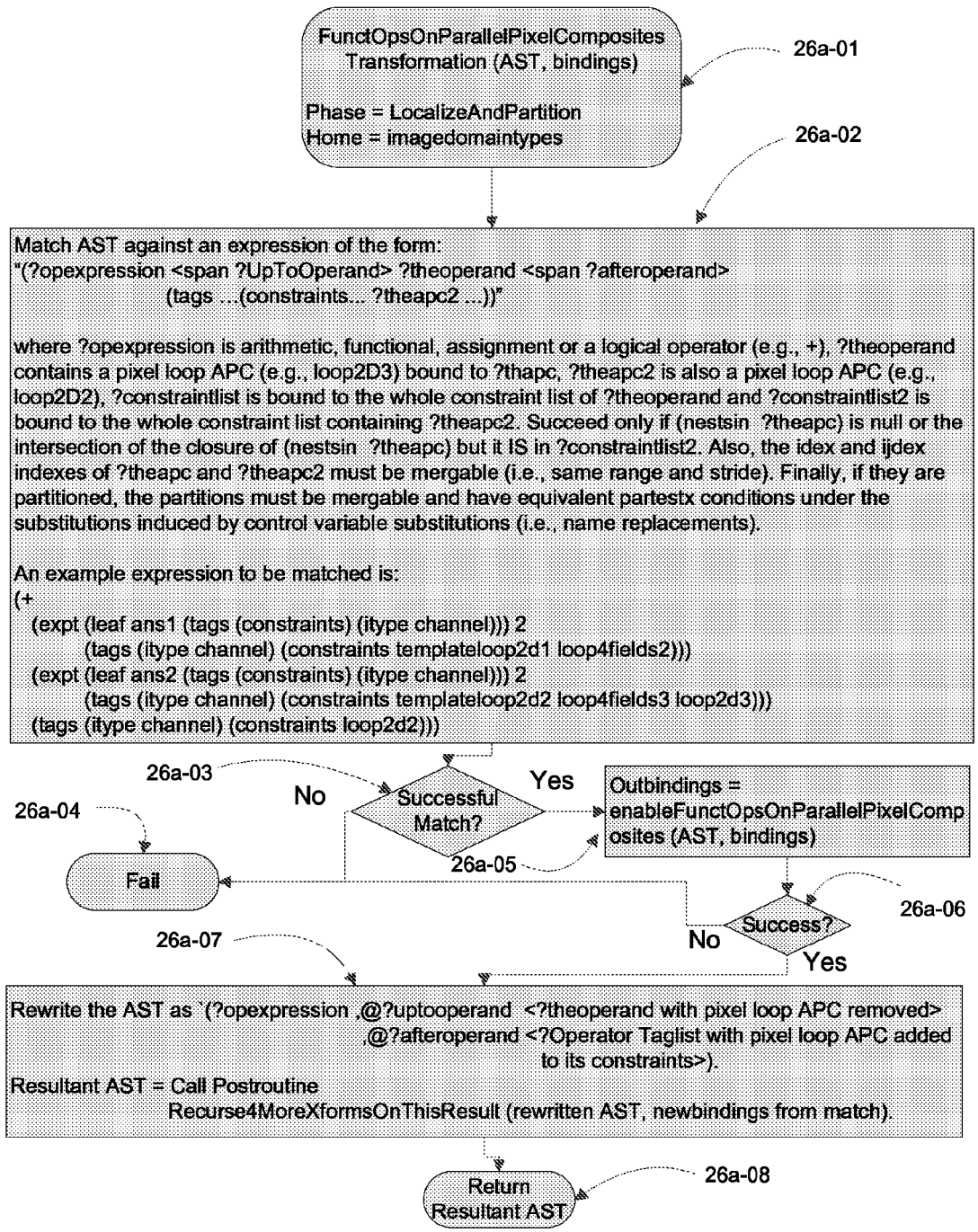
FIG. 26a is the FunctionalOpsOnParallelPixelComposites transformation, which that promotes a pixel APC within an expression and combines it with a different but compatible pixel APC at the expression level.
Figure 26B:
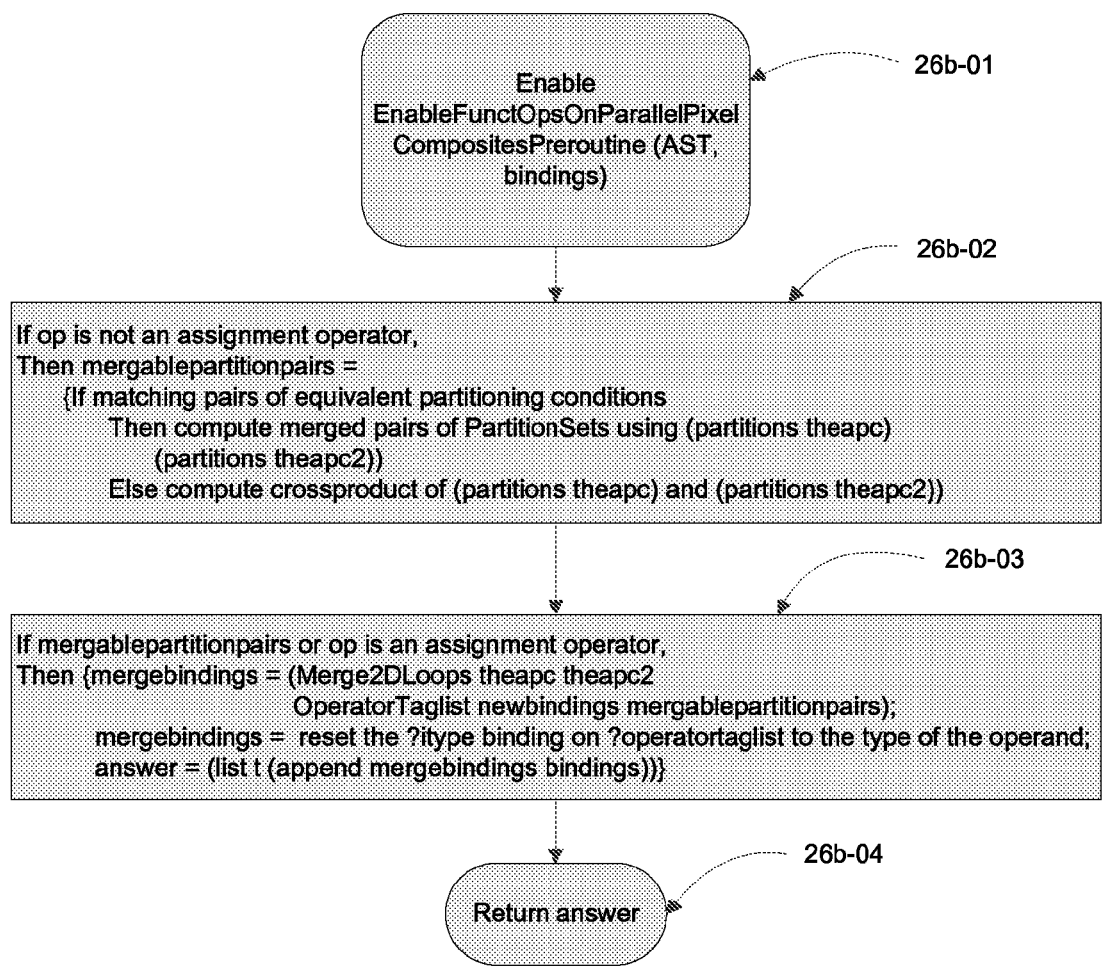
FIG. 26b is the EnableFunctionalOpsOnParallelPixelComposites preroutine for the FunctionalOpsOnParallelPixelComposites transformation.
Figure 27A:
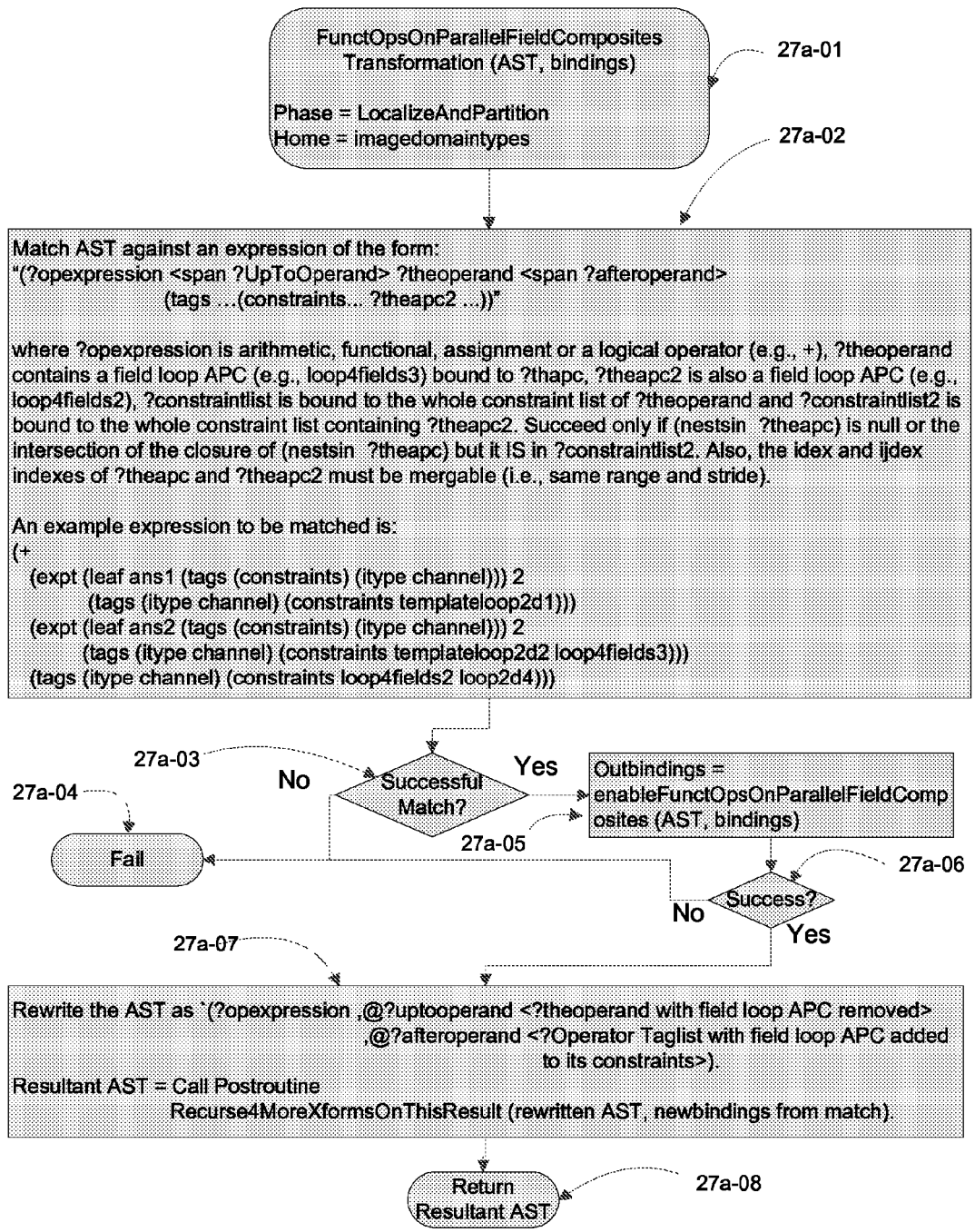
FIG. 27a is the FunctionalOpsOnParallelTemplateComposites transformation, which that promotes a field APC within an expression and combines it with a different but compatible field APC at the expression level.
Figure 27B:
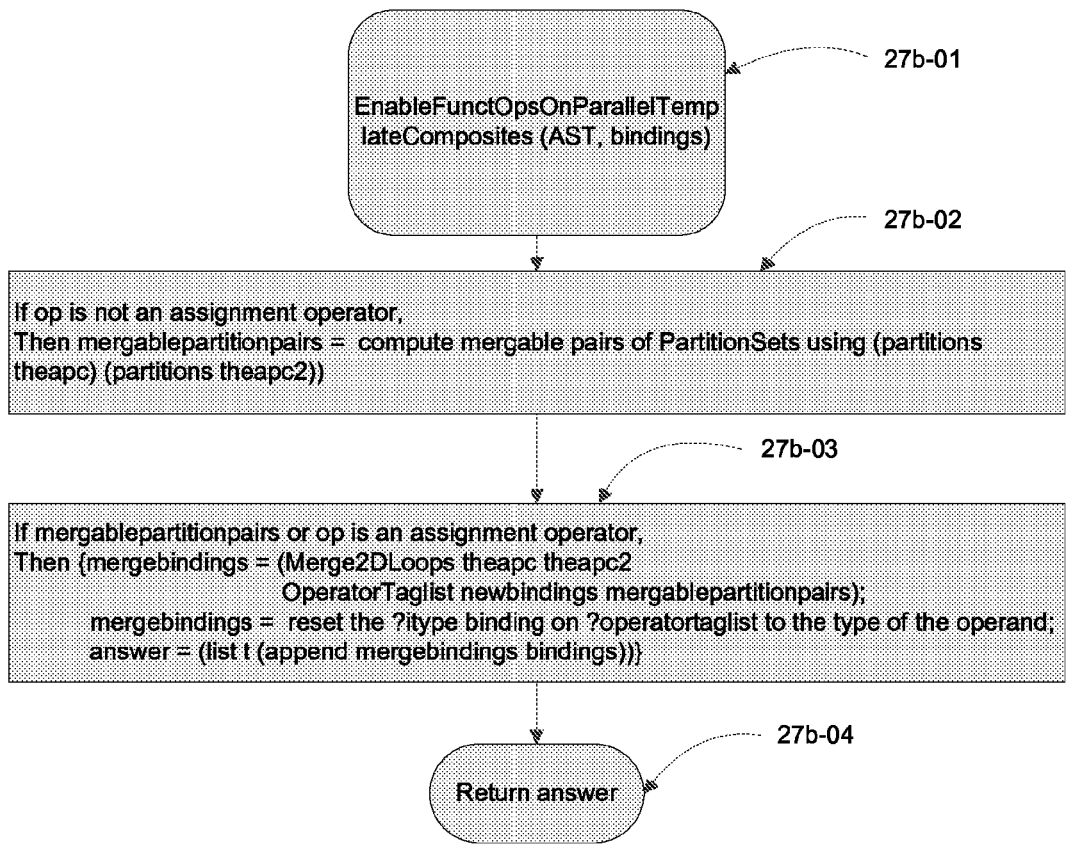
FIG. 27b is the EnableFunctionalOpsOnParallelTemplateComposites preroutine for the FunctionalOpsOnParallelTemplateComposites transformation.
Figure 28A:
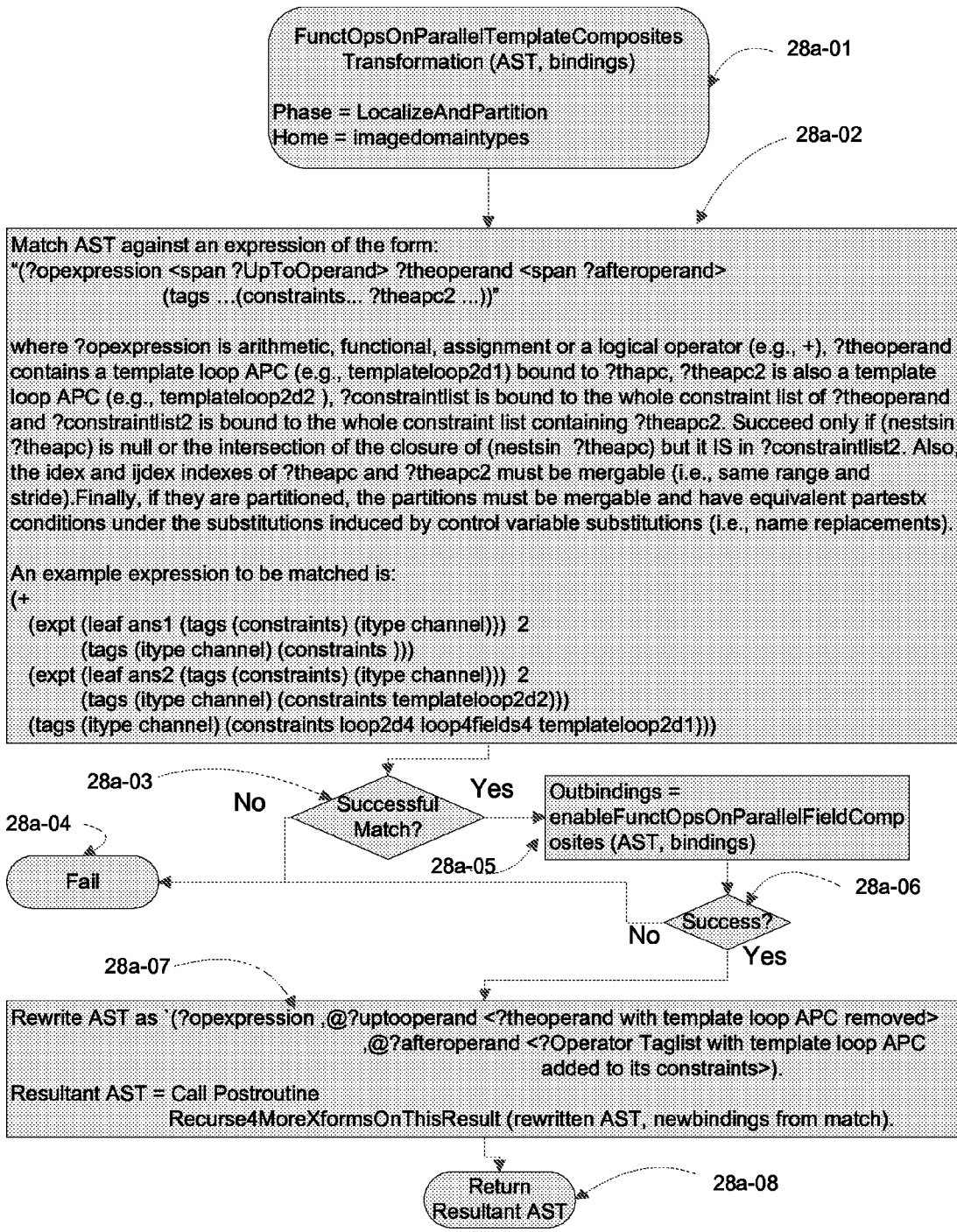
FIG. 28a is the FunctionalOpsOnParallelFieldComposites transformation, which that promotes a template APC within an expression and combines it with a different but compatible template APC at the expression level.
Figure 28B:
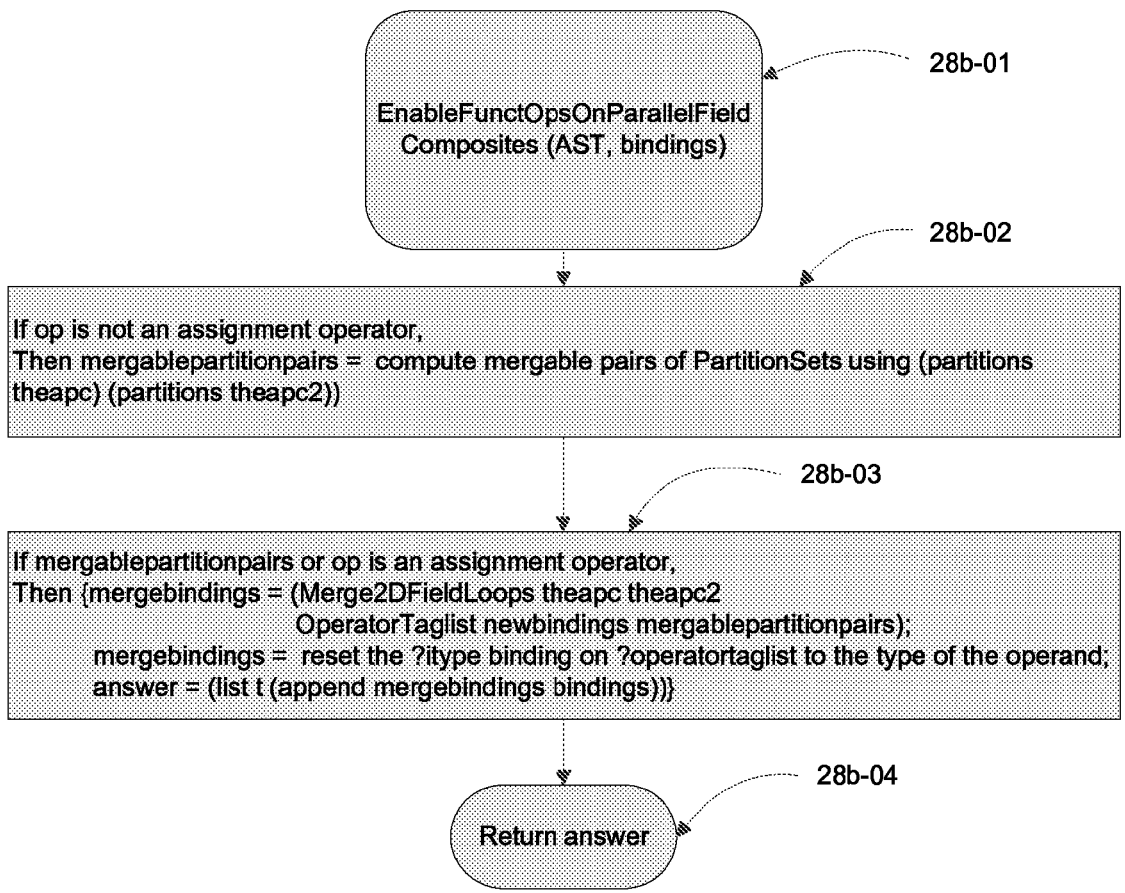
FIG. 28b is the Enable FunctionalOpsOnParallelFieldComposites preroutine for the FunctionalOpsOnParallelFieldComposites transformation.

The loop constraints may be propagated up to the + operator if, based on the definitions of the two expressions, the + expression can be calculated without intervening calculations. That is, all data needed by the two expressions must be currently available to the computation without need for any other yet-to-be-computed data. In fact, this condition is met because the expression contains only pure functions, so these two expressions are candidates for being processed within the same loop. However, the machinery has to determine if the two loop constraints are mergable. They are mergable if 1) the loop ranges are the same, and 2) the partition sets are mergable. Condition 1 is met. Partition sets are mergable if 1) they have the same number of partitions, and 2) a correspondence between corresponding partitions can be found such that for each pair of corresponding partitions, the ranges (and strides, if defined) are provably equal and the ParTestx Defcomponents are provably equal. (FIGS. 26-28)

Simply described, the procedure is to start with a substitution list that asserts equivalence of Loop2D1's and Loop2D2's indexes (i.e., ((idx5. idx3) (idx6. idx4))) and then:
  Show the equivalence of Loop2D1's range and Loop2D2's ranges under that substitution:

```
(member idx3 (range 0 99)) will be equal to (member idx5        [31]
  (range 0 99))
(member idx4 (range 0 99)) will be equal to (member idx6        [32]
  (range 0 99))
```

Show the equivalence of the corresponding pairs of partition "ParTestx (specialized templates)" components after resolving their inline value, i.e., the inline result of ParTestx(s-edge1) from Loop2d1 might be "(==idx3 0)" and the inline result of ParTestx(sp-edge6) from Loop2d2 might be "(==idx5 0)", which under the substitutions, implies

```
          (== idx3 0) will be equal to (== idx5 0)              [33]
```

In summary, this is a specialized proof (i.e., inference) procedure operating on pieces of the target program and logical assertions about them to demonstrate their logical equivalence. There are many ways to implement this but a very general implementation might use some form of Resolution theorem proving to effect the proof in which Unification is used to accomplish the matching of logical expressions (or clauses) such as "(==idx3 0)" and "(==idx5 0)". (See Chang, Chin-Liang: Symbolic Logic and Mechanical Theorem Proving. (Computer Science Classics) Academic Press, (1973), Hardcover, 331 pages and Robinson, J. Alan: A Machine-Oriented Logic Based on the Resolution Principle. Journal of the ACM (JACM), Volume 12, Issue 1, (1965), pp. 23-41) Other more restricted and less general methods would also suffice for this situation, e.g., a Prolog-like rule scheme. A Prolog-like scheme is used in the reduction to practice implementation.

A merged partitioning is created by combining partitionings. (See FIG. 7e, FIG. 47a) For this partitioning, let's call the combined partitioning set s-sp-matrixpar. S-sp-matrixpar will need to keep track of corresponding template cases, that is, cases that have a shared range and stride for each merged partition. It does this by create a new partition for each corresponding pair of partitions. (FIG. 7e) Each merged partition records corresponding pairs of methods via a substitution list that can be used to convert a generic, seed loop (e.g., involving expressions of template s) into a version of that loop specialized for a specific partition by applying the substitution list to the generic loop. That is, a generic loop expressed in terms of templates s and sp becomes a loop specialized to the s-edge1 and sp-edge6 pair by applying the substitution list ((s. s-edge1) (sp. sp-edge6)) to that loop. Since the partition tests must be equivalent to allow merging, ParTestx(s) may be specialized by substitution of either s-edge1 or sp-edge6 for s.

So, all conditions are met to merge the loop constraints and propagate them up to the + operator. The machinery will determine that idx3 and idx5 are equivalent indexes and idx4 and idx6 are too, so Loop2D2's idx5 and idx6 can be discarded and Loop2D1's, idx3 and idx4 will survive the merge. S-sp-matrixpar will be the partitioning for the surviving loop, Loop2D3. The final result for the + expression is:

```
(+ (expt (rightconvolutionop (aref a idx3 idx4) (aref s p5 q6)) 2)
    (expt (rightconvolutionop (aref a idx3 idx4) (aref sp p5 q6)) 2)
    (tags (constraints Loop2D3 TemplateLoop2D3) ))          [34]
```

Next, Loop2D3 propagates up to the sqrt function unchanged based on the definition of sqrt. Finally, Loop2D3 merges with the loop constraint on b and it is the surviving loop constraint. Thus, at end of the localization and partitioning phase, the expression [17] has evolved by APC merging (FIG. 47a) to [34a].

```
(:= (aref b i j) (sqrt (+ (expt (rightconvolutionop (aref a idx3 idx4)
                (aref s p5 q6)) 2) (expt (rightconvolutionop
                (aref a idx3 idx4) (aref sp p5 q6)) 2)))
        (tags (constraints Loop2D3 TemplateLoop2D3)))       [34a]
``` where Loop2D3 will have a control specification (e.g., range and stride) that is common to Loop2D1 and Loop2D2, and will be constrained by the partition set s-sp-matrixpar. (FIG. 7e) TemplateLoop2D3 is similarly formed by merging TemplateLoop2D1 and TemplateLoop2D2. Both merges use the Loop2D merge method Merge2DLoops of FIG. 47a. Had there been field functions (e.g., RGB color fields), the method of FIG. 47b would have been used in addition. (See FIGS. 23-28b, FIGS. 47a-b for detailed logic of APC merging.)

At the completion of this phase of processing, the result is

```
(progn scope1
    (:= (aref b i j)
        (sqrt (+ (expt (rightconvolutionop (aref a idx3 idx4)
            (aref s p5 q6)) 2)
            (expt (rightconvolutionop (aref a idx3 idx4)
            (aref sp p5 q6)) 2)))
        (tags (constraints Loop2D3 TemplateLoop2D3)))))     [35]
``` where scope1 is a generated object that is the temporary holder of declaration information that is introduced during the overall generation process. It also holds the initial declarations supplied with the specification, i.e.,

```
(dsdeclare dsnumber m :value 100)
(dsdeclare dsnumber n :value 100)
(dsdeclare image a :form (array m n) :of bwpixel)
(dsdeclare image b :form (array m n) :of bwpixel)           [36]
```

Decision Propagation Phase

At the end of the localization and partitioning phase, decisions from the localization and partitioning phase must be propagated to the program (e.g., target program variable idx5 is replaced by variable idx3 and idx5 is discarded). This is handled by FIG. 29. Each of these decisions (e.g., changing names of loop indexes, field names, etc.) is recorded by the creation of a dynamic transformation (e.g., idx5=>idx3) that is stored on the item being replaced (e.g., idx5). This phase simply walks the AST and executes any transformations associated with the objects that it encounters.

Loop Generation Phase

Recall that in the Localization and Partitioning Phase the templates (e.g., s and sp) were specialized into new templates (e.g., s-0 and sp-0) that relocate their indexes from domain friendly ranges (e.g., [−1,1]) to GPL-friendly ranges (e.g., [0, 2]) but that the intervening examples omitted these specialized templates to make the examples more compact. At this point, they become relevant so they will be re-introduced into the description.

This phase will transform the loop constraint APC into an internal seed loop form that will be the basis for all loops generated in the various partitionings that the various machine specifications might induce. (FIGS. 30-33, FIGS. 48a-b) Later, when the partition constraint is processed, it will replicate and customize this seed loop for each partition. In this seed loop, idx3 and idx4 are declared to be the indexes and the suchthat field of the loop APC contains propositional phrases describing the properties of the loop, which, so far, are just propositions describing the ranges of the indexes. Later, some derivative loops will eventually contain propositions that will be used to infer modified ranges or eliminate loops altogether (e.g., when (==idx3 0) is true).

In general, APCs are abstract, domain oriented constraints. Specifically, loop APCs are the first but not finalized approximation of loops expressed declaratively in a mixture of GPL-like details (e.g., propositions specifying hypothetical loop ranges and strides), domain oriented design abstractions (e.g., partitions and partition sets), and programming action requests (e.g., make this loop into an out-of-line, callable routine containing a threaded version of the loop). APCs declaratively specify properties of the eventual GPL structures rather than explicitly construct those GPL structures.

- Each APC is an atomic package of information constraining a specific domain concept (e.g., an outer convolution loop). Eventually that information will be distributed among multiple, related GPL-like entities (e.g., GPL-like loops, scopes, thread code (optionally) and loop housekeeping code).
- They can interact with other APCs (e.g., other loop APCs and partitioning APCs) to realize differing GPL designs. Loop APCs may merge, thereby allowing loop bodies to share a looping structure (e.g., index variables and loop control). Loop and partition APCs interact to partition one loop into multiple, independent case loops, each achieving some portion of the overall loop computation.
- Their loop specification information is expressed by logical propositions (e.g., (==idx3 0) and (member idx3 (range 0 99)) rather than operational, GPL-like forms (e.g., "for (idx3=0; ++idx3; idx3<=0) . . ."). This allows the generator to change the loop specification very simply (e.g., by adding a proposition for example), without the need to re-code some AST structure. Such changes may imply new GPL loop control structures or even imply that a loop instance should be eliminated. Importantly, it allows the system to defer commitments to specific GPL structures (e.g., loops, scopes, thread code, housekeeping code, and combinations of these) until their complete set of constraint propositions has evolved.
- Domain knowledge is carried by the APC data type. For example, a loop2d data type carries information that it is an "outer convolution loop over an image" whereas a templateloop2d carries information that it is an "inner convolution loop over template-defined sub-image". Domain knowledge often simplifies the generation process by providing analysis-free properties for the target code. For example, the property that an outer and inner convolution loop generated by the same convolution expression must be nested loops is known directly without need for any code analysis. And more concretely, in [7a] the value of the nestin field of templateloop2d3 is loop2d5. Note that if the chosen representation were a GPL-base representation (i.e., if the system were operating in the program domain), this information would be encoded in the syntax of the GPL code (if encoded at all) and one might have to perform an extended analysis of the GPL code to discover this property whereas in the problem domain, the relationship is expressed declaratively.
- Domain knowledge may help to shape or specialize the definitions of operators (e.g., convolutions over color field data types result in different code from convolutions over opacity fields). More specifically, pixels often have fields other than color fields (e.g., opacity or depth). A convolution is only defined over the color fields and the other fields by default become field copies. However, the user may chose to change the default operation for those fields to some other function by specializing the convolution definition for specific kinds of domain fields.

This section will look at an example APC (loop2d5) which is a CLOS object of type loop2d. (FIG. 46) We illustrate how the GPL-seed loop forms are generated from loop2d5 and other APCs (e.g., partition APCs). The important fields of the loop2d5 object for this discussion are:

| Field Name | Field Value |
| --- | --- |
| idex | idx3 |
| irange | 0, 99 |
| jdex | idx4 |
| jrange | 0, 99 |
| nestsin | nil |
| partitions | partitionset3 |
| pname | loop2d5 |
| suchthat | (member idx3 (range 0 99)) |
|  | (member idx4 (range 0 99)) |
| super | loop2d |

Most of the fields are self explanatory with the exception of the partitions fields. Partitionset3 is an object that in this example contains five related partitionmatrix objects each of which describes a specific partitioning of loop2d5. At this point, we have switched from the publication friendly naming convention used in earlier small examples (e.g., s-sp-matrix-par for the example combined matrix partition) to the actual naming conventions used in the reduction to practice implementation of the generator (i.e., Partitionmatrixm for a matrix partition object and Partitionsetn for a partition set).

Two fields of each partitionmatrix object are relevant to this discussion: the partitiontest field and the specsubstitutions field. (FIGS. 7*c-e*, 46) The values of those fields for this example are:

| Partitionmatrix Object | Partitiontest Field | Specsubstitutions Field |
| --- | --- | --- |
| Partitionmatrix11 | (partestx sp-0) | ((s-0 s-0-edge6) (sp-0 sp-0-edge1)) |
| Partitionmatrix12 | (partestx sp-0) | ((s-0 s-0-edge7) (sp-0 sp-0-edge2)) |
| Partitionmatrix13 | (partestx sp-0) | ((s-0 s-0-edge8) (sp-0 sp-0-edge3)) |
| Partitionmatrix14 | (partestx sp-0) | ((s-0 s-0-edge9) (sp-0 sp-0-edge4)) |
| Partitionmatrix15 | (partestx sp-0) | ((s-0 s-0-default10) (sp-0 sp-0-default5)) |

To specialize a seed loop for any one of these partitionmatrix objects, the generator applies the specialization substitutions (specsubstitutions) to a copy of the seed loop body. It also applies the substitutions to the loop's suchthat field, thereby transforming the (partestx s-0) occurrence in that field of the clones to an expression such as (partestx s-0-edge6), (partestx s-0-edge7), or similar expression. The fact that there are two substitutions on each specialization substitution list indicates that as the loop APCs propagated up the expression AST, the generator discovered that the loop over of the convolution of s-0 could be shared with the convolution of sp-0 and they and their partition objects were merged. (FIGS. 23-28*b*, FIGS. 47*a-b*) As a matter of fact, the loop APCs propagated to the top the expression

```
(:= (aref b idx3 idx4) (sqrt (+ (expt ans1 2) (expt ans2 2)))
    (tags (itype bwpixel) (constraints templateloop2d3 loop2d5)))    [37]
``` and the generator generated a seed loop in preparation for splitting that loop into partitions. (The generator revises expressions beforehand to assure that the matrix loop will propagate to the top of the expression.) If a multi-core design is specified, these partitions will be wrapped with thread routine definitions and calls to those routines are generated as the main body of the program. However, because that kind of straightforward generation is peripheral to the key partitioning ideas, we will omit that complexity from the example for the moment.

The pre-partitioning GPL-like loop structures that are derived from the APCs associated with [37] (FIGS. 30-33, FIGS. 48a-b) look something like

```
(progn scope1
    (let scope2 ((idx3 0) (idx4 0))
        (forall (idx3 idx4)
            (suchthat (partestx sp-0) (member idx3 (range 0 99))
                (member idx4 (range 0 99)))
            (let scope3 ((p5 0) (q6 0) (ans2 0) (ans1 0))
                (forall (p5 q6)
                    (suchthat (member q6 (range 0 2)) (member p5 (range 0 2))
                        (answervbl ans1 0) (answervbl ans2 0))
                    (:=+ ans2 (rightconvolutionop (aref a idx3 idx4)
                        (aref sp-0 p5 q6)))
                    (:=+ ans1 (rightconvolutionop (aref a idx3 idx4)
                        (aref s-0 p5 q6))))
                (:= (aref b idx3 idx4) (sqrt (+ (expt ans1 2) (expt ans2 2)))))))
            (tags (constraints partitionset3))))              [38]
```

This is not quite real GPL code yet but it is close enough that one can intuit the meaning of most of the constructs. On that basis, we present the template loop (i.e., (forall (p5 q6) . . . )) without a detailed discussion of its derivation. Its derivation is conceptually analogous to the outer convolution loop over the image (i.e., (forall (idx3 idx4) . . . )). Suffice it to say, that the two template loops of s-0 and sp-0 were discovered to be mergable IF they were first reformed to compute their result out-of-line of the (sqrt . . . ) expression. This was accomplished with the introduction of the two so-called answer variables ans1 and ans2 whose roles in the loop are described semantically in the loop's suchthat clause.

The various scope objects that show up here (e.g., scope3) are behind-the-scenes housekeeping devices for storing target program variables declarations whose need is discovered in some lower part of a subtree but whose declaration location is dictated by the target GPL (e.g., C) to be at the top of that subtree. The housekeeping code of the generator creates and stores such declarations on these scope objects. These declarations will be inserted in their GPL dictated locations just before the actual C code is generated.

The list of (variable value) pairs (e.g., (p5 0) or (ans 1 0)) in the let constructs represent the initial values of those variables upon entry to the associated loop.

Form [38] contains the seed loop structure that will be partitioned by cloning based on the partitionset3 APC that now resides on the tags list of the loop over idx3 and idx4.

Partitioning the Computation by Loop Cloning and Specializing

The Loop Partitioning phase reformulates the seed loop based on the partition design derived earlier and described by partitionset3. (FIGS. 34a-b and FIGS. 49a-b.) In short, this processing will replicate the loop in formula [38] five times, once for each of the specialized template pairs s-0-case and sp-0-case. Each loop will be specialized using the substitutions defined by one of the ParSubstx methods for sp-0-edge1, sp-0-edge2, sp-0-edge3, sp-0-edge4 or sp-0-default. partitionset3 determines what kind of control structure framework is required for the replicated and specialized loops. In this case, because the machine specification specified the use of SIMD vector instruction extensions, partitionset3 will effect a simple sequence of the specialized loops that will handle different partitions of the matrix and one of those specialize loops will be reformed to use SIMD instructions. In contrast, had the architectural specification requested multi-core execution, partitionset3 would have generated a control structure that would spawn separate execution threads for the loops. This case will be described later in this description.

Applying the specsubstitutions to copies of the edge cases produce structures analogous to

```
(let scope2 ((idx3 0) (idx4 0))
    (forall (idx3 idx4)
        (suchthat (partestx sp-0-edge1) (member idx3 (range 0 99))
            (member idx4 (range 0 99)))
        (let scope3 ((p5 0) (q6 0) (ans2 0) (ans1 0))
            (forall (p5 q6)
                (suchthat (member q6 (range 0 2)) (member p5 (range 0 2))
                    (answervbl ans1 0) (answervbl ans2 0))
                (:=+ ans2 (rightconvolutionop (aref a idx3 idx4)
                    (aref sp-0-edge1 p5 q6)))
                (:=+ ans1 (rightconvolutionop (aref a idx3 idx4)
                    (aref s-0-edge6 p5 q6))))
            (:= (aref b idx3 idx4) (sqrt (+ (expt ans1 2) (expt ans2 2))))))))     [39]
``` and the default partition produces the analogous form

```
(let scope2 ((idx3 0) (idx4 0))
    (forall (idx3 idx4)
        (suchthat (partestx sp-0-default5) (member idx3 (range 0 99))
            (member idx4 (range 0 99)))
        (let scope3 ((p5 0) (q6 0) (ans2 0) (ans1 0))
            (forall (p5 q6)
                (suchthat (member q6 (range 0 2)) (member p5 (range 0 2))
                    (answervbl ans1 0) (answervbl ans2 0))
                (:=+ ans2 (rightconvolutionop (aref a idx3 idx4)
                    (aref sp-0-default5 p5 q6)))
                (:=+ ans1 (rightconvolutionop (aref a idx3 idx4)
                    (aref s-0-default10 p5 q6))))
            (:= (aref b idx3 idx4) (sqrt (+ (expt ans1 2) (expt ans2 2)))))))).   [40]
```

At this point, we have five separate but still abstract GPL-like loops whose concrete details depend on ten specialized templates, five that are specializations of s-0 and five of sp-0.

Evolving Abstract Loops into Concrete Loops

The Definition Inlining phase will inline the domain entities and IL definitions, that is, definitions for operators (e.g., convolutions) and MT components (e.g., (w s . . . )) among others. Earlier, we discussed the set of steps in this phase by showing a generic case with generic components in forms [7-15]. Since inlining these loops differs only modestly from the generic example (i.e., these components are specialized versions of the generic components), we will omit showing this level of expression-to-expression transformation and just present the results with some explanation of how the results differ from the generic case.

The edge cases all have pretty much the same form as [39] or [40] after inlining with minor but critical differences such as the partitioning assertions like "(==idx3 0)"). Form [41], the edge partition where (==idx3 0), is representative of these forms after inlining.

```
(let scope2 ((idx3 0) (idx4 0))
    (forall (idx3 idx4)
        (suchthat (== idx3 0) (member idx3 (range 0 99)) (member idx4
            (range 0 99)))
        (let scope3 ((p5 0) (q6 0) (ans2 0) (ans1 0))
            (forall (p5 q6)
```

-continued

```
(suchthat (member q6 (range 0 2)) (member p5 (range 0 2))
         (answervbl ans1 0) (answervbl ans2 0))
    (:=+ ans2 (* (aref a (+ idx3 (+ p5 −1)) (+ idx4 (+ q6 −1))) 0))
    (:=+ ans1 (* (aref a (+ idx3 (+ p5 −1)) (+ idx4 (+ q6 −1))) 0))
    (:= (aref b idx3 idx4) (sqrt (+ (expt ans1 2)
    (expt ans2 2))))))))).                                              [41]
```

The follow on phase (SimplifyLoops; FIGS. 36-42h) attempts to simplify these forms, largely by partial evaluation. In this case, the multiplication by 0 (i.e., the weight for all template items for the edge cases) reduces the ans1 and ans2 answer accumulation statements to the expressions

```
                    (:=+ ans1 0)                                        [42]
                    (:=+ ans2 0)                                        [43]
``` and because, the initial values of both are specified to be 0 in the let, the partial evaluator infers that both are always a constant 0. Given that, the "(forall (p5 q6) . . . )" loop is eliminated. Finally, the "(sqrt . . . )" expression reduces to 0 and whole expression [41] becomes

```
(let scope2 ((idx4 0))
  (forall (idx4)
    (suchthat (== idx3 0) (member idx3 (range 0 99))
              (member idx4 (range 0 99)))
    (:= (aref b 0 idx4) 0))).                                           [44]
```

Notice, that the idx3 loop has also been eliminated because idx3 is always 0 and additionally, "(aref b idx3 idx4)" has become "(aref b 0 idx4)". The other edge cases will have analogous forms for the constant index cases where idx3 is 99 or idx4 is 0 or 99.

The default (non-edge) case cannot be simplified and its form after the inlining and simplification phases is

```
(let scope2 ((idx3 0) (idx4 0))
 (forall (idx3 idx4)
 (suchthat (!= idx3 0) (!= idx3 99) (!= idx4 0) (!= idx4 99)
           (member idx3 (range 0 99)) (member idx4 (range 0 99)))
 (let scope3 ((p5 0) (q6 0) (ans2 0) (ans1 0))
   (forall (p5 q6)
     (suchthat (member q6 (range 0 2)) (member p5 (range 0 2))
               (answervbl ans1 0) (answervbl ans2 0))
     (:=+ ans2 (* (aref a (+ idx3 (+ p5 −1)) (+ idx4 (+ q6 −1)))
              (if (and (!= (− p5 1) 0) (!= (− q6 1) 0)) (then (− p5 1))
                (else
                  (if (and (!= (− p5 1) 0) (== (− q6 1) 0))
                    (then (* 2 (− p5 1))) (else 0)))))
     (:=+ ans1 (* (aref a (+ idx3 (+ p5 −1)) (+ idx4 (+ q6 −1)))
              (if (and (!= (− p5 1) 0) (!= (− q6 1) 0)) (then (− q6 1))
                (else
                  (if (and (== (− p5 1) 0) (!= (− q6 1) 0))
                    (then (* 2 (− q6 1))) (else 0)))))
     (:= (aref b idx3 idx4) (sqrt (+ (expt ans1 2) (expt ans2 2))))))))).  [45]
```

Notice the propositions in the outer suchthat field. A later phase will infer the actual, concrete limits required by the target program GPL (C) and this suchthat field will be rewritten into its final form before the actual C code is generated, specifically,

```
(suchthat (member idx3 (range 1 98)) (member idx4 (range 1 98))).       [46]
```

Of course, in real world examples the original limits are likely to be symbolic expressions such as "(−M1)" or "(−N1)" so that the revised suchthat clause might contain "(range 1 (−M 2))" or "(range 1 (−N 2))" after the partial evaluation of interim forms like "(+0 1)" and "(−(−M1) 1)".

Partitioning Results

Putting the results together, the AST for the partitioned loops has the form

```
(progn
 ...
 (let scope4 ((idx4 0)) ;; edge 1 case
  (forall (idx4)
    (suchthat (== idx3 0) (member idx3 (range 0 99))
              (member idx4 (range 0 99)))
    (:= (aref b 0 idx4) 0)))
 (let scope5 ((idx4 0)) ;; edge 2 case
  (forall (idx4)
    (suchthat (!= idx3 0) (== idx3 99) (member idx3 (range 0 99))
              (member idx4 (range 0 99)))
    (:= (aref b 99 idx4) 0)))
 (let scope6 ((idx3 0)) ;; edge 3 case
  (forall (idx3)
    (suchthat (!= idx3 0) (!= idx3 99) (== idx4 0)
              (member idx3 (range 0 99))
              (member idx4 (range 0 99)))
    (:= (aref b idx4 0) 0)))
 (let scope7 ((idx3 0)) ;; edge 4 case
  (forall (idx3)
    (suchthat (!= idx3 0) (!= idx3 99) (!= idx4 0) (== idx4 99)
              (member idx3 (range 0 99)) (member idx4 (range 0 99)))
    (:= (aref b idx4 99) 0)))
 (let scope2 ((idx3 0) (idx4 0)) ;; default case
  (forall (idx3 idx4)
    (suchthat (!= idx3 0) (!= idx3 99) (!= idx4 0) (!= idx4 99)
              (member idx3 (range 0 99)) (member idx4 (range 0 99)))
    (let scope3 ((p5 0) (q6 0) (ans2 0) (ans1 0))
     (forall (p5 q6)
       (suchthat (member q6 (range 0 2)) (member p5 (range 0 2))
                 (answervbl ans1 0) (answervbl ans2 0))
       (:=+ ans2 (* (aref a (+ idx3 (+ p5 −1)) (+ idx4 (+ q6 −1)))
                (if (and (!= (− p5 1) 0) (!= (− q6 1) 0)) (then (− p5 1))
                  (else
                    (if (and (!= (− p5 1) 0) (== (− q6 1) 0))
                      (then (* 2 (− p5 1))) (else 0)))))
       (:=+ ans1 (* (aref a (+ idx3 (+ p5 −1)) (+ idx4 (+ q6 −1)))
                (if (and (!= (− p5 1) 0) (!= (− q6 1) 0)) (then (− q6 1))
                  (else
                    (if (and (== (− p5 1) 0) (!= (− q6 1) 0))
                      (then (* 2 (− q6 1))) (else 0)))))
       (:= (aref b idx3 idx4) (sqrt (+ (expt ans1 2) (expt ans2 2))))))))).  [47]
```

Results for Multi-Core Architectures

Had we followed in detail through the transformations for multi-core platforms with two cores, for example, [47] might be organized into two routines to be called from within two threads as shown in [48]. (FIGS. 36-43b) (The detailed calls for thread creation and synchronization vary from platform to platform but are generally similar enough that they can be used from a common interface. Without getting into too much detail, this exposition uses an interface that is loosely similar to the Microsoft C++ thread interface.) Notice that two edge cases and the top half of the default case are organized into the dotop function and the other two edge cases and the bottom half of the default case into dobot.

```
(progn
 ...
  (dsdeclare THandle THandle1 ...)
  (dsdeclare THandle THandle2 ...)
 ...
  (defunop dotop ( ) ;;; thread routine for two edges and top of center
  (let scope4 ((idx4 0)) ;; edge 1 case
     (forall (idx4)
       (suchthat (== idx3 0) (member idx3 (range 0 99))
           (member idx4 (range 0 99)))
       (:= (aref b 0 idx4) 0)))
  (let scope5 ((idx4 0)) ;; edge 2 case
     (forall (idx4)
       (suchthat (!= idx3 0) (== idx3 99) (member idx (range 0 99))
           (member idx4 (range 0 99)))
       (:= (aref b 99 idx4) 0)))
  (let scope2 ((idx3 0) (idx4 0)) ;; half of default case (0 < idx3 <= 49)
     (forall (idx3 idx4)
       (suchthat (!= idx3 0) (!= idx3 99) (!= idx4 0) (!= idx4 99)
           (member idx3 (range 0 49)) (member idx4 (range 0 99)))
       (let scope3 ((p5 0) (q6 0) (ans2 0) (ans1 0))
         (forall (p5 q6)
           ... template loop elided ...
           (:= (aref b idx3 idx4)
             (sqrt (+ (expt ans1 2) (expt ans2 2)))))))))
  (defunop dobot ( ) ;;; thread routine for other two edges and bottom of
  center
  (let scope6 ((idx3 0)) ;; edge 3 case
     (forall (idx3)
       (suchthat (!= idx3 0) (!= idx3 99) (== idx4 0)
           (member idx3 (range 0 99)) (member idx4 (range 0 99)))
       (:= (aref b idx4 0) 0)))
  (let scope7 ((idx3 0)) ;; edge 4 case
     (forall (idx3)
       (suchthat (!= idx3 0) (!= idx3 99) (!= idx4 0) (== idx4 99)
           (member idx3 (range 0 99)) (member idx4 (range 0 99)))
       (:= (aref b idx4 99) 0)))
  (let scope2 ((idx3 0) (idx4 0)) ;; other half of default case
  (50 <= idx3 <= 98)
     (forall (idx3 idx4)
       (suchthat (!= idx3 0) (!= idx3 99) (!= idx4 0) (!= idx4 99)
           (member idx3 (range 50 99)) (member idx4 (range 0 99)))
       (let scope3 ((p5 0) (q6 0) (ans2 0) (ans1 0))
         (forall (p5 q6)
           ... template loop elided ...
           (:= (aref b idx3 idx4) (sqrt (+ (expt ans1 2) (expt ans2 2))))))))
  (create_thread THandle1 dotop "list of arguments"[79] cpu1)
  (create_thread THandle2 dobot "list of arguments" cpu2)
  (thread_join THandle1)
  (thread_join THandle2))                                    [48]
```

(In [48], the actual "list of arguments" argument to the two calls to create-thread is an empty list since the thread handles are defined as global variables.)

The interaction between the computation design, the thread domain, and the multi-core platform domain provides a rich set of opportunities for variations in the final design. Variations that arise because of a multiplicity of cores are just the tip of the iceberg of such opportunities.

Alternative Architectures

The examples to this point have illustrated how to partition loops for multi-core processors. These examples have assumed that vector-based instructions (if available) have not been exploited. However, the generator is designed to partition a computation for vector-based instructions in addition to (or instead of) multi-core partitioning. In the following example, we will provide a general description of the processing without going into the step by step detailed evolution. For concreteness, the example will focus on Intel's MMX/SSE instruction set although the method is easily applicable to other application specific instruction sets including those for parallelization or other high capability functionality. Other kinds of SIMD instructions can be accommodated by the general principles shown below but the details of the design features, design objects (i.e., cousins of partition and partitionset objects) and transformations will be specific to the domain of the SIMD instruction set.

For the convolution specific to the example computation, the kind of vector instruction that should be exploited is the sum of products instructions. That is, an expression such as "$(C_1 * X_1)+(C_2 * X_2)+ \ldots +(C_n * X_n)$" may be represented by one or more vector instructions, where the $C_i$ coefficients are contiguous in memory (i.e., no gaps in their vector indexes) within some vector of numerical coefficients and $X_i$'s are contiguous within a vector of numbers. (If the $X_i$ fields are not contiguous but there are regular gaps between them (e.g., the red fields in an RGB structure), then the generator uses a "gather read" or "scatter write" technique for assembling or disassembling the specific $X_i$ fields.) Typically, the data types of C and X can be chosen from several kinds of integer or floating point numbers. The example will represent such vector instructions abstractly in the AST as "(pmadd n &C &X)" where n is the parameterized length of the instruction, the "&" represents the address operator, and the data types of C and X determine the exact machine instruction intended. Clearly, the transformation from this abstraction to the MMX/SSE pmadd instruction or a compiler intrinsic form is generally straightforward and often trivial.

Two segmentation issues must be dealt with. First, the machine instructions are designed for some maximum n and second, while C can be constructed to be contiguous, the X vectors in an image will not be (in general). The second issue is dealt with by dealing with each template row separately (assuming the image is stored in row-major order), in which case the row length (i.e., 3 for our example) does not exceed the instruction limit. The first issue is dealt with by generating multiple pmadd instructions if n exceeds the maximum instruction length. For this example, it does not and that simplifies the generated code.

There is another variation that must be dealt with. The coefficients C may be constants (as in these examples) or they may be functions that have to be calculated at run time. In both cases, the generator generates an array for the coefficients and a loop for computing them. The only difference in the two cases is when that loop is executed—at generation time or at target program execution time. In the example shown, the loop is executed at generation time and the array will appear in the generated program as a declaration with a vector of constant initial values.

So, how does vectorization happen? Fundamentally, it is realized by yet another specialization of the template (e.g., s-0-default9) to a new template (e.g., s-0-default9-MMX) with a specialized version of the w MT component. The new version of w uses a heretofore unmentioned capability of MT components. Just like regular transformations, MT components may optionally have a so-called preroutine and/or a postroutine. The preroutine executes just after the parameter pattern has been processed but before the expression rewrite for the preroutine. The postroutine executes just after the expression rewrite for the postroutine. These facilities are LISP functions in the reduction to practice implementation that are designed to perform data or control management activities that are not well suited to a transformation-based notation. Typically, for preroutines, they perform data management on tables or objects, create new symbols and definitions, and in this case, call a routine designed to perform vector-based specialization of template components. The new template (e.g., s-0-default9-MMX) replaces the seed template (e.g., s-0-default9) in the convolution expression. Later, when "(w s-0-default9-MMX ...)" is being inlined, the newly created preroutine will be called and some new data arrays (e.g., dsarray9 and dsarray10) will be created. Additionally, the preroutine of w creates a loop whose body assigns the value of each distinct call of w (i.e., each discrete template position) to the corresponding array value. Finally, that loop is partially evaluated and the result is a vector of constant values for the array declaration. Overall, this will result in new definitions such as those shown in [49] (see below) being generated. The convolution expression "(right-convolution (aref b idx3 idx4) (aref s-0-default9 p5 q6))" gets rewritten as "(*(aref b idx3 idx4) (aref dsarray9 p5 q6))" with a reference to the newly created array—dsarray9.

For details of this generation with an example, see FIGS. 42*a*-*h*. At the highest level of abstract description, multiple, interrelated generation steps are occurring at different times as a two step cascade of generations. The first step is a specialization that is triggered at the convolution operator level, generates a specialization of the convolution's neighborhood object, and rewrites the convolution expression with that specialized neighborhood object. In the course of that specialization, the first step builds a new w MT that will rewrite the w expression as an access to the coefficient array and a preroutine for that w that will perform the generation steps that build and populate the coefficient arrays. Later, when that new w expression is inlined, the new preroutine actually generates and populates that coefficient array. In a later generation phase, the loop will be re-expressed to take advantage of the MMX/SSE instructions. Now, let's analyze this generation process in more detail.

Figure 42A:
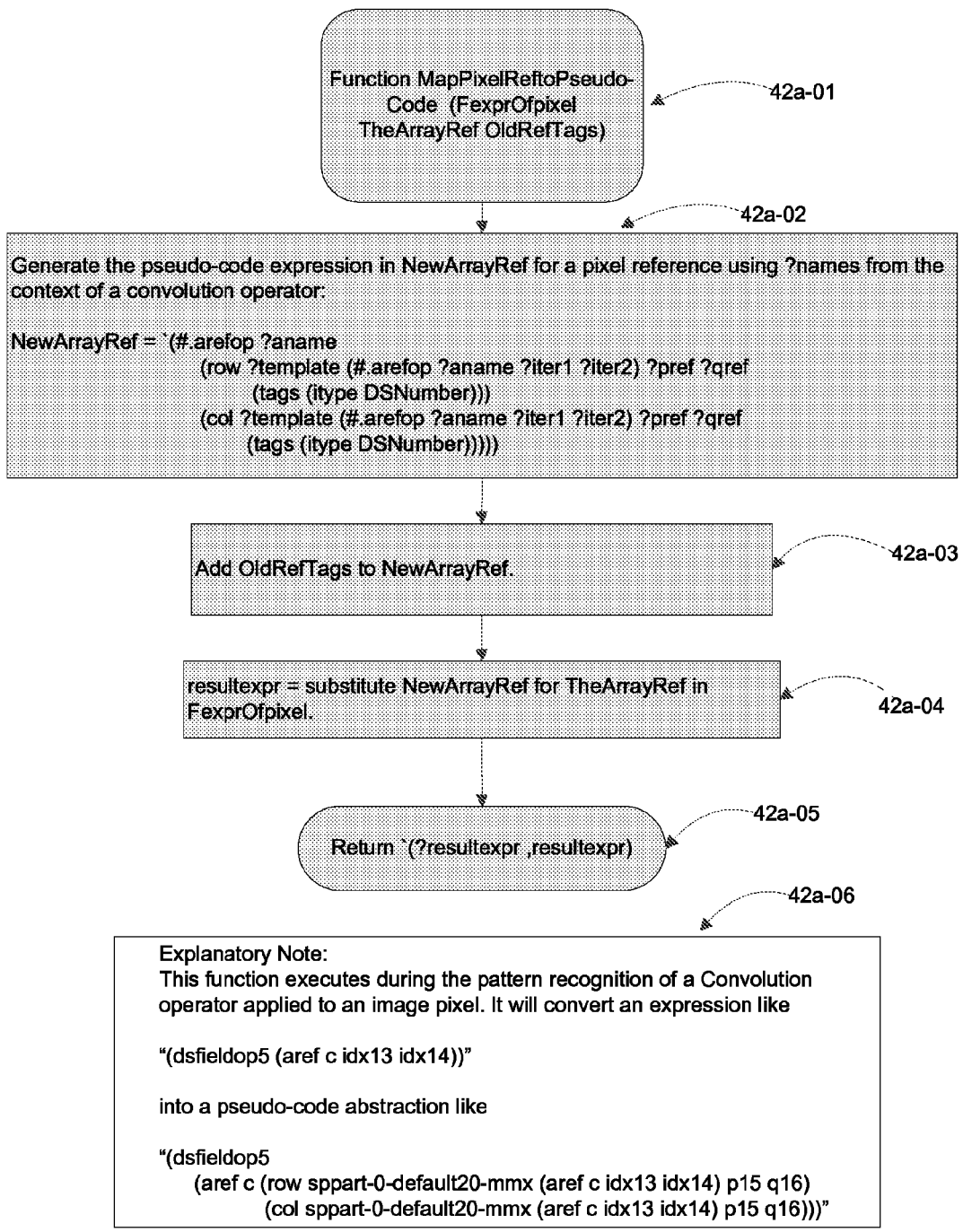
FIG. 42a is a service function MapPixelRefToPseudoCode, which maps a pixel reference in the context of a convolution operation into abstracted pseudo-coded pixel reference that reflects the template-based constraints of that context. It is used in the definition of the Convolution operator.
Figure 42B:
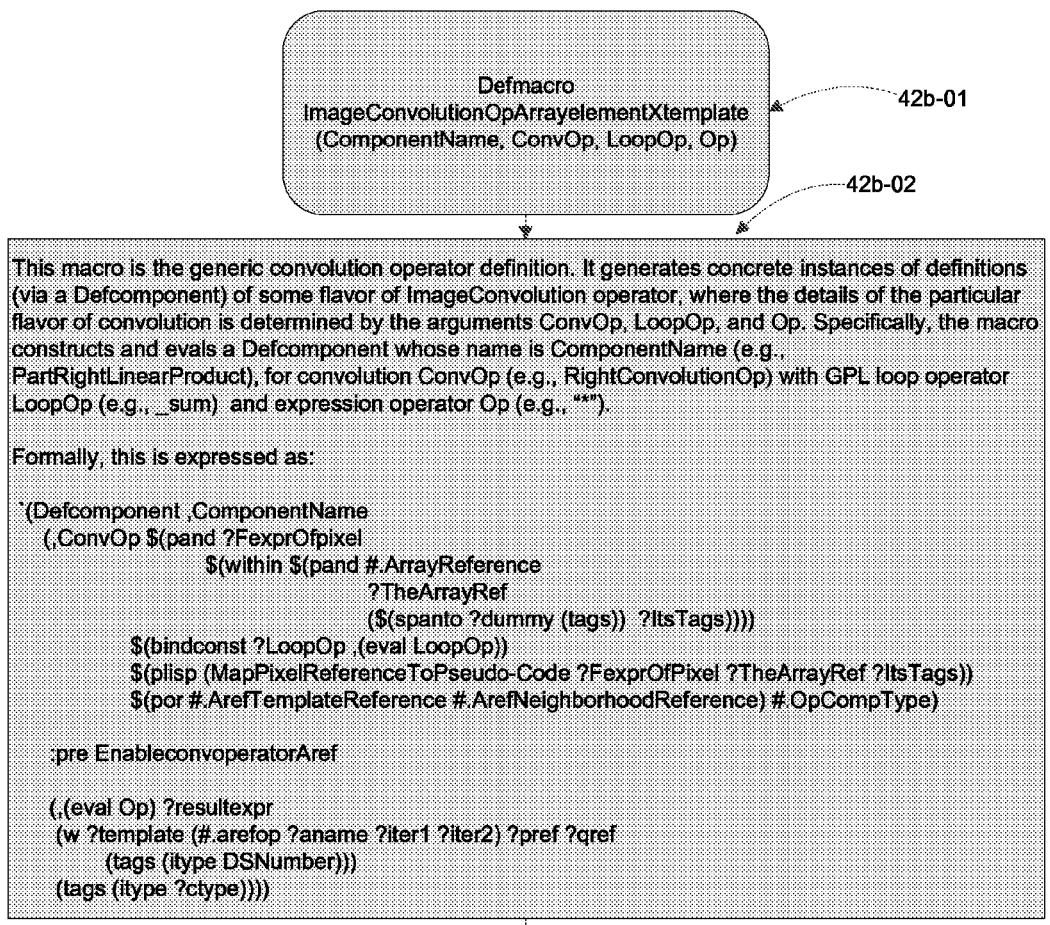
FIG. 42b is ImageConvolutionOpArrayelementXtemplate macro (a service macro) that is the generic definition of a Convolution operator, which is used as a shorthand to generate concrete definitions for various flavors of Convolutions by specifying the name of the overloaded operation (e.g., Part RightLinearProduct), the domain name of the operator (e.g., RightConvolutionOp), the associated loop operator (e.g., _sum) and the coefficient-pixel operator (e.g., timesop).
Figure 42C:
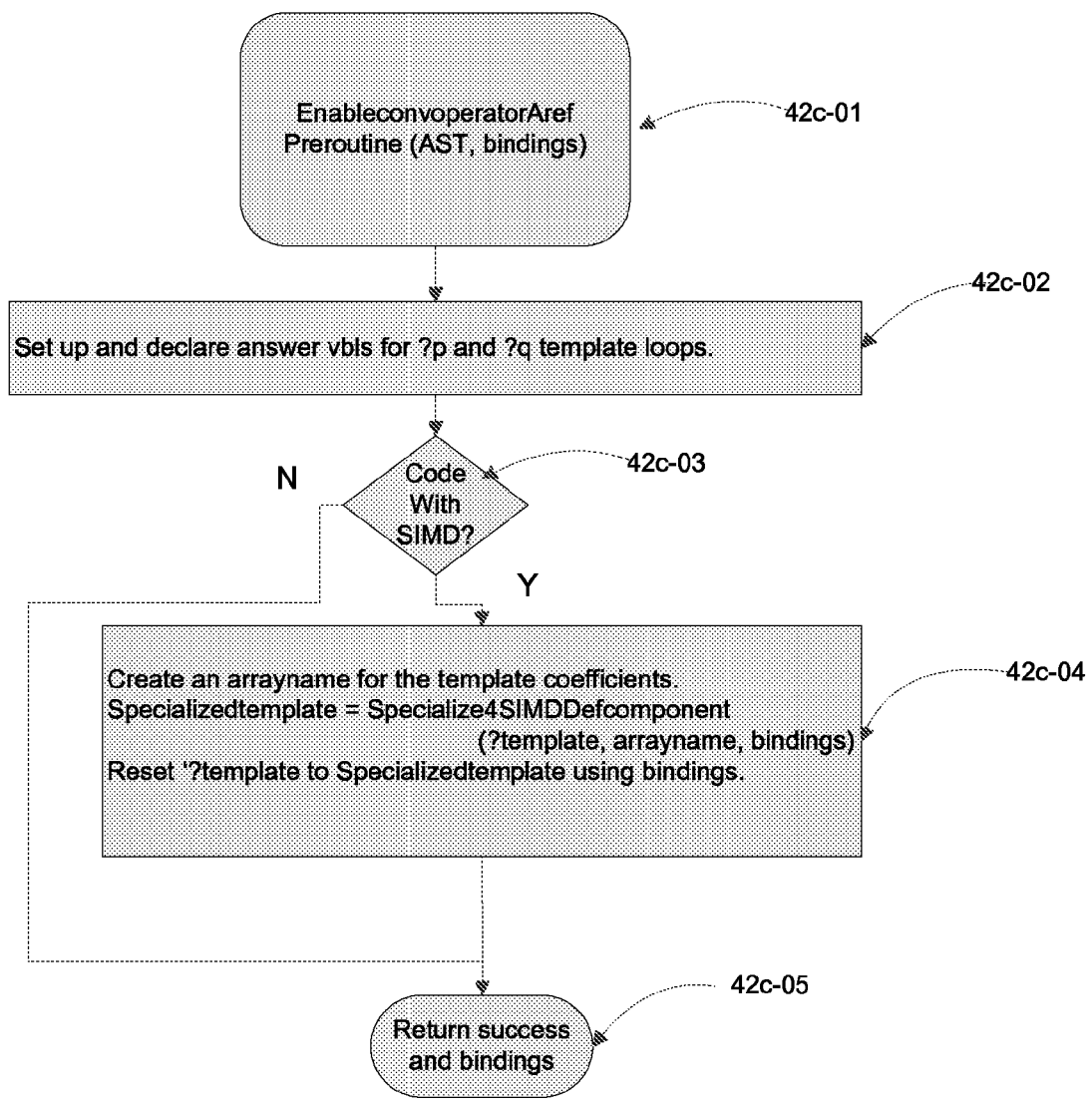
FIG. 42c is the EnableconvoperatorAref preroutine for the Image Convolution Defcomponent generated by the ImageConvolutionOpArrayelementXtemplate macro of FIG. 42b.
Figure 42D:
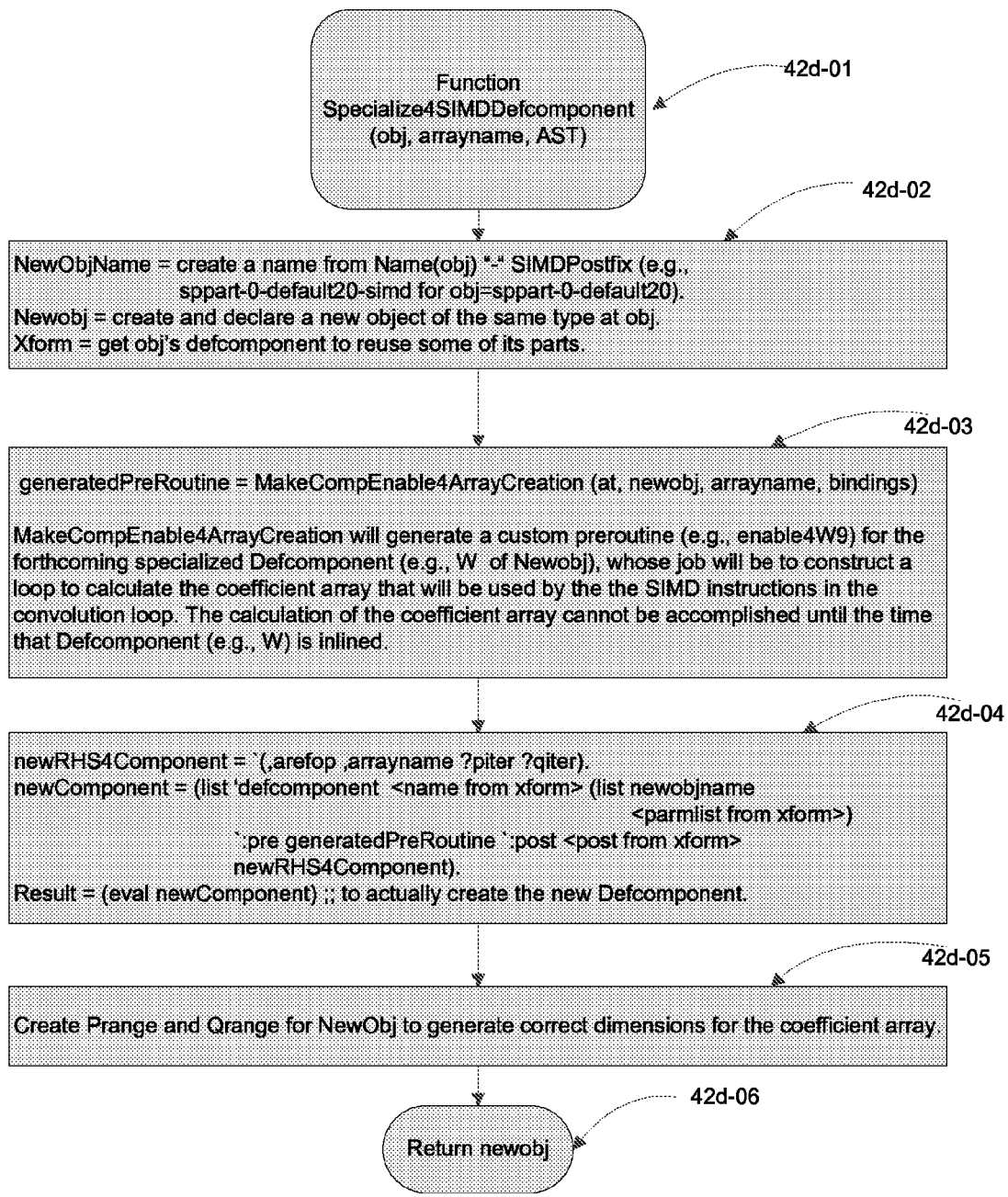
FIG. 42d is the Specialize4SIMDDefcomponent service function call by the EnableconvoperatorAref preroutine to specialize a template for SIMD computation (e.g., SSE). This specialization occurs during the inlining of the convolution operator, that is, when a convolution expression is being converted to its pseudo-code definition.
Figure 42E:
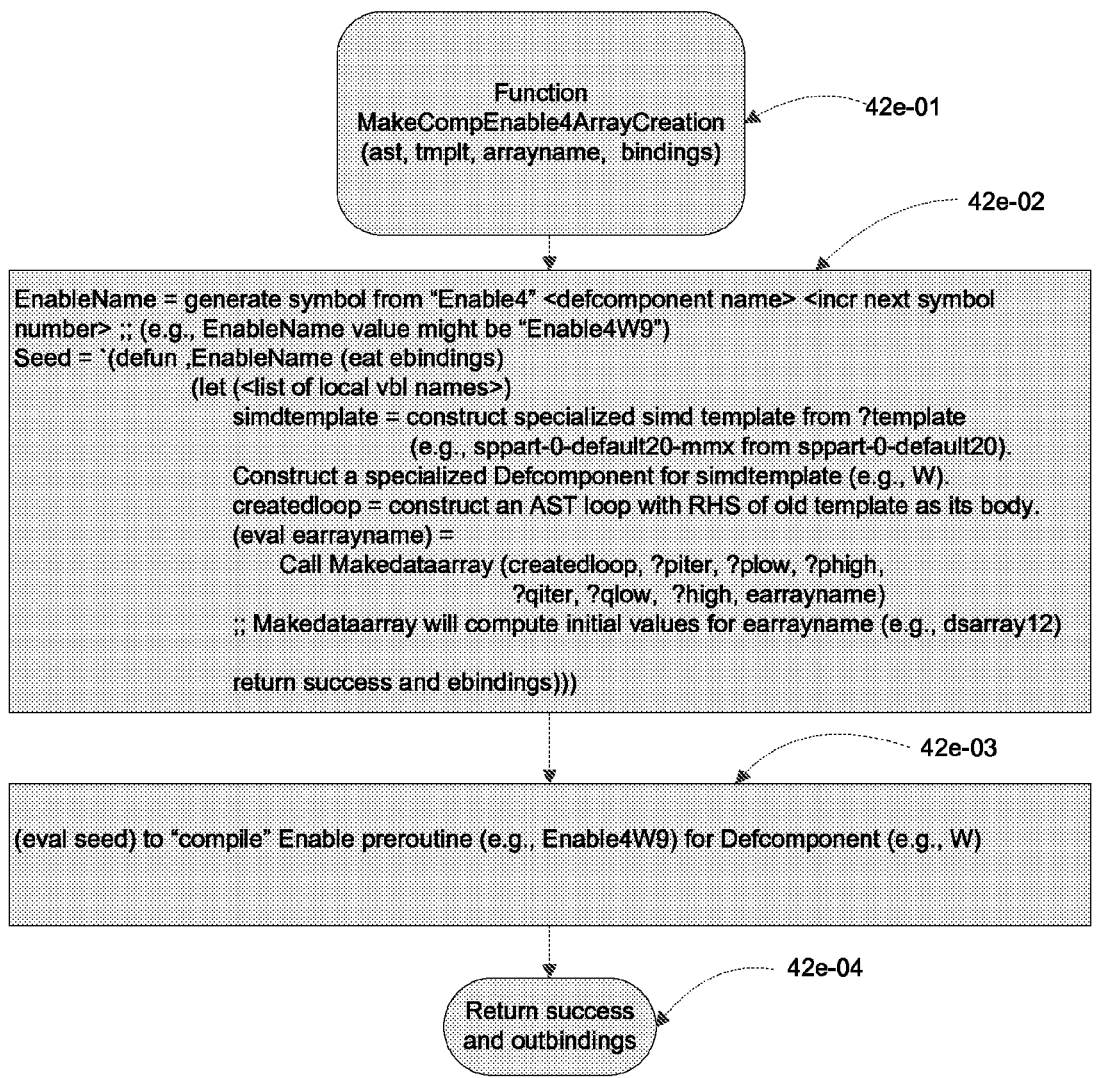
FIG. 42e is the MakeCompEnable4ArrayCreation helper function, which builds a custom preroutine for the w Defcomponent of a template that is being specialized to generate SIMD instructions for its loop.
Figure 42F:
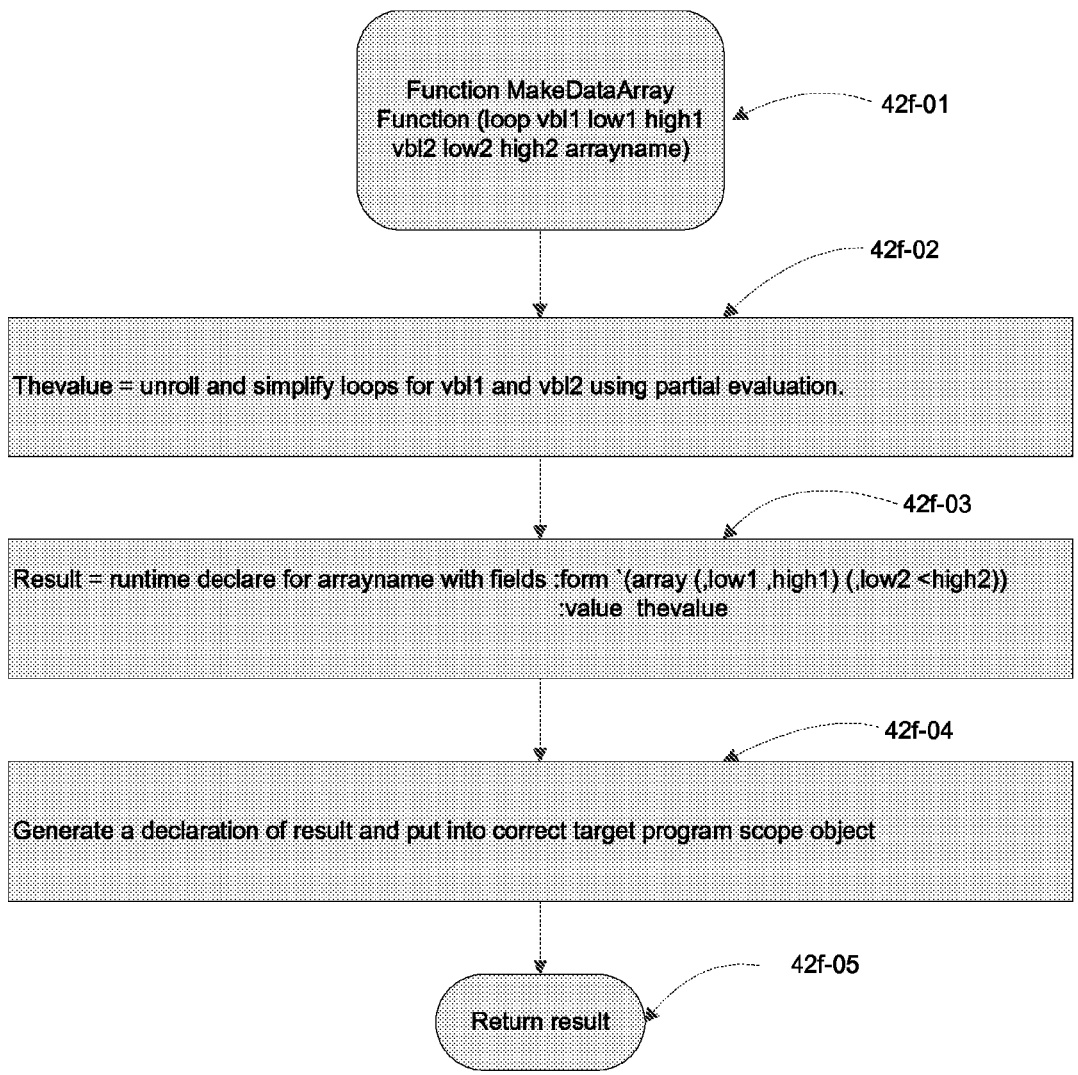
FIG. 42f is the MakeDataArray helper function that invents arrays to hold W's coefficients, formulates a loop to compute the coefficient values and if the values can be computed at transformation-time, it is partially evaluated to produce the initial values for the invented array.
Figure 42G:
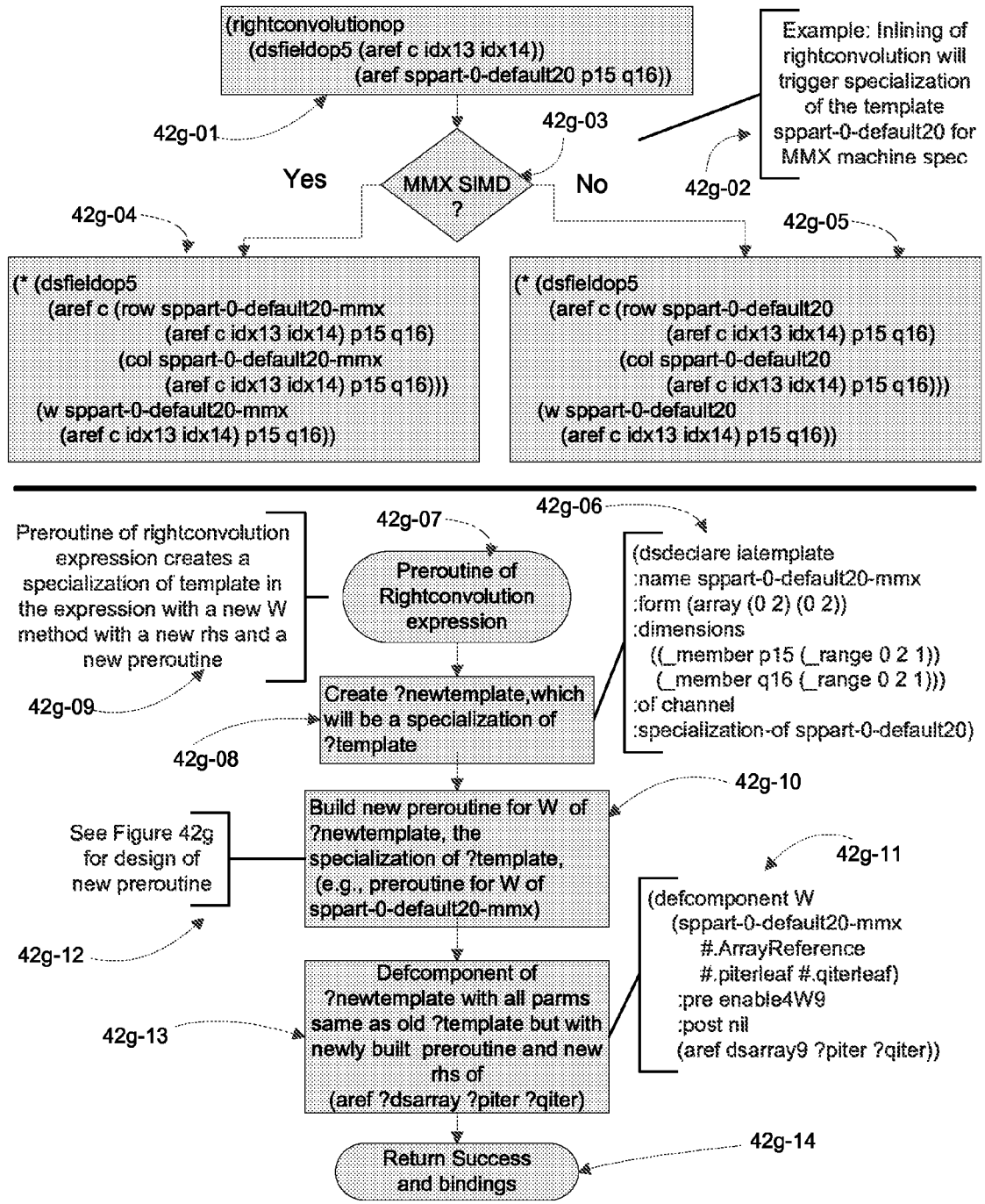
FIG. 42g is an example of the vectorization of pseudo-code via the replacement of a template with specialization of that template and its methods.
Figure 42H:
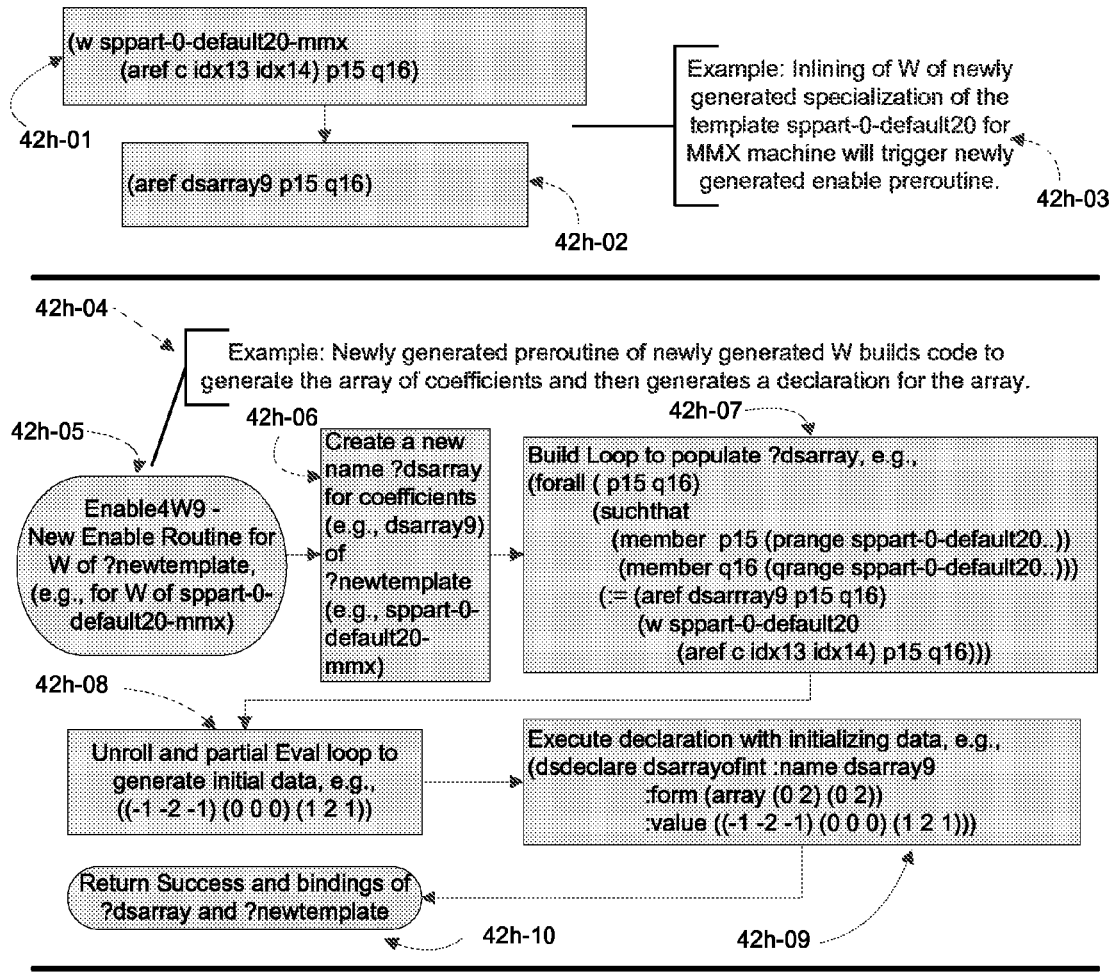
FIG. 42h is an example of applying W to a template that has been specialized for vector instructions.

FIG. 42*b* is a LISP macro that creates (at the generator definition time) various versions of the convolution operator using different pairs of loop type (e.g., summation) and different operators (e.g., multiply) for the (operator coefficients pixel) expression. Thus, FIG. 42*b* will allow definition of instances such as sum of products convolution; maximum or minimums of sums of coefficients and pixels; maximum and minimums of xors of coefficients and pixels; and so forth. The Image Algebra defines seven different kinds of convolutions. In this example, the convolution definition being used is the sum or products definition, also called rightlinearproduct in Image Algebra terminology. At a later time (i.e., the Inlining phase), during the inlining of the convolution operator created by that macro, the convolution's preroutine (i.e., FIG. 42*c*) will trigger the specialization of s-0-default9 by calling Specialize4SIMDDefcomponent (FIG. 42*d*). (This specialization is illustrated by the example of FIG. 42*g*.) During the specialization, the preroutine calls a service routine (FIG. 42*e*) that will create an enable routine for W component of s-0-default9-MMX (the specialization FIG. 42*d* is creating). That enable routine will contain a call to the MakeDataArray function (FIG. 42*f*), which will actually create the data arrays dsarray9 and dsarray10 later in time when "(w s-0-default9-MMX . . . )" is being inlined. (See example of FIG. 42*h* to illustrate the inlining behavior of the w method of a newly specialized template.) This complexity is required because the inlining of the convolution definition happens before the inlining of "(w s-0-default9-MMX . . . )", which is the point in time that the generator has the exact subtree of the AST in hand that is needed to formulate the loop to compute the values for dsarray9 and dsarray10. This time delay between the creation of the specialization of s-0-default9 and its actual execution during the inlining of s-0-default9-MMX's w method illustrates a constraint relating two separated parts of the AST (i.e., a convolution operator and a template object) that are interdependent.

The two newly created arrays in [49] are added to scope1.

```
(dsdeclare dsarrayofint dsarray9 :form (dsarray (range 0 2) (range 0 2))
        :value ((−1 0 1) (−2 0 2) (−1 0 1))) ;;/* s-0-default9 */
(dsdeclare dsarrayofint dsarray10 :form (dsarray (range 0 2) (range 0 2))
        :value ((−1 −2 −1) (0 0 0) (1 2 1))) ;;/                           [49]
        * sp-0-default10*/
```

In a later stage, the template loops are rewritten as expressions of abstracted MMX instructions, which the code generator will later translate to forms of MMX instructions that are acceptable to the target compiler. The newly constructed form of the template loops are shown in [50].

```
(:= ans1
 (unpackadd
  (padd 2
   (padd 2
    (pmadd 3 (& (aref a (− idx3 1) (+ idx4 −1))) (& (aref dsarray9 0 0)))
    (pmadd 3 (& (aref a idx3 (+ idx4 −1))) (& (aref dsarray9 1 0))))
   (pmadd 3 (& (aref a (+ idx3 1) (+ idx4 −1))) (& (aref dsarray9 2 0))))))
(:= ans2
 (unpackadd
  (padd 2
   (padd 2
    (pmadd 3 (& (aref a (− idx3 1) (+ idx4 −1))) (& (aref dsarray10 0 0)))
    (pmadd 3 (& (aref a idx3 (+ idx4 −1))) (& (aref dsarray10 1 0))))
   (pmadd 3 (& (aref a (+ idx3 1) (+ idx4 −1))) (&
    (aref dsarray10 2 0))))))                                              [50]
```

The final result of the partitioning with declarations included is

```
(progn  scope1
    (dsdeclare dsnumber m :value 100)
    (dsdeclare dsnumber n :value 100)
    (dsdeclare image a :form (array m n))
    (dsdeclare image b :form (array m n))
    (dsdeclare iterator idx3 :form dsinteger :of dsinteger)
    (dsdeclare iterator idx4 :form dsinteger :of dsinteger)
    (dsdeclare dsarrayofint dsarray9 :form (array (range 0 2) (range 0 2))
        :value ((−1 0 1) (−2 0 2) (−1 0 1)))
    (dsdeclare dsarrayofint dsarray10 :form (array (range 0 2) (range 0 2))
        :value ((−1 −2 −1) (0 0 0) (1 2 1)))
    (let scope4 ((idx4 0)) ;; edge 1 case
        (forall (idx4) (suchthat (== idx3 0)
                (member idx4 (range 0 (− n 1))))
            (:= (aref b 0 idx4) 0)))
    (let scope5 ((idx4 0)) ;; edge 2 case
        (forall (idx4) (suchthat (!= idx3 0) (== idx3 (− m 1))
                (member idx4 (range 0 (− n 1))))
            (:= (aref b (− m 1) idx4) 0)))
    (let scope6 ((idx3 0)) ;; edge 3 case
        (forall (idx3) (suchthat (!= idx3 0) (!= idx3 (− m 1)) (== idx4 0)
                (member idx3 (range 0 (− m 1)))
            (:= (aref b idx3 0) 0)))
    (let scope7 ((idx3 0)) ;; edge 4 case
        (forall (idx3) (suchthat (!= idx3 0) (!= idx3 (− m 1)) (!= idx4 0)
                (== idx4 (− n 1)) (member idx3 (range 0 (− m 1)))
            (:= (aref b idx3 (− n 1)) 0)))
    (let scope2 ((idx3 0) (idx4 0)) ;; default case
        (forall (idx3 idx4)
            (suchthat (!= idx3 0) (!= idx3 (− m 1)) (!= idx4 0)
            (!= idx4 (− n 1))
                (member idx3 (range 1 (− m 2)))
                (member idx4 (range 1 (− n 2)))) )
            (:= ans1
             (unpackadd
              (padd 2
               (padd 2
```

```
    (pmadd 3 (& (aref a (− idx3 1) (+ idx4 −1)))
        (& (aref dsarray9 0 0)))
    (pmadd 3 (& (aref a idx3 (+ idx4 −1))) (&
        (aref dsarray9 1 0))))
    (pmadd 3 (& (aref a (+ idx3 1) (+ idx4 −1)))
        (& (aref dsarray9 2 0))))))
(:= ans2
    (unpackadd
        (padd 2
            (padd 2
                (pmadd 3 (& (aref a (− idx3 1) (+ idx4 −1)))
                    (& (aref dsarray10 0 0)))
                (pmadd 3 (& (aref a idx3 (+ idx4 −1))) (&
                    (aref dsarray10 1 0))))
            (pmadd 3 (& (aref a (+ idx3 1) (+ idx4 −1)))
                (& (aref dsarray10 2 0))))))
(:= (aref b idx3 idx4) (sqrt (+ (* ans1 ans1)
    (* ans2 ans2))))))                                    [51]
```

Additional Component Abstractions

In the discussion above, we focused on only a few of the available problem domain MT abstractions for expressing the abstract program, i.e., row, col and w, and they were the most relevant for the examples. However, other problems require problem specific variations that go beyond these. For example, the size of templates may vary. For example, the size could be a function of the position in the image of pixel being processed. One such case is image averaging, which replaces a pixel by the average of some set of neighboring pixels. Let us say that the ideal neighborhood is three by three pixels. Then on the corners, that neighborhood is just four pixels in size because one row and one column of the neighborhood are hanging off the edge of the image. On the non-corner edges, it is six pixels and in the middle it is nine pixels. This means that the template loops will have variable ranges. How do we handle that?

The answer is that we abstract the ranges just like we did with row, col and w. Let us say that the template for image average convolution is defined as

```
(DSDeclare IATemplate avg :form (array (−1 1) (−1 1)) :of    [52]
    DSInteger).
```

Then we can define MT components that abstract the ranges of the template loop indexes p5 and q6, specifically, the MT components PRange and QRange. In addition, there are MT component abstractions for the matrix loop ranges, IRange and JRange. Other problems, may require abstractions for the various loop increments or strides (e.g., PIncr) and for non-symmetric templates, the abstract component Default allows the centering pixel to be other than [0,0] with respect to the current matrix pixel.

The previous example did not require the user to define components for s because the minimum and maximum values for p5 and q6 were already concrete (i.e., (−1 1)) and there was no role for an abstract range component. The range component for s would be expressed straightforwardly as

```
(Defcomponent PRange (avg #.ArrayReference ?plow ?phigh ?p)
                    (Range ?plow ?phigh))                 [53]
``` where the parameter pattern, like w's parameter pattern in [15], is a property of a convolution template object and can be predefined for the user.

For image averaging, the user will need to define PRange and Qrange in order to define how the range varies. Definition [54] is illustrative.

```
(Defcomponent PRange (avg #.ArrayReference ?plow ?phigh ?p)
                (Range (if (== ?iter1 ?i1low) (then 0)
                        (else ?plow))
                    (if (==?iter1 ?i1high) (then 0)       [54]
                        (else ?phigh)))
```

In other words, the low index for the p range is 0 if the template is centered anywhere on the left edge of the image including corners and otherwise, it is the ?plow value. For avg as defined in [52], the ?plow value will resolve to −1. Similarly, the second "if" expression indicates the high p value is 0 for any centering pixel on the right edge of the image and otherwise, it is the maximum value ?phigh.

If the matrix loop is partitioned for image averaging, the components of PRange and the analogous Qrange will cause differing template loops for each partitioned loop. There will be four distinct corner loops, four distinct non-corner edge loops and one default loop. For the corner loops, the matrix loops completely evaporate with only the template loop remaining. For the non-corner edge loops, the two dimensional loops simplify to a one dimensional loop. And the loop over the center pixels is analogous to the one derived for Sobel edge detection.

On the other hand, if the matrix loop is not partitioned, the single template loop will dynamically recalculate the upper and lower template bounds for each centering pixel.

Given that one may want to partition an image averaging computation, how does that happen and what is involved? To answer these questions, we have to look at the user definition of w component of avg.

```
(Defcomponent w (avg #.ArrayReference ?p ?q)
    (if (and (or (equal ?iter1 ?i1low) (equal ?iter1 ?i1high))
            (or (equal ?iter2 ?i2low) (equal ?iter2 ?i2high))
            (tags (constraints partitionmatrixtest corner[81])))
        (then (leaf 0.25 ))
        (else (if (or (equal ?iter1 ?i1low) (equal ?iter1 ?i1high))
                (equal ?iter2 ?i2low) (equal ?iter2 ?i2high))
                (tags (constraints partitionmatrixtest ncedge)))
            (then (divide 1.0 6.0)) (else (divide 1.0 9.0)))))  [55]
```

(Like the CLOS object "edge," "corner" and "ncedge" used in [55] are constraint objects that carry semantic meaning allowing the system to produce human friendly generated names. This is a significant help in debugging generation sequences.)

The first tagged condition test is converted into disjunctive normal form resulting in four disjuncts, each one of which determines one of the four corners. This will produce four new templates that are based on the zero-relocated avg-0. These are avg-0-corner1, avg-0-corner2, etc. The second condition test in conjunction with the negations of the four disjuncts from the first condition result four templates avg-0-ncedge5, avg-0-ncedge5, etc. The final template avg-0-default9 handles the non-corner, non-edge pixels.

The AST for a non-partitioned version of image average looks like

```
(progn scope1
   (dsdeclare dsnumber m :value 100)
   (dsdeclare dsnumber n :value 100)
   (dsdeclare image a :form (array 100 100))
   (dsdeclare image b :form (array 100 100))
   (dsdeclare iterator idx3 :form dsinteger :of dsinteger)
   (dsdeclare iterator idx4 :form dsinteger :of dsinteger)
   (dsdeclare iterator p5 :form dsinteger) (dsdeclare iterator q6 :form
      dsinteger)
   (dsdeclare bwpixel ans9 :form bwpixel :of bwpixel)
   (dsdeclare bwpixel ans10 :form bwpixel :of bwpixel)
   (dsdeclare bwpixel t1 :form dsinteger)
   (forall (idx3 idx4)
     (suchthat (member idx3 (range 0 99)) (member idx4 (range 0 99)))
     (:= t1
       (if (and (or (== idx3 0) (== idx3 99)) (or (== idx4 0) (== idx4 99)))
         (then 0.25)
         (else
           (if(or (== idx3 0) (== idx3 99) (== idx4 0) (== idx4 99))
             (then (/ 1.0 6.0)) (else (/ 1.0 9.0))))))
     (forall (p5 q6)
       (suchthat
         (member p5
           (range (if (== idx3 0) (then 1) (else 0))
             (if (== idx3 99) (then 1) (else 2))))
         (member q6
           (range (if (== idx4 0) (then 1) (else 0))
             (if (== idx4 99) (then 1) (else 2))))
         (answervbl p5 ans9) (answervbl q6 ans10))
         (:= + ans9 (aref a (+ idx3 (+ p5 -1)) (+ idx4 (+ q6 -1)))))
       (:= (aref b idx3 idx4) (* ans9 t1)))))            [56]
```

In the name of brevity, we will not present the full AST for the partitioned version but will identify the key features for the partitioned version that differ from the design of [56]. For the four corners, the outer two dimensional (idx3 idx4) loop evaporates and the inner (p5 q6) loops survive with suchthat fields that contain range specs with constant values that vary as follows:

(member p5 (range 1 2)) for the left and right bottom corners because the $0^{th}$ template row is below the edge (member p5 (range 0 1)) for the left and right top corners because the $2^{nd}$ row is above the edge (member q6 (range 1 2)) for the bottom and top left side corners because $0^{th}$ column off the left edge (member q6 (range 0 1)) for the bottom and top right side corners because the $2^{nd}$ column off the right edge and the assignment of b's pixel value will be ":=(aref b idx3 idx4) (*ans9 0.25))" for each corner loop. There will be no "t1" that is calculated for each iteration of the (idx3 idx4) loop. Why? Because with partitioning, the weight expressions "(w . . . )" partially evaluate to a constant and therefore, do not trigger the optimization that moves that calculation (which does not depend on p5 or q6) out of the (p5 q6) loop.

For the non-corner edge loops, the outer loop survives as either a one dimensional loop over idx3 or idx4 with the non-surviving index held at a constant 0 or 99. Each non-corner edge loop's body contains a (p5 q6) template loop whose ranges are analogous to the corner loops but with only one edge of the template off the edge of the image. Furthermore, b's pixel value statement is of the form ":=(aref b idx3 idx4) (*ans9 (/1 6)))" for each non-corner edge loop. That is, it is averaging the sum of six pixel values.

Finally, the default loop (idx3 idx4) ranges from 1 to 98 (for this example) and its template (p5 q6) loop ranges over the full template, i.e., 0 to 2 in both dimensions. Now, the average must be calculated over the full nine pixels of the template and therefore, b's pixel value statement is of the form ":=(aref b idx3 idx4) (*ans9 (/1 9)))."

Inferring Concrete Loop Limits from Propositions

The suchthat field allows the generator to keep the description of a loop in a propositional-based semantic form, which allows the structural nature of loops to be inferred and realized very late in the development of the target program based on a few, relatively simple logic rules. Importantly, it avoids much program analysis and syntactic parsing that might be required if loop were specified early-on in a true GPL form. For example, a loop may be destined to be eliminated because its index has become a constant value through partitioning. The generator does not have to parse and analyze AST structures to determine this situation. A simple semantic rule allows it to infer this fact from a few propositions that logically describe the loop. Further, simple addition of new propositions can significantly alter the resulting GPL structure. This is a case where one representation of the loop (i.e., semantic-based propositions) makes early processing easy (e.g., partitioning) and a different representation (i.e., a GPL form) makes specification of executable code easy. This section provides a snapshot of the process that gets from the first representation to the second.

An important element of the partitioning process is that by the user providing some domain specific knowledge of which condition tests would induce a problem-specific partitioning, the generator is able to construct a set of abstract expressions of partitioning conditions that can be added to the propositions describing various loops and thereby imply some modification of those loops (e.g., a change of an index range or the complete elimination of a loop). Only after those abstract partitioning condition expressions have been refined into concrete forms can the implication be concretely realized. And this happens fairly late in the programming process when the overall design becomes largely settled, e.g., the partitioning, thread design, loop placement, scoping and so forth are largely settled.

Let us review how propositions that semantically describe loop limits are used to rewrite the semantic loop description to a form that is closer a GPL style description of loops. Consider the transition from expression [41] to [44]. This transition must recognize that idx3 is a fixed value and therefore, that loop over idx3 will be eliminated leaving nothing but the loop over idx4. Thus, this process must rewrite expression [57a] to [57b], where the body of [57b] (not shown) must be rewritten to account for the fact that idx3 is equal to 0.

```
(forall (idx3 idx4)
    (suchthat (== idx3 0) (member idx3 (range 0 99))
                         (member idx4 (range 0 99))) ...)   [57a]
(forall (idx4)
    (suchthat (== idx3 0) (member idx3 (range 0 99))
                         (member idx4 (range 0 99)))...)    [57b]
```

The process of figuring out the nature of the rewrite is fundamentally an inference process that has a fairly large space of cases. Not only might one index variable be fixed, both might be fixed. One or more members of the range of either variable may be excluded. For example, the default case in the previous example omitted both 0 and 99 from the loop. The multi-core partitioning splits the range into two pieces although it could just as well be split into n pieces. Beyond these simple cases, array dimension extensions may induce propositional knowledge about the relation between two index variables (e.g., (<k m)) that can be used to eliminate impossible partitions and therefore, eliminate loop cases. (See next section.) And just for good measure, such splittings could have a variety of other restrictions such as reversing the direction of the advancing index in order to accommodate hardware peculiarities. Thus, the inference process needs to be easily extensible and the distinct case specifications isolated from one another so that changes and additions do not require global changes to some monolithic inference process. This requirement argues against writing the inference as a single, monolithic piece of software.

As a result, the generator expresses these inference rules as a simple DSL for inference. This is a little domain language that is similar to Prolog (Clocksin and Mellish 1987) in structure and is built on top of the generator's pattern recognition engine. It is used for many purposes in the generator. A rule specification in this little domain language looks like [58].

```
(RuleSet (loopcontrol nil) ;; second arg of nil indicates this ruleset
does not inherit other rulesets
  (<- (fixediterator ?i ?imember ?iequal ?ilow ?ihigh ?c)
      $(pand ($(spanto ?spaceover (suchthat $(remain ?such))))
      $(pmatch ($(spanto ?x $(bindvarEQ ?imember
                                (member ?i (range ?low ?ihigh)))))
                                ?such)
      $(pmatch ($(spanto ?y $(bindvarEQ ?iequal $(por (== ?i ?c)
                                (== ?c ?i)))) ) ?such)))
  (<- (cliplowend ?i ?imember ?iequal ?ilow ?ihigh ?c) ...)
  (<- (cliphighend ?i ?imember ?iequal ?ilow ?ihigh ?c) ...) ... )    [58]
```

This ruleset shows one completely defined rule, fixediterator, and two rules, cliplowend and cliphighend, whose details are elided. These latter rules, respectively, infer that low and high values of a loop index are eliminated.

These rules are invoked when the pattern matcher is asked to "prove" some expression like (?which idx3 ?mem ?eq1 0 99 ?c)    [59]

in the context of a specific AST loop structure (to be specified by the calling program), while using the ruleset "loopcontrol." (See Table 3.) If the rule is successful, ?which will be bound to one of the rule cases that will define which rewrite to execute on [57a] (i.e., "fixediterator" for this example), ?mem will be bound to some expression of the form "(member (range 0 99))" where the 0 and 99 come from the two constant input arguments, ?eq1 will be bound to some equality proposition (i.e., (==idx3 0) for this example) and ?c will be bound to the constant of the equality expression (i.e., 0 for this expression). The actual fixediterator transformation, which is defined separately, will use these bindings to rewrite [57a].

The inference process using this ruleset is specialized to "inferring" simple properties of loop descriptions in suchthat fields. The rules shown in [58] are more specialized than the rules that one might find in a general purpose inference system (e.g., a Prolog processor or, more generally, a resolution style theorem prover). (See Clocksin, W. F. and Mellish, C. S.: Programming in Prolog, Springer-Verlag (1987) and Robinson, 1965, previously cited.) The rules could exhibit a bit more Prolog-like behavior by organizing intermediate inferences (e.g., symmetry and transitivity) into separate rule sets that can be invoked using the "pprove" operator using those rule sets. That is, rather than inferring symmetry via matching the pattern "$(por (==?i ?c) (==?c ?i))," it could invoke a rule set to do that job via the pprove operator. For this simple example, we make the behavior explicitly clear by simply incorporating properties like symmetry directly into the pattern matching. However, as we introduce properties in the next section that may require multiple inference steps, those intermediate inference steps (e.g., symmetry and transitivity) will be represented in lower level rule sets and the generator will use the pprove operator to infer those intermediate properties.

The right hand side pattern of the fixediterator rule uses the "$(pand ... )" operator to specify that the three sub-patterns nested within it must simultaneously match the data (i.e., suchthat field in this case) with bindings that are consistent among the three patterns. In short, these three sub-patterns behave as follows. The "$(spanto ... )" operator spans over suchthat list of [57a] to find the atom "suchthat" and binds the rest of that list to ?such. The other two pattern matches use the value of ?such as the data they are trying to match. The first scans the ?such list for "(member ?i (range ?low ?high))" using the input values of ?i ?ihigh and ?ilow, which are bound to idx3, 0 and 99, respectively. The whole expression is then bound to ?imember for use in the rewriting. Finally, the last pattern match scans the ?such list looking for "(==idx3 ?c)" or "(==?c idx3)" and it succeeds with ?c bound to 0 and ?iequal bound to "(==idx3 0)."

At this point, the generator knows the name of the transformation (i.e., fixediterator) to apply to [57a], which will rewrite [57a] as [57b], and it has the bindings that that transformation needs.

Cartesian Product of Partitions

Figure 51:
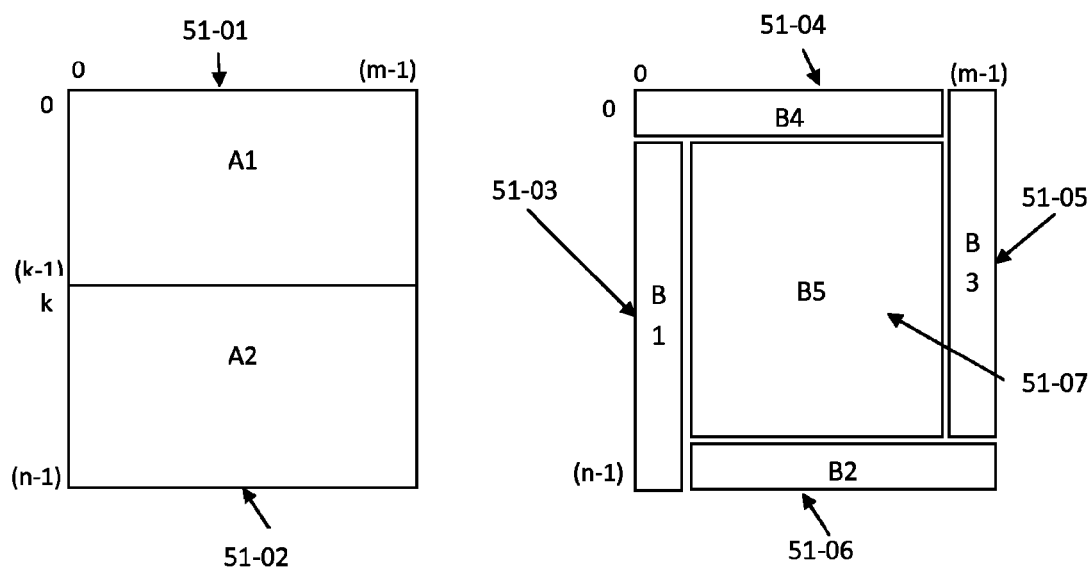
FIG. 51 Matrix Extension to Match Shapes.

Up to this point, we have only discussed one way for loop APCs to combine. If they meet certain consistency conditions, they are combined thereby allowing the loops that will derive from them to share loop variables and loop control structures. This occurs for loop APCs with the same domain data type (e.g., two matrix, template or field loops) given that any respective partitions meet certain combinability properties. However, there are other types of APCs that may have partitions that will not directly combine. An example of one such is the loop APC partitioned by a matrix's extension (or contraction). In the previous examples, the expressions operated on images that were contained in matrices of the same dimensions. So, how does one operate on matrices of different dimensions? Simply put, the programmer specifies how to coordinate the dimensions. For example in FIG. 51, the programmer could define an extension Ax of A1 to be of the same shape as B and define how the extended portion of Ax is to be initialized. The generator has a variety of pre-defined initialization objects to choose from (e.g., integer zeros, a particular color value, the largest 32 bit floating point number, or the largest 16 bit integer). If this value is machine specific, the specific initialization value would be specified in the machine portion of the specification. To keep the example simple, we will choose zero. Of course, the user could also define any initialization value of his choosing.

The Ax matrix is like a template in that it is an object with a MT Defcomponent, which will trigger the generation of partitions when Ax induces the creation of its loop APC. In other words, this Defcomponent creates a specialization of the aref operator (i.e., the indexing operator) that is specific to Ax.

```
(Defcomponent aref (Ax #.ArrayReference)    ;; with loop context indexes
                                              bound
                                              ;; to ?iter1 and ?iter2
    (if (< ?iter2 k (tags (constraints
    partitionextend xt))
        (then (aref A1 ?iter1 ?iter2)) (else 0))    [60]
``` where partitionextend is a loop APC that captures the domain intent (i.e., matrix extension) of the loop and xt is a symbol used to build human-friendly specialization names for Ax (e.g., Ax-xt0, Ax-xt1, etc.). The generation of the partition-extend loop APC for Ax will trigger the generation of two partitions for that loop APC, Ax-xt0 and Ax-xt1. (Name generation regimes can be custom tailored to the APC type so, we choose not to use Ax-default for the last case since it would be misleading to the human reader.) The specialized Defcomponents of Ax-xt0 and Ax-xt1, respectively, are shown in [61a] and [61b].

For (<?iter2 k)=true, specialization produces:

(Defcomponent aref (Ax-xt0 #.ArrayReference) (aref A1 ?iter1 ?iter2)))
(Defcomponent Partest (Ax-xt0 #.ArrayReference) (< ?iter2 k))
(Defcomponent Partestx (Ax-xt0)
   (closure (Partest Ax-xt0 (aref A1 ?iter1 ?iter2))
        ...binding list for Ax context...))           [61a]

For (<?iter2 k)=false, specialization produces:

(Defcomponent aref (Ax-xt1 #.ArrayReference) 0)
(Defcomponent Partest (Ax-xt1 #.ArrayReference) (not (< ?iter2 k)))
(Defcomponent Partestx (Ax-xt1)
        (closure (Partest Ax-xt1 (aref A1 ?iter1
        ?iter2))
                ...binding list for Ax           [61b]
                context...))

Retaining the domain intent of loops via the APC has a number of advantages and in this case, it allows the beginnings of a logic for APC combinations. That is to say, later in the generation process the generator will be faced with two APCs that potentially can be combined. The partitionextend APC is associated with Ax and has the two partitions shown in FIG. 51. The second is the loop2d APC associated with B, which has the five partitions in the figure. The domain knowledge of the APC type indicates that these two APCs can not generate compatible loops that can share variables and control structure. But they can be combined by forming the Cartesian Product of the two sets of partition cases and thereby, define a separate loop for each pair of partitions. From a logic point of view, this is just an application of the distributive law of propositional logic. That is, ((A or B) and (D or E)) is equivalent to ((A and D) or (A and E) or (B and D) or (B and E)). In other words, the Ax extension generates two cases and B's cases divide each of those cases into five sub-cases. So, the APC resulting from this combination will have ten partitions, (Ax-xt0, B1), (Ax-xt0, B2), . . . (Ax-xt1, B1), (Ax-xt1, B2), etc. Notice that there will end up being only eight viable GPL loops generated from these ten partitions because the cases (Ax-xt0, B2) and (Ax-xt1, B4) are not logically possible and the loops will evaporate. By simply staring at the diagrams of FIG. 51, one should be able to see intuitively why these two cases are impossible. So, how does the generator figure this out? It uses inference on the propositions in the suchthat field of the generated loop clones. Specifically, the suchthat field of the first case contains Partestx(Ax-xt0) which will resolve to a concrete proposition like (<idx3 k) and Partestx(B2) which will resolve to something like (==idx3 99). The loop inference logic will infer that ((0<=idx3≦k≦99) and (==idx3 99)) is false. Therefore, the case and its loop will be eliminated. Similar logic eliminates the (Ax-xt1, B4) case and its loop. Of course, the inferences cannot be made until the Defcomponents have been resolved to concrete propositions.

Extensions

The Data Structure Domain

The same principles, methods, and mechanisms used in the DSP domain can be applied to other domains. Let us look at how these can be applied in the data structure domain. First, we will need to introduce a new kind of APC, the tree traversal APC of (CLOS) type TreeTrav. This APC abstracts recursive iteration over a tree structure and we will use it much like we used the loop2d APC for loops over matrices. The TreeTrav APC represents the simplest kind of recursive iteration over a tree but the TreeTrav APC can be further specialized to allow for processing of the nodes in a particular order such as preorder, postorder, inorder, breadth-first (level-order), depth-first (the default for TreeTrav), etc. While these APCs are all virtually the same and use the same methods during the early phases, they will significantly differ in their affect on the resulting GPL control structures that are generated. That is, like the loop APCs mostly affected the GPL looping control structure, the tree iterator APCs will mostly affect the tree traversal control structure.

Further, the TreeTrav APC allows specializations that are even more domain specific and once the representation evolves to the GPL-like forms in the later generation phases, these specializations lead to designs that are more like frameworks (see definition below) for various specialized data structures. That is, the designs codify large, related chunks of tree management pseudo-code (IL) that are written in terms of MT component abstractions. Like the IL from the image domain, the IL may contain associated domain specific knowledge that identifies partitioning opportunities to exploit parallelism or other high capability platform facilities.

Definition: Frameworks. Frameworks are designs that are partially abstract and partially concrete (i.e., include some code parts) but leave open certain aspects of their design. The open aspects are often parametric inputs to the framework, which when specified allow the design to be refined to a specific, fully concrete form. Because frameworks are usually represented in a GPL-like representation, they are insufficiently general for the generator's manipulation of domain specifications but once the generator's representation has evolved into the GPL territory (i.e., in the later phases of generation), frameworks are a good mechanism for incorporating large grain GPL-based designs with some modest residual variability. The forms of the frameworks used by this invention are written in a pseudo-code using IL specific to data structure implementations.

Consider an example framework. Balanced trees and red-black trees are highly specialized tree data structures with certain desirable operational properties. The data management of such data structures is often more complex than simple trees and difficult to program correctly from scratch. However, if viewed abstractly, the data management algorithms for such specialized trees can be written by static abstract specifications much like the definition of convolution that was written in terms of the abstract MT Defcomponents row, col and w. And this is the trick that the generator employs for data structures. Much like images, the data management pseudo-code is written in terms of abstract components that allow user-specified, concrete variations to be incorporated into the component definitions. This allows the abstract components to refine into a wide variety of concrete expressions in the context of the framework design. So, what kinds of abstractions are needed for this new kind of APC?

Analogous to loops over matrices that incorporated the dimensionality of the matrix and loop abstractly into the APC, tree APCs will need to incorporate the abstract the branching structure (how many branches), the method of accessing the branches (e.g., field names or field functions), branch specializations (e.g., uni- or bi-directional), and so forth. Early on, some of these may be abstractly specified by logical propositions in the suchthat field of the TreeTrav APC. Only later in the generation process, will these logical propositions be used to infer the concrete, GPL details of the code. Additionally, user-based computational values that are dependent on the tree traversal in some way (like the w component of the template abstraction in the DSP domain) are allowed via user defined IL.

The key question now arises. What domain language can be used to specify this kind of computation in an implementation neutral form? Recursive functions? No, because that is too GPL like in that it incorporates too many design decisions too early. It's GPL-like character tends makes manipulation of the forms difficult as has been discussed earlier. Well, then how about the Image Algebra? The Image Algebra does not fit the problem domain because its domain model is really designed for signals of one or two dimensions, e.g., audio signals and images, and its operators are oriented toward transforming those signals into new signals. On the other hand, data structures tend to be more localized in their rewriting behavior. They are updating subsets of data within larger sets of data. Therefore, the target domain language for data structures must have a certain database like character in that it must allow iterative updates that change subsets of data within larger sets of data. And yet, it must have that algebraic quality that allows it to be manipulated (e.g., partitioned) into a form that fits the execution platform. One representation stands out as having this character, the Relational Algebra (see C. J. Date, 1995 and E. F. Codd, 1970). The Relational Algebra was the inspiration for a number of related representations that were used as database management languages, notably SQL. SQL was designed for performing database execution directly and because of this, it does not lend itself to algebraic manipulation as well as the more basic Relational Algebra.

In the Relational Algebra (RA), a "database" is represented by a set of tables of relations (or rows) and attributes (or columns). Codd defined six primitive operators for searching and updating those tables. While the ostensible motivation for the Relational Algebra was operational management of real life databases, the purpose to which it is put here is one of abstractly specifying a data management operation in implementation neutral terms such that it can be easily manipulated into forms that, for example, capture the broad parallelism of a data management operation for different execution platforms and that can be reformulated in concrete implementation frameworks (e.g., red-black trees) with desired operational properties. So, while RA and its progeny (e.g., SQL) are operating on real tables containing real data, the generator's RA will be a meta-representation (i.e., domain specific language) in that the tables are abstractions (much like templates are abstractions) and do not themselves "operate" at all. They are operated upon by the generator. They are manipulated by the generator. And they are eventually transformed into GPL code that will operate on some data container (e.g., a tree).

Additionally, it must also be made clear that RA provides only a specification of the data management requirements of the overall computation. The domain specific computation on the attribute values of a relation (e.g., Delaunay triangulation) must be specified by other specialized domain languages analogous to the Image Algebra. In other words, we have situation where the specification of a computation may comprise several different domain languages. That is, the implementation neutral specification could be an expression of operators for expressing triangulation computations where their parameters are data items specified by RA expressions.

So, let us provide a simple example of an RA like representation, suggest how it might get partitioned for parallel computation and suggest how it might then get re-formulated into implementation data structure containers that have some set of desirable properties. The representation of the example deviates somewhat from the stricter syntax of Date but is more intuitive so that one can understand the essence of the operations without need of a formal specification of the stricter syntax. To keep the example very simple, we will omit consideration of some of the deeper aspects of RA such as keys and properties of tables. Let P be a table of points in a two dimensional space where some Value is associated with each point. P is defined by the relation (X, Y, Value) where X, Y and Value are called attributes (or alternatively, columns) of P. The rows of P will contain a finite number of triples such as (0, 0, 127) and (5, 5, 255). A simple operation on P would be to search for the Value field of some specific (x, y) pair, say (0, 0). An RA representation of this search might be (project (select[90] P where X= "0" and Y= "0") over Value). [62]

(Originally, the "select" operator was called "restrict" but today it is commonly called "select" even though this name does tend to cause confusion with the "select" operator from SQL.)

If this were to be "executed" with the real data examples above, the select operation would produce the row (0, 0 127) and the project operation would produce the Value field of that result, i.e., 127. But in this usage, P is not a real table but rather problem domain abstraction not unlike, in principle, image A or the template s in the Sobel edge detection example. And therefore, P might be implemented as a linear array of triples (i.e., an array of records with three fields). In generating code for a linear array of triples, the table P would induce a one dimensional (1D) loop APC much like the A in the earlier example and select would induce another 1 D loop APC like the convolution operation. As these loops propagate up the expression tree, eventually they will be identified as the same loop and will be merged into a single loop returning an entity of type TableRow. TableRow's fields would define the attributes (i.e., X, Y and Value) among other things. The project operator would produce an entity from the result of the loop that contains only the Value member of the row. The derivation of the implementation code would be analogous to (although vastly simpler) than the derivation of the code for the Sobel edge detection. However, there is a new behavior that this computation must exhibit that was not present in the Sobel example. It must have some machinery that distinguishes a successful search from an unsuccessful one since there is the possibility that there may be no legitimate answer for the search of [62]. This requirement is another example of semantic programming requirements being included in the suchthat field of a control structure such as a loop. And there must be MT Defcomponents such as (succeeded operator . . . ) that can be used to write the abstract definition of [62] and which will provide the correct concrete code when once inlined. During the code derivation, the specification of the execution platform might induce some partitioning of the computation say, by splitting the computation into two pieces to be run separately on their own processor core.

On the other hand, the implementation part of the specification might specify that P is implemented as a tree structure.

Figure 52:
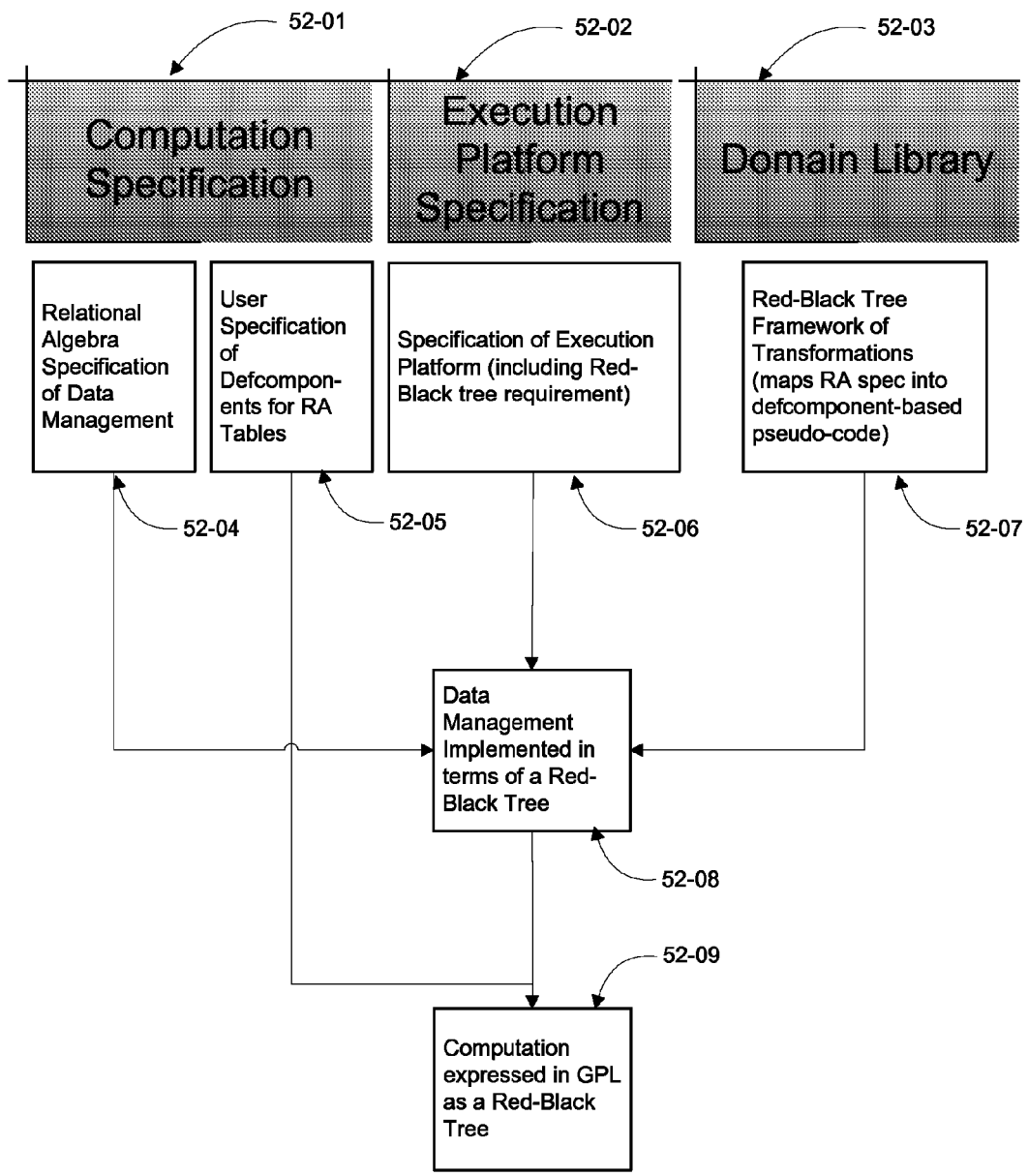
FIG. 52 Generation in the Data Structure Domain.
Figure 53:
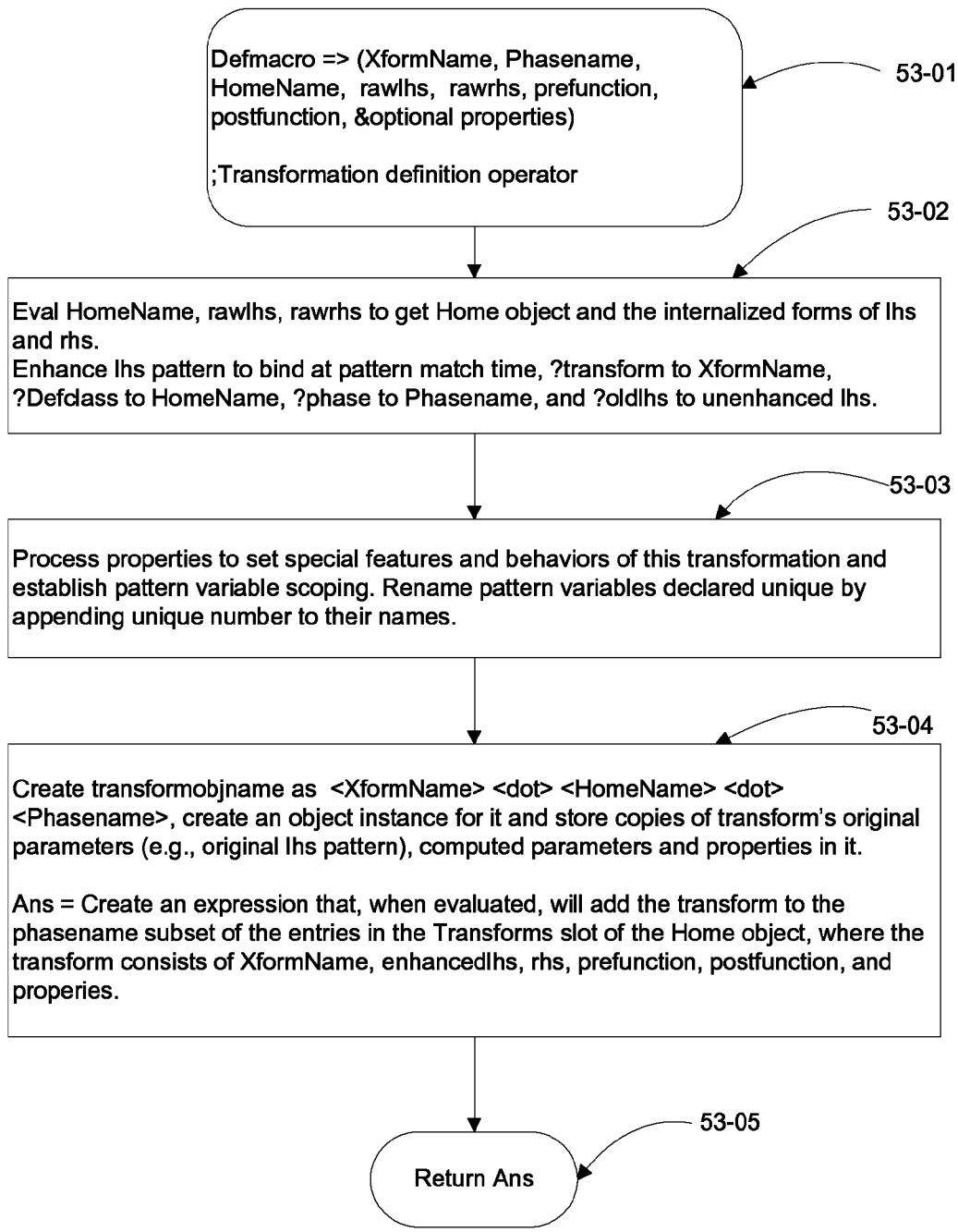
FIG. 53 Definition of Transformation Definition Macro (=>).

In this case, recursive tree traversal code will be generated for the search and if partitioning is specified, it will construct two (or more) routines that run parallel searches, splitting the tree into its natural constituent partitions to be searched. FIG. 52 summarizes the overall process of generation in the data structure domain.

Detailed consideration of this example is beyond the scope of this description but some examples of the possible programming variations are worth discussing. Consider an example from the domain of terrain mapping using triangulation. One triangulation method uses a tree to record the history of the triangulation. If an element in the tree conflicts with a newly added point in the triangulation, all of that element's children in the tree also conflict and must be removed from the triangulation. Thus, the tree is a fast way to compute triangles that need to be removed when new conflicting triangles are introduce by a step of the computation. In many computations, tree data structures of one sort or another will need to be an implementation option for the RA table specifications. What kinds of programming variations are available to the generator?

- Packaging Domain Data: The final GPL data structure will be a union of data items from two domains: 1) the data items from the tree data structure domain (e.g., pointer fields) and 2) the data items from the application domain (e.g., triangulation data for terrain modeling). Given this, the generator will produce GPL code that packages these two separately specified sets of fields into a single data structure. In the problem domain space, this packaging operation manifests itself as a RA join operation on two tables, one from the data structure domain and one from the application domain. They are joined over a phantom column or design artifact that is common to the two tables and is introduced by the generator. That phantom column disappears before the final GPL is generated. Thus, the packaging will happen in the problem domain space and not in the GPL space.
- Sharing Traversals: If the application specification contains an operation (e.g., an addition or a comparison) on two columns of the same row of a table, it will contain two separate projection/selection operations. In the implementation neutral specification, the selections look like two separate traversals (i.e., searches) that end up at the same row (i.e., at the same data structure in the eventual GPL). The generator will merge these two traversals into a single one by merging their APCs in much the same way as the template loops (of s-0 and sp-0) in the earlier examples were merged to share the loops over the coefficient computations.
- Data Structure Algorithm IL Pseudo-Code: The operators (i.e., insert, delete, left-rotate, etc.) and data types (e.g., tree record) that are specific to particular algorithmic contexts (e.g., red-black trees) have "little IL languages" whose expressions are built from the MT Defcomponents of the operator and data type objects. For example, the algorithmic context of red-black tree algorithms includes MT Defcomponents for the fields of a tree node including color, key, left, right and parent. With these MT Defcomponents, one can write the algorithm using the IL pseudo-code. The definitions of these MT Defcomponents will determine the exact form of the GPL-level implementation structures (e.g., pointers to structs or objects, or indexes into an array).

The full subject of partitioning in the context of data structures is beyond the scope of this discussion and will be considered in a later paper.

Adding Synchronization

The data structure domain discussed so far addresses computational parts that can be fully executed in parallel with no synchronization among the partitions. However, problems in many domains do not have the properties that allow such independent parallelizations. For example, Delaunay triangulation is a problem of finding a mesh of triangles in a set of points that meet certain properties. (See De Berg, et al, 1997, and also http://en.wikipedia.org/wiki/Delaunay_triangulation.) Because triangulation occurs in a vector space (i.e., 3D space), there is a natural way to divide up the computation into regions of the overall space that can be computed almost completely in parallel. However, the elements on the boundary of the regions occur in two or more of the regions and therefore, require synchronization to coordinate the computations of the boundary elements.

Such problems arise in many domains that range from mathematics to interactive graphics. Additionally, data structures, databases, client/server and other widely diverse application domains require synchronization to fully exploit the parallelization opportunities inherent in the application. So, what can the model and its principles contribute to such problems?

Let us approach this problem by teasing out some aspects of the domain knowledge and some domain knowledge-based constraints that inform the generator as to how to design and program the problem. We will use Triangulation as a concrete example so that we can be quite concrete and thereby aid the reader's intuition.

Partitioning: Partitioning the computation for large grain parallelism (i.e., for multi-core like platforms) in the context of an assumed algorithmic framework (e.g., divide-and-conquer) is an obvious constraint that can be stated in domain terms. A natural partitioning strategy would be to segment the data into regions based on the geometry of the points. This could allow the triangles inside the regions to be computed in parallel without synchronization. However, when the shared points on the boundaries are dealt with, the user must specify the boundary processing as well as some synchronization strategy for data access to boundary points. So, the first possibility is a domain specific constraint that identifies the partitioning method Divide-And-Conquer with parameters that tell the system how to divide (i.e., geometrically based on point data fields like (x, y)). Further, this constraint must introduce the domain abstractions for the "programming model" such as inside points and boundary points and perhaps a synchronization programming model (e.g., Transactional Memory—see Larus and Kozyrakis, July, 2008 and Larus and Rajwar, 2007, previously cited—or some more problem specific synchronization design) for the shared data. This constraint expression might be associated with a test condition (in the user's component specifications) that partitions the points. An alternative option, might be to incorporate the test condition in the constraint itself and associate the constraint with the definition of the points. A third alternative is that the partitioning arises from the domain specific framework (e.g., the data flow pattern of data in a shared queue may indicate the partitioning of the overall computation).

Let us consider how synchronization is incorporated by designing partitions with "communication protocols" that determine how they are related and what kind of synchronization structures to generate. In the case of triangulation, the user has domain knowledge that determines what data elements are shared (i.e., the boundary elements) and how to design synchronization structures that avoid conflicts when re-computing boundary element values. This domain knowledge modifies the partitioning knowledge. So, the user will identify a partitioning condition, which will be defined by a constraint such as triangregiontest (an instance of the class PartitionIDs). Triangregiontest is analogous to the partitionmatrixtest from the earlier examples but is a constraint specific to the domain of triangulation data rather than pure image data as partitionmatrixtest is. In the image example, partitionmatrixtest was used to identify a partitioning condition for Sobel edge detection in images as shown in [63a], which is a portion of a Sobel Defcomponent definition.

```
(or (== ?i ?ilow) (== ?j ?jlow)
    (== ?i ?ihigh) (== ?j ?jhigh) (tags (constraints    [63a]
    partitionmatrixtest edge)))
```

The analogous portion of a triangulation Defcomponent might be something like

```
(or <...triangulation partition condition expression>
    (tags (constraints triangregiontest region)))     [63b]
```

However, the user needs to say more to define the portions of the triangulation regions with potential conflicts so, the user will add modifications that will tell the generator how to design synchronization for the conflicting portions of the regions. An example of how to do this is shown in [63c].

```
(or <...triangulation partition condition expression>
    (tags (constraints (triangregiontest (overlap 1)) region)))   [63c]
``` which tells the generator that the regions will overlap and therefore, conflict by one boundary point and the points connected to boundary points by one edge. Given this information, the generator has several options as to how to design the program:
  Break each region into a no-conflict partition that can run in parallel without any synchronization and one or more conflict partitions that must be synchronized with other partitions. Associate a specific protocol with the PartitionSet or ThreadSet that incorporates the design of the synchronization.
  Don't create no-conflict and conflict partitions. Just associate a protocol that will test every element to see if it needs to be synchronized.
  Since the generator is operating in the problem domain, regions of conflict and no-conflict can be specified using ParTestX expressions. To keep the example simple, consider a two partition case with partitions named region-1 and region-2. The portion of region-1 that can run without synchronization, which we will give the name of region-1-parallel, is specified by [64a].

```
(and (ParTestX region-1) (not (ParTestX region-2)))     [64a]
```

This expression will evolve into a concrete, problem specific set of logical propositions that will specify the portion of the region-1 that can be run in parallel with no synchronizations. Analogously, the portion of region-2 that can run without synchronization, which we will give the name of region-2-parallel, is specified by [64b].

```
(and (ParTestX region-2) (not (ParTestX region-1)))     [64b]
```

The portion of region-1 that will require synchronization with region-2 is specified as [64c]. Let us call this region-1-2-synch.

```
(and (ParTestX region-1) (ParTestX region-2))           [64c]
```

When [64a-c] are resolved to concrete logical expressions in the implementation domain, those logical expressions will be analogous to the logical expressions seen in the earlier examples from the imaging processing domain data model. Those previous logical expressions were constraints on indexes over image arrays and on data fields within the image array elements. In this domain, the abstract domain data model will include three dimensional points, vertexes of triangles, triangle edges between pairs of those points, and sets of these items. The concrete logical expressions that constrain the partitions may include constraints on the geometric relationships of points (e.g., point p1 is left of point p2), connectivity relationships (e.g., point p1 is connected to p2 by edge e1), set inclusion or exclusion relationships (e.g., point set s1 is in partition region-1 and region-2 or is a point linked by a single edge to such a point), etc. In addition, the abstract algorithm that will guide the generation of the implementation for this example will be expressed in pseudo-code that will introduce logical tests and operations on this abstract data model. For example, the abstract algorithm will contain an abstract test (e.g., is the minimum angle in triangle p1, p2, p3 and in triangle p3, p4, p1 less than the minimum angle in triangle p1, p2, p4 and triangle p2, p3, p4) to determine if an edge shared between two triangles (e.g., edge (p1, p3)) should be flipped (e.g., to edge (p1, p4)). The abstractions of this domain model, both the partitioning constraint pseudo-code and the abstract algorithm pseudo-code, will ultimately be mapped into some concrete data model for storing points, vertexes, edges, etc. It will be the concrete logical expressions that arise from that mapping that will define the GPL loops over the partitions. Similarly, the concrete expressions of the pseudo-coded tests and operations that arise from that mapping will define the GPL tests and the GPL operations that are finally generated.

Shared Data, Communications and Synchronization: Other constraints can be used to identify the shared data and synchronization conditions in the boundary points that require synchronization. Also, other properties may be included in various kinds of computations, properties such as whether the data is actively transactional, privatized, thread-local, etc. to guide the design of the sharing code. Similarly, portions of a computation can also be explicitly identified by domain knowledge such as a portion of code that is identified as a critical-region. (Certain protocols for synchronization among a set of continuously running and cooperating processes that run in parallel and share data resources are characterized by the existence of a so called critical section of code in each process such that only one process at a time may be in its critical section. If one process is in its critical section and another process seeks to enter its critical section, that other process must wait until the first process has exited its critical section. See Dijkstra, Edsger: Solution of a problem in concurrent program control., CACM 8, 9 (September 1965) and Knuth, D. E.: Additional comments on a problem in concurrent programming., CACM 9, 5 (May 1966), 321-323. See also Herlihy, Maurice and Shavit, Nir: The Art of Multiprocessor Programming, Morgan Kaufmann (2008).) This domain knowledge allows a direct derivation of a design for the overall synchronization of a set of cooperating processes. Such properties are in effect describing aspects of communication and synchronization between the large grain parallel computations. A very general model for this communication and sharing is one that connects the large grain parallel computations with each other and with the shared data via a communications protocol, which can be separately and independently expressed as a part of the machine specification. CAPE (See Neighbors website at http://wwwbayfronttechnologies.com/) suggests example machinery for specifying such protocols. There can be many such protocols in a library (e.g., simple web interface client-application processing server protocol, geometric regions with shared boundaries protocol, other geometric decompositions, shared queues with or without blocking, task parallelism patterns, master/worker patterns, etc.). Such protocols can be specialized to incorporate narrow domain specific behaviors for the cases. This results in an inheritance tree of protocol abstractions available to the generation system. This tree of protocols is in fact a library of abstract (not application specific) design patterns for the communication, sharing, and synchronization aspect of the target computation. The final target program is an integration of the essential computation (e.g., triangulation) with one or more of these protocol patterns. The important idea is that these various constraints (e.g., partitions, communication and synchronization protocols, and abstract algorithm design patterns expressed in pseudo-code) become compose-able entities that allow a huge array of concrete designs to be realized from a relative small number of compose-able and abstract building blocks. Further, partial evaluation can be use to specialize the composition of these generalized components to a narrower, simpler purpose thereby reducing the number of components that must be defined to a set of highly generic components.

Now, returning to the specifics of the triangulation example, the generator uses the domain knowledge encapsulated in the triangregiontest with its modification of (overlap 1) to choose an appropriate abstract algorithm design and synchronization protocol (e.g., AlmostParallelTriangulation) and build a description

---

(AlmostParallelTriangulation (parallel region-1-parallel region-2-parallel) (synch region-1-2-synch)) [65]

--- which will get added to the suchthat clause of a threadset. In short, [65] is specifying the name of an abstract design pattern (i.e., AlmostParallelTriangulation) to be imposed on the implementation and an implied synchronization protocol. For example, the generator might design GPL structures consisting of two threads that run in parallel and one that computes the boundary elements after the other two threads have completed. However, there are lingering questions. What data elements require synchronization? What is the pattern of synchronization? Where does that information come from?

There are many possible and legitimate answers to these questions and in different situations, the user may want to use different answers. The design pattern named by AlmostParallelTriangulation can define what data elements are the targets of synchronization and what the synchronization patterns are. Alternatively, we could introduce a new pseudo-code abstraction element(pointpattern) and require the user to make a Defcomponent definition for it based on the specific target computation. The pseudo-code abstraction could be added as a modifier to the "synch" clause of the abstract design pattern AlmostParallelTriangulation expression [65]. The pseudo-code abstraction will eventually resolve to a concrete data element specific to the concrete physical design of the computation. And to the pattern of synchronization, one could further modify the synch clause with a protocol name that would define the exact nature of the synchronization of the computational steps.

The critical point to be drawn from this is that the specification of the regions as well as the design pattern that will become the concrete algorithm is expressed completely in the problem domain and makes no commitment to the concrete details of the implementation domain. That is, there is no commitment to the concrete looping structures, to the concrete synchronization data, to the concrete synchronization patterns, or to the concrete implementation data structures. Yet the generator can design an abstract algorithm using pseudo-code-based IL expressions as stand-ins for many of the concrete implementation details and even manipulate the structure of this abstract algorithm to take advantage of implementation opportunities provided by the execution platform with full confidence that when the stand-ins resolve to implementation details, they will be correct and fully coordinated and consistent across the complete implementation.

Local Optimizations: The area of synchronization provides great opportunities for extensions that construct large blocks of programming domain knowledge (i.e., "programming models" in the lingo of other specialties) that relate problem domain entities (e.g., APC constraints) to transformation-based program design and construction strategies. While domain specific approaches to synchronization are by no means a fully solved problem, the generator principles, methods, and mechanisms (e.g., constraining the design via APCs, partitioning via component specialization and synchronization via protocols) provide an architectural guide to the development of DSL based techniques for computational parallelization with synchronization.

Creating networks of domain concepts provides a representation language in which to express programming notions in terms other than GPL constructs. That is, a problem domain pseudo-code is built mostly on semantic constructs (e.g., abstract operators, data objects, and APCs with logical propositions) whereas a GPL representation is built largely on concrete structures (e.g., sequences of statements, scopes, and various kinds of nestings) with the semantics specialized via these concrete GPL structures. With a problem domain language, one can create an abstract and incompletely determined design with added constraints that partially express how to construct (i.e., to program) an imperative, GPL form of the computation. Once these partial constraints and the user's customized specification are combined with the transformations that define the programming process (or steps), then the GPL form of the computation can be incrementally constructed.

In other words, a problem domain model is more declarative and a GPL model is more operational or prescriptive. The domain model is talking about the program (i.e., the specs) and the steps to construct it (i.e., the process) whereas the GPL model is the thing being constructed.

Mapping into a Macroscopic Implementation Architecture

Figure 58:
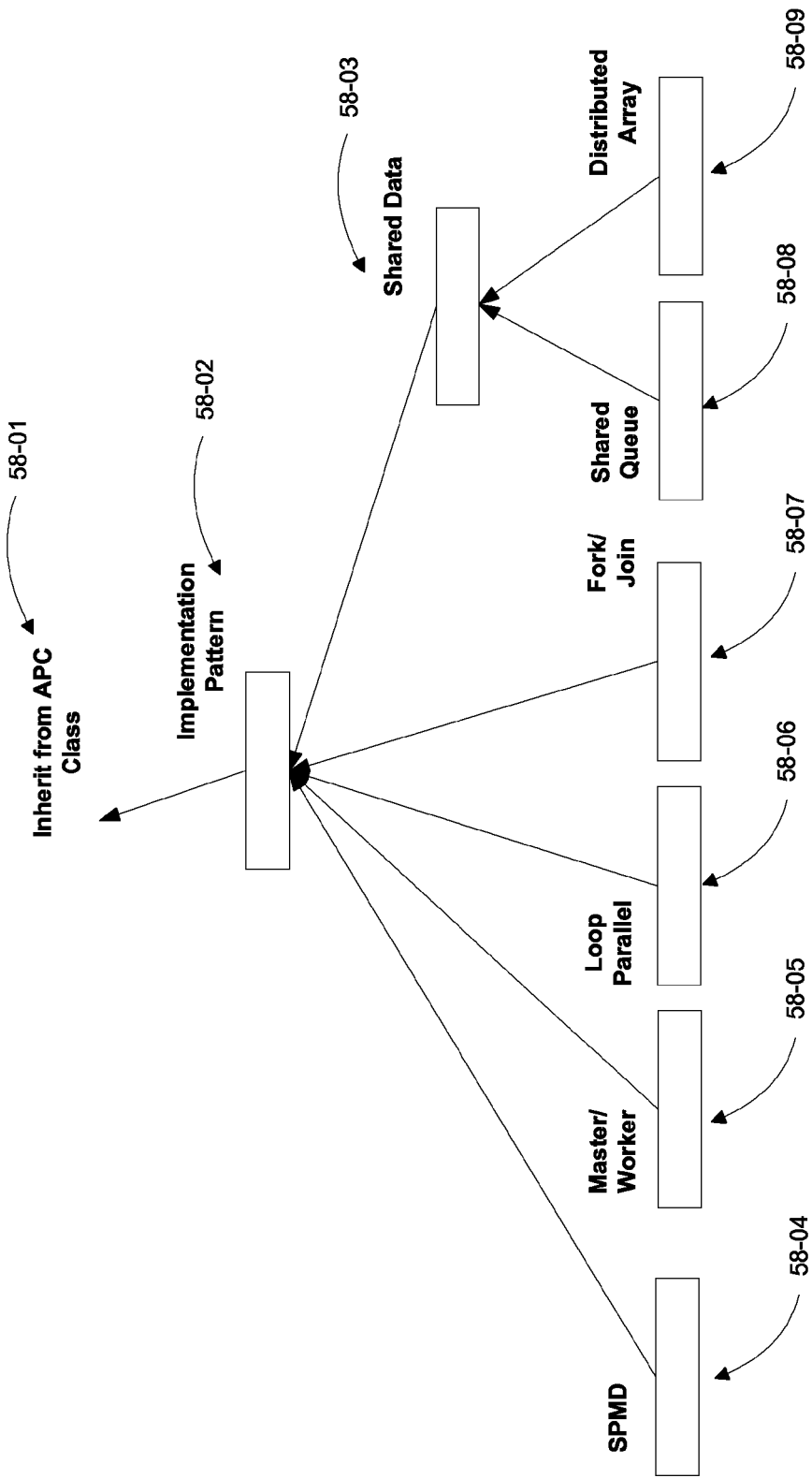
FIG. 58 Implementation Design Pattern APCs.

The invention chooses a macroscopic implementation architecture to define the global structure of the algorithm being programmed (FIG. 58). The choice is largely determined by the nature of the computation and provides an implied, though abstract design in which to fit the computation. In the following example, that algorithm specification is included in the execution platform specification.

Figure 59:
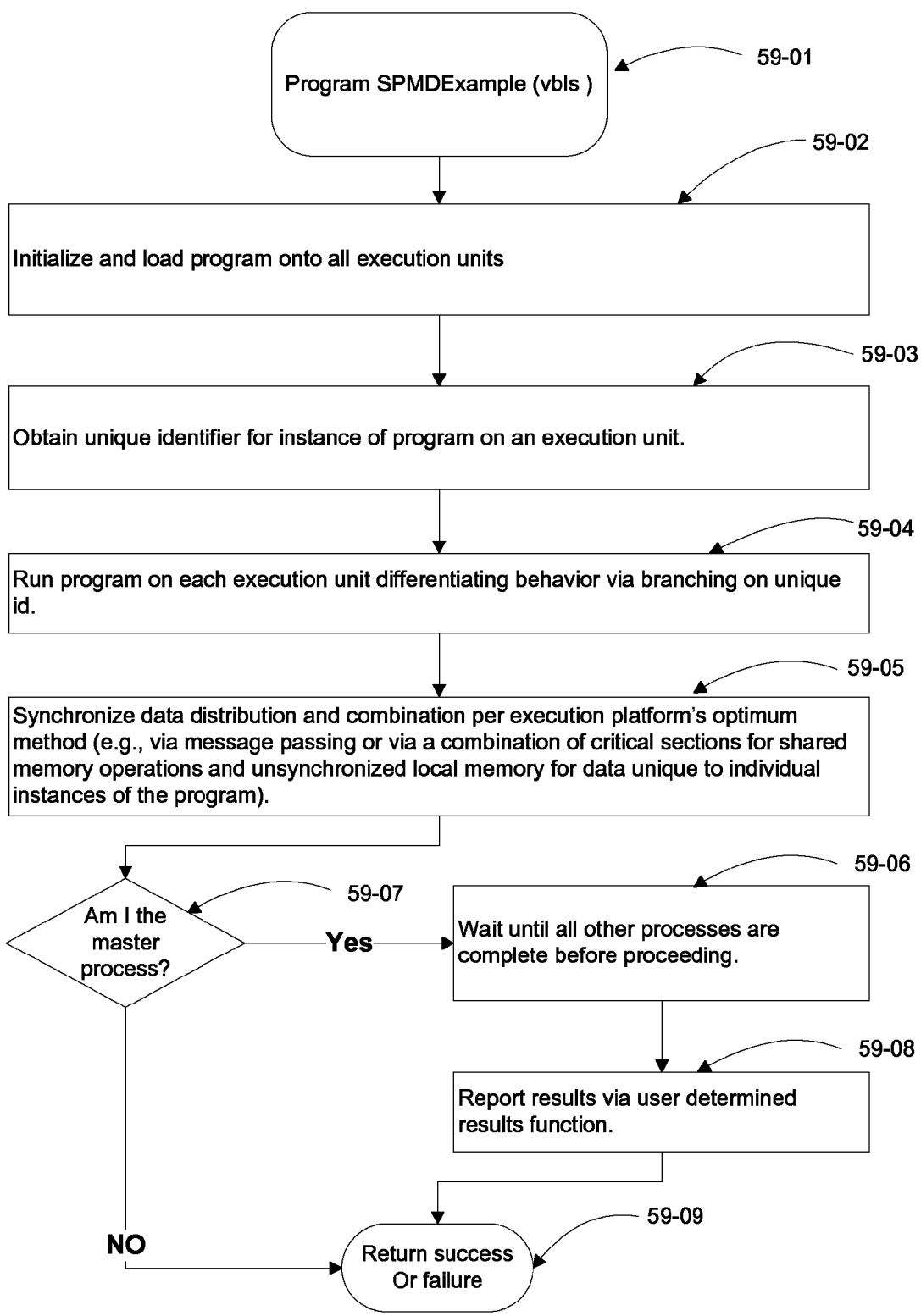
FIG. 59 SPMD Design.

Let us consider an example for which one might want a different kind of parallel partitioning, one that will exploit a multicore architecture and will require explicit synchronization of the parallel partitions. In this example, the user will chose an SPMD (Single Program, Multiple Data) implementation architecture in which the same program (or at least, the computational heart of the program) is run in separate processors with differing sets of data. In this case, the number of partitions are implied and not represented as distinctly different chunks of code. FIG. 59 shows an abstract version of the implementation program that will be generated for an SPMD architecture. At the end of this program (step 05 of FIG. 59), the results are combined by a user defined operation.

The chosen example problem (FIG. 60) is that of computing a value for PI via numerically integrating a function using the trapezoid rule. That is, we know that the definite integral between 0 and 1 of the given function definition for f(x) is equal to PI. To compute a numerical approximation of PI, the method will sum up the area of many small rectangles. The greater the number of rectangles (and therefore, the smaller their width), the closer the computation can get to the actual value of PI. (Of course, PI is a transcendental number, which cannot be expressed by a finite value. So, the computation can only get so close to PI, which means that the integration will produce a finite number of digits of precision.) The following example specification of the computation chooses 1,000,000 steps. This should provide sufficient precision for most computational purposes and more importantly, will require a significant amount of computation, thereby justifying parallel computation.

To specify the execution platform for this example, the user specifies that the desired implementation use a SPMD design on a four core processor. The number of cores or processors will indicate how many times to replicate the program. If the number of cores is a variable, the user will specify the name of a function that will return this value at run time and the replication decision will be deferred until run time. Each instance of the program will have a unique id determined at run time by a call to a user specified function, in this case, get_myid( ) which, to simplify the example, is shown in the program specification. A more strictly implementation free specification would replace this with an IL expression and move the explicit call into the IL definition.

The execution platform specification is:

```
(PlatformArchitecture (tags (constraints (Parallelism (MultiCore 4))
        (ImplementAs SPMD groupsteps)))            [62b]
```

The implementation free computation specification for this example is:

```
(progn
    (dsdeclare dsinteger totalsteps :value 1,000,000)
    (dsdeclare dsreal pi
            (tags (common variable)
                (Synchronize InCriticalRegion))) ;;synch & scope
                    knowledge
    (defcomponent f (?x) (/ 4.0 (+ 1.0 (* ?x ?x))))
(dsdeclare dsnumber eu :value (ExecutionUnits PlatformArchitecture))
(dsdeclare dsnumber id :value (rtcall get_myid( ))) ;; runtime call to
middleware
(:= pi (* step (Integrate 0 1 (f x) dx totalsteps)))
(report pi))                                        [62c]
```

This example introduces the domain specific operator Integrate, which will refine to code that does a numerical integration of the function (f x) between 0 and 1 using totalsteps steps. Specifically, during the localization and partitioning phase, the Integrate operation will trigger a reduction of the integration step to the form:

```
(:= pi (* (deltax Integral1 ?i) (x Integral1?i) (tags (constraints  [62d]
    sumloop1))))
```

This reduction creates the APC sumloop1 that will evolve into a summation loop that will sum up the areas of rectangles under the curve and uses a design context that includes the design variable ?i, which in that design context refers to the target program index variable for the loop that will evolve from sumloop1. The localization and partitioning phase also produces an instance of a partition APC (i.e., replpart5) that modifies sumloop1. Replpart APCs capture the implementation knowledge that this partitioning is determined by runtime logic based on a runtime id of the execution unit on which it is running. Further, it captures the design knowledge that the partitions are replicated instances of the total program load image. Subtypes of the replpart type determine variations in that implementation design (e.g., synchronization via message passing or via shared memory). Such implementation variations are indicated via additional modifiers in the ImplementAs expression. In addition, this reduction creates a domain specific design object representing the yet-to-be-generated integration code, in this example Integral1 of type Integral. The Method-Transforms (MTs) associated with the Integral type define the IL that will be used to abstractly define the implementation. In [62d], deltax and x are MTs that respectively define the width of the integration rectangle and the value of the curve f(x) at step ?i.

This reduction automatically generates the IL definitions that will be used in expressing the abstract design. These are derived using generator domain knowledge (expressed in transformations) and problem specific knowledge from [62c]. For this example, the generated IL is:

```
(defcomponent deltax (Integral1 ?i) (/ 1 totalsteps)) ;; width summation
rectangles
(defcomponent x (Integral1 ?i)
            (* (+ ?i 0.5) (deltax Integral1 ?i))) ;; code for midpoint of
                    x at step ?i
(defcomponent numsteps (Integral1)
                    totalsteps) ;; # of steps in the integration of (f x)
                        from 0 to 1
(defcomponent ordinal (Integral1 ?i) ?i)     ;; ordinal number of this step,
                                                ranging
                                            ;; from 0 to (- (numsteps
                                                Integral1) 1)
(defcomponent istart (Integral1 ?i) 0) ;; Loop start
(defcomponent istride (Integral1 ?i) 1) ;; Loop index increment
(defcomponent iend (Integral1 ?i) (- totalsteps 1)) ;; Loop index start
(defcomponent irange (Integral1 ?i)
            (_range (istart Integral1) (iend Integral1)        [62e]
(istride Integral1))
```

Since the expression (deltax Integral1 ?i) is defined as a constant, the generator rewrites [62d] as:

```
(:= ans1 (x Integral1?i (tags (constraints sumloop1))))
(:= pi (* (deltax Integral1 ?i) ans1)) ;; eliminate arith. op. &   [62f]
    decrease error terms
```

If there were no parallelism specified, [62c] would refine a simple serial C program like:

```
#include <stdio.h>
#include <math.h>
int main ( )
    {
    int idx1;
    int totalsteps = 1000000;
    double x, pi, deltax, ans1 = 0.0;
    deltax = 1.0 / (double) totalsteps;
    for (idx1=0; idx1<totalsteps; idx1++)
        {
        x = (idx1 + 0.5)*deltax;
        ans1 = ans1 + 4.0/(1.0+ x*x);
        }
    pi = deltax* ans1;
    report(pi); /* call user routine to report result */
    return 0;
    }                                                    [62g]
```

This case in not very interesting from the point of view of parallel computation. Another relatively simple case is where there are sufficient execution units so that each iteration of the loop can be handled in one unit. However, we will skip that case because it is a degenerate version of the next case, which is a more typical, interesting, and challenging case. Consider the case is where there are fewer execution units than number of steps in the summation. In this case, groups of computational steps must be handled as a group in each execution unit (as indicated by the "groupsteps" modifier in the execution platform specification of [62b]). Further, this is a case where synchronization will be required during the combination of the results from the various execution units. The synchronization pattern is determined by the SPMD design pattern (FIG. 59) in conjunction with problem specific knowledge.

The modifier "groupsteps" triggers the generator to specialize the IL so that the loop of each instance of the program chooses a group of iterations to perform based on the unique id of the execution unit (e.g., a machine or a CPU core). That is, for this example, each execution unit will handle 250,000 iterations. This mapping is accomplished by creating a specialization of the design object Integral1 named Integral1-seg with specialized MTs istart, iend, and irange that will redefine the loop that sumloop1 evolves into. The new istart becomes the execution unit id (an integer in the range [0, 3]) times the number of iterations per group. The new iend becomes the new istart plus the number of iterations per segment except in the last processor where it is all of the leftover iterations up to the end. If there is the same number of processors as iterations, each loop becomes a single step and if that condition is provable (i.e., both number of processors and number of iterations per group are constants) at generation time, the loop will evaporate leaving only the body of the loop. In our example, each of the four processors will be assigned the same number of iterations to handle. In addition, the specialization step generates the Partest and PartestX MTs that will restrict the resulting loop to run from a starting point and an ending point that will be computed at runtime. The specialized IL is shown as [62h].

```
(defcomponent istart (Integral1-seg ?i)
    (* (id Integral1-seg ?i) (/ (numsteps Integral1)
                (numprocs Integral1-seg)))
(defcomponent iend (Integral1-seg ?i)
    (if (== (ordinal Integral1-seg ?i) (- (numprocs
    Integral1-seg) 1))
        (then (numsteps Integral1-seg))
        (else (+ (istart Integral1-seg ?i)
                (/ (numsteps Integral1-seg)
                    (numprocs Integral1-seg))))))
(defcomponent irange (Integral1-seg ?i)
        (_range (istart Integral1-seg) (iend Integral1-seg)
        (istride Integral1-seg))
(defcomponent Partest (Integral1-seg ?i) (_member ?i (irange
    (Integral1-seg ?i)))
(defcomponent Partestx (Integral1-seg)
    (closure (Partest (Integral1-seg ?i)
        ...binding list containing (?i idx1) binding...)))    [62h]
```

Partestx (Integral1-seg) is associated with the replpart5 partition APC that modifies sumloop1. In the loop generation phase, Partestx (Integral1-seg) migrates into the suchthat field of the loop generated by sumloop1. Once inlining is completed, the istart, iend, istride and irange components will evolve into code that will determine how to calculate those values for the resultant loop as a function of the process id and thereby, determine the bounds of the partition computed by the loop.

The definition of pi in [62c] included the constraint "(Synchronize InCriticalRegion)," which will affect the definitional location of pi (i.e., it is effectively a shared global variable) as well as what kind of code to generate for accesses to it. That is, the expression "(:=pi (*(deltax Integral1 ?i) ans1))" from [62f] will have to be coded to act like a critical region and this can take many different forms depending on the implementation foundation chosen. For example, if the implementation is exact replication of program images (i.e., strict SPMD), then PI will be defined in all of them and some convention for which PI is "the" unique pi must be defined (e.g., the pi in the program instance with id=0). If the underlying implementation is a message passing architecture such as MPI (see Mattson, et al.), this convention might be chosen. In addition, only one process at a time can have access to pi. That is, the code that derives from the expression "(:=pi (*(deltax Integral1 ?i) ans1))" in [62f], will be in a critical region in all processes. Further, all processes must complete their critical regions before the program can progress to the code generated for "report(pi)" in [62f] and importantly, since "the" pi is specific to one process (e.g., the one where id==0), only the "report(pi)" code in that one process can actually execute. The variable icomplete is a count of those processes that have completed their critical regions. It indicates when the computation is complete and can progress to the "report(pi)" code. The wait_until function assures that the process with id equal to 0 cannot progress until all processes have completed their critical regions. The "(id==0)" test assures that only the process with id equal to 0 will progress to the call to report(pi).

See FIG. 5.3 in Mattson, et al, page 131 for an example of the code that would be generated for an MPI execution platform.

Certain properties of the computation specification may affect other possible variations in the generated code. For example, the computation of pi is essentially a reduction operation, that is, a summation with many terms, each coming from a different process. Since, the plus operator is associative, the order in which the sum is computed is irrelevant (at least, in theory). (In practice, issues of computational precision might affect the order in which updates are performed. If this were the case, the IL would have to be specialized to accommodate this requirement.) Because the plus operator is associative, the generator does not need to worry about the order in which the various processes update the value of pi. It only needs to assure only one update takes place at a time and the notion of a critical region will assure this requirement. In the case that the reduction operator is not plus but rather some non-associative operator, then the generator would have to generate code that assured updates occurred in a specific order.

If a shared memory implementation were specified in the execution platform specification (e.g., by adding one or more additional modifiers to the ImplementAs phrase), the generator would have to generate additional, explicit code that assures the above conditions. This is not particularly hard and probably would be handled by generating calls to runtime service routines from a library. One possible generated program is shown in [62i]. In this design, library routines hide the details of process to process communication (e.g., getting values from and updating shared variables in process 0) and access to data that is meta to any one process (e.g., how many processes or execution units there are and what is the id of the current process). The chosen design establishes the convention that variables shared across processes (i.e., the user defined variable pi and the generated variable icomplete) are assumed to be in process 0 and calls to library routines are used to access these variables. The design includes logic to assure all processes are complete before pi's value is reported as well as logic to assure that only process 0 reports that value. Formulation of this logic is based on a mixture of user supplied problem and domain knowledge and transformation supplied problem domain knowledge.

```
#include <stdio.h>
#include <math.h>
 int main ( )
 {
 int idx1;
 int totalsteps = 1000000;
 int icomplete =0;         /*count of processes that have completed
                             the computation*/
 int my_id, numprocs;   /* id of this process and number of
                             processors (i.e., cores)*/
 double x, pi, deltax, ans1 = 0.0;
 int i_start, i_end;
 my_id = get_myid( );       /* get id from initiator program*/
 numprocs = get_numprocs( ); /* get number of processors from
                                initiator program*/
 deltax = 1.0 / (double) totalsteps;
 i_start = my_id + (totalsteps /numprocs);
if (my_id == (numprocs −1)) i_end = totalsteps;
 else i_end = i_start + (totalsteps/numprocs);
for (idx1=i_start; idx1<i_end; idx1++)
 {
 x = (idx1 + 0.5)*deltax;
 ans1 = ans1 + 4.0/(1.0+ x*x);
 }
Enter_critical_region(my_id); /* Library routine*/
Add_To_shared (0,&pi ,(deltax* ans1)); /* Library routine to update
pi in process 0*/
Add_To_shared (0,&icomplete,1); /* Library routine to update
                         processes completed in process 0*/
Leave_critical_region(my_id); /* Library routine*/
if ((my_id==0) &&
    wait_until((Get_value(&icomplete,0) == totalsteps))
    report(pi); /* call user routine to report result */
return 0;
}                                                        [62i]
```

Another shared memory variation would be one in which the generated program itself handles the initiation of all processes dynamically rather than assuming a separate initiator program loading full execution images of the program. Such a design variation would be triggered by a different ImplementAs modifier (say "groupstepsV2") and that would lead to a different kind of partitioning APC (say "replpartV2"), which in turn would lead to the appropriate design variations.

Such a rich set of possible variations in the generated code is one of the advantages of a microcoded generator. A large number of target platforms and variations in target designs can be supported by varying the sets of generator transformations chosen without having to make any changes to the implementation free specification of the program.

Design Meta Conditions: The requirements such as "all processes must be complete before the 'report(pi)' code can execute" are called Design Meta Conditions or Meta Conditions for short. The partitioning condition, Partestx, was the first instance of a Meta Condition discussed, but a Meta Condition is a more general concept and there are as many kinds of Meta Conditions definable as there are abstract algorithms, abstract frameworks, abstract designs, and variations thereof. They allow the generator to represent abstract designs in IL using Meta Conditions (i.e., in pseudo-code) and then later when the specifics of the target computation are known, to derive the concrete specifics of the Meta Conditions. For example, Partestx indirectly and partially affected the form of loop control structure code. But Meta Conditions may also evolve into explicit branching code within the target implementation such as in the statement from [62i]:

```
if ((my_id==0) &&
    wait_until((Get_value(&icomplete,0) == totalsteps))
    report(pi); /* call user routine to report result */
``` where the branch conditions "(my_id==0)" and "(Get_value (&icomplete,0), totalsteps)" are the concrete refinements of the Meta Conditions, respectively, for identifying a special parallel process (i.e., the one that contains the globally shared definitions) and for determining completion of a set of parallel computations. Earlier, a design feature that determined how to designate specific processes combined with the design feature that determined how to designate the "master" process in an SPMD design effected specialization of the SPMD IL. That specialized IL later generated the concrete branch conditions above from the Design Meta Conditions that were initially part of the abstract, first cut at the SPMD design. Further, domain knowledge from the user or general knowledge from the domain may allow these Meta Conditions to be refined into many different concrete code forms depending upon a variety of domain knowledge and design decisions made in the course of generation. Such global interrelationships allow global coordination among various design decisions over time and since the Meta Conditions are abstract and not yet refined into concrete code, the generator does not have to represent them as concrete code until such global coordinations have been completed and synchronized. Thus, abstraction of and deference of the refinement of Meta Conditions makes the process of making design decisions computationally inexpensive. If a series of design decisions are made by the generator and perhaps later changed or refined in the course of figuring out the details and variations of a design, no concrete code has to be reorganized because it has not yet been generated. And when it is generated, it can be generated consistent with the full, finalized and synchronized set of design decisions, which is much less complex, much less prone to failure and much less costly computationally than producing concrete programming code early and iteratively manipulating and evolving it.

Additional Performance Optimizations

The last few generator phases introduce some conventional optimizations as mentioned earlier. Normally, if one has a good optimizing C compiler, these could be left up to the compiler. However, since the generator will be generating C for a variety of platforms some of which may have non-optimizing C compilers, the generator provides the option to perform such optimizations before the C code is generated.

SUMMARY

Operational Summary

This invention is a method and a system for transformation-based program generation using two separate specifications as input: An implementation neutral specification of the desired computation and a specification of the execution platform. The generated implementation incorporates execution platform opportunities such as parallelism. Operationally, the invention has two broad stages. First, it designs the abstract implementation in the problem domain in terms of an Intermediate Language (IL) that is unfettered by programming language restrictions and requirements. Concurrently, the design is evolved by specializing the IL to encapsulate a plurality of desired design features in the implementation such as partitioning for multicore and/or instruction level parallelism. Concurrently, constraints that stand in for implied implementation structures are added to the design and coordinated with other constraints. Second, the IL is refined into implementation code. With this invention, porting an implementation neutral computation to a new architecture can be automated.

The generator approach to program generation rejects the use of GPL-based representations in the early stages of program generation. Why? Because GPL-based representations have a structural bias that encodes much information about the target program in terms of highly inter-constrained structural forms (e.g., blocks, scopes, iterations, etc.). This structural representation requires an extensive amount of low level, concrete detail that engenders a rich web of inter-component relationships and constraints. Because of these characteristics, GPL-based representations make manipulation, understanding, extension, and change difficult. Thus, forming a specification in a GPL-based representation from which to derive a target program is much like, and in many ways just as difficult as, forming the target program itself.

Rather, this approach uses representations of the target computation that are expressed in terms of largely functional expressions of DSL abstractions (e.g., convolution operators and templates) and eventually, in IL abstractions. The generator's programming process is one that specializes these DS abstractions via redefinition, simplification, transformation, combination, creation of new DS abstractions, and other manipulations of these abstractions before generating the low level, GPL-based structure and details. Table 4 summarizes these specialization methods and offers examples similar to those that have been discussed earlier in this paper.

DS objects, via their associated IL, define pieces of the evolving target program (e.g., W (s-0 . . . )) and sometimes those pieces are based on some assumptions about the eventual structure of the target program (e.g., Partestx (s-0-Edge5) assumes a partitioning). However, the effects of DS objects alone are quite local. DS objects alone are not good at expressing constraints that relate widely separated elements within the global program structure. Nor are they good at adding to those constraints step by step until enough information is available to cast the constraints into final, concrete, GPL code. In other words, they are not good at producing a series of design approximations that get closer and closer to the final form of the target program. But this is exactly what the generator needs to do and the target program representation is designed for that purpose. The ability to provide that widely separated coordination is accomplished by associating the DS objects with Method-Transform based IL constructs. The IL encapsulates the design of portions of the implementation and because that IL specific to a single DS object will be dispersed across extended expressions, it has the effect of coordinating dispersed but interrelated pieces of the design. The addition of constraints (i.e., APCs) that explicitly constrain their associated expressions further extends this ability to coordinate implementation elements that are dispersed across extended expressions (e.g., loops and partitions). Finally, the IL provides a singular target—specifically, the DS object with which the IL is associated—at which to apply specializations that will encapsulate specific design features in a specialized version of the associated IL. Overall, these facilities to coordinate design aspects and features over extended expressions are central to the ability to formulate a macroscopic design before the concrete GPL-like details are completely known or even determinable.

The generator evolves the target program by formulating the desired macroscopic, abstract implementation design and then, adding information, needed design features, and constraints incrementally. For example, it first uncovers implied loops or iterations and records the information as constraints (APCs). There are NO GPL-like loops yet. In the course of this, it uncovers implied information about loop control, location, and sharing, based on some general loop genotype. It identifies partitions based on domain specific knowledge and determines which of the partitions allow loop sharing. This partitioning information is expressed as constraints (i.e., APCs) associated with loop APCs but it is not yet cast into GPL-like program structure. In the course of these processes, the generator decides what control variables will be used for sharing and what ones will be discarded. Execution environment specs may add information about desired threading (e.g., multi-core) and vectorization. This information is expressed as explicit constraints or encapsulated into the IL that will generate the concrete code structures but NO GPL-like code structures are built yet. The decisions to build GPL-like code structures are deferred until it is determined how many loops there will be, whether they will be in threads, what design features will be needed in the implementation (e.g., whether there will be vectorization structures), and so forth. The Table 5 summarizes the key steps in the program generation process.

Summary of Key Innovations

The generator uses an implementation neutral specification of a target computation along with a separate specification of the execution platform and from those two independent specifications, it generates an implementation in a general purpose language that takes full advantage of the execution platform architecture. In other words, the architecture of the resulting implementation does not have to be limited by the architecture of problem specification.

Several key innovations are introduced to achieve this goal.

Computation Specification In the Problem Domain Not GPL Domain: The computation specification is expressed in a problem domain or DSL oriented (not GPL oriented) representation. This is achieved by avoiding imperative language constructs and constructs that are concrete in the GPL sense.

Representation and Manipulation in Problem Domain Not GPL Domain: The generator manipulates and evolves a domain specific (not GPL specific) representation of the macroscopic design of the implementation early-on in the generation process.

Computation Specification is Implementation Neutral: The specification describes only the essence of the computation but provides no specification of the form or structure of the implementation.

Execution Platform is Independently Specified: The specification of the execution platform is separate from and independently specified from the computation specification thereby allowing computations to be moved from platform to platform without reprogramming the computation proper.

Abstract and Extensible DSL: The DSL operators (e.g., convolutions), iteration constructs (e.g., implied loops) and data types (e.g., templates) are all defined in terms of abstractions that are open to further definition of the detailed computational intentions by the user supplying Defcomponents, each of which customizes how the concrete definitions of the DSL abstractions are derived.

Parameters Abstract DSL Operators: Templates are an example of abstract parameters to the definitions of abstract DSL operators (e.g., convolutions). They allow the operators to be abstractly defined in terms of template components, thereby postponing many detailed design commitments (e.g., the exact number, form, location, computational details and optimizations of loops that implement the operator). This form of parameterization goes beyond the kind of parameterization found in GPL programming languages in that, it can interact with and effect parts of the program that are outside of its immediate scope and thus, well remote from the point of usage.

User-Based Customization of DSL Operators: Abstract Defcomponents (e.g., of an operator's parameter object or even of the operator itself) provide the user with a way to inject his or her customization into the definition of an abstract domain specific operator. For example, these customized components can affect the size and data type of the template as well as the constant data or computational definition of the coefficient values. Further, an operator itself may be specialized by the addition of a component that alters its definition, e.g., by defining a custom definition for convolution over the non-color fields of a pixel object.

Domain Knowledge Influences Design: It is generally true that domain knowledge influences and affects the design of the target program. An important specific example of this is the affect of the user identifying test conditions that separate a computation into a set of discrete, problem specific computational cases. This information drives the native partitioning of the computation. A second example, the specification of the execution platform architecture (e.g., multi-core) drives a further partitioning, architectural partitioning, of the computation.

Intermediate Language (IL) Expresses Abstract Implementation: IL provides abstract building blocks that allow formulations of the implementation outside of the formulation rules and constraints that would be required by a GPL.

Design Features of Implementations Determined by User: The user has the freedom to specify that the implementation should be constructed using certain desired design features thereby allowing a significant degree of control over the final form of the implementation.

Design Features Encapsulated by Specialization of IL: Design features that often affect remote but interrelated parts of the implementation can be encapsulated in an object that is a specialization of a generalized object that represents some simple, default implementation. This encapsulation is effected by specializing the Method-Transforms (MTs) of the less specialized object and thereby specializing the IL associated with the object. This coordinates the design effects across a set of separate MTs and thereby across separated places within the evolving implementation.

Partitioning by Specialization: The essence of a partition is captured in a specialization of operator and data object DSL abstractions (e.g., template) and their associated IL. In a strong sense, one can say that partitioning is driven by specializations of the DSL entities.

Meta Conditions Stand In For Elements of Implementation: Meta Conditions, e.g., a partitioning condition or a computation completion condition, are abstractions that cannot be refined to concrete GPL form until the form and interdependencies of the macroscopic design have been finalized and constructed. The abstractions allow the generator to operate in the abstract problem domain and defer dealing with low level refinement details until after the macroscopic design is complete.

Program Design by Partial Constraints: The DSL provides programming design constraints (e.g., APCs) that are associated with and constrain parts of the evolving program as well as the programming process itself. They can, in a step by step manner, be propagated, manipulated, merged, and caused to interact in order to refine the program constraints and thereby refine the program design from an abstract DSL form to a concrete GPL form.

Design First, Code Later: Because the generator is manipulating the implementation in the problem and programming domain, that implementation can be sketched out abstractly deferring that development of the code level details until the broad, macroscopic framework of the implementation and its program wide constraints are settled. Within that framework, the coding details and GPL-required constraints become simpler problems.

The generator is "Programming": The generator is "writing programs," to a degree, like humans do. That is, the generator guides the abstract design in an intended direction rather than seeking a solution via a naïve search of some solution space. It introduces desired programming design structures (e.g., threads, partitions, etc) in a goal oriented manner based on the opportunities provided by the execution platform. As a concrete example, partitioning is accomplished in the abstract domain space (rather than in the GPL space) by incrementally specializing operators, loops, and data type abstractions and their components to reflect design goals.

The generator Is "Microcoded": The generator is fundamentally a generator framework that can be reprogrammed by loading different sets of domain objects, transformations, phases, type inference rules, and constraint objects. The metaphor that invokes the right sense of this facility is the microcoding for hardware chips to produce CPUs with various instruction sets. In this sense, each new domain (e.g., data structures and data bases) and each new execution platform architecture is microcoded into the generator, thereby producing a generator specialized to that domain and/or that platform architecture.

No Reprogramming Required for New Platforms: Since the computation and platform specification are separate and independent, no application reprogramming is required when new machines or architectures come along.

The generator introduces a fundamentally new way of generating software by using associative programming constraints (APCs) that serve to constrain both the programming process and the evolving program and by using intermediate language the encapsulates elements of the implementation and importantly, can be specialized to encapsulate needed design features. It uses the APCs and domain specific knowledge with phase-based transformations to implement the programming process. It uses incremental design feature encapsulation to allow features to be incorporated into design of the final implementation in a step by step manner, where these include features such as architectural facilities of the execution platform (e.g., parallelism), large grain algorithmic frameworks (e.g., red-black tree algorithms), GPL requirements (e.g., iteration control constraints), and desired implementation forms (e.g., SPMD parallel design). Importantly, much of this process operates in the problem domain and programming domain spaces rather than the GPL space, thereby providing great freedom in the architecture of the result and importantly, allowing the specification of the target computation to be separate and independent from the execution platform. As a result, changes in the architecture of execution platform affect only the domain specific specification of the execution environment and while regeneration of a computation's program for a new platform architecture may be required, reprogramming of the computation is not.

The generator lays out a global design for the overall computation using design-like abstractions that only partially define and constraint the overall design. These design abstractions allow the system to avoid introducing concrete details too early, which might fix aspects of the final program that are later determined to be better expressed by a different design. Once the overall design is settled, then the concrete details of those abstract design objects can be derived. Behaviorally, the programming process looks somewhat like the human oriented programming process. Sketch the design of the overall computation first and then add in the concrete programming details once the program's superstructure is decided.

SEQUENCE LISTING

Not Applicable

TABLE 1

Comparison of Program and Programming Constraints

| Constraint Type | Role | Form | Linguistic Basis | Solution Multiplicity |
|---|---|---|---|---|
| Program | Express Relational Facts (What) | Declarative | Mathematics | Unique |
| Programming | Effect Computational Method (How) | Operational | Object Oriented Programming (OOP) | Many |

TABLE 2

Elements of The Generator

| Component | Form | Description |
|---|---|---|
| DSL Class Definition | (DefDSLClass Name (Super) Form (SlotName1 InitVal1) (SlotName2 InitVal2) . . . ) | This creates an CLOS class named Name whose superclass is Super. It has slots SlotName1, SlotName2, and so forth. The slots may optionally have initial values. Form will create an instance of the class. |
| Pattern-Directed Transformation | (→ XformName Phase XFormGroup Pattern Rewrite [Pre][Post]) | The transform's name is XformName and it is stored as part of the XFormGroup object structure (which might be a type or other specific kind of grouping object, for example). It is enabled only during the Phase phase. Pattern is used to match an AST subtree and upon success, the subtree is replaced by Rewrite instantiated with the bindings derived during the pattern match. Pre is the name of a routine that checks further enabling conditions and may perform bookkeeping chores (e.g., creating translator variables). Post performs chores after the rewrite. Pre and Post are optional. |
| DSL Operator Definition | (Defcomponent CompName (Operator. ParameterPat) [Pre: PreName] [Post: PostName] Body) | Equivalent to (→ CompName Inline TypeofOperator EnhancedPattern Body PreName PostName) where TypeofOperator is the type of Operator, Inline is the phase where operator and method inlining occurs, and EnhancedPattern is a pattern automatically derived from (Operator. ParameterPat) enhanced with hidden implementation machinery that simplifies the writing of operator definitions. |

TABLE 2-continued

Elements of The Generator

| Component | Form | Description |
| --- | --- | --- |
| DSL Class Method-Transform | (Defcomponent MethodName (Object. ParameterPat) [Pre: PreName] [Post: PostName] [Phase: PhaseName] Body) | Equivalent to (→ MethodName PhaseName Object EnhancedPattern Body PreName PostName) where PhaseName is the phase where operator and method inlining occurs (default is Inline), and EnhancedPattern is a pattern automatically derived from (MethodName Object. ParameterPat) with enhancements analogous to those of operator definitions. |
| Dynamic Deferred Transform | Dynamically created as (GenDeferredXform XformName ContextPattern Rewrite Bindings) | These transforms are part of specialized machinery for moving generated code to contexts that do not yet exist when the code is generated. Given initial bindings of Bindings, at some future time when ContextPattern matches some newly created context, then that context is replaced by Rewrite. |
| Type Inference Rules for Operators | (DefOPInference OpType (Operator Type1 Type2 ...) ResultType) | This macro generates a pattern that will compute a type for the Operator expression where the expression's parameters have types Type1 Type2 ... This rule is stored in the OpType class. In addition to simple type names, various pattern operators allow indefinite spans such as zero or more instances of types, one or more, and so forth. The ResultType may be either 1) an explicit type name, 2) an integer parameter position indicating that the resulting type is the same as that parameter, or 3) the keyword last indicating the type of the last argument. After a successful match of a type inference pattern, the binding list will contain the inferred type bound to ?itype. |
| Type Inference Rules for Method-Transforms | (DefMethodInference ObjType (MethodName Object Type1 Type2 ...) ResultType) | This generates a pattern that computes the inferred type of a call to the MethodName method of object Ojbect. The rule is stored in the ObjType class. |

TABLE 3

Elements of the Pattern Language

| Pattern Element | Explanation |
| --- | --- |
| Literal Data | Succeeds if it matches the same literal data in the AST. The pattern language is an inverse quoting representation, so that literal data is represented as itself without any syntactic adornment. Non-literal data (e.g., pattern variables or operators) will have syntactic adornment such as a "?" or "$" prefix. |
| ?vblname | Pattern variable. If ?vblname is unbound in the current match, it will match and bind to any AST subtree. If ?vblname is bound, it will match only if its current value matches the current subtree of the AST. |
| $(por pattern1 pattern2 ... patternN) | Succeeds if any of the patterns succeed. |
| $(pand pattern1 pattern2 ... patternN) | Succeeds if all patterns succeed. |
| $(pnot pattern) | Succeeds if the pattern fails. |
| $(none pattern1 pattern2 ... patternN) | Succeeds if the current AST subtree matches none of the patterns. |

TABLE 3-continued

Elements of the Pattern Language

| Pattern Element | Explanation |
| --- | --- |
| $(bindconst ?variable constant) | Bind the constant value to ?variable and succeed, allowing the pattern match to advance without advancing the current position in the AST. |
| $(bindvar ?variable pattern) | This will cause (a copy of) whatever the pattern argument matches in the current AST subtree to be bound to ?variable. This is an analog of the SNOBOL4 "$" operator. |
| $(bindvarEQ ?variable pattern) | This will cause whatever the pattern argument matches in the current AST subtree (not a copy of the AST) to be bound to ?variable. |
| $(is ?variable expression) | The expression is evaluated by LISP and its value bound to the ?variable. |
| $(ptest SingleArgumentLispFunction) | Calls the LISP function using the current item in the AST as its argument. The pattern match succeeds or fails based on the result of SingleArgumentLispFunction. The function may be a lambda expression. |
| $(papply funct arg1 arg2 . . . argn) | Applies LISP function funct to the arguments without advancing the pattern matcher's data pointer. If funct returns non-nil, the match succeeds. Otherwise it fails. A non-nil value may be a pair of the form (variable value) to indicate a binding pair to be added to the current binding list. |
| $(plisp <list of Lisp statements using pattern ?variables>) | Executes the list of LISP statements succeeding or failing based on the return value of the Lisp code. A nil value causes failure and non-nil succeeds. A non-nil value may be a binding pair (variable, value) to be added to the binding list. |
| $(plet LetList Pattern) | This ensures that the ?variables mentioned in the LetList are local to the Pattern. |
| $(pdeclare LetList Pattern) | This is a mechanism that allows a simpler interface to LISP code by mentioning ?variables so that THE GENERATOR macros can invisibly set up a LISP scope for ?variables whose names cannot be determined at pattern definition time. |
| $(pmatch Pattern Data) | Recursively match Pattern against Data that has been bound in the parent match. This basically makes patterns easier to read by taking sub-matching out of line. |
| $(recurseme Pattern Data) | Recursively match Pattern against Data that has been bound in the parent match. This is useful for recognizing recurring patterns such as a list of the same kind of data items or nested loop structures. |
| $(recurse ?resultvbl Data) | Recursively match any relevant transform against Data. The results are returned in ?resultvbl. This pattern is useful in recursively parsing arithmetic expressions and sub-expressions in the AST for the purpose of generating of C code. |
| $(recurseOnTransform Transformname TransformClass ?resultvbl Data) | Recursively matches the data in Data using a specific transform named Transformname that is define in class TransformClass. The results are returned in ?resultvbl. This pattern is useful when previous pattern matching has established that ?newdata is restricted a narrow set of forms much like a grammatical non-terminal restricts the set of legal parses in a programming language. |
| $(recurseOnTransform-Inline Transformname TransformClass ?resultvbl) | Recursively matches from the current match position using a specific transform named Transformname that is define in class TransformClass. The results are returned in ?resultvbl. This is much like recurseOnTransform except that the size of the data to be matched cannot be determined a priori. |
| $(psuch Slotname ?vbl Pattern) | Match Pattern against the value of slot Slotname of the CLOS object bound to ?vbl. |
| $(remain ?variable) | Bind ?variable to the remainder of the list from the current position in the AST. This is the analog of the SNOBOL4 rem operator. |
| $(remainempty ?variable) | Bind ?variable to the remainder of the list and succeed if the remainder is nil and otherwise, fail. |
| $(remainnotempty ?variable) | Bind ?variable to the remainder of the list and succeed if the remainder is non-nil and otherwise, fail. |
| $(spanto ?variable Pattern) | Bind ?variable to the remainder of parent list up to but not including that expression that matches Pattern. |

TABLE 3-continued

Elements of the Pattern Language

| Pattern Element | Explanation |
| --- | --- |
| $(spanthru ?variable Pattern) | Bind ?variable to the remainder of parent list up to and INCLUDING the expression that matches Pattern. |
| $(seq Pattern) | Succeeds if Pattern matches a sequence of items in the AST starting with the current item. In other words, this matches at the parent level of the current item. |
| $(bindseq ?variable Pattern) | Succeeds if Pattern matches a sequence of items in the AST starting with the current item and binds a copy of that sequence to ?variable. |
| $(oneormore Pattern) | Succeeds if Pattern occurs one or more times at the current position in the AST tree. |
| $(zeroormore Pattern) | Succeeds if Pattern occurs zero or more times at the current position in the AST tree. |
| $(within Pattern) | Succeeds if there is an instance of Pattern anywhere within the current AST subtree. The search order is from the leaves up to the root of the subtree. |
| $(preorderwithin Pattern) | Succeed if there is an instance of Pattern anywhere within the current AST subtree. The search order is from the root down. |
| $(pat ?variable) | Match the current item against the pattern bound to ?variable. This allows dynamically computed patterns. For example, the data may contain patterns that describe other portions of the data. |
| $(pmark) | This puts a Prolog-like mark on the choices stack to indicate where the next cut will be stopped. |
| $(pcut) | User invoked Prolog-like cut to cause search to abandon remaining choices back to the last marked choice point. |
| $(psucceed) | Allows the user to assure success of a pattern. |
| $(pfail) | User invoked fail causes search to backup to last choice point and select the next choice. This is often used to iterate through all possible matches. |
| $(ptrace LispEpression Label) | Pattern debugging facility. This produces trace printout of the label if the lisp expression evaluates to true. |
| $(traceon LispSymbol Label) | Pattern debugging facility. This sets LispSymbol (presumably a pattern trace flag) to True. |
| $(traceoff LispSymbol Label) | Pattern debugging facility. This sets LispSymbol (presumably a pattern trace flag) to nil. |
| (<- consequent antecedent) | Defines a Prolog-like inference rule whose antecedent defines a method for achieving the goal expressed by the consequent. This is basically a pattern that can be "called" based on its consequent pattern. These are the inference rules used by THE GENERATOR during the generation process. |
| $(pprove goal) | Will invoke a Prolog-like rule whose consequent matches goal. This is the mechanism by which THE GENERATOR does inference. |
| (RuleSet (RulesetName super) rule1 rule2 . . . rulen) | Defines a rule set RulesetName containing the inference rules rule1 rule2 . . . rulen. RulesetName inherits rules from another rule set object super. |
| $(with-rules (RulesetName) Pattern) | Defines the starting RulesetName for use with any pprove operator in pattern. |
| $(op pattern1 pattern2 . . . ) | This is the general form of any arbitrary pattern operator. It is represented internally as (*PAT* (LAMBDA (*CONT* DATA BINDINGS) (FUNCALL '=op *CONT* '(Pattern1 Pattern2 . . . )) DATA BINDINGS))) where =op is a Lisp pattern matching routine built using continuations, *CONT* is a continuation, DATA is the AST being matched, and BINDINGS is the current binding list. If the user writes pattern operators according to a few simple rules, the pattern language can be user extended to include arbitrary new pattern operators. |
| #.PatternName | Shared pattern, which is the value of the LISP variable PatternName. This is the analog of a non-terminal symbol in a context free grammar. |

TABLE 4

Various Specializations of DS Abstractions

| Operation | Example DS Objects | Role of DS Object | Nature of Change | Trigger |
| --- | --- | --- | --- | --- |
| Definition | s | Template with Defcomponents for defining template loop. | User defined target computation specializes the convolution. | User input. |
| Relocation | s-0 | Template with relocated range [0 . . . n]. | Arithmetic transformation of Defcomponents' functional expressions. | Output GPL (e.g., C) dictates loop expression. |
| Problem Specific Partitioning | Partition (s-0-Edgei) Partition (s-0-Defaultk) | Templates further specialized to partitions inherent to the computation | Redefinition of Defcomponents via partial evaluation assuming various conditions. | User supplied domain knowledge about natural partitions. |
| Thread Partitioning | Thread-v(Partition (s-0-Edgei1), Partition (s-0-Defaultk1)) Thread-w(Partition (s-0-Edgei2), Partition (s-0-Defaultk2)) | Partitions and their templates may be split and grouped for threading. | Partition splitting with template specialization or partition grouping. | Machine specification of thread-based parallelizetion. |
| Vectorization | Partition (s-0-Edgei-SSE) Partition (s-0-Defaultk-SSE) | Templates further specialized to SIMD encoding. | Dynamically create Defcomponent (e.g., W) and a preroutine that will restructure coefficients to data array. | If machine spec requests it, inlining of convolution expression dynamically redefines the convolution's own Defcomponents. |
| Combination | Partition (s-0-Edgei-SSE, s-0-Edgeh-SSE) | Set of templates that can share loop control structure. | Compatible partitions allowing loop sharing are grouped into a partition. | Determined by range definition compatibility. |
| Extension or Contraction | s-0-xt | Template for matrix shape extension. | Defcomponents of template are transformed for extended or contracted ranges. | User specified matrix shape correlations. |
| Partition Cross Product | Partition (s-0-Edgei-xt0) Partition (s-0-Edgei-xt1) | Overlapping but not combinable template based partitions. | Combine two partition sets (via specialization) (e.g., s-0-Edgei and xt0 specialize to s-0-Edgei-xt0). | Two potentially combinable APCs that lack compatibility of overlapping templates. |

TABLE 5

Key Generator Operations

| Type of Operation | Examples | Key Goals and Mechanisms | Nature of Change | Trigger |
|---|---|---|---|---|
| Create APC for DS data type. | A loop2d APC defines control variables, their ranges and strides (e.g., i2 ranging from 0 to (M−1) by 1); loop nesting; and data decomposition (image -> pixel). | First specification of an abstract loop (i.e., a kind of genotype) which describes loop control variables and unpartitioned dimensions. Constraint APCs sketch intent of an incipient loop leaving concrete GPL specifics to be determined. | Invent target program loop variables (e.g., i2, j3) and transform D to D[i2,j3], for example. | Occurrence of M by N colorimage D, for example. Phase is Localization And-Partition (or LP). |
| Create APC(s) for DS expression. | Convolution, for example, implies a 2d loop and a 2d template sub-loop both of which must be coordinated with the loops implied by its operands. | Evolution, specialization and merging of abstract loops induced by the DS operator and operands, e.g., convolution operation. | APC of image promoted to expression and APC of template promoted as sub-loop of image APC. | Occurance of a DS expression (e.g., convolution expression). Phase is LP. |
| Promote APC | A loop2d APC constraining example expression (conv D[i2,j3] s-0 [p15,q16]) is promoted to (expr (conv . . . ) 2). | Loop that computes (conv . . . ) image and loop that computes (expr (conv . . . ) 2) can be the same loop. | Extend the body of the incipient loop implied by the loop APC. | Occurance of DS operation implying a loop (e.g., convolution expression). Phase is LP. |
| Identify Partitioning Propositions | Idpartitionmatrixtest and Matrixedge objects | Idpartitionmatrixtest is used to identify "propositions" that will partition loop(s) into parallel cases. Matrixedge object provides a case-specific token (e.g., "edge") for building human-friendly specialization names. | Propositions are used to create partition-specific specializetions of DS operators and operands. | Expression specific transformation recognizing DS operators and operands. Phase is LP. |
| Create a Partition | Partition(s-0-edge14) APC might contain fields such as- Seed Test: Partestx (s-0) Specialization: s-0-edge14 Subst: (s-0, s-0-edge14) | Partition APC constrains a loop APC thereby defining how to transform a unconstrained loop based on a seed object (e.g., s-0) into a partition of that loop based on a specialization of the seed object (e.g., s-0-edge14). The "Partestx (s-0)" constraint of the seed loop becomes "Partestx (s-0-edge14)" in the partition loop. | Create a Partestx Defcomponent (e.g., Partestx (s-0-edge14)) to effect specialization of the loop control structure. | This is one step of Creating a Partition-Set. Phase is LP. |
| Create a Partition-Set | Partition (s-0-edge11) Partition (s-0-edge12) Partition (s-0-edge13) Partition (s-0-edge14) Partition (s-0-default1) | PartitionSet APC is the set of parallel partitions that taken together comprise the complete computation. | PartitionSet is created as a holder for Partitions. It is associated with the relevant loop APC thereby constraining the loop APC. | Occurance of DS operation implying a loop (e.g., convolution expression) in which some DS object has an Idpartition constraint. Phase is LP. |

TABLE 5-continued

Key Generator Operations

| Type of Operation | Examples | Key Goals and Mechanisms | Nature of Change | Trigger |
|---|---|---|---|---|
| Create a ThreadSet | Thread-v( Partition (s-0-Edgei1), Partition (s-0-Defaultk1)) | ThreadSet APC is the set of parallel partitions that will be organized together. ThreadSet is a subclass of PartitionSet. | ThreadSet is created as a holder for Partitions if thread parallelism is specified by the user. | Same trigger as PartitionSet except that the Platform Specification requests multi-core. Phase is LP. |
| Merge Partitions | Partition (s-0-edge6) Partition (s-0-edge11) | Partitions that lead to the same loop control structure are equivalent. However, non-control structure Defcomponents (e.g., W) may be different. | Becomes one partition with multiple spec substitutions to handle different seed objects (e.g., s-0 & sp-0). | Two separate APCs potentially promotable to same expression level. Phase is LP. |
| Coordinate Design Decisions | Target program variables idx3, idx7 and idx10 might be replaced by idx13 and temporary design placeholders (e.g., colorpixel4) might be replaced by their definitions (e.g., (aref d idx13 idx14)) | Dynamically generated transformations that recorded design decisions during localization and partitioning are executed to effect those decisions. | Redundant target program variables are discarded and temporary design stand-ins are mapped to functional definitions. | Triggered by SpecRefine phase. |
| Generate Pre-GPL loop | (_forall (idx13 idx14) (_suchthat (partestx sppart-0) (_member idx13 (_range 0 99)) (_member idx14 (_range 0 99))) ...) | Create seed scope, initializations, loop with variable and their constraints (e.g., range specs for variables and possibly a partitioning proposition). | Begin to establish concrete scope and loop structures. | Expressions with loop APCs found during Codegen phase. |
| Repartition | Seed loop structure specialized by partitions. | Partitionset APC that is associated with a previously generated seed loop supplies substitutions (e.g., s-0-edge6 for s-0) to create specializations of the seed loop. | Create one specialized loop structure for each partition. | Expressions with partitionset APC found during Repartition phase. |
| Inline Definitions | Definitions for pseudo-code (e.g., convolution, w, col, row, etc.) are in-lined. | User supplied Defcomponents and their specializations transform the abstract pseudo-code into concrete but pre-GPL code. | Recursive in-lining of domain entities and their Defcomponents. | Triggered by the Inline phase. |
| Simplify Loops | Edge case template loops with coefficients of zero may partially evaluate to (:= ans1 0) (:= ans2 0). | Loops are partially evaluated to simplify them. | Expression simplification. | Triggered by the Simplify-loops phase. |

TABLE 5-continued

Key Generator Operations

| Type of Operation | Examples | Key Goals and Mechanisms | Nature of Change | Trigger |
|---|---|---|---|---|
| Infer Loop Limits | (_forall (idx3 idx4) (_suchthat (!= idx3 0) (!= idx4 0) (!= idx3 99) (!= idx4 99) (_member idx3 (_range 0 99)) (_member idx4 (_range 0 99))) ... ) | Concrete partitioning propositions (e.g., (!= idx3 0)) imply changes to range of loop control variable (e.g., (_member idx3 (_range 0 99)). | Rewrite ranges. The example_ suchthat propositions at the left imply a rewrite to (_member idx3 (_range 1 98)) for idx3's range. | Called from the Simplify-Loops step. |
| Hoist Arithmetic | (+ p5 −1) occurs several times in the q6 template loop within the p5 template loop. | Optionally, hoisting may be requested in Platform Spec when target C compiler does not do it. This is a standard optimization. | (:= hoist4 (+ p5 −1)) is moved above the q6 loop. | Triggered by the HoistArith phase. |
| Opportunistic optimizations | (expt expr 2) is candidate for reduction in strength. | Optionally, reduce an exponentiation operation to a multiply by reorganizing the code. This is a standard optimization. | (:= tmp3 expr) is moved out of line and (expt expr 2) becomes (* tmp3 tmp3) | Triggered by the Opt phase. |
| Insert Declarations | User specified (e.g., c) and invented variables (e.g., idx3) to their scope locations and out-of-line code moved into sequence ... | Assemble code into a sequence acceptable to compiler with variable declarations going into their proper scopes. | Inserts definitions from scopes and linearizes definitions. | Triggered by the Insert-Scopes phase. |
| Generate C | "(+ Idx3 1)" data structure goes to "(idx3 + 1)" string. | AST to C code. | Add surface C syntax to AST and pretty print. | GPLGen Phase. |

What is claimed is:

1. A method of automatically generating computer code for implementing a desired computation on a desired execution platform, the method comprising:
   providing an implementation neutral domain specific specification expressed in terms of domain specific operators and operands, the implementation neutral domain specific specification specifying details for a desired computation;
   providing a domain specific specification of a desired execution platform selected from a plurality of possible execution platforms, the domain specific specification of a desired execution platform including information about high capability features of the desired execution platform; and
   using the implementation neutral domain specific specification and the domain specific specification of the desired execution platform to automatically generate computer code that exploits the high capability features of the desired execution platform, wherein human intervention is not required to generate the computer code that exploits the high capability features of the desired execution platform after the implementation neutral domain specific specification and the domain specific specification of the desired execution platform are provided;
   creating a logical architecture, wherein the logical architecture is a partial and provisional specification of at least some design features of said desired computation;
   wherein said logical architecture includes constraint objects and their associated parts within said implementation neutral, domain specific specification of said computation;
   wherein said constraint objects limit a legitimate set of possible forms of one or more eventual programming language expressions of said constraint objects and their associated parts;
   wherein said constraint objects may represent, among other things, implied iteration objects such that one or more eventual programming language expressions derived from said implied iteration objects are logically consistent with a set of logical assertions and abstract precursors to said logical assertions that are part of one or more definitions of said implied iteration objects;
   wherein said constraint objects may represent, among other things, implied partitions of said computer code that exploits the high capability features of the desired execution platform such that said implied partitions are logically consistent with a set of logical assertions and abstract precursors to said logical assertions that are part of one or more definitions of said constraint objects; and
   wherein said logical assertions and abstract precursors to said logical assertions of a constraint object that implies a partition are called partitioning conditions for said constraint object that implies a partition.

2. The method of claim 1, further comprising creating a logical architecture, wherein the logical architecture is a partial and provisional specification of at least some design features of said the desired computation.

3. The method of claim 2, further comprising creating a physical architecture from the logical architecture by applying a plurality of transformations to incorporate a plurality of distinct design features that are implied by the domain specific specification, wherein a final form of the physical architecture is the realization of the desired computation.

4. The method of claim 3, wherein revisions, refinements or changes to the implied iteration objects are accomplished using the set of logical assertions.

5. The method of claim 1, wherein the high capability features of the desired execution platform include instruction level parallelism.

6. The method of claim 1, wherein the high capability features of the desired execution platform include multicore parallelism.

7. The method of claim 1, further comprising:
providing a second domain specific specification of a second desired execution platform, the second domain specific specification including information about high capability features of the second desired execution platform; and
using the implementation neutral domain specific specification that specifies details for the desired computation and the second domain specific specification of a desired execution platform to automatically generate computer code that exploits the high capability features of the second desired execution platform.

8. The method of claim 7, wherein the generated computer code that exploits the high capability features of the second desired execution platform is generated without reprogramming the implementation neutral domain specific specification.

9. A method in a computer system for fully automatic generation of a compilable and executable high capability implementation form of a computation from an implementation neutral, domain specific specification of said computation and a separate domain specific description of a target execution platform, comprising:
creating a logical architecture, wherein said logical architecture is a partial and provisional specification of at least some design features of said compilable and executable high capability implementation; and
creating a physical architecture from said logical architecture by applying a plurality of transformations to incorporate a plurality of distinct design features that are implied by said domain specific description of a target execution platform, wherein the final form of said physical architecture is the realization of said compilable and executable high capability implementation form of a computation, and wherein human intervention is not essential to the generation of the compilable and executable high capability implementation form of a computation;
wherein said logical architecture includes associative programming constraint objects and their associated parts within said implementation neutral, domain specific specification of said computation, wherein said constraint objects limit a legitimate set of possible forms of one or more eventual programming language expressions of said constraint objects and their associated parts resulting in the generation of the compilable and executable high capability implementation form of a computation;
wherein said constraint objects may represent, among other things, implied iteration objects such that the one or more eventual programming language expressions derived from said implied iteration objects are logically consistent with a set of logical assertions and abstract precursors to said logical assertions that are part of a definition of said implied iteration objects;
wherein said constraint objects may represent, among other things, implied partitions of said computer code that exploits the high capability features of the desired execution platform such that said implied partitions are logically consistent with a set of logical assertions and abstract precursors to said logical assertions that are part of one or more definitions of said constraint objects; and
wherein said logical assertions and abstract precursors to said logical assertions of a constraint object that implies a partition are called partitioning conditions for said constraint object that implies a partition.

10. The method of claim 9, further comprising inferring a program language iteration form in said compilable and executable high capability implementation from said set of logical assertions and abstract precursors to said logical assertions that define a constraining behavior of an iteration object.

11. The method of claim 10, wherein inferring a program language iteration form is performed in conjunction with other information including one or more of information from said implementation neutral, domain specific specification of said computation, information from said domain specific description of a target execution platform and other information derived during generation.

12. The method of claim 9, wherein revisions, refinements or changes to the constraining behavior of said implied iteration objects are accomplished by addition to, deletion from or alteration of said set of logical assertions and abstract precursors to said logical assertions.

13. The method of claim 9, wherein said constraint objects represent an implied partitioning of said compilable and executable high capability implementation such that the constraining behavior of the constraint object representing an implied partitioning is determined by a set of logical assertions and precursors to said logical assertions, wherein said set must be logically consistent with the logical preconditions of the implied computational partitionings.

14. The method of claim 13, wherein a decomposition of said computation into separate pieces of the overall computation can be automatically inferred from a partitioning constraint object.

15. The method of claim 13, wherein revisions, refinements or changes to the constraining behavior of said partitioning objects are accomplished by addition, deletion or alteration of said set of logical assertions and precursors to said logical assertions.

16. The method of claim 9, wherein said implementation neutral, domain specific specification includes definitions of domain specific operators and domain specific operands, wherein the definitions of said domain specific operators and domain specific operands may optionally be defined by a human user or programmer.

17. The method of claim 16, where the definitions of said domain specific operators and operands may depend upon definitions of constraint objects and therefore said definitions may vary depending upon variations determined by said constraint objects.

18. The method of claim 17, wherein domain specific operators and operands may be specialized to a specific partition constraint object by partially evaluating definitions of said domain specific operators and operands under the assumption of logical assertions and abstract precursors to said logical assertions that are part of one or more definitions of said specific partition constraint object.

19. The method of claim 18, wherein the implementation neutral computational specification or a portion thereof may be specialized to a specialized specific constraint object by substituting domain specific operators and operands specialized to said specialized specific constraint object for the corresponding unspecialized domain specific operators and operands in said implementation neutral computational specification or portion thereof.

20. The method of claim 16, further comprising repartitioning said logical architecture to reform non-equivalent sets of partition constraint objects into a single set of partition constraint objects, wherein said repartitioning formulates a new set of partition constraint objects whose partitioning conditions are formed from applying the distributive law from logic to the partitioning conditions of said partitioning constraint objects within said non-equivalent sets, which means treating the non-equivalent sets as if they are connected by the logical 'and' operator and treating said partition conditions within each non-equivalent set as if said partitioning conditions were connected by the logical 'or' operator and then distributing said 'and' operator over said 'or' operators per the distributed law of logic.

21. The method of claim 9, wherein said logical architecture is fully automatically manipulated and evolved from the start of generation to the generation of said compilable and executable high capability implementation without human intervention.

22. The method of claim 21, further comprising automatically forming sets of partition objects that cover a set of computationally distinct cases of a computation, wherein said set of computationally distinct cases are identified by a set of domain specific knowledge that identifies a set of partitioning conditions within the implementation neutral, domain specific specification of the computation, and wherein said set of domain specific knowledge may be supplied by a user in the course of providing said implementation neutral, domain specific specification of the computation.

23. The method of claim 21, further comprising repartitioning said logical architecture to unify logically equivalent partition constraint objects, wherein a partitioning condition of a partition constraint object is a set of logical assertions and abstract precursors to said logical assertions that are part of one or more definitions of said partition constraint object; and wherein two partition constraint objects x and y are logically equivalent if the following clause is true, the partitioning condition of x is true if and only if the partitioning condition of y is true, which means that the full clause is true when the partitioning conditions of x and y always have the same truth value, either both true or both false.

24. The method of claim 21, further comprising repartitioning said logical architecture to unify logically equivalent sets of partition constraint objects, wherein two sets of partition constraint objects v and w can be unified only when the sets of partition constraint objects v and w are the same size and when each partition constraint object in v is one to one logically equivalent to a partition constraint object in w.

25. The method of claim 21 further comprising repartitioning said logical architecture by synthesizing a plurality of new, synthetic constraint objects that imply a plurality of design features and by incorporating said plurality of new, synthetic constraint objects into said logical architecture, wherein said plurality of new, synthetic constraint objects implicitly limit a legitimate set of possible forms of an eventual programming language expression of said constraint objects and their associated parts to only those said possible forms that include said plurality of design features.

26. The method of claim 25, further comprising unifying dimensional shapes of two separate data structures whose dimensional shapes are similar but not exactly the same so that two separate control structures for iterating over said two separate data structures can be unified into a single control structure that will iterate over both, wherein the shape of one of the data structures, called the inferior data structure, is dimensionally contained within the other data structure, called the superior data structure, the method further comprising:
  synthesizing a pair of partitions, one whose partitioning condition is true for data structure elements within the inferior data structure, and a second virtual partition whose partitioning condition is true for data structure elements that are outside said inferior data structure but inside superior data structure;
  specializing said inferior data structure to make its dimensional shape equivalent to the dimensional shape of said superior data structure such that the specialized inferior data structure will imply a control structure equivalent to that implied by said superior data structure;
  replacing occurrences of said inferior data structure with the specialized version thereof;
  formulating intermediate language definitions of new data structure access methods specialized to the two newly synthesized partitions, where said data structure access methods express the correct behaviors for the two newly synthesized partitions; and
  unifying said two separate implied control structures into one and computing the unified partition set.

27. The method of claim 21, further comprising realizing specializations of computational partitions by cloning with specialization, wherein cloning with specialization is realized by copying that implementation neutral specification portion of the logical architecture that is associated with a partitioning constraint object and then specializing said implementation neutral specification portion.

28. The method of claim 21, further comprising formulating part or all of the physical architecture by choosing a physical design framework based on said logical architecture, said implementation neutral specification, said execution platform specification and a plurality of other information derived during a step by step generation process.

29. The method of claim 28, further comprising deriving synchronization patterns and related implementation patterns from domain and derived knowledge.

30. The method of claim 28, further comprising deriving from domain and derived knowledge a data flow design and parameter plumbing design by which data is communicated between operational components of said physical architecture.

31. The method of claim 21, further comprising populating a chosen physical framework by mapping cloned specializations of a computation into unfilled receptacle slots with said framework using domain knowledge associated with said cloned specializations and domain knowledge associated with said unfilled receptacle slots.

32. The method of claim 9, wherein said constraint objects are specialized by addition, deletion or alteration of the set of logical assertions defining constraining behavior of said constraint objects, where such specialization alters a set of legitimate programming language forms that can be derived from said constraint objects and associated objects to which said constraint objects apply.

33. The method of claim 9, wherein said compilable and executable physical architecture will execute on some high capability execution platform and exploit some or all of the high capability features of the high capability execution platform.

34. The method of claim 9, wherein said high capability features are open ended and may include at least one of multicore parallel execution, instruction level parallel execution, application specific processor, graphical processor unit, specialty central processing unit, specialty library, specialty program, and specialty operating system interface.

35. The method of claim 9, wherein said implementation neutral, domain specific specification of said computation provides sufficient information for a human to understand what computation is being specified but no information as to how that computation is intended to be implemented.

36. The method of claim 9, wherein said plurality of transformations from said logical architecture to said physical architecture is decomposed into a set of named phases, wherein each phase has a defined generation objective, and wherein said generation objective of a phase is implemented by a set of transformations enabled for said phase.

37. The method of claim 36, wherein transformations are defined to be enabled only during one or more phases and where transformations are available to be executed only when they are enabled.

38. The method of claim 36, wherein overall generation behavior of said method is user definable, the method further comprising: defining a set of operating phases and any user specialized behaviors of said phases; defining a set of transformations each of which is enabled for one or more of said phases; optionally, defining extensions to basic system data, operations and behaviors; and informing said method, at the start of a generation run, of a plurality of phases and an order of said phases to be used for said generation run.

39. The method of claim 9, wherein transformations are stored on an object called their home object and are only available for application if a search strategy traverses said transformation's home object, where there are a plurality of search strategies, where which said search strategy is chosen is user specifiable and where a plurality of additional search strategies may be defined by said user.

40. The method of claim 39, wherein transformations may optionally be inheritable, meaning that if a search for applicable transformations starts at an object within a tree of objects but finds no applicable transformations at the object at which the search starts, the search will proceed up the tree and apply any enabled transformation that is found, the method further comprising:
determining a starting object for a transformation search; and
if there is an applicable and enabled transformation at said object, applying it successfully, else if said transformation at said object fails, then recursing up the object tree until an applicable and enabled transformation is found that can be successfully applied, or else if no such transformation can be found on any object up the tree, causing the search to fail.

41. The method of claim 39, wherein an object chosen to start the search for applicable and enabled transformations is user definable.

42. The method of claim 9, wherein intermediate language forms are used to stand-in for programming language code forms that cannot yet be formed because details of said code forms require design decisions that are yet to be made, design details that are yet to be determined or relationships to other code that is similarly incomplete and in determinant, wherein said intermediate language forms will eventually be refineable into said programming language code forms or precursors thereof, and wherein said intermediate language is a mechanism whereby definitions of domain specific operators and operands are expressed, the method comprising:
constructing definitions in said intermediate language as phase specific transformations;
revising definitions in said intermediate language definitions by revising said phase specific transformations to incorporate design features; and
when the method is operating in a phase specific to one or more intermediate language definitions, applying said definitions of said intermediate language to expressions in said logical architecture or in said physical architecture by matching left hand sides of the phase specific transformations specific to said definitions and if successful, replacing said expressions with the right hand sides of said definitions instantiated with data from said matching of the left hand sides.

43. The method of claim 42, further comprising deferring mapping of intermediate language definitions into legitimate programming language forms or precursors thereof until all necessary programming language contextual structure has been created, the method further comprising:
defining a set of generation phases whose totality of effect is to create all necessary programming language contextual structure required by a plurality of all intermediate language definitions and then defining a plurality of subsequent generation phases whose effect is to map said intermediate language definitions into legitimate programming language forms or precursors thereof; and
defining transforms that map said intermediate language definitions into legitimate programming language forms or precursors thereof such that said transforms are enabled only in said plurality of subsequent generation phases, thereby deferring said mapping until a plurality of phases preceding said plurality of subsequent generation phases have had sufficient time to create said necessary programming language contextual structure.

44. The method of claim 42, further comprising coordinating and synchronizing an implied design of logically interrelated but physically separated code chunks within said physical architecture by coordinated and synchronized definitions of said logically interrelated but physically separated code chunks, the method further comprising:
defining domain specific operators and operands whose intermediate language definitions will refine into code chunks that include said logically interrelated but physically separated code chunks; and
coordinating specializations of said domain specific operators and operands such that their intermediate language definitions contain connecting and coordinating machinery that will be invoked when said intermediate language definitions are transformed into code or precursors to code.

45. The method of claim 44, further comprising modifying generator process transformations of future phases to assist in coordination and synchronization during refinement of intermediate language definitions of said domain specific operators and operands into code or precursors to code.

46. The method of claim 9, further comprising creating a customized program generation system via an ability to micro-program a plurality of data and behaviors of the method, wherein creating the customized program generation system further comprises:
extending, redefining and varying step by step transformation behavior; what transformation phases are included and how said transformation phases are defined in said program generation system; an ordered list of specific translation phases to be enabled for each specific redefinition, extension and variation of said program generator; how deep, how broad and what kind of domain knowledge is dealt with by said program generator; what applicable application domains are dealt with by said program generator; what domain specific operators and operands are dealt with for a plurality of application domains; which target execution platforms are dealt with by said program generator; and special capabilities of target execution platforms that are implemented by said program generator including but not limited to high capability target execution platforms.

47. The method of claim 9, further comprising encapsulating design features in the logical architecture or the physical architecture of said compilable and executable high capability implementation form of a computation, the method further comprising:

specializing domain specific operators and operands by formulating new, uniquely named instances of said domain specific operators and operands;

specializing intermediate language definitions of said domain specific operators and operands by applying higher order transformations, whose definitions codify said design features, to the lower order transformations that implement the definitions of said domain specific operators and operands, and thereby revising said lower order transformations such that they incorporate the design feature within their newly formed definitions; and assigning the specialized intermediate language definitions to be the intermediate language definitions of said new, uniquely named instances of said domain specific operators and operands.

48. A method in a computer system for recognition, derivation, use and application of meta-information about a process of generating a compilable and executable high capability implementation form of a computation from an implementation neutral, domain specific specification of said computation and a separate domain specific description of a target execution platform, rather than meta-information only about just a compilable and executable high capability implementation product, wherein said meta-information is information beyond and outside that which a programming language compiler requires and uses to generate code, wherein said meta-information is operated upon in a fully automated manner, and wherein said meta-information informs and guides processes of generating said compilable and executable high capability implementation;

the method further comprising:

capturing and using domain specific knowledge as meta-information to guide and inform processes of generating said compilable and executable high capability implementation, wherein said domain specific knowledge includes but is not limited to knowledge of problem domains, generation process domains, execution platform architecture domains, mathematics domains, data structure domains, parallel processing domains, high capability architecture domains, domains of heuristic rules of design, domains of algorithms and a plurality of other knowledge domains beyond that which a programming language compiler requires and uses to generate code;

creating a logical architecture, wherein said logical architecture is a partial and provisional specification of at least some design features of said compilable and executable high capability implementation; and wherein said logical architecture includes associative programming constraint objects and their associated parts within said implementation neutral, domain specific specification of said computation, wherein said constraint objects limit a legitimate set of possible forms of one or more eventual programming language expressions of said constraint objects and their associated parts resulting in generation of the code; and wherein said constraint objects may represent, among other things, implied iteration objects such that one or more eventual programming language expressions derived from said implied iteration objects are logically consistent with a set of logical assertions and abstract precursors to said logical assertions that are part of one or more definitions of said implied iteration objects;

wherein said constraint objects may represent, among other things, implied partitions of said computer code that exploits the high capability features of the desired execution platform such that said implied partitions are logically consistent with a set of logical assertions and abstract precursors to said logical assertions that are part of one or more definitions of said constraint objects; and wherein said logical assertions and abstract precursors to said logical assertions of a constraint object that implies a partition are called partitioning conditions for said constraint object that implies a partition.

49. The method of claim 48, further comprising recognizing and generating meta-information specifying future but required generation actions that cannot be performed until a plurality of intervening and prerequisite generation actions have been performed to prepare the logical or physical architecture to assure that said future but required generation actions will be successfully performed.

50. The method of claim 49, further comprising acquiring, accumulating and organizing meta-information where an availability and opportunity for said acquiring, accumulating and organizing meta-information occurs at a plurality of generation steps before a generation step or steps wherein there is an opportunity to perform or apply said meta-information.

51. The method of claim 48, further comprising creating and representing meta-information as revisions to later stages of a generation process, wherein creating and representing meta-information as revisions to later stages of the generation process further comprises:

specializing, during a plurality of current transformation steps, a plurality of other transformation steps scheduled for a later phase in the generation process by incorporating operational variations implied by a specific computation being processed by the generation process defined by this method; and applying the newly specialized said plurality of other transformation steps during said later phase.

* * * * *